United States Patent
Park et al.

(10) Patent No.: US 10,474,282 B2
(45) Date of Patent: Nov. 12, 2019

(54) ELECTRONIC DEVICE INCLUDING ANTENNA DEVICE

(71) Applicant: Samsung Electronics Co., Ltd., Suwon-si, Gyeonggi-do (KR)

(72) Inventors: Jung-Sik Park, Suwon-si (KR); Jae-Young Shin, Yongin-si (KR); Seunggil Jeon, Suwon-si (KR); Chongyoon Chung, Seoul (KR); Dohyung Ha, Seoul (KR); Byoung-Uk Yoon, Hwaseong-si (KR); Hyun-Ju Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 15/458,565

(22) Filed: Mar. 14, 2017

(65) Prior Publication Data
US 2017/0285844 A1 Oct. 5, 2017

(30) Foreign Application Priority Data

Mar. 31, 2016 (KR) .......................... 10-2016-0039590

(51) Int. Cl.
*G06F 3/041* (2006.01)
*G06F 1/16* (2006.01)
(Continued)

(52) U.S. Cl.
CPC .......... *G06F 3/0416* (2013.01); *G06F 1/1643* (2013.01); *G06F 1/1647* (2013.01);
(Continued)

(58) Field of Classification Search
CPC ...... G06F 3/041–047; G06F 2203/041–04113; G06F 3/0416;
(Continued)

(56) References Cited

U.S. PATENT DOCUMENTS

| 8,442,600 | B1 | 5/2013 | Tseng |
| 8,665,236 | B2 | 3/2014 | Myers |

(Continued)

FOREIGN PATENT DOCUMENTS

| KR | 10-1025054 B1 | 3/2011 |
| KR | 10-2011-0120858 A | 11/2011 |

(Continued)

*Primary Examiner* — Roberto W Flores
(74) *Attorney, Agent, or Firm* — Jefferson IP Law, LLP

(57) ABSTRACT

An electronic device is provided. The electronic device includes a housing having a first face, a second face that faces a direction opposite to the first face, and a side face that encloses at least a portion of a space between the first face and the second face, a touch sensing circuit disposed within the housing, a communication circuit disposed within the housing, a transparent substrate that forms at least a portion of the first face, the second face, and the side face of the housing, at least one display disposed within the housing along at least a portion of the transparent substrate, a first conductive pattern disposed between the transparent substrate and the at least one display or inside the at least one display, and electrically connected with the touch sensing circuit, and a second conductive pattern disposed between the transparent substrate and the first conductive pattern, and electrically connected with the wireless communication circuit.

20 Claims, 90 Drawing Sheets

(51) Int. Cl.

| | |
|---|---|
| *G06F 3/044* | (2006.01) |
| *G06F 1/3234* | (2019.01) |
| *H01Q 1/24* | (2006.01) |
| *H01Q 1/40* | (2006.01) |
| *H01Q 3/24* | (2006.01) |
| *H01Q 9/42* | (2006.01) |
| *H01Q 21/28* | (2006.01) |
| *H01Q 5/30* | (2015.01) |

(52) U.S. Cl.
CPC .......... *G06F 1/1652* (2013.01); *G06F 1/1692* (2013.01); *G06F 1/1698* (2013.01); *G06F 1/3262* (2013.01); *G06F 1/3265* (2013.01); *G06F 3/044* (2013.01); *G06F 2203/04102* (2013.01); *G06F 2203/04105* (2013.01); *G06F 2203/04107* (2013.01); *G06F 2203/04112* (2013.01); *H01Q 1/243* (2013.01); *H01Q 1/40* (2013.01); *H01Q 3/24* (2013.01); *H01Q 5/30* (2015.01); *H01Q 9/42* (2013.01); *H01Q 21/28* (2013.01); *Y02D 10/153* (2018.01)

(58) Field of Classification Search
CPC .... G06F 1/1643; G06F 1/3265; G06F 1/3262; G06F 1/1692; G06F 1/1652; G06F 1/1698; G06F 1/1647; G06F 3/044; G06F 2203/04107; G06F 2203/04102; G06F 2203/04112; G06F 2203/04105; H01Q 1/242; H01Q 1/243; H01Q 1/2283; H01Q 5/30; H01Q 21/28; H01Q 9/42; H01Q 3/24; H01Q 1/40; Y02D 10/153; G09G 2380/02

See application file for complete search history.

(56) References Cited

U.S. PATENT DOCUMENTS

| | | |
|---|---|---|
| 8,831,687 B1 | 9/2014 | Kotab |
| 8,976,141 B2 | 3/2015 | Myers et al. |
| 2009/0051620 A1 | 2/2009 | Ishibashi et al. |
| 2011/0273382 A1* | 11/2011 | Yoo .......................... G06F 3/041 345/173 |
| 2013/0059532 A1* | 3/2013 | Mahanfar ............ H04B 5/0031 455/41.1 |
| 2013/0162594 A1* | 6/2013 | Paulsen .................... G06F 3/044 345/174 |
| 2013/0229362 A1* | 9/2013 | Liu .......................... G06F 3/041 345/173 |
| 2013/0328732 A1* | 12/2013 | Shimizu ................... H01Q 1/22 343/720 |
| 2014/0043248 A1* | 2/2014 | Yeh .......................... H01Q 7/00 345/173 |
| 2014/0080411 A1* | 3/2014 | Konanur ............... H04B 5/0031 455/41.1 |
| 2014/0152425 A1* | 6/2014 | Valentine .................. G06F 3/00 340/10.51 |
| 2014/0213178 A1* | 7/2014 | Wolff ...................... H01P 11/00 455/41.1 |
| 2014/0292601 A1 | 10/2014 | Kim et al. |
| 2015/0015511 A1* | 1/2015 | Kwak .................... G06F 3/0412 345/173 |
| 2015/0024728 A1 | 1/2015 | Jang |
| 2015/0035715 A1 | 2/2015 | Kim et al. |
| 2015/0199037 A1* | 7/2015 | Reunamaki ............ G06F 3/041 345/173 |
| 2015/0214619 A1* | 7/2015 | Shimizu ................. H01Q 1/243 343/748 |
| 2015/0311960 A1* | 10/2015 | Samardzija ............. G06F 1/163 455/90.3 |
| 2016/0188092 A1* | 6/2016 | Sebastian .............. G06F 3/0416 345/174 |
| 2016/0211586 A1 | 7/2016 | Hong et al. |
| 2016/0328057 A1* | 11/2016 | Chai ...................... G06F 3/0412 |

FOREIGN PATENT DOCUMENTS

| | | |
|---|---|---|
| KR | 10-1348452 B1 | 1/2014 |
| KR | 10-2014-0117309 A | 10/2014 |
| KR | 10-2015-0009204 A | 1/2015 |
| KR | 10-2015-0015759 A | 2/2015 |
| KR | 10-2015-0032972 A | 4/2015 |
| WO | 2009/085777 A2 | 7/2009 |

\* cited by examiner

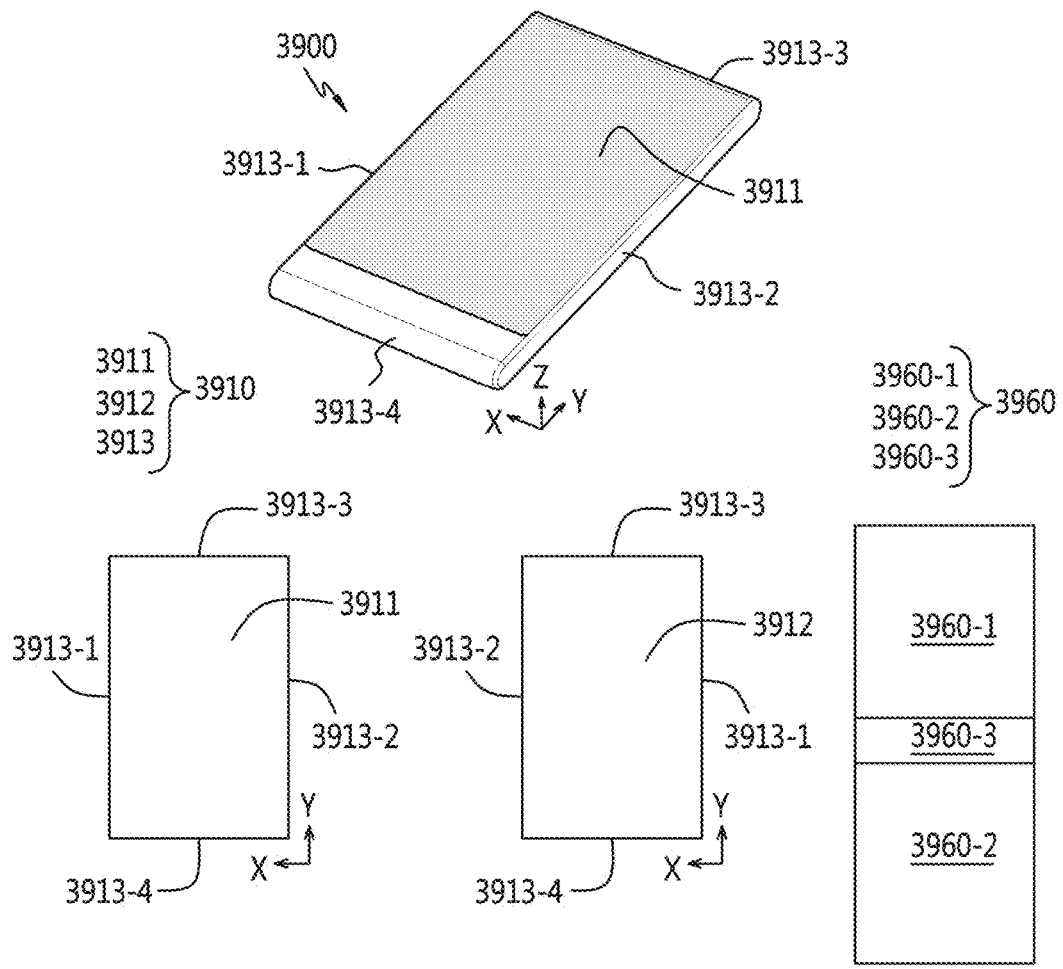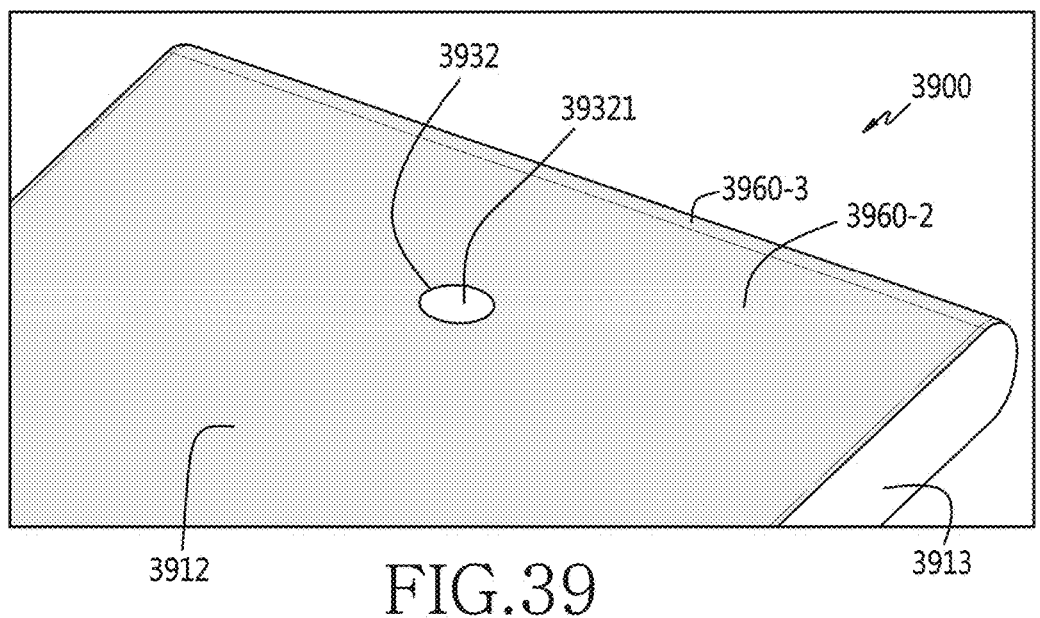
FIG.39

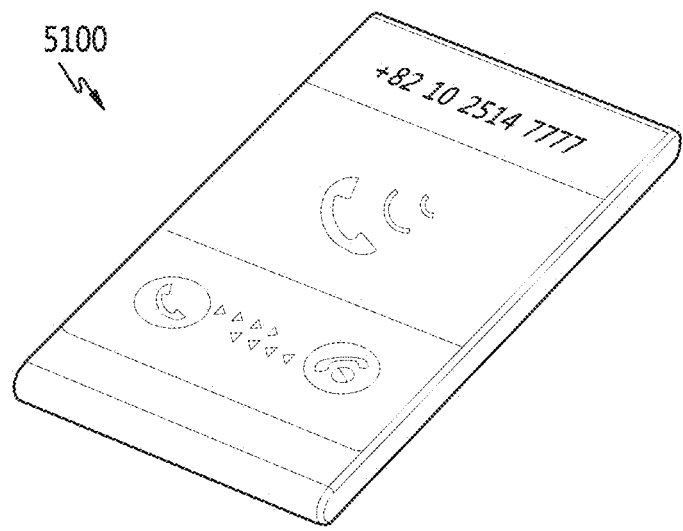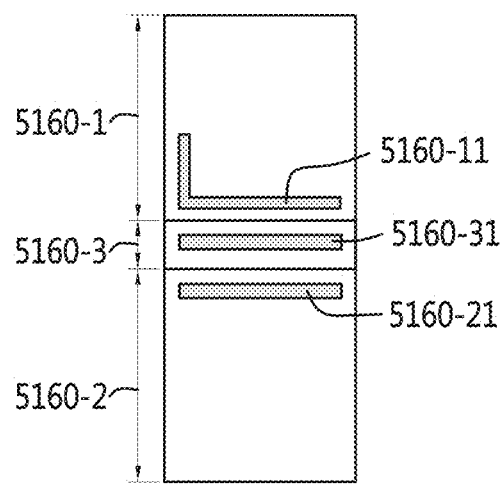
FIG.51B

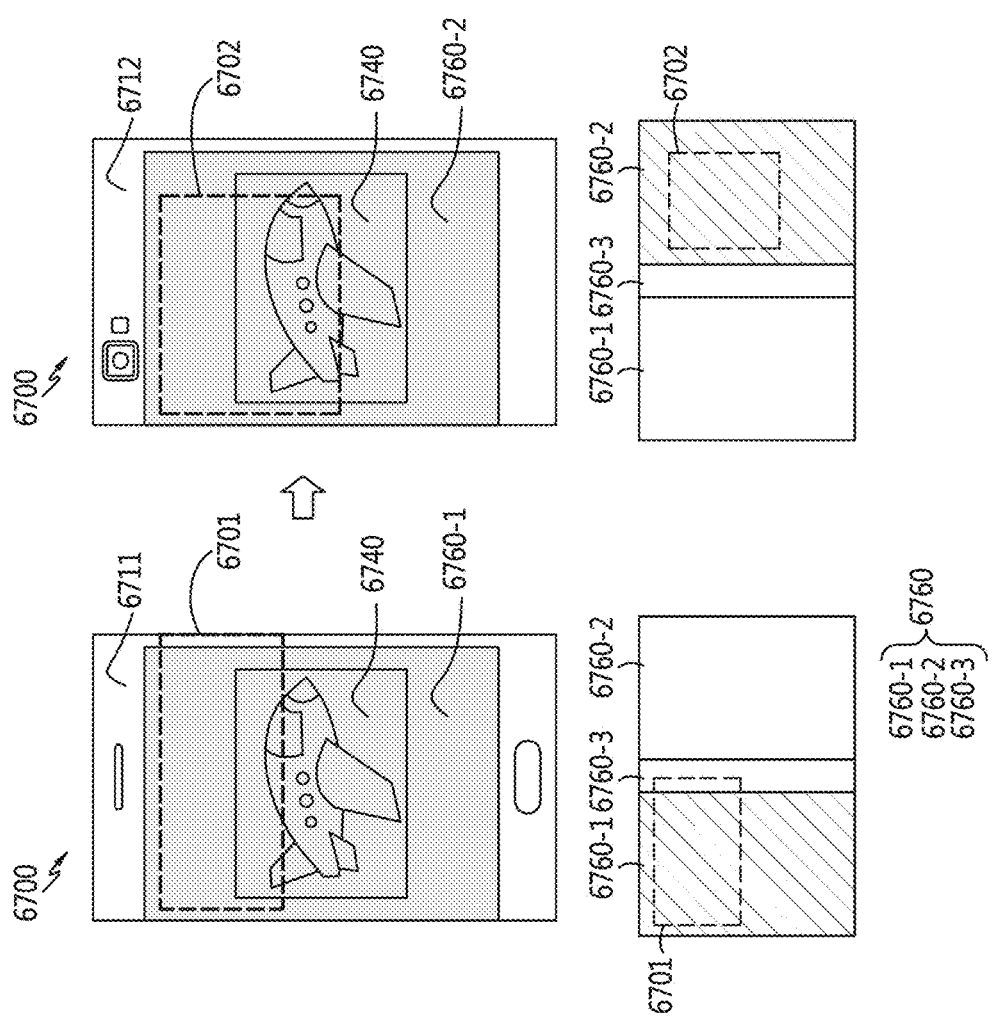

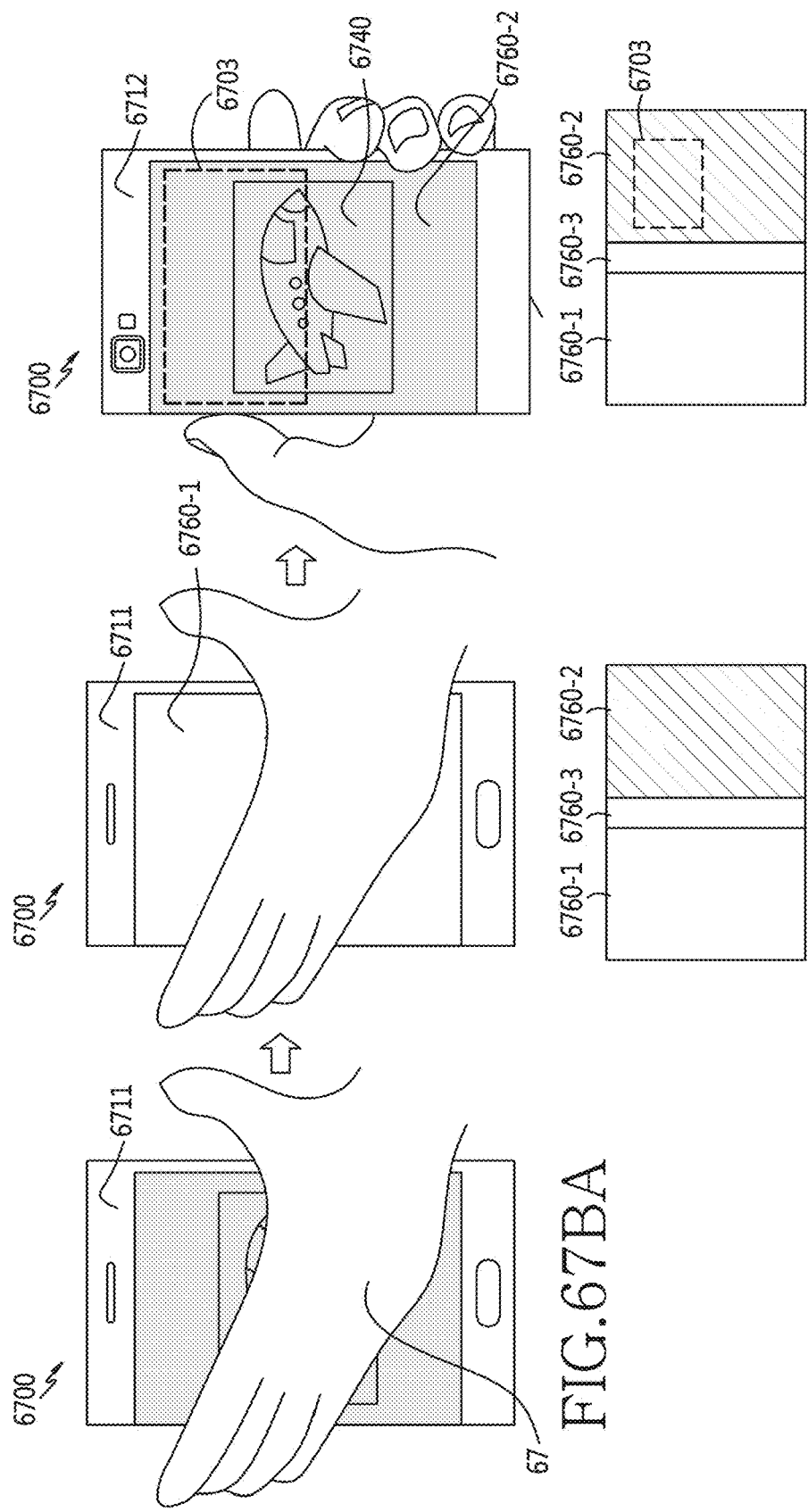

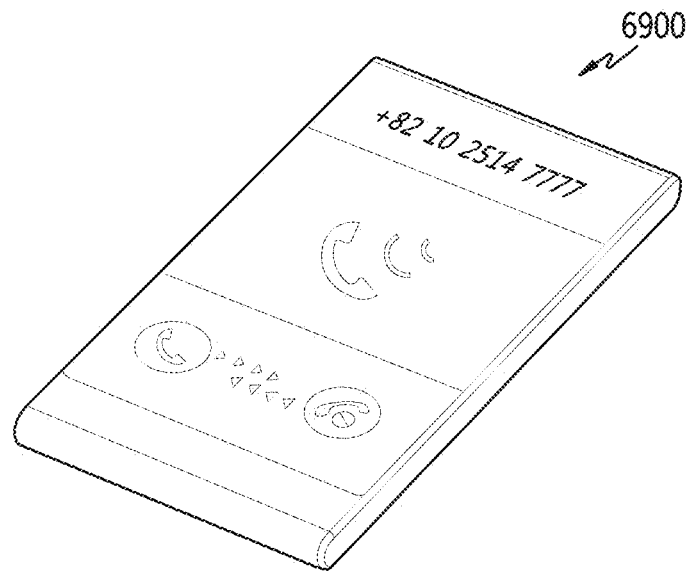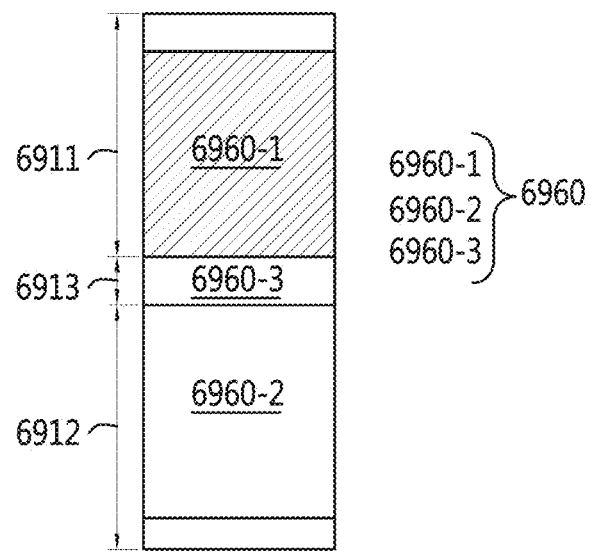
FIG.69B

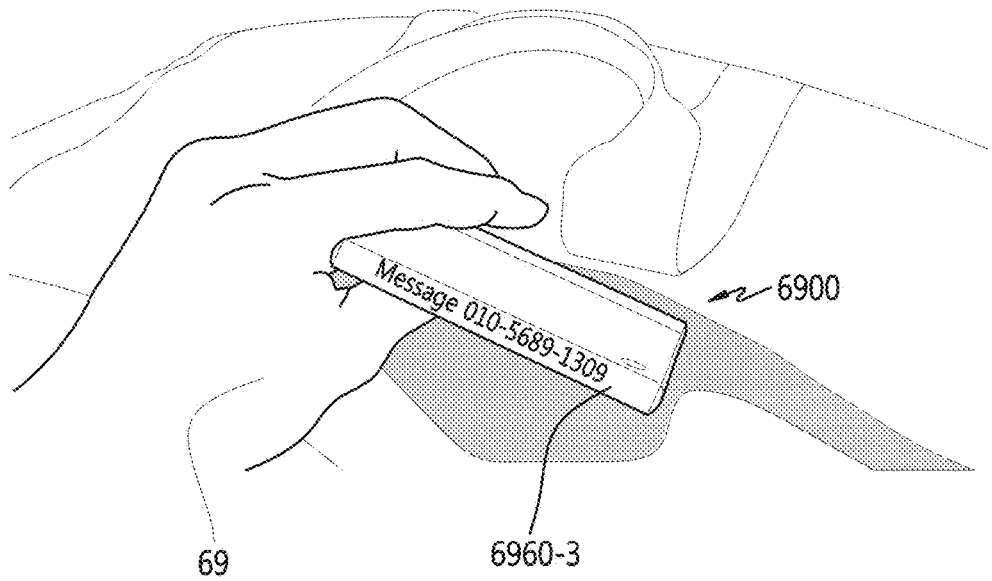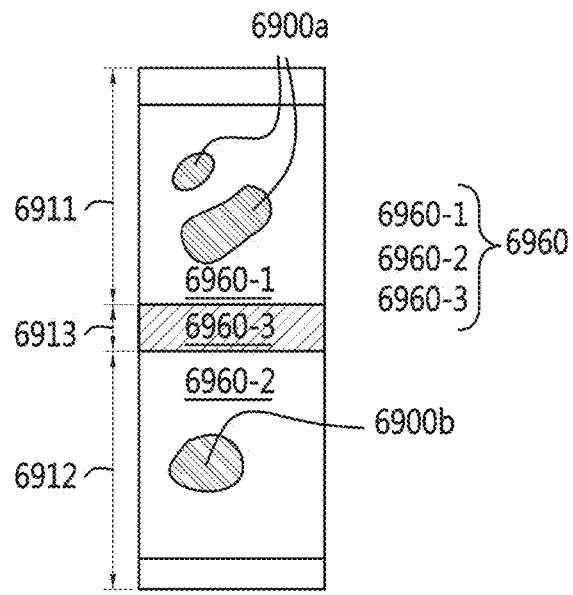
FIG.69C

ELECTRONIC DEVICE INCLUDING ANTENNA DEVICE

CROSS-REFERENCE TO RELATED APPLICATION(S)

This application claims the benefit under 35 U.S.C. § 119(a) of a Korean patent application filed on Mar. 31, 2016 in the Korean Intellectual Property Office and assigned Serial number 10-2016-0039590, the entire disclosure of which is hereby incorporated by reference.

TECHNICAL FIELD

The present disclosure relates to an electronic device for securing an antenna performance.

BACKGROUND

An electronic device may be equipped with one or more antennas that are suitable for a position tracking system, wireless Internet, and an overseas roaming service, respectively.

The above information is presented as background information only to assist with an understanding if the present disclosure. No determination had been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device is reduced and the number of components incorporated for multiple functions increases, it may be difficult to secure an antenna function, which is an important factor for wireless mobile communication. For example, in terms of design, the thickness of a user device itself has been reduced so that an antenna mounting space may be insufficient. Or, when an antenna is mounted in a situation where the antenna mounting space is insufficient, the antenna performance may deteriorate due to a human body.

Another aspect of the present disclosure is to provide an electronic device to secure an antenna performance through the restriction of the size of the electronic device having a wireless communication function or through the improvement of an influence caused by the human body.

In accordance with an aspect of the present disclosure, an electronic device is provided. The electronic device includes a housing having a first face, a second face that faces a direction opposite to the first face, and a side face that encloses at least a portion of a space between the first face and the second face, a touch sensing circuit disposed within the housing, a wireless communication circuit disposed within the housing, a transparent substrate that forms at least a portion of the first face, the second face, and the side face of the housing, at least one display disposed within the housing along at least a portion of the transparent substrate, a first conductive pattern disposed between the transparent substrate and the at least one display or inside the at least one display, and electrically connected with the touch sensing circuit, and a second conductive pattern disposed between the transparent substrate and the first conductive pattern, and electrically connected with the wireless communication circuit.

According to various embodiments of the present disclosure, an electronic device can secure various designs and antenna performance by addressing a spatial restriction.

Other aspects, advantages, and salient features of the disclosure will become apparent to those skilled in the art from the following detailed description, which, taken in conjunction with annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 39, 40, 41, and 42 are views each illustrating an electronic device according to various embodiments of the present disclosure;

FIG. 51B is a view illustrating an operation flow of an electronic device according to an embodiment of the present disclosure;

FIGS. 67AA, 67AB, 67BA, 67BB, and 67BC are illustrative views for describing an operation flow of an electronic device according to various embodiments of the present disclosure;

FIGS. 69A, 69B, and 69C are views illustrating an operation flow of an electronic device according to various embodiments of the present disclosure.

Throughout the drawings, it should be noted that like reference numbers are used to depict the same or similar elements, features, and structures.

DETAILED DESCRIPTION

Figure 1:
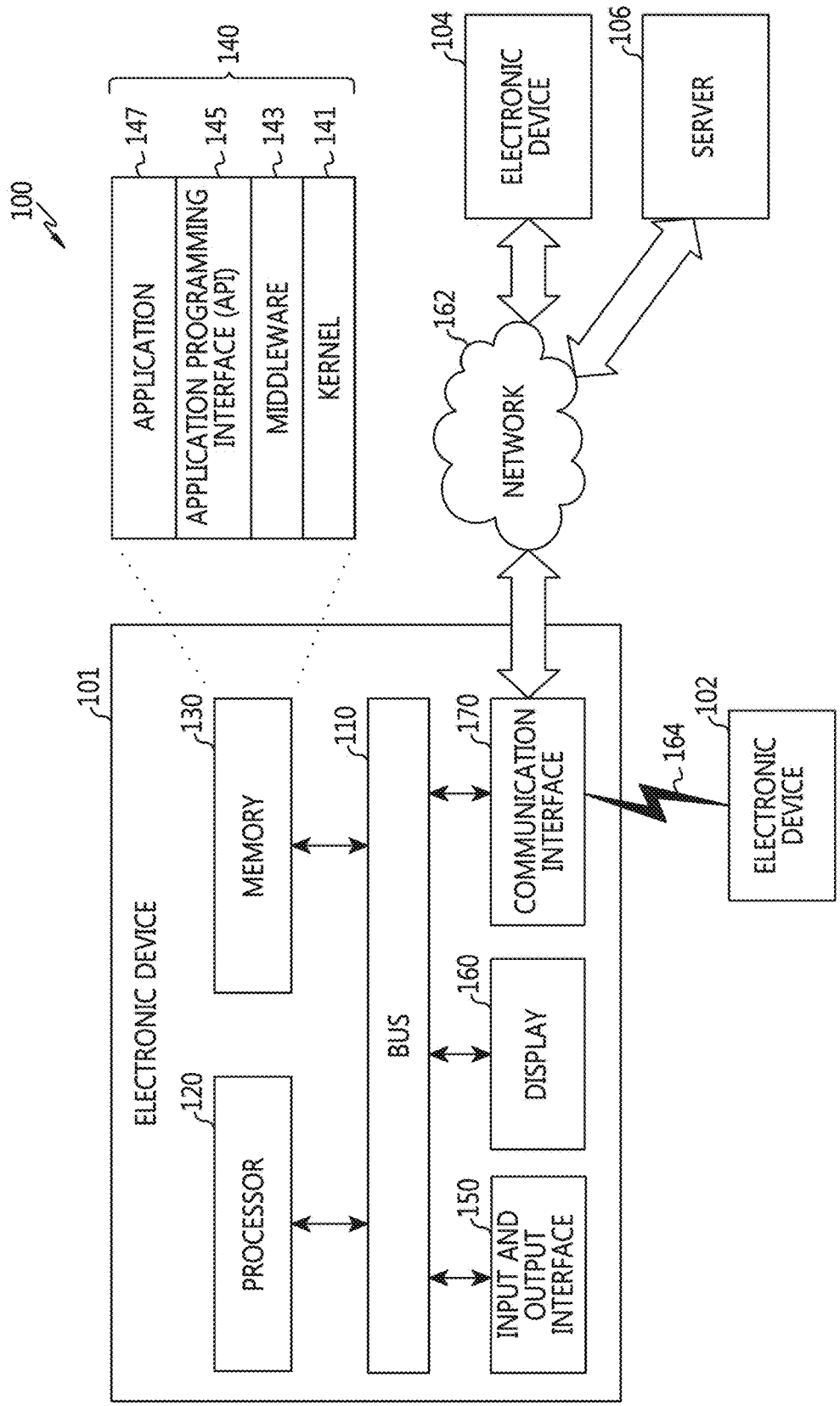
FIG. 1 is a view illustrating a network environment that includes an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a motion picture experts group (MPEG-1) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices (VID), an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 is a view illustrating a network environment that includes an electronic device according to an embodiment of the present disclosure.

Referring to FIG. 1, an electronic device 101 within a network environment 100 in various embodiments will be described with reference to FIG. 1. The electronic device 101 may include a bus 110, a processor 120, a memory 130, an input/output interface 150, a display 160, and a communication interface 170. In a certain embodiment, the electronic device 101 may omit at least one of the above-mentioned components or may additionally include other components.

The bus 110 may include, for example, a circuit that interconnects the above-mentioned components 110 to 170 and transmits communication (e.g., a control message or data) among the components.

The processor 120 may include one or more of a CPU, an AP, and a communication processor (CP). The processor 120 may execute, for example, an arithmetic operation or data processing that is related to a control and/or communication of one or more other components of the electronic device 101.

The memory 130 may include a volatile memory and/or a non-volatile memory. The memory 130 may store, for example, commands or data that are related to one or more other components of the electronic device 101. According to an embodiment, the memory 130 may store software and/or a program 140. The program 140 may include, for example, a kernel 141, a middleware 143, an application programming interface (API) 145, and/or an application program (or an "application") 147. At least one of the kernel 141, the middleware 143, and the API 145 may be referred to as an operating system (OS).

The kernel 141 may control or manage, for example, system resources (e.g., the bus 110, the processor 120, or the memory 130) that are used for executing operations or functions implemented in the other programs (e.g., the middleware 143, the API 145, or the application programs 147). In addition, the kernel 141 may provide an interface that allows the middleware 143, the API 145, or the application programs 147 to access individual components of the electronic device 101 so as to control or manage the system resources.

The middleware 143 may play an intermediary role such that, for example, the API 145 or the application programs 147 may communicate with the kernel 141 so as to exchange data.

In addition, the middleware 143 may process one or more task requests that are received from the application programs 147, according to priority. For example, the middleware 143 may assign the priority to be capable of using a system resource of the electronic device 101 (e.g., the bus 110, the processor 120, or the memory 130) to at least one of the application programs 147. For example, the middleware 143 may perform scheduling, load balancing, or the like for the one or more task requests by processing the one or more requests according to the assigned priority.

The API 145 is, for example, an interface that allows the application programs 147 to control functions provided from the kernel 141 or the middleware 143, and may include, for example, one or more interfaces or functions (e.g., commands) for a file control, a window control, an image processing, a character control, or the like.

The input/output interface 150 may serve as an interface to transmit commands or data, which are entered from, for example, a user or any other external device, to the other component(s) of the electronic device 101. In addition, the input/output interface 150 may output commands or data, which are received from the other component(s) of the electronic device 101, to the user or the other external device.

The display 160 may include, for example, a liquid crystal display (LCD), a light emitting diode (LED) display, an organic light emitting diode (OLED) display, or a micro electro mechanical system (MEMS) display, or an electronic paper display. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of the user's body.

The communication interface 170 may set, for example, communication between the electronic device 101 and an external device (e.g., a first external electronic device 102, a second external device 104, or a server 106). For example, the communication interface 170 may be connected with a network 162 through wired or wireless communication so as to communicate with the external device (e.g., the second external electronic device 104 or the server 106).

The wireless communication may use at least one of, for example, long-term evolution (LTE), LTE advance (LTE-A), code division multiple access (CDMA), Wideband CDMA (WCDMA), universal mobile telecommunication system (UMTS), wireless broadband (WiBro), or global system for mobile communication (GSM), as a cellular communication protocol. In addition, the wireless communication may include, for example, short range communication 164. The short range communication 164 may include at least one of, for example, WiFi, Bluetooth, near field communication (NFC), and global navigation satellite system (GNSS). GNSS may include, for example, at least one of GPS, GNSS, Beidou navigation satellite system (hereinafter, "Beidou"), Galileo, and the European global satellite-based navigation system, according to, for example, a use area or band width. Hereinafter, "GPS" and "GNSS" may be interchangeably used. The wired communication may use at least one of, for example, universal serial bus (USB), high definition multimedia interface (HDMI), recommended standard 232 (RS-232), and plain old telephone service (POTS). The network 162 may include a telecommunication network, for example, at least one of a computer network (e.g., LAN or WAN), the internet, and a telephone network.

Each of the first and second external electronic devices 102 and 104 may be a type of device that is the same as or different from the electronic device 101. According to an embodiment, the server 106 may include a group of one or more servers. According to various embodiments, all or some of the operations to be executed by the electronic device 101 may be executed by another electronic device or a plurality of other electronic devices (e.g., the electronic devices 102 and 104 or the server 106). According to an embodiment, in the case where the electronic device 101 should perform a certain function or service automatically or by a request, the electronic device 101 may request some functions or services that are associated therewith from the other electronic devices (e.g., the electronic devices 102 and 104 or the server 106), instead of or in addition to executing the functions or service by itself. The other electronic devices (e.g., the electronic devices 102 and 104 or the server 106) may execute the requested functions or additional functions, and may deliver the results to the electronic device 101. The electronic device 101 may provide the requested functions or services by processing the received results as they are or additionally. For this purpose, for example, a cloud computing technique, a distributed computing technique, or a client-server computing technique may be used.

Figure 2:
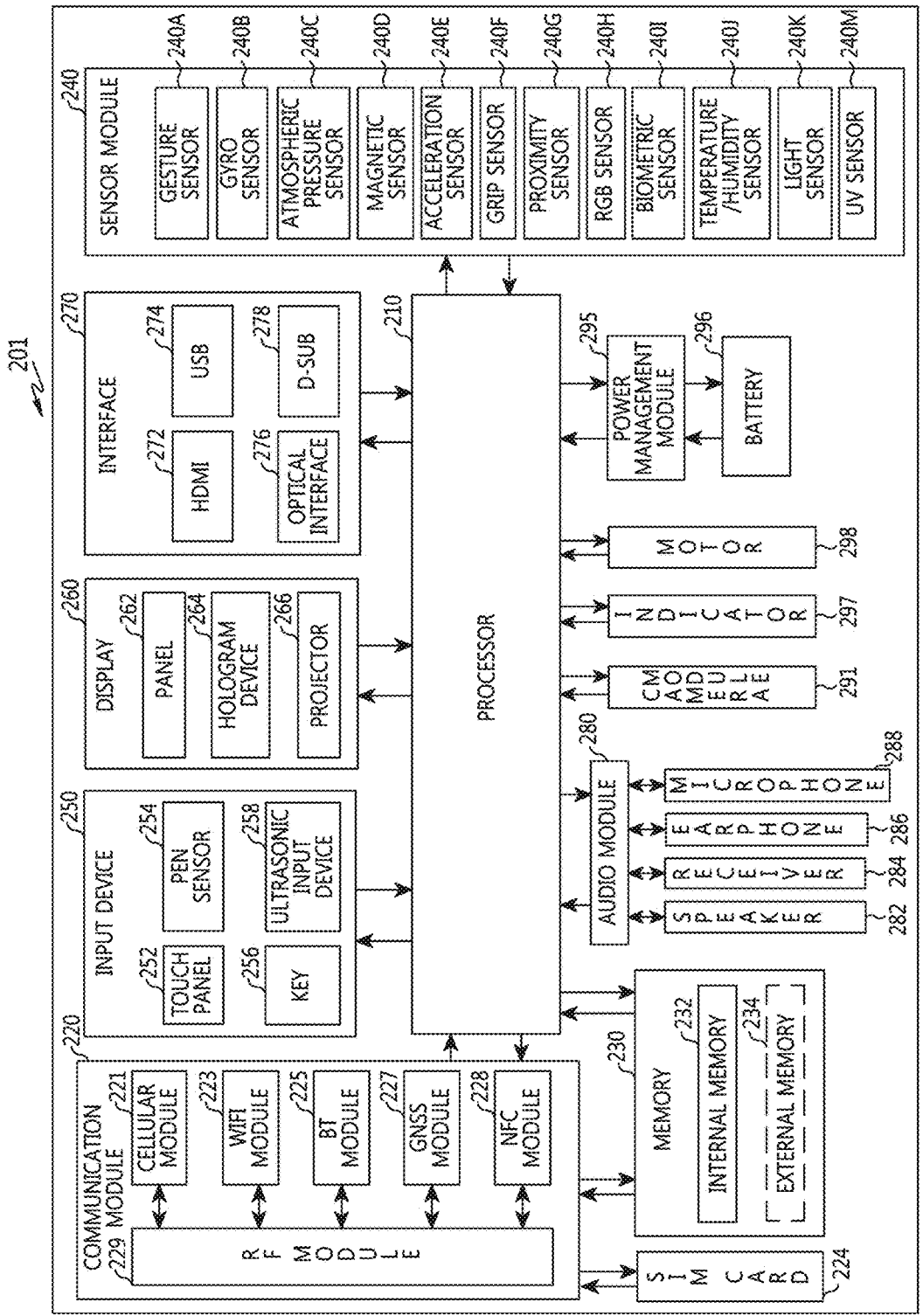
FIG. 2 is a block diagram of an electronic device according to an embodiment of the present disclosure.

FIG. 2 is a block diagram of an electronic device according to an embodiment of the present disclosure.

Referring to FIG. 2, an electronic device 201 may include the whole or a portion of the electronic device 101 illustrated in FIG. 1. The electronic device 201 may include at least one processor (e.g., an AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an OS or an application program so as to control a plurality of hardware or software components connected thereto, and may also perform various data processing and arithmetic operations. The processor 210 may be implemented by, for example, a system-on-chip (SoC). According to an embodiment, the processor 210 may further include a graphical processing unit (GPU) and/or an image signal processor. The processor 210 may include at least some components (e.g., the cellular module 221) among the components illustrated in FIG. 2. The processor 210 may load a command or data received from at least one of the other components (e.g., a non-volatile memory) in a volatile memory to process the command and data, and may store various data in a non-volatile memory.

The communication module 220 may have a configuration that is the same as or similar to the communication interface 170 of FIG. 1. The communication module 220 may include, for example, a cellular module 221, a WiFi module 223, a Bluetooth module 225, a GNSS module 227 (e.g., GPS module, Glonass module, Beidou module, or Galileo module), an NFC module 228, and a radio frequency (RF) module 229.

The cellular module 221 may provide, for example, a voice call, a video call, a message service, or an internet service through a communication network. According to an embodiment, the cellular module 221 may perform discrimination and authentication of the electronic device 201 within the communication network by using the subscriber identification module (e.g., a SIM card) 224. According to an embodiment, the cellular module 221 may perform at least some of functions that may be provided by the processor 210. According to an embodiment, the cellular module 221 may include a CP.

Each of the WiFi module 223, the Bluetooth module 225, the GNSS module 227, and the NFC module 228 may include, for example, a processor to process data transmitted/received through a corresponding module. According to a certain embodiment, at least some (e.g., two or more) of the cellular module 221, the WiFi module 223, the Bluetooth module 225, the GNSS module 227, and the NFC module 228 may be incorporated in a single integrated chip (IC) or an IC package.

The RF module 229 may transmit/receive a communication signal (e.g., an RF signal). The RF module 229 may include, for example, a transceiver, a power amp module (PAM), a frequency filter, a low noise amplifier (LNA), or an antenna. According to another embodiment, at least one of the cellular module 221, the WiFi module 223, the Bluetooth module 225, the GNSS module 227, and the NFC module 228 may transmit/receive an RF signal through one or more separate RF modules.

The subscriber identification module 224 may include, for example, a card that includes a subscriber identification module and/or an embedded SIM, and may also include intrinsic identification information (e.g., integrated circuit card IDentifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of, for example, a volatile memory (e.g., dynamic RAM (DRAM), static RAM (SRAM), or synchronous DRAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash memory, or NOR flash memory), hard drive, or solid state drive (SSD)).

The external memory 234 may further include a flash drive (e.g., compact flash (CF), secure digital (SD), micro secure digital (Micro-SD), mini secure digital (Mini-SD), extreme Digital (xD), multi-media card (MMC), or memory stick). The external memory 234 may be functionally and/or physically connected to the electronic device 201 through various interfaces.

For example, the sensor module 240 may measure a physical quantity or may determine an operating status of the electronic device 201, and may then convert the measured or determined information into electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illuminance sensor 240K, and an ultra-violet (UV) sensor 240M. Additionally or alternatively, the sensor module 240 may include, for example, an E-nose sensor, an electro myo graphy (EMG) sensor (not illustrated), an electro encephalo gram (EEG) sensor, an electro cardio gram (ECG) sensor, an infra-red (IR) sensor, an iris sensor, and/or a fingerprint sensor. The sensor module 240 may further include a control circuit for controlling one or more sensors incorporated therein. In a certain embodiment, the electronic device 201 may further include a processor configured to control the sensor module 240 as a part of the processor 210 or separate from the processor 210 so as to control the sensor module 240 while the processor 210 is in the sleep state.

The input device 250 may include a touch panel 252, a (digital) pen sensor 254, a key 256, or an ultrasonic input device 258. As the touch panel 252, at least one of, for example, a capacitive type touch panel, a resistive type touch panel, an infrared type touch panel, and an ultrasonic type touch panel may be used. In addition, the touch panel 252 may further include a control circuit. The touch panel 252 may further include a tactile layer so as to provide a tactile reaction to the user.

The (digital) pen sensor 254 may be, for example, a portion of the touch panel or may include a separate recognition sheet. The key 256 may include, for example, a physical button, an optical key, or a keypad. The ultrasonic input device 258 may sense, through a microphone (e.g., a microphone 288), ultrasonic waves generated by an input tool so as to confirm data corresponding to the determined ultrasonic waves.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module with the touch panel 252. The hologram device 264 may show a stereoscopic image in the air using interference of light. The projector 266 may project light onto a screen so as to display an image. The screen may be located, for example, inside or outside the electronic device 201. According to an embodiment, the display 260 may further include a control circuit to control the panel 262, the hologram device 264, or the projector 266.

The interface 270 may include, for example, a high-definition multimedia interface (HDMI) 272, a USB 274, an optical interface 276, or a D-subminiature (D-sub) 278. For example, the interface 270 may be included in the communication interface 170 illustrated in FIG. 1. Additionally or alternatively, the interface 270 may include, for example, a mobile high-definition link (MHL) interface, a SD card/MMC interface, or an infrared data association (IrDA) standard interface.

The audio module 280 may bi-directionally convert, for example, sound and electric signals. At least some of the components of the audio module 280 may be included in, for example, the input/output interface 150 illustrated in FIG. 1. The audio module 280 may process sound information input or output through, for example, a speaker 282, a receiver 284, an earphone 286, or a microphone 288.

The camera module 291 is a device that is capable of photographing, for example, a still image and a video image, and according to an embodiment, the camera module 2910 may include at least one image sensor (e.g., a front sensor or a back sensor), a lens, an image signal processor (ISP), or a flash (e.g., LED or xenon lamp).

The power management module 295 may manage, for example, the electric power of the electronic device 201. According to an embodiment, the power management module 295 may include a power management integrated circuit (PMIC), a charger integrated circuit (IC), or a battery 296 or fuel gauge. The PMIC may be configured as a wired and/or wireless charge type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 296, and a voltage, a current, or a temperature during the charge. The battery 296 may include, for example, a rechargeable battery and/or a solar battery.

The indicator 297 may indicate a specific status (e.g., a booting status, a message status, or a charged status) of the electronic device 201 or of a part thereof (e.g., AP 210). The motor 298 may convert an electric signal into a mechanical vibration, and may generate, for example, a vibration or a haptic effect. Although not illustrated, the electronic device 201 may include a processor (e.g., a GPU) to support a mobile TV. The processor to support a mobile TV may process media data according to the standards of, for example, digital multimedia broadcasting (DMB), digital video broadcasting (DVB), or MediaFLO™.

According to an embodiment of the present disclosure, the electronic device 201 may have one or more conductive members configured as a floating ground or may be electrically connected to a ground of the electronic device 201 for the purpose of maintaining an antenna performance and/or reducing the effect of electromagnetic waves on a human body. The control circuit may be a part of the processor 210 or a separate circuit from the processor 210. Alternatively, the control circuit may be provided in a form of a program.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. In addition, some of the hardware components according to various embodiments may be combined into one entity, which may perform functions identical to those of the relevant components before the combination.

Figure 3:
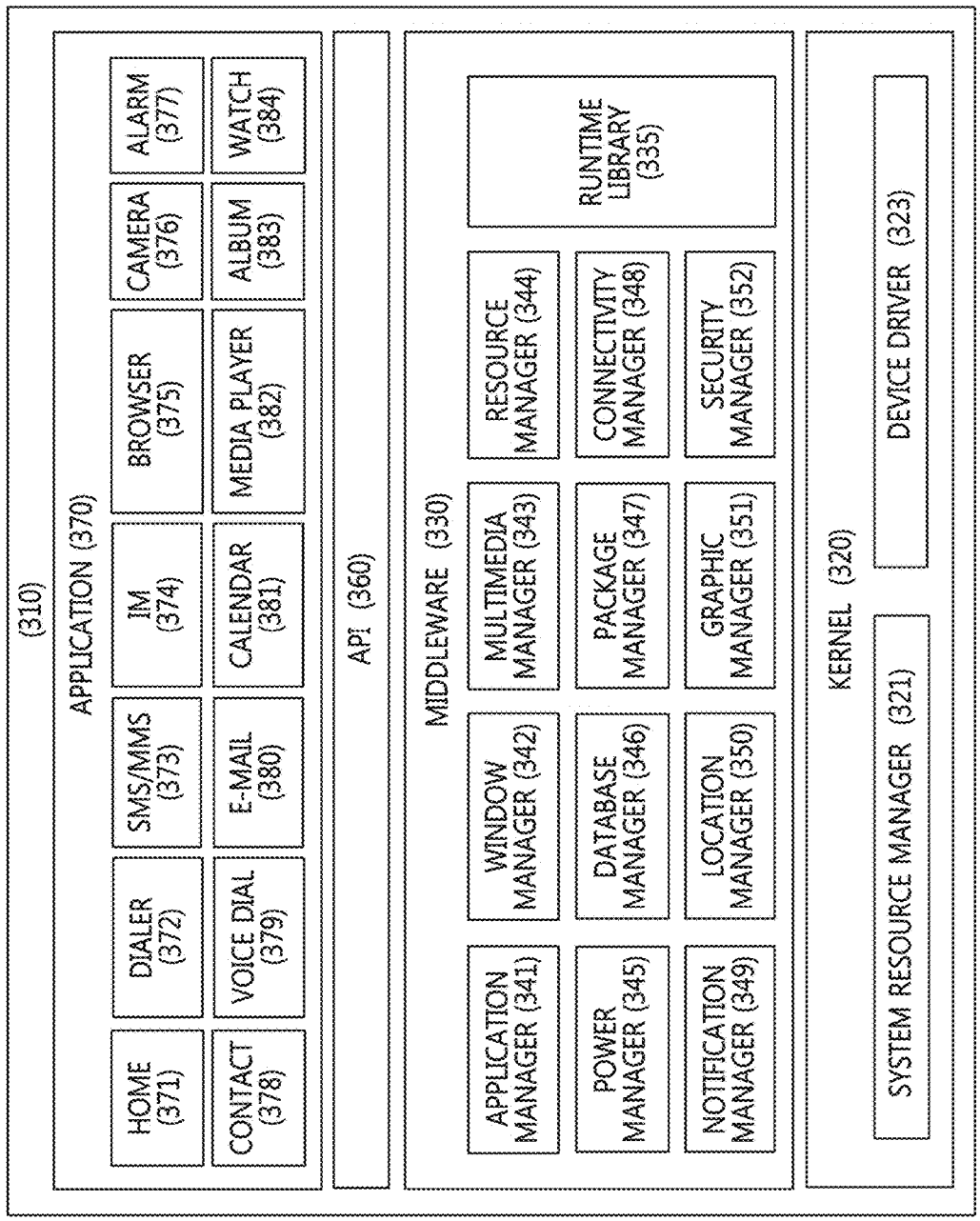
FIG. 3 is a block diagram illustrating a program module according to an embodiment of the present disclosure.

FIG. 3 is a block diagram illustrating a program module according to an embodiment of the present disclosure.

Referring to FIG. 3, a program module 310 (e.g., the program 140) may include an OS that controls resources associated with an electronic device (e.g., the electronic device 101 of FIG. 1) and/or various applications (e.g., the application programs 147 of FIG. 1) that are driven on the operating system. The OS may be, for example, Android, iOS, Windows, Symbian, Tizen, or Bada.

The program module 310 may include a kernel 320, a middleware 330, an API 360, and/or an application 370. At least a part of the program module 310 may be preloaded on the electronic device, or may be downloaded from an external electronic device (e.g., the electronic device 102 or 104, or the server 106 of FIG. 1).

The kernel 320 (e.g., the kernel 141 of FIG. 1) may include, for example, a system resource manager 321 and/or a device driver 323. The system resource manager 321 may perform, for example, a control, allocation, or recovery of a system resource. According to an embodiment, the system resource manager 321 may include, for example, a process management unit, a memory management unit, or a file system management unit. The device driver 323 may include, for example, a display driver, a camera driver, a Bluetooth driver, a common memory driver, a USB driver, a keypad driver, a WiFi driver, an audio driver, or an inter-process communication (IPC) driver.

The middleware 330 may provide, for example, a function that is commonly required by the applications 370, or may provide various functions to the applications 370 through the API 360 such that the applications 370 can efficiently use the limited system resources within the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that is used by a compiler in order to add a new function through a program language while the applications 370 are executed. The runtime library 335 may perform, for example, input/output management, memory management, or a function for an arithmetic function.

The application manager 341 may manage, for example, a life cycle of at least one application among the applications 370. The window manager 342 may manage a GUI resource that is used in a screen. The multimedia manager 343 may grasp a format required for reproducing various media files, and may perform encoding or decoding of the media files by using a codec that is suitable for the corresponding format. The resource manager 344 may manage a resource, such as a source code, a memory, or a storage space, of at least one application among the applications 370.

The power manager 345 is operated together with, for example, a basic input/output system (BIOS) so as to manage a battery or a power source, and may provide, for example, power information that is required for operating the electronic device. The database manager 346 may generate, retrieve, or change a database to be used by at least one application among the applications 370. The package manager 347 may manage the installation or update of an application that is distributed in the form of a package file.

The connectivity manager 348 may manage, for example, a wireless connection of WiFi, Bluetooth, or the like. The notification manager 349 may display or notify events, such as an arrival message, appointment, and proximity notification, in a manner that does not disturb the user. The location manager 350 may manage position information of the electronic device. The graphic manager 351 may manage a graphic effect to be provided to the user or a user interface associated therewith. The security manager 352 may provide all security functions required for, for example, system security, or user authentication. According to an embodiment, in the case where the electronic device (e.g., the electronic device 101 of FIG. 1) includes a phone function, the middleware 330 may include a telephony manager to manage a voice or video call function of the electronic device.

The middleware 330 may include a middleware module that forms a combination of various functions of the above-described components. The middleware 330 may provide a module that is specialized for each kind of operation system in order to provide differentiated functions. In addition, the middleware 330 may dynamically delete some of the existing components or add new components.

The API 360 (e.g., the API 145 of FIG. 1) is, for example, a collection of API programming functions, and may be provided in different configurations according to operation systems. For example, Android or iOS may provide one API set for each platform and Tizen may provide two or more API sets for each platform.

The applications 370 (e.g., the application programs 147 of FIG. 1) may include, for example, one or more applications that can execute, for example, the functions of home 371, dialer 372, SMS/MMS 373, instant message (IM) 374, browser 375, camera 376, alarm 377, contact 378, voice dial 379, e-mail 380, calendar 381, media player 382, album 383, watch 384, health care (e.g., measurement of a quantity of motion, or blood sugar), or provision of environmental information (e.g., provision of atmospheric pressure, humidity, or temperature information).

According to an embodiment, the applications 370 may include an application that supports information exchange between the electronic device (e.g., the electronic device 101 of FIG. 1) and the external electronic devices (e.g., the electronic devices 102 and 104 of FIG. 1) (hereinafter, the application will be referred to as an "information exchange application" for the convenience of description). The information exchange application may include, for example, a notification relay application to transmit specific information to the external electronic devices, or a device management application to manage the external electronic devices.

For example, the notification relay application may include a function of relaying notification information generated from any other application of the electronic device (e.g., an SMS/MMS application, an e-mail application, a healthcare application, or an environment information application) to the external electronic devices (e.g., the electronic devices 102 and 104 of FIG. 1). In addition, the notification relay application may receive notification information from, for example, an external electronic device, and may provide the notification information to the user.

The device management application may manage (e.g., install, delete, or update) at least one function of an external electronic device (e.g., the electronic device 102 or 104 of FIG. 1) that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to an embodiment, the applications 370 may include an application designated according to an attribute of an external electronic device (e.g., the electronic device 102 or 104 of FIG. 1) (e.g., a healthcare application of a mobile medical device). According to an embodiment, the applications 370 may include an application received from an external electronic device (e.g., the server 106 or the electronic device 102 or 104 of FIG. 1). According to an embodiment, the applications 370 may include a preloaded application or a third party application that is capable of being downloaded from the server. The names of the components of the program module 310 according to the illustrated embodiment may vary depending on the kind of operation system.

According to various embodiments, at least a portion of the program module 310 may be implemented by software, firmware, hardware, or a combination of two or more thereof. At least a portion of the program module 310 may be implemented (e.g., executed) by, for example, a processor (e.g., the processor 210). At least a portion of the program module 310 may include, for example, a module, a program, a routine, a set of instructions, or a process for performing one or more functions.

The term "module" as used herein may mean, for example, a unit that includes hardware, software, firmware, or a combination of two or more thereof. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

At least some of devices (e.g., modules or functions thereof) or methods (e.g., operations), according to various embodiments, may be implemented by an instruction stored in a computer-readable storage medium in the form of a programming module. When the instruction is executed by one or more processors (e.g., the processor 120 in FIG. 1), the one or more processors may perform a function corresponding to the command. The computer-readable recoding media may be, for example, a memory (e.g., the memory 130 of FIG. 1).

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Modules or programming modules, according to various embodiments, may include at least one of the above-described elements, exclude some of the elements, or further include other additional elements. The operations performed by the modules, the programming module, or other elements, according to various embodiments, may be executed in a sequential, parallel, repetitive, or heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Hereinafter, the display method and device, according to the various embodiments, will be described with reference to the accompanying drawings. However, since the various embodiments are not restricted or limited by the following description, it should be noted that applications can be made to the various embodiments based on embodiments that will be described below. Hereinafter, various embodiments of the present disclosure will be described based on an approach of hardware. However, various embodiments of the present disclosure include a technology that uses both hardware and software and thus, the various embodiments of the present disclosure may not exclude the perspective of software.

Figure 4A:
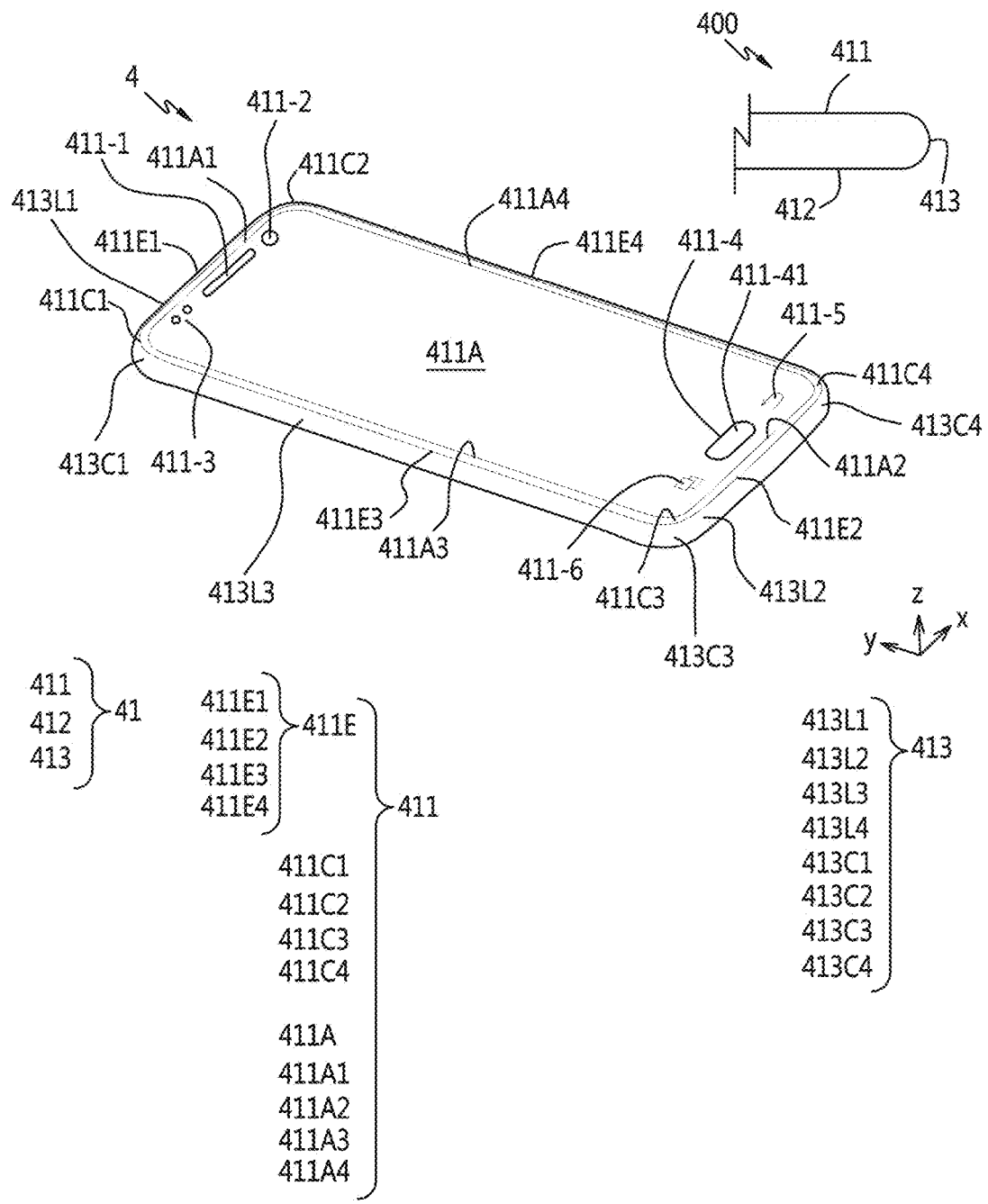
FIGS. 4A and 4B are views each illustrating an electronic device according to various embodiments of the present disclosure.
Figure 4B:
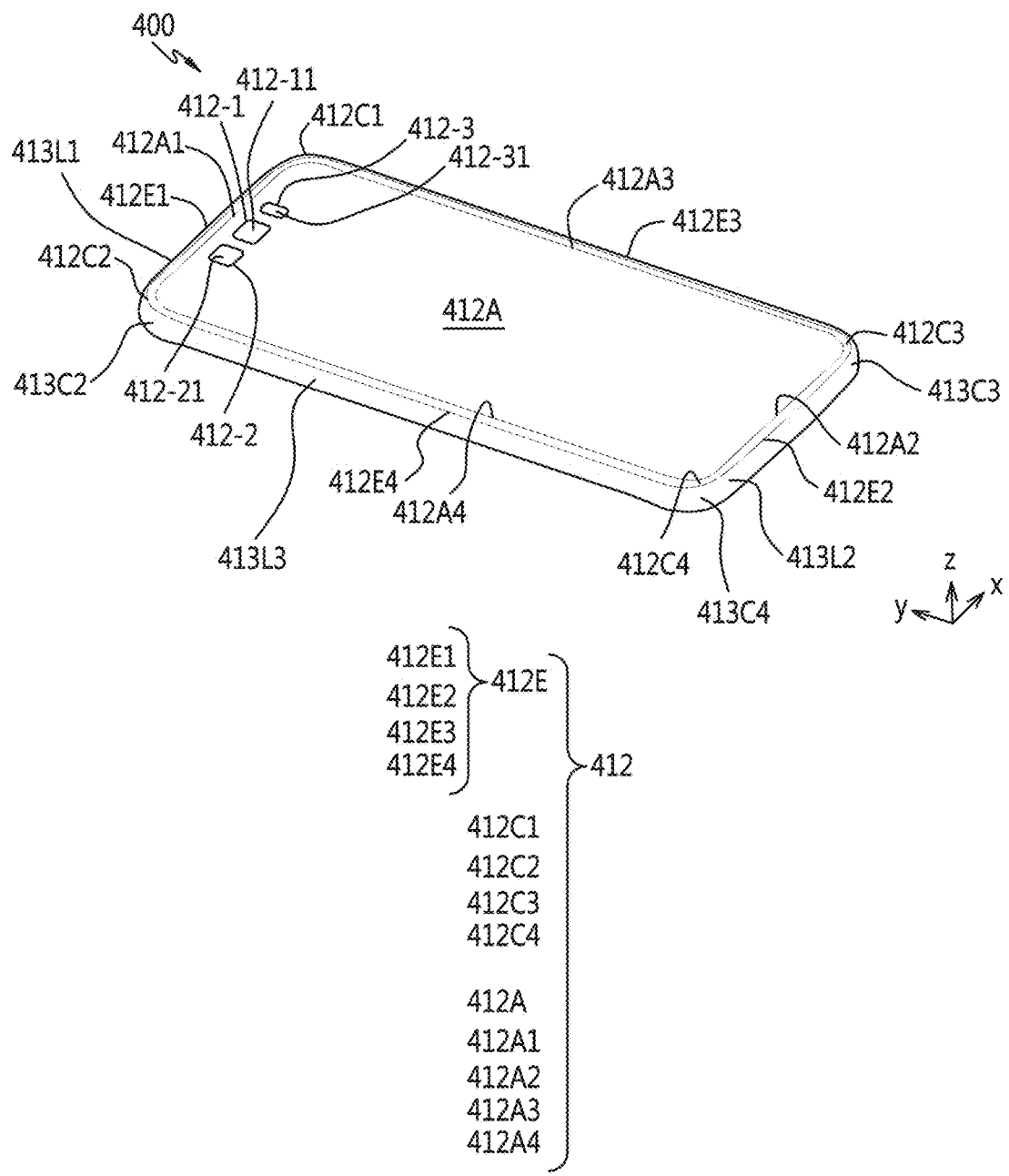

FIGS. 4A and 4B are views each illustrating an electronic device according to various embodiments of the present disclosure. The electronic device may have a configuration that is the same as or similar to that of at least one of the electronic devices mentioned in this specification.

Referring to FIGS. 4A and 4B, an electronic device 400 may have a substantially rectangular shape. The electronic device 400 may include a housing 41 that includes a first face 411 (e.g., a front face) and a second face 412 (e.g., a rear face) that faces a direction opposite to the first side 411.

According to an embodiment, the housing 41 may include a third face 413 (side face) that surrounds a space between the first face 411 and the second face 412.

According to an embodiment, the first face 411 may include edges 411E where the first face and the third face 413 are connected to each other. The edges 411E may include, for example, a first edge 411E1, a second edge 411E2, a third edge 411E3, and/or a fourth edge 411E4. The first edge 411E1 and the second edge 411E2 may be disposed opposite to each other, and the third edge 411E3 and the fourth edge 411E4 may be disposed opposite to each other. The third edge 411E3 may interconnect one end of the first edge 411E1 and one end of the second edge 411E2. The third edge 411E3 may interconnect the other end of the first edge 411E1 and the other end of the second edge 411E2.

According to various embodiments, at least one of the first edge 411E1, the second edge 411E2, the third edge 411E3, and the fourth edge 411E4 may include a curved face.

According to various embodiments, the first face 411 may include a first corner portion 411C1 that interconnects the first edge 411E1 and the third edge 411E3. The first face 411 may include a second corner portion 411C2 that interconnects the first edge 411E1 and the fourth edge 411E4. The first face 411 may include a third corner portion 411C3 that interconnects the second edge 411E2 and the third edge 411E3. The first face 411 may include a fourth corner portion 411C4 that interconnects the second edge 411E2 and the fourth edge 411E4.

According to various embodiments, at least one of the first corner portion 411C1, the second corner portion 411C2, the third corner portion 411C3, and the fourth corner portion 411C4 may include a curved face.

According to various embodiments, the first face 411 may include a first region 411A1 located adjacent to the first edge 411E1. The first face 411 may include a second region 411A2 located adjacent to the second edge 411E2. The first region 411A1 and the second region 411A2 may be symmetrical to each other.

According to an embodiment, the first face 411 may include a third region 411A3 located adjacent to the third edge 411E3. The first face 411 may include a fourth region 411A4 located adjacent to the fourth edge 411E4. The third region 411A3 and the fourth region 411A4 may be symmetrical to each other.

According to various embodiments, at least one of the first region 411A1, the second region 411A2, the third region 411A3, and the fourth region 411A4 may include a curved face. Alternatively, at least one of the first region 411A1, the second region 411A2, the third region 411A3, and the fourth region 411A4 may be a face having a certain inclination.

According to an embodiment, the first face 411 may include a central region 411A surrounded by a first region 411A1, a second region 411A2, a third region 411A3, and a fourth region 411A4. For example, the central region 411A may have a substantially (rectangular) quadrilateral shape.

According to various embodiments, the first face 411 may include a through-hole 411-1 for supporting a speaker or a receiver (not illustrated) mounted on the electronic device 400. The sound generated from the speaker or the receiver may be discharged to the outside through the through-hole 411-1.

According to various embodiments, the first face 411 may include one or more transparent regions 411-2 and 411-3 for supporting an optical component mounted on the electronic device 400 (e.g., an illuminance sensor, an image sensor, or a proximity sensor). External light may be introduced into the optical component through the transparent regions 411-2 and 411-3. Alternatively, the light generated from the optical component may be emitted to the outside through the transparent regions 411-2 and 411-3.

According to various embodiments, the through-hole 411-1 and/or the transparent regions 411-2 and 411-3 may be disposed adjacent to the first edge 411E1.

According to various embodiments, the first face 411 may include a through-hole 411-4 for supporting a button 411-41 mounted on the electronic device 400. The button 411-41 may be exposed to the outside through the through-hole 411-4.

According to various embodiments, the first face 411 may include touch regions 411-5 and 411-6 for supporting one or more touch keys (not illustrated) mounted on the electronic device 400. For example, when a user's finger is brought close to a touch region 411-5 or 411-6, the capacitance applied to the conductor of a touch key disposed close to the touch region 411-5 or 411-6 is changed, and the electronic device 400 can recognize that a key input is generated based on the change in capacitance.

According to various embodiments, the through-hole 411-4 and/or the touch regions 411-5 and 411-6 may be disposed adjacent to the first edge 411E1.

According to an embodiment, the second face 412 may include edges 412E where the second face 412 and the third face 413 are connected to each other. Edges 412E may include, for example, a first edge 412E1, a second edge 412E2, a third edge 412E3, and/or a fourth edge 412E4. The first edge 412E1 and the second edge 412E2 may be disposed opposite to each other, and the third edge 412E3 and the fourth edge 412E4 may be disposed opposite to each other. The third edge 412E3 may interconnect one end of the first edge 412E1 and one end of the second edge 412E2. The fourth edge 412E4 may interconnect the other end of the first edge 412E1 and the other end of the second edge 412E2.

According to various embodiments, at least one of the first edge 412E1, the second edge 412E2, the third edge 412E3, and the fourth edge 412E4 may include a curved face.

According to various embodiments, the second face 412 may include a first corner portion 412C1 that interconnects the first edge 412E1 and the third edge 412E3. The second face 412 may include a second corner portion 412C2 that interconnects the first edge 412E1 and the fourth edge 412E4. The second face 412 may include a third corner portion 412C3 that interconnects the second edge 412E2 and the third edge 412E3. The second face 412 may include a fourth corner portion 412C4 that interconnects the second edge 412E2 and the fourth edge 412E4.

According to various embodiments, at least one of the first corner portion 412C1, the second corner portion 412C2, the third corner portion 412C3, and the fourth corner portion 412C4 may include a curved face.

According to various embodiments, the second face 412 may include a first region 412A1 located adjacent to the first edge 412E1. The second face 412 may include a second region 412A2 located adjacent to the second edge 412E2. The first region 412A1 and the second region 412A2 may be symmetrical to each other.

According to an embodiment, the second face 412 may include a third region 412A3 located adjacent to the third edge 412E3. The second face 412 may include a fourth region 412A4 located adjacent to the fourth edge 412E4. The third region 412A3 and the fourth region 412A4 may be symmetrical to each other.

According to various embodiments, at least one of the first region 412A1, the second region 412A2, the third region 412A3, and the fourth region 412A4 may include a curved face. Alternatively, at least one of the first region 412A1, the second region 412A2, the third region 412A3, and the fourth region 412A4 may be a face having a certain inclination.

According to an embodiment, the second face 412 may include a central region 412A surrounded by a first region 412A1, a second region 412A2, a third region 412A3, and a fourth region 411A4. For example, the central region 412A may have a substantially (rectangular) quadrilateral shape.

According to various embodiments, the second face 412 may include a through-hole 412-1 for supporting a camera 412-11 mounted on the electronic device 400. The camera 412-11 may be exposed through the through-hole 412-1.

According to various embodiments of the present disclosure, the second face 412 may include a transparent region 412-2 for supporting a flash 412-21 mounted on the electronic device 400. The light generated from the flash may be emitted to the outside through the transparent region 412-2.

According to various embodiments, the second face 412 may include a through-hole 412-3 for supporting a speaker 412-31 mounted on the electronic device 400. The sound generated from the speaker may be discharged to the outside through the through-hole 412-3.

According to various embodiments, the through-holes 412-1 and 412-3 or the transparent region 412-2 may be disposed adjacent to the first edge 412E1.

According to an embodiment, the third face 413 may interconnect an edge 411E of the first face 411 and an edge 412E of the second face 412.

According to an embodiment, the third face 413 may include a first connecting face 413L1 that interconnects the first edge 411E1 of the first face 411 and the first edge 412E1 of the second face 412. The third face 413 may include a second connecting face 413L2 that interconnects the second edge 411E2 of the first face 411 and the second edge 412E2 of the second face 412. The third face 413 may include a third connecting face 413L3 that interconnects the third edge 411E3 of the first face 411 and the third edge 412E3 of the second face 412. The third face 413 may include a fourth connecting face 413L4 that interconnects the fourth edge 411E4 of the first face 411 and the fourth edge 412E4 of the second face 412.

According to various embodiments, the first connecting face 413L1 of the third face 413 may have a shape protruding in a direction from the second edge 411E2 to the first edge 411E1 of the first face 411. The second connecting face 413L2 of the third face 413 may have a shape protruding in a direction from the first edge 411E1 to the second edge 411E2 of the first face 411. The third connecting face 413L3 of the third face 413 may have a shape protruding in a direction from the fourth edge 411E4 to the third edge 411E3 of the first face 411. Alternatively, the fourth connecting face 413L4 of the third face 413 may have a shape protruding in a direction from the third edge 411E3 to the fourth edge 411E4 of the first face 411

According to various embodiments, at least one of the first connecting face 413L1, the second connecting face 413L2, the third connecting face 413L3, and the fourth connecting face 413L4 of the third face 413 may be a curved face According to an embodiment, the third face 413 may include a first corner connecting face 413C1 that interconnects the first corner portion 411C1 of the first face 411 and the second corner portion 412C2 of the second face 412. The third face 413 may include a second corner connecting face 413C2 that interconnects the second corner portion 411C2 of the first face 411 and the second corner portion 412C2 of the second face 412. The third face 413 may include a third corner connecting face 413C3 that interconnects the third corner portion 411C3 of the first face 411 and the third corner portion 412C3 of the second face 412. Alternatively, the third face 413 may include a third corner connecting face 413C4 that interconnects the fourth corner portion 411C4 of the first face 411 and the fourth corner portion 412C4 of the second face 412.

According to various embodiments, at least one of the first corner connecting face 413C1, the second corner connecting face 413C2, the third corner connecting face 413C3, and the fourth corner connecting face 413C4 of the third face 413 may include a curved face According to various embodiments, the electronic device 400 may further include a microphone embedded in the inside of the housing 41. The housing 41 may include a through-hole (not illustrated) for supporting the microphone. Sound generated from the outside may be introduced into the microphone through the through-hole.

According to various embodiments, the electronic device 400 may include a through-hole (not illustrated) for supporting a connector (e.g., a USB socket, a charging jack, a communication jack, or an ear jack) embedded in the inside of the housing 41. An external device may be connected to the connector through the through-hole.

According to an embodiment, at least a portion of at least one of the first face 411, the second face 412, and the third face 413 of the housing 41 may be formed by a transparent substrate (or a window). For example, the transparent substrate may be formed of acryl, glass, or the like.

According to an embodiment, the electronic device 400 may include at least one display (not illustrated) disposed in the inside of the housing 41. The at least one display may be disposed along at least a portion of the transparent substrate. For example, the display may be exposed through at least one region of at least one of the first face 411, the second face 412, and the third face 413 of the housing 41. At least a portion of the display may be disposed adjacent to the first face 411 of the housing 41, and may be exposed through the first face 411. Alternatively, at least a portion of the display may be disposed adjacent to the second face 412 of the housing 41, and may be exposed through the second face 412. Alternatively, at least a portion of the display may be disposed adjacent to the third face 413 of the housing 41, and may be exposed through the third face 413.

According to an embodiment, the at least one display may be flexible and may be in the form that follows one of the faces of the housing 41 (e.g., the first face 411, the second face 412, and the third face 413).

According to an embodiment, the at least one display may be installed along the first face 411 and the third face 413 of the housing 41. Alternatively, the at least one display may be installed along the second face 412 and the third face 413 of the housing 41. Alternatively, the at least one display may be installed along the first face 411, the second face 412, and the third face 413 of the housing 41.

Figure 5:
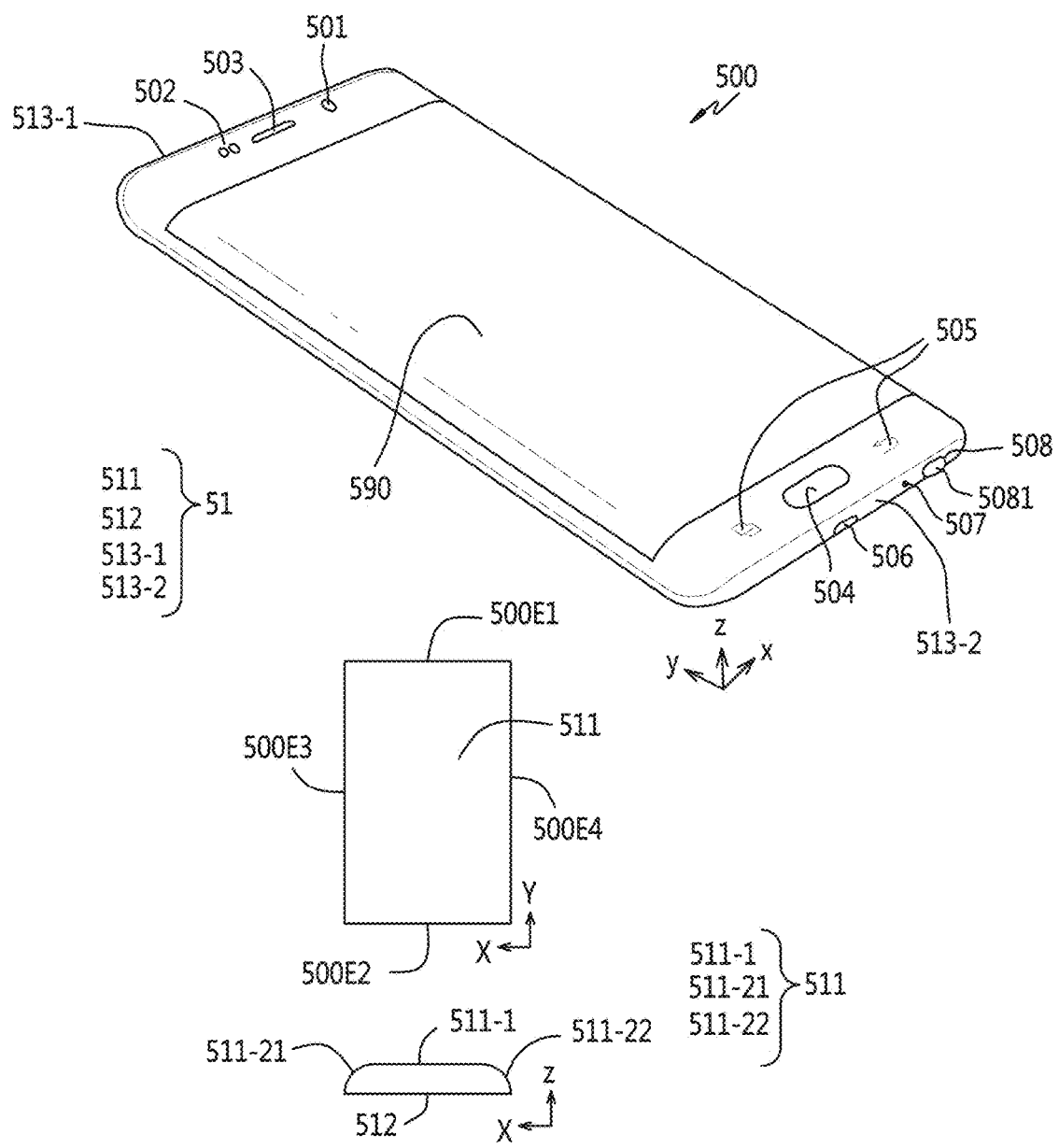
FIG. 5 is a view illustrating an electronic device according to an embodiment of the present disclosure.

FIG. 5 is a view illustrating an electronic device according to an embodiment of the present disclosure. An electronic device 500 may have a configuration that is the same or similar to that of at least one of the electronic devices mentioned in this specification.

Referring to FIG. 5, the electronic device 500 may have a substantially rectangular shape, including four edges 500E1, 500E2, 500E3, and 500E4, when viewed on a plane (e.g., the XY plane). For example, the electronic device 500 may have a relatively long rectangular shape in a direction from the first edge 500E1 to the second edge 500E2.

According to an embodiment, when viewed on a plane (e.g., the XZ plane), the housing 51 of the electronic device 500 may include a first face 511 and a second face 512. The first face 511 may include a central region 511-1 that faces a direction opposite to the second face 512. The first face 511 may include a first edge region 511-21 and a second edge region 511-22 that interconnect the central region 511-1 and the second face 512. The central region 511-1 may interconnect the first edge region 511-21 and the second edge region 511-22.

According to an embodiment, the central region 511-1 of the first face 511 and/or the second face 512 may be substantially flat faces.

According to an embodiment, at least one of the first edge region 511-21 and the second edge region 511-22 may be a face having an inclination (e.g., a curved face).

According to an embodiment, the first edge region 511-21 and the second edge region 511-22 may be symmetrical to each other.

According to an embodiment, the electronic device 500 may include a display 590 that is exposed through at least one region of the first face 511. For example, the display 590 may include a first portion exposed through the first edge region 511-21, a central portion exposed through the central region 511-1, and a second portion exposed through the second edge region 511-22.

According to an embodiment, the first face 511 may be formed by a transparent substrate (e.g., glass), and the display 590 may be disposed along at least a portion of the transparent substrate.

According to an embodiment, the display 590 may be flexible, and may be present in a deformed form following the first face 511.

According to various embodiments, the first face 511 may include transparent regions 501 and 502 for supporting optical components mounted on the electronic device 500 (e.g., an illuminance sensor and an image sensor). Alternatively, the first face 511 may include a through-hole 503 for supporting a speaker or a receiver mounted on the electronic device 500. According to an embodiment, the transparent regions 501 and 502 and/or the through-hole 503 may be disposed adjacent to the first edge 500E1.

According to various embodiments, the first face 511 may include a through-hole 504 for supporting a button mounted on the electronic device 500. Alternatively, the first face 511 may include a touch region 505 for supporting a touch key mounted on the electronic device 500. According to an embodiment, the through-hole 504 and/or the touch region 505 may be disposed adjacent to the second edge 500E2.

According to an embodiment, the housing 51 of the electronic device 500 may include a first side face 513-1 that is directed from the second edge 500E2 to the first edge 500E1 and includes the first edge 500E1. Alternatively, the housing 51 of the electronic device 500 may include a second side face 513-2 that is directed from the first edge 500E1 to the second edge 500E2 and forms the second edge 500E2.

According to various embodiments, the second side face 513-2 may include a through-hole 506 for supporting a connector (e.g., a socket) mounted on the electronic device 500. Alternatively, the second side face 513-2 may include a through-hole 507 for supporting a microphone mounted on the electronic device 500. Alternatively, the second side face 513-2 may include an insertion portion 508 that allows a stylus 5081 to be inserted into the electronic device 500 therethrough.

FIGS. 6 to 12 are views each illustrating an electronic device including a display according to various embodiments of the present disclosure.

Referring to FIGS. 6 to 12, a display may form at least one of a plurality of faces of the electronic device. The display may be flexible and may be installed to the electronic device in a deformed form. According to various embodiments, the electronic device may have a configuration that is the same or similar to that of at least one of the electronic devices mentioned in this specification.

Figure 6:
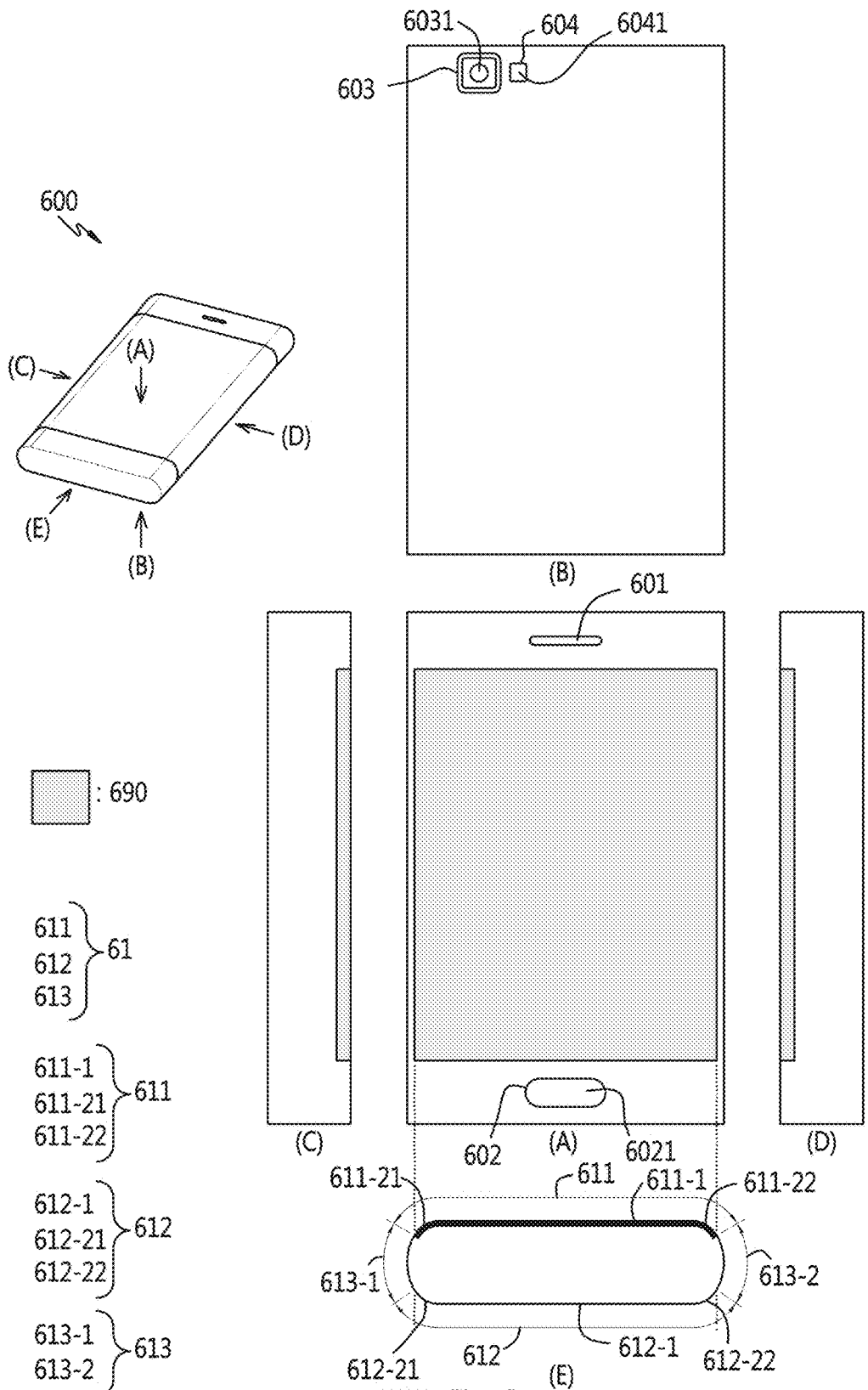
FIGS. 6, 7, 8, 9, 10, 11, and 12 are views each illustrating an electronic device including a display according to various embodiments of the present disclosure.

Referring to FIG. 6, when viewed in a cross section, the housing 61 of the electronic device 600 may include a first face 611, a second face 612, and a third face 613. The first face (e.g., front face) 611 and the second face (e.g., rear face) 612 may face opposite directions. The third face 613 (e.g., a side face) may surround a space between the first face 611 and the second face 612.

According to an embodiment, when viewed in a cross section, the first face 611 of the housing 61 may include a first central region 611-1, a first left edge region 611-21, and a first right edge region 611-22). The first central region 611-1 may be disposed between the first left edge region 611-21 and the first right edge region 611-22. The first left edge region 611-21 and/or the first right edge region 611-22 may be a face having an inclination (e.g., a curved face).

According to an embodiment, when viewed in a cross section, the second face 612 of the housing 61 may include a second central region 612-1, a second left edge region 612-21, and a second right edge region 612-22. The second central region 612-1 may be disposed between the second left edge region 612-21 and the second right edge region 612-22. The second left edge region 612-21 and/or the second right edge region 612-22 may be a face having an inclination (e.g., a curved face).

According to an embodiment, when viewed in a cross section, the third face 613 may include a first region 613-1 and a second region 613-2. The first region 613-1 and the second region 613-2 may be disposed opposite to each other. The first region 613-1 may interconnect the first left edge region 611-21 of the first face 611 and the second left edge region 612-21 of the second face 612. The second region 613-2 may interconnect the first right edge region 611-22 of the first face 611 and the second right edge region 612-22 of the second face 612.

According to an embodiment, when viewed in a cross section, the third face 613 of the housing 61 may be a curved face that is convex toward the outside of the electronic device 600. Alternatively, the first region 613-1 and the second region 613-2 of the third face 613 may be substantially symmetrical to each other.

According to an embodiment, a display 690 may be exposed through the first face 611 of the housing 61. For example, the display 690 may be disposed between the first left edge region 611-21, the first central region 611-1, and the first right edge region 611-22.

According to an embodiment, the display 690 may be exposed through the second face 612 and the third face 613.

According to various embodiments, the first face 611 may include a through-hole 601 for supporting a speaker or a receiver. Alternatively, the first face 611 may include a through-hole 602 for supporting a button 6021. The second face 612 may include a through-hole 603 for supporting a camera 6031. Alternatively, the second face 612 may include a through-hole or a transparent region 604 for supporting a flash.

According to various embodiments, as viewed from above the first face 611, the display 690 may be disposed between the through-holes 601 and 602.

Figure 7:
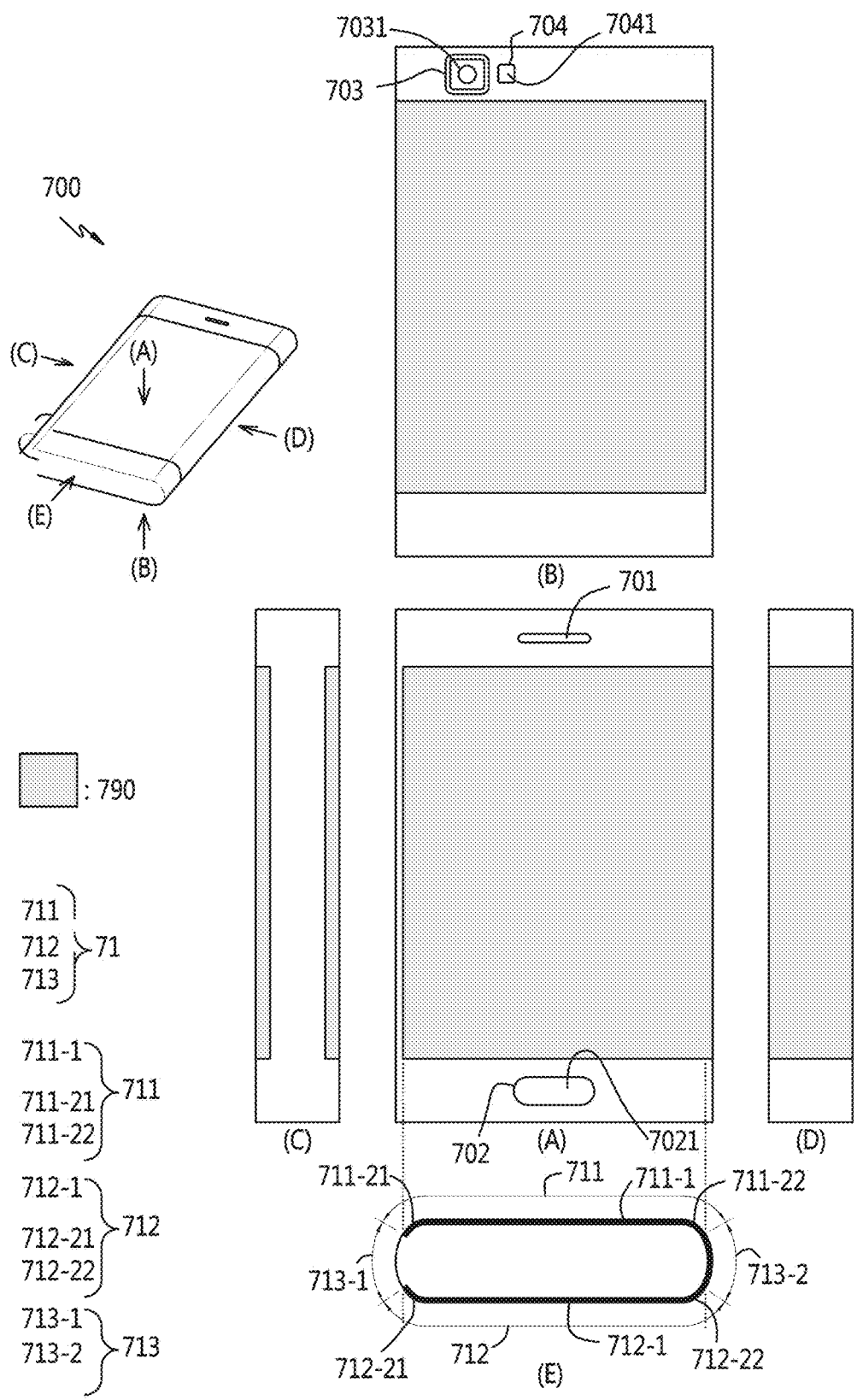

Referring to FIG. 7, when viewed in a cross section, the housing 71 of the electronic device 700 may include a first face 711, a second face 712, and a third face 713. The first face 711, the second face 712, and the third face 713 of the housing 71 may be configured to be at least partially the same as or similar to the first face 611, the second face 612, and the third face 613 of the housing 61 of FIG. 6, respectively.

According to various embodiments, the electronic device 700 may include through-holes 701, 702, 703, and 704. The through-holes 701, 702, 703, and 704 may be configured to be at least partially the same as or similar to the through-holes 601, 602, 603, and 604 of FIG. 6, respectively.

According to an embodiment, a display 790 may include a first portion, a second portion, and a third portion. The second portion may be a portion that interconnects the first portion and the third portion.

According to an embodiment, the first portion of the display 790 may be exposed through the first face 711. For example, the display 790 may be disposed through the first left edge region 711-21, the first central region 711-1, and the first right edge region 711-22.

According to an embodiment, the second portion of the display 790 may be exposed through the second region 713-2 of the third face 713.

According to an embodiment, the third portion of the display 790 may be exposed through the second face 712. For example, the display 790 may be disposed through the second right edge region 712-22, the second central region 712-1, and the second left edge region 712-21.

According to an embodiment, the display 790 may be exposed through the first region 713-1 of the third face 713.

Figure 8:
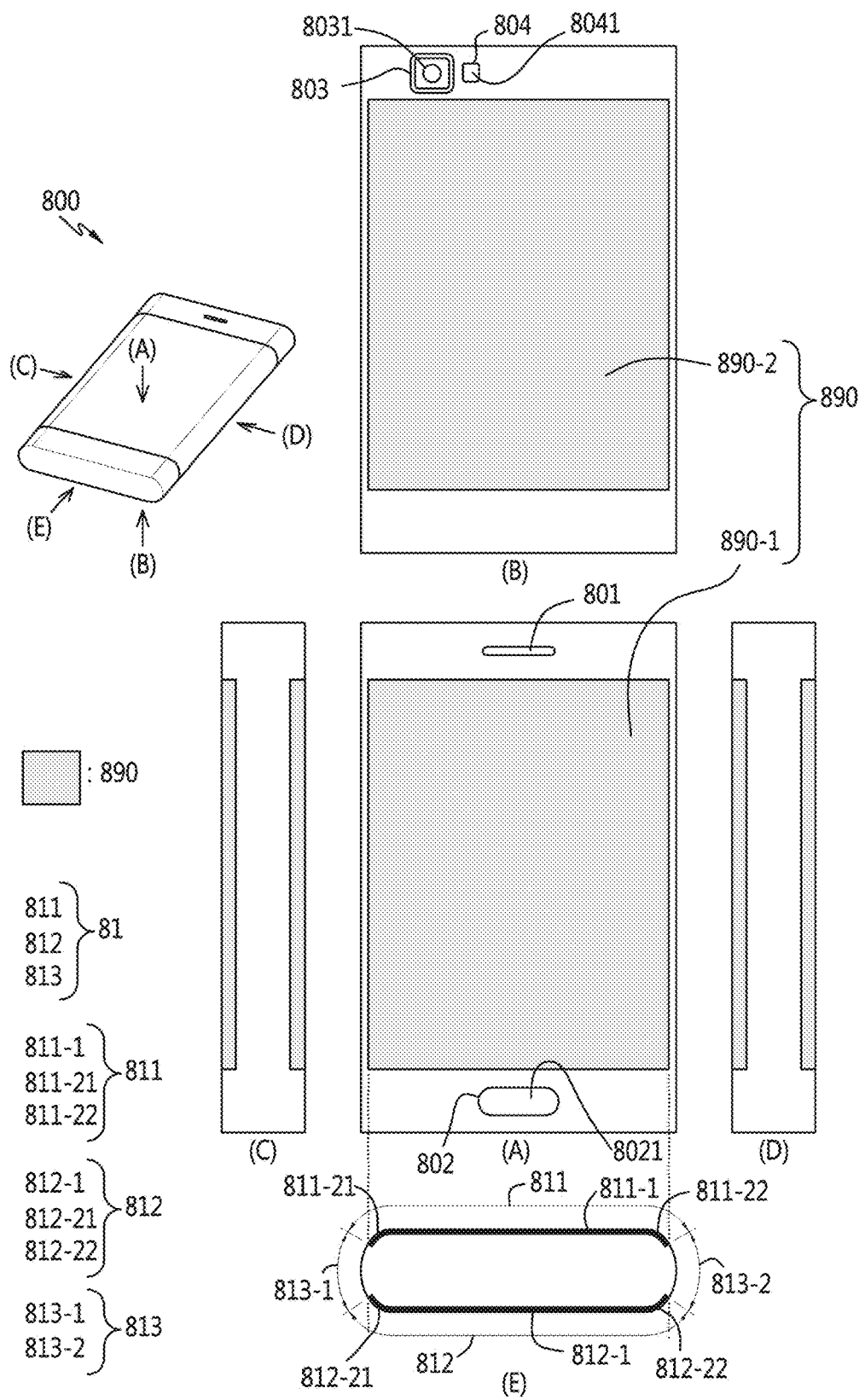

Referring to FIG. 8, when viewed in a cross section, the housing 81 of the electronic device 800 may include a first face 811, a second face 812, and a third face 813. The first face 811, the second face 812, and the third face 813 of the housing 81 may be configured to be at least partially the same as or similar to the first face 611, the second face 612, and the third face 613 of the housing 61 of FIG. 6, respectively.

According to various embodiments, the electronic device 800 may include through-holes 801, 802, 803, and 804. The through-holes 801, 802, 803, and 804 may be configured to be at least partially the same as or similar to the through-holes 601, 602, 603, and 604 of FIG. 6.

According to an embodiment, the display 890 of the electronic device 800 may include a first display 890-1 and a second display 890-2 that are separate from each other.

According to an embodiment, the first display 890-1 may be exposed through the first face 811. For example, the first display 890-1 may be exposed through the first left edge region 811-21, the first central region 811-1, and the first right edge region 811-22.

According to an embodiment, the second display 890-2 may be exposed through the second face 812. For example, the second display 890-2 may be exposed through the second left edge region 812-21, the second central region 812-1, and the second right edge region 812-22.

According to an embodiment, the display 890 may not be exposed through the third face 813.

Figure 9:
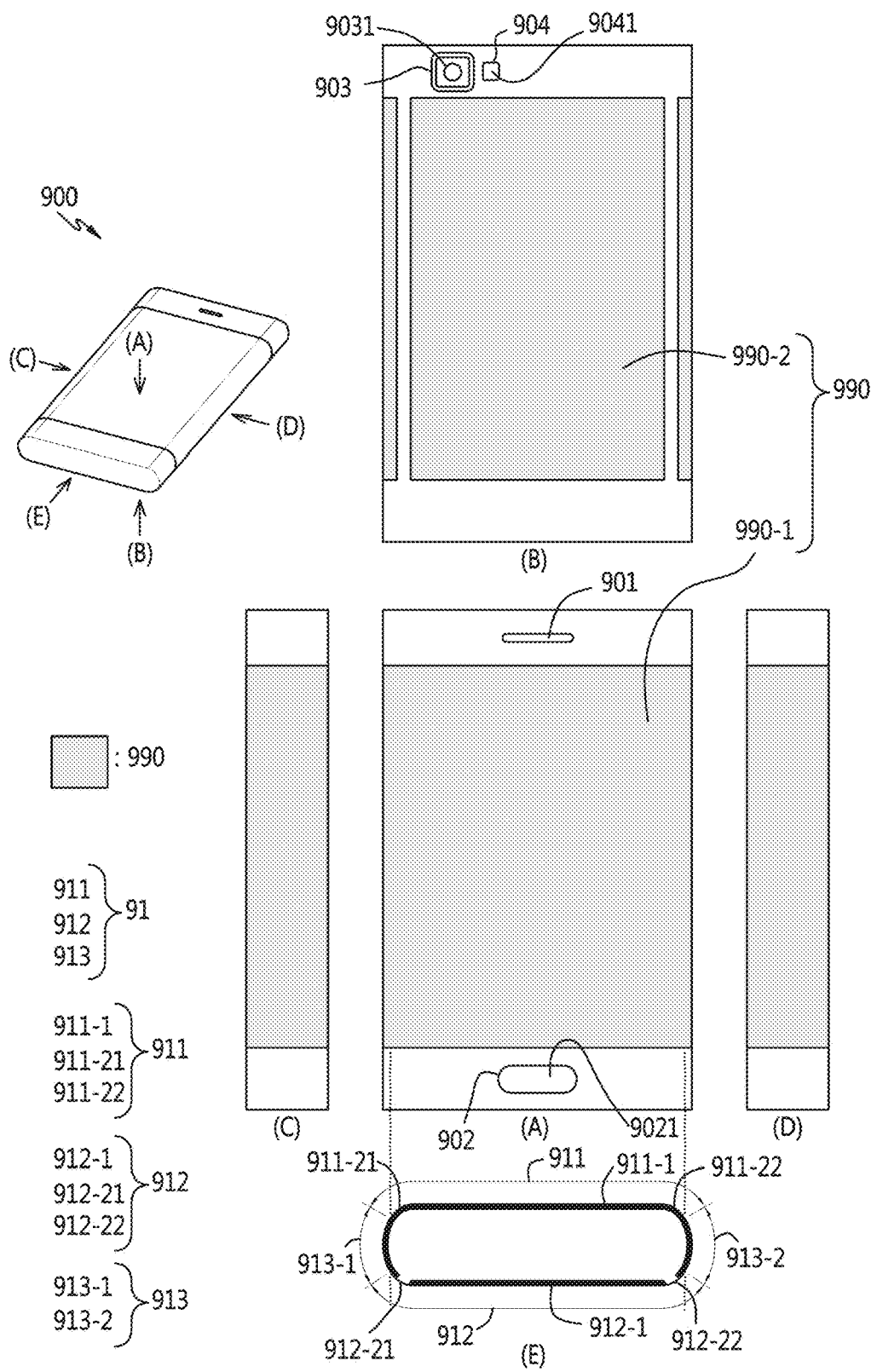

Referring to FIG. 9, when viewed in a cross section, the housing 91 of an electronic device 900 may include a first face 911, a second face 912, and a third face 913. The first face 911, the second face 912, and the third face 913 of the housing 91 may be configured to be at least partially the same as or similar to the first face 611, the second face 612, and the third face 613 of the housing 61 of FIG. 6, respectively.

According to various embodiments, the electronic device 900 may include through-holes 901, 902, 903, and 904. The through-holes 901, 902, 903, and 904 may be configured to be at least partially the same as or similar to the through-holes 601, 602, 603, and 604 of FIG. 6.

According to an embodiment, the display 990 of the electronic device 900 may include a first display 990-1 and a second display 990-2 that are separate from each other.

According to an embodiment, the first display 990-1 may include a first portion, a second portion, and a third portion. The second portion may be a portion that interconnects the first portion and the third portion.

According to an embodiment, the first portion of the first display 990-1 may be exposed through a portion of the second left edge region 912-21 of the second face 912 and a first region 913-1 of the third face 913.

According to an embodiment, a second portion of the first display 990-1 may be exposed through the first face 911. For example, the first display 990-1 may be exposed through the first left edge region 911-21, the first central region 911-1, and the first right edge region 911-22.

According to an embodiment, the third portion of the first display 990-1 may be exposed through the second region 913-2 of the third face 913 and a portion of the second right edge region 912-22 of the second face 912.

According to an embodiment, the second display 990-2 may be exposed through the second central region 912-1 of the second face 912.

According to an embodiment, the display 990 may not be exposed through a portion of the second left edge region 912-21 of the second face 912 and a portion of the second right edge region 912-22.

Figure 10:
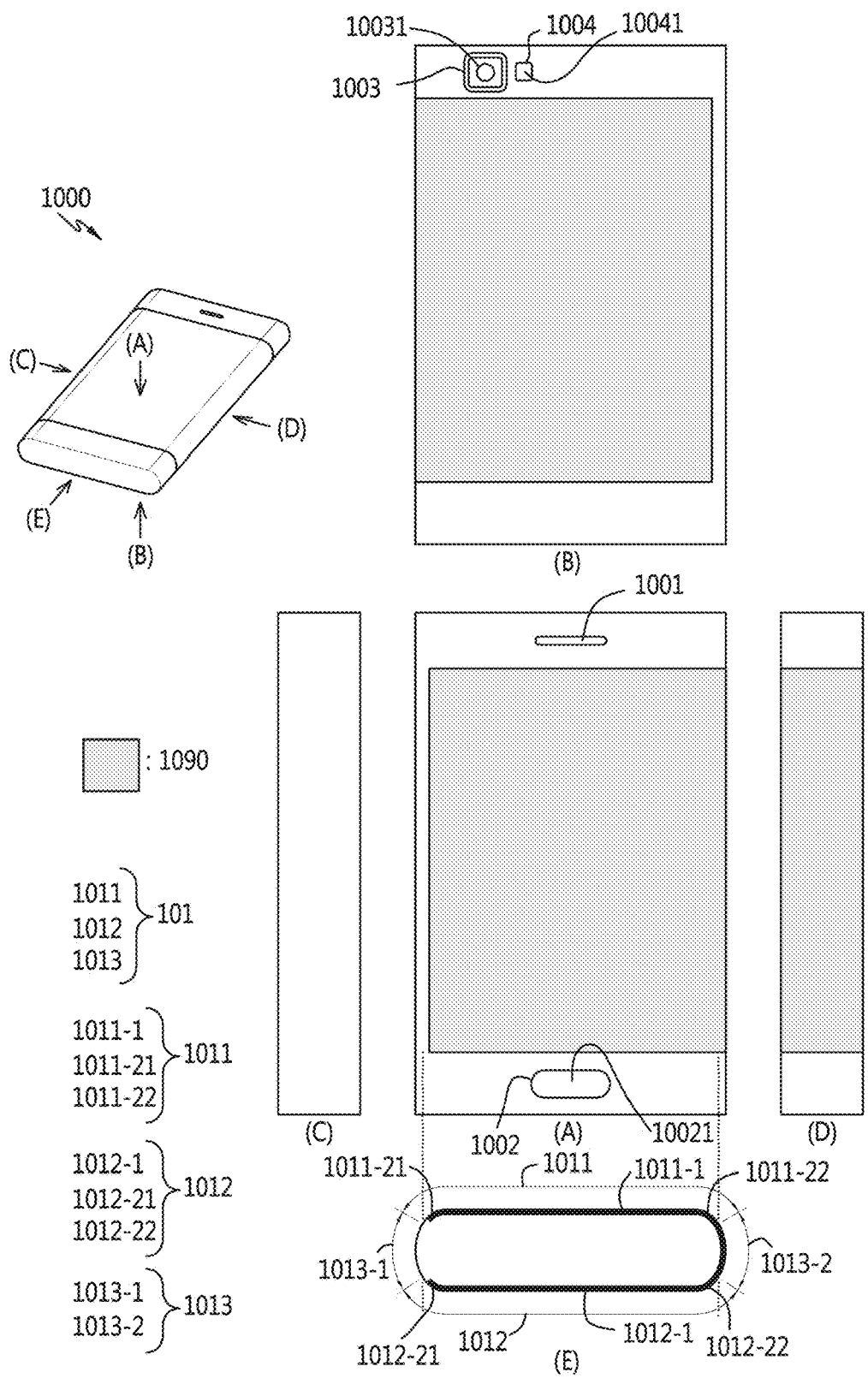

Referring to FIG. 10, when viewed in a cross section, the housing of the electronic device 1000 may include a first face 1011, a second face 1012, and a third face 1013. The first face 1011, the second face 1012, and the third face 1013 of the housing may be configured to be at least partially the same as or similar to the first face 611, the second face 612, and the third face 613 of the housing 61 of FIG. 6, respectively.

According to various embodiments, the electronic device 1000 may include through-holes 1001, 1002, 1003, and 1004. The through-holes 1001, 1002, 1003, and 1004 may be configured to be at least partially the same as or similar to the through-holes 601, 602, 603, and 604 of FIG. 6.

According to an embodiment, the display 1090 may include a first portion, a second portion, and a third portion. The second portion may be a portion that interconnects the first portion and the third portion.

According to an embodiment, the first portion of the display 1090 may be exposed through the first face 1011. For example, the display 1090 may be disposed through a portion of the first left edge region 1011-21, the first central region 1011-1, and the first right edge region 1011-22.

According to an embodiment, the second portion of the display 1090 may be exposed through the second region 1013-2 of the third face 1013.

According to an embodiment, the third portion of the display 1090 may be exposed through the second face 1012. For example, the display 1090 may be exposed through the second right edge region 1012-22, the second central region 1012-1, and a portion of the second left edge region 1012-21.

According to an embodiment, the display 1090 may not be exposed through a portion of the first left edge region 1011-21 of the first face 1011, the first region 1013-1 of the third face, and a portion of the second left edge region 1012-21 of the second face 1012.

According to an embodiment, the display 1090 may not be exposed through a portion of the first right edge region 1011-22 of the first face 1011, the second region 1013-2 of the third face 1013, and a portion of the second right edge region 1012-22 of the second face 1012.

Figure 11:
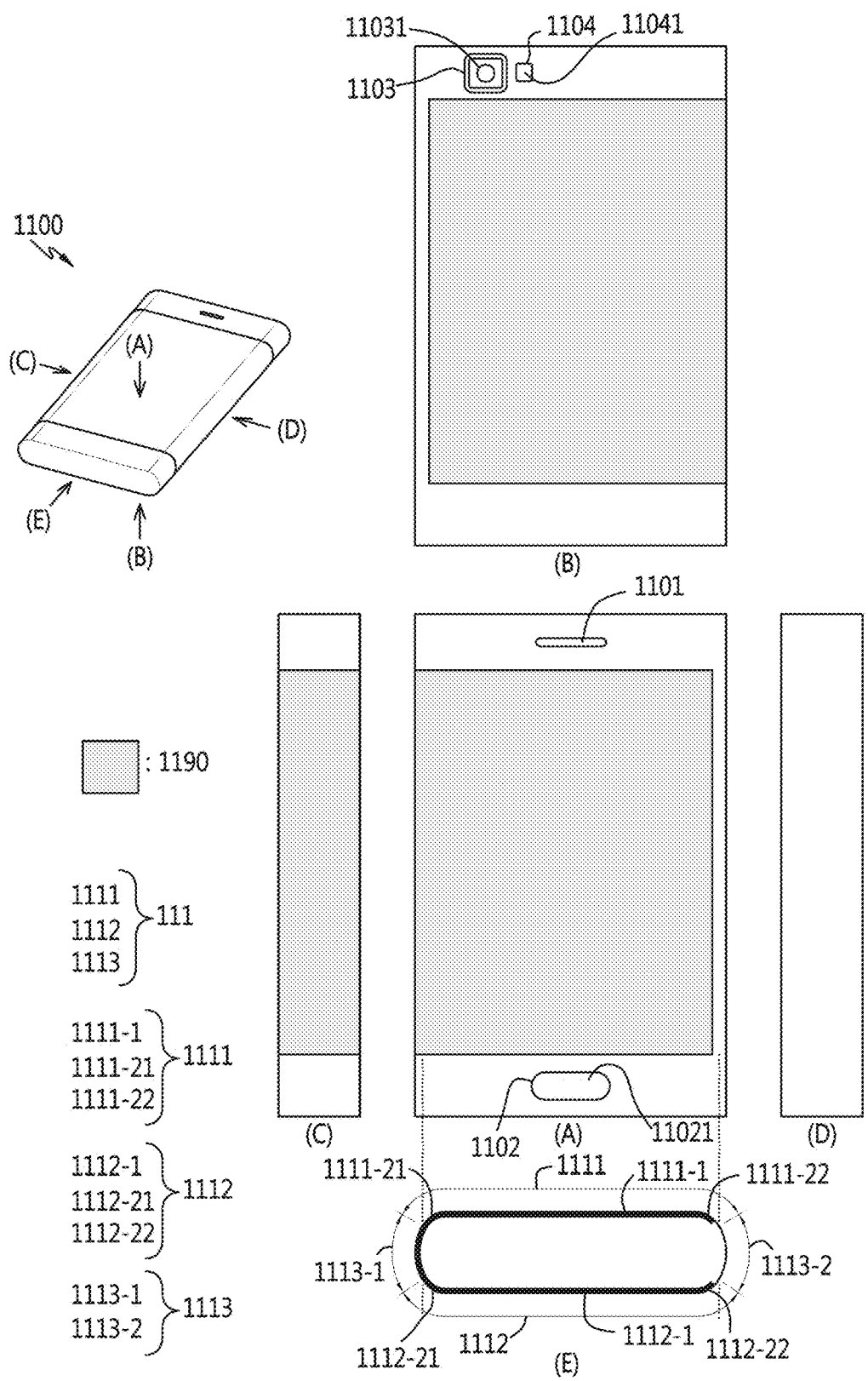

Referring to FIG. 11, when viewed in a cross section, the housing 111 of the electronic device 1100 may include a first face 1111, a second face 1112, and a third face 1113. The first face 1111, the second face 1112, and the third face 1113 of the housing 111 may be configured to be at least partially the same as or similar to the first face 611, the second face 612, and the third face 613 of the housing 61 of FIG. 6, respectively.

According to various embodiments, the electronic device 1100 may include through-holes 1101, 1102, 1103, and 1104. The through-holes 1101, 1102, 1103, and 1104 may be configured to be at least partially the same as or similar to the through-holes 601, 602, 603, and 604 of FIG. 6, respectively.

According to an embodiment, the display 1190 may include a first portion, a second portion, and a third portion. The second portion may be a portion that interconnects the first portion and the third portion.

According to an embodiment, the first portion of the display 1190 may be exposed through the first face 1111. For example, the display 1190 may be disposed through a portion of the first right edge region 1111-22, the first central region 1111-1, and the first left edge region 1111-21.

According to an embodiment, the second portion of the display 1190 may be exposed through the first region 1113-1 of the third face 1113.

According to an embodiment, the third portion of the display 1190 may be exposed through the second face 1112. For example, the display 1190 may be disposed through the second left edge region 1112-21, the second central region 1112-1, and the second right edge region 1112-22.

According to an embodiment, the display 1190 may not be exposed through a portion of the first right region 1111-22 of the first face 1111, the second region 1113-2 of the third face 1113, and a portion of the second right edge region 1112-22 of the second face 1112.

Figure 12:
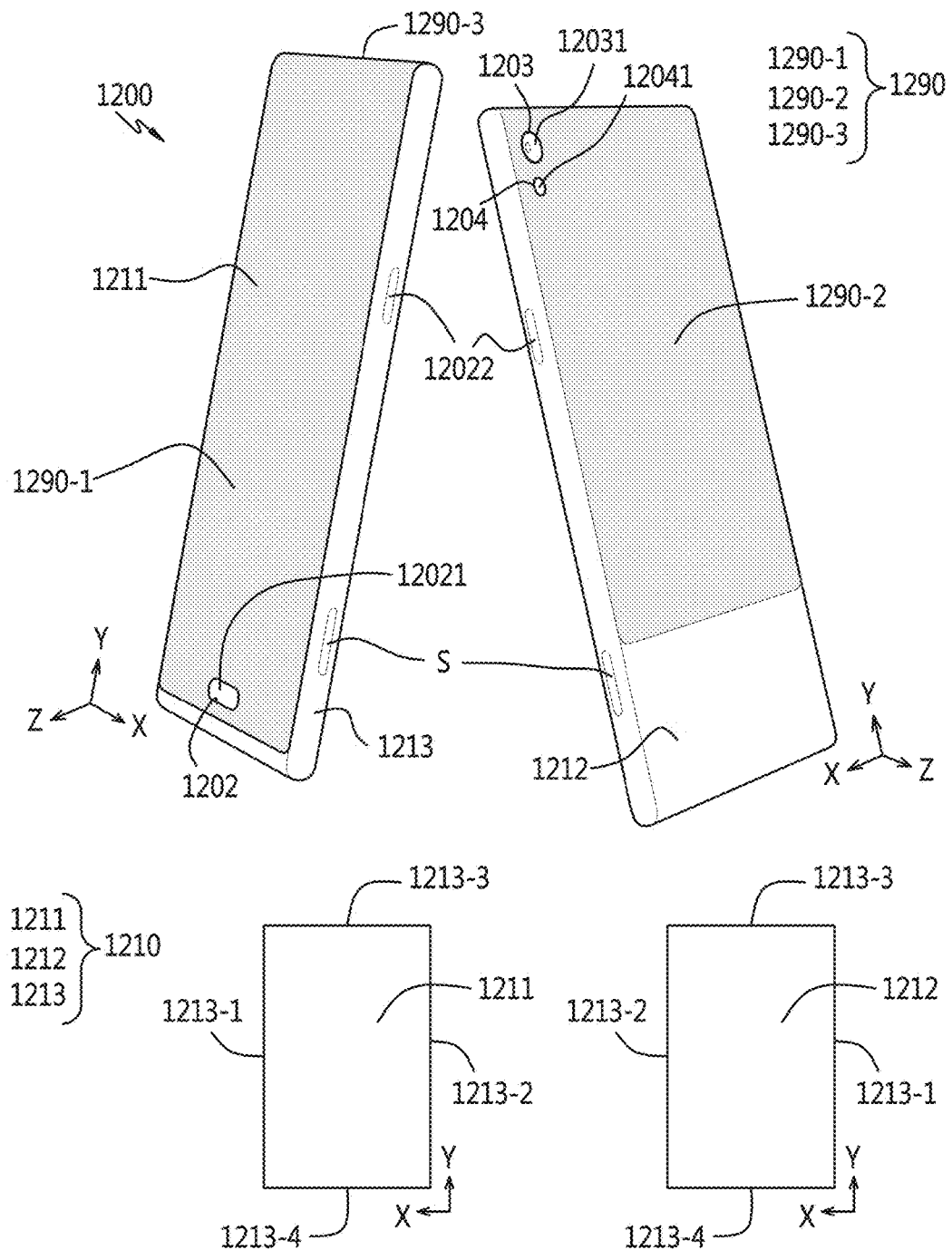

Referring to FIG. 12, a housing 1210 of an electronic device 1200 may include a first face 1211 and a second face 1212 that faces a direction opposite to the first face 1211. The housing 1210 may include a third face 1213 that surrounds a space between the first face 1211 and the second face 1212.

According to an embodiment, the first face 1211 (e.g., the front face) and the second face 1212 (e.g., the rear face) of the housing 1210 may have a substantially rectangular shape when unfolded and viewed in a plan view.

According to an embodiment, the third face 1213 of the housing 1210 may include a first region 1213-1, a second region 1213-2, a third region 1213-3, and a fourth region 1213-4. The first region 1213-1 and the second region 1213-2 may be disposed opposite to each other. The third region 1213-3 and the fourth region 1213-4 may be disposed opposite to each other.

According to an embodiment, the housing 1210 may have a substantially rectangular shape. For example, the distance between the first region 1213-1 and the second region 1213-2 of the third face 1213 may be smaller than the distance between the third region 1213-3 and the fourth regions 1213-4 of the third face 1213.

According to an embodiment, the display 1290 may include a first portion 1290-1, a second portion 1290-2, and a third portion 1290-3. The third portion 1290-3 may be a portion that interconnects the first portion 1290-1 and the second portion 1290-2.

According to an embodiment, the first portion 1290-1 of the display 1290 may be exposed through the first face 1211 of the housing 1210.

According to various embodiments, the first face 1211 of the housing 1210 may include a flat face or a curved face. For example, the first portion 1290-1 of the display 1290 may be flat or curved to correspond to the first face 1211 of the housing 1210.

According to an embodiment, the second portion 1290-2 of the display 1290 may be exposed through the second face 1212 of the housing 1210.

According to various embodiments, the second face 1212 of the housing 1210 may be a flat face or a curved face. For example, the second portion 1290-2 of the display 1290 may be flat or curved to correspond to the second face 1212 of the housing 1210.

According to an embodiment, the third portion 1290-3 of the display 1290 may be exposed through the third region 1213-3 of the third face 1213 of the housing 1210.

According to various embodiments, the third region 1213-3 of the third face 1213 of the housing 1210 may be a flat face or a curved face. For example, the third portion 1290-3 of the display 1290 may be flat or curved to correspond to the third region 1213-3 of the third face 1213 of the housing 1210.

According to various embodiments, assuming the first face 1211 and the second face 1212 of the housing 1210 have substantially the same areas, the area occupied by the first portion 1290-1 of the display 1290 on the first face 1211 may be greater than the area occupied by the second portion 1290-2 of the display 1290 on the second face 1212.

According to an embodiment, the display 1290 may not be exposed through the first region 1213-1, the second region 1213-2, and the fourth region 1213-4 of the third face 1213.

According to various embodiments, the electronic device 1200 may include one or more buttons disposed on at least one of the plurality of faces of the housing 1210. For example, a button 12021 may be disposed on the first face 1211 of the housing 1210. For example, a button 12022 may be disposed on the third face 1213 of the housing 1210.

According to various embodiments, the first face 1211 of the housing 1210 may include a through-hole 1202 for supporting the button 12021. The first portion 1290-1 of the display 1290 may include a through-hole that corresponds to the through-hole 1202.

According to various embodiments, the second face 1212 of the housing 1210 may include a through-hole or transparent region 1203 for supporting a camera 12031. The second portion 1290-2 of the display 1290 may include a through-hole that corresponds to the through-hole or transparent region 1203.

According to various embodiments, the second face 1212 of the housing 1210 may include a through-hole or transparent region 1204 for supporting a flash 12041. The second portion 1290-2 of the display 1290 may include a through-hole that corresponds to the through-hole or transparent region 1204.

According to an embodiment, an electronic device (e.g., the electronic device 101 of FIG. 1) may include a first conductive pattern (not illustrated) disposed between the transparent substrate and the at least one display. For example, the first conductive pattern may be configured to support a touch input or hovering input. The first conductive pattern may be electrically connected to a touch sensing circuit (not illustrated) disposed within the housing. According to various embodiments, the electronic device 101 may include at least one of the electronic devices 400, 500, 600, 700, 800, 900, 1000, 1100, and 1200 of FIGS. 4A and 4B, and FIGS. 5 to 12.

According to another embodiment, the first conductive pattern may be disposed within at least one display (e.g., an integrated touch screen). For example, the display may include an AMOLED-integrated touch screen (on-cell TSP AMOLED (OCTA)).

According to various embodiments, the first conductive pattern may at least partially include Al, Cu, Ag, graphene, indium-tin-oxide (ITO), or indium-zinc-oxide (IZO).

According to an embodiment, the electronic device 101 may include a second conductive pattern (not illustrated) disposed between the transparent substrate and the first conductive pattern. The second conductive pattern may be electrically connected to a wireless communication circuit (not illustrated) disposed within the housing. The second conductive pattern may be used as an antenna radiator configured to support various types of communication.

According to an embodiment, the second conductive pattern may include an electrode pattern of a mesh structure. Hereinafter, the electrode pattern of the mesh structure will be referred to as a "metal mesh pattern." The metal mesh pattern may include openings. Image-related light generated from at least one display may pass through the openings of the metal mesh pattern.

According to an embodiment, a layer may be disposed between the transparent substrate and the first conductive pattern, and the layer may include the second conductive pattern.

According to an embodiment, the electronic device 101 may include a third conductive pattern (not illustrated) disposed on at least one display or disposed within at least one display. According to another embodiment, the third conductive pattern may be disposed between the first conductive pattern and the display. The third conductive pattern may be electrically connected to a wireless communication circuit disposed within the housing. The third conductive pattern may be used as an antenna radiator configured to support various types of communication.

According to an embodiment, the third conductive pattern may include the metal mesh pattern described above. For example, the metal mesh pattern may be coupled to a non-pixel region outside a plurality of pixel (pixel) regions of the at least one display. The metal mesh pattern does not overlap with the plurality of pixel regions of the display, and each pixel region of the display may be disposed in the openings of the metal mesh pattern. The light generated from the pixel regions of the display may proceed in the direction of the transparent substrate without being disturbed by the metal mesh pattern.

According to an embodiment, the electronic device 101 may include one or both of the second conductive pattern and the third conductive pattern.

According to an embodiment, the second conductive pattern and/or the third conductive pattern may be disposed along at least one region of the housing. For example, referring to FIGS. 4A and 4B, the second conductive pattern and/or the third conductive pattern may be disposed in at least one region of at least one of a first face 411, a second face 412, and a third face 413 of the housing 41.

According to an embodiment, the second conductive pattern and/or the third conductive pattern may take a form that follows one face of the housing (e.g., the first face 411, the second face 412, or the third face 413 of FIGS. 4A and 4B).

According to an embodiment, the second conductive pattern and/or the third conductive pattern may at least partially include Al, Cu, Ag, graphene, ITO, or IZO.

According to an embodiment, the first conductive pattern may at least partially include silver (Ag), ITO, or IZO. The second conductive pattern and/or the third conductive pattern may at least partially include aluminum (Al) or copper (Cu).

According to various embodiments, the metal mesh pattern may have various mesh shapes. The mesh shape may be, for example, a square shape, a hexagonal shape, or the like.

According to various embodiments, the mesh shape of the metal mesh pattern may be generally uniform. Alternatively, the mesh size of the metal mesh pattern may be generally uniform. Alternatively, the mesh thickness of the metal mesh pattern may be generally uniform.

As described above, the metal mesh pattern may be used as an antenna radiator configured to support various types of communication. For example, when the electronic device 101 is a mobile device, the electronic device 101 is designed to radiate radio waves in all directions (omnidirectionally). However, the metal mesh pattern may emit radio waves in a specific direction by the display and electronic components therearound. This may cause a deterioration of antenna performance in a design that uses a metal mesh pattern as an antenna radiator.

As described above, the metal mesh pattern may have a shape following one face of the housing. According to an embodiment, a portion of the layer including the metal mesh pattern may not be flat. For example, the portion of the layer including the metal mesh pattern may be curved. The curved portion of the layer including the metal mesh pattern may include an inner curved portion and an outer curved portion. The radius of curvature of the inner curved portion and the radius of the outer curved portion may be different from each other. When a curved portion is formed with a certain thickness of the layer including the metal mesh pattern, the thickness of the metal mesh pattern of the curved portion may become thinner than the initial thickness depending on a relationship between stress and strain. This may cause a deterioration of antenna performance in a design that uses a metal mesh pattern as an antenna radiator.

According to an embodiment, the mesh shape of the metal mesh pattern may be partially different in order to reduce the deterioration of the antenna performance. For example, the mesh shape of a portion of the metal mesh pattern may be quadrilateral, and the mesh shape of another portion of the metal mesh pattern may not be quadrilateral (e.g., hexagonal). When the mesh shape of a portion of the metal mesh pattern is made different from that of another portion, the radiation direction or radiation coverage of radio waves can be extended.

According to an embodiment, the mesh size of the metal mesh pattern may be partially different in order to reduce the above-mentioned deterioration of antenna performance. For example, when the mesh pattern of a portion of the metal mesh pattern is made different from that of another part, the radiation direction or radiation coverage of radio waves can be extended.

According to an embodiment, the size (e.g., the width or thickness) of the metal mesh pattern may be partially different in order to reduce the above-mentioned deterioration of antenna performance. For example, when the thickness of a portion of the metal mesh pattern is made different from that of another portion, the radiation direction or radiation coverage of radio waves can be extended.

According to various embodiments, a portion in the metal mesh pattern (hereinafter, referred to as a "pattern adjustment part") in which at least one of the mesh shape, the mesh size, and the thickness is made different from that of another portion, may be a place that requires the extension of the radiation direction or radiation coverage of radio waves as described above.

According to an embodiment, the pattern adjustment portion in the metal mesh pattern may be a non-planar portion.

Referring to FIG. 6, the pattern adjustment portion may correspond to the first left edge region 611-21 and/or the first right edge region 611-22 of the first face 611 of the housing 61.

Referring to FIG. 7, the pattern adjustment portion may correspond to the first left edge region 711-21 and the first right edge region 711-22 of the first face 711 of the housing 71. Alternatively, in the metal mesh pattern, the pattern adjustment portion may correspond to the second left edge region 712-21 and/or the second right edge region 712-22 of the second face 712 of the housing 71. Alternatively, in the metal mesh pattern, the pattern adjustment portion may correspond to the second region 713-2 of the third face 713 of the housing 71.

Referring to FIG. 8, the pattern adjustment portion may correspond to the first left edge region 811-21 and/or the first right edge region 811-22 of the first face 811 of the housing 81. Alternatively, in the metal mesh pattern, the pattern adjustment portion may correspond to the second left edge region 812-21 and/or the second right edge region 812-22 of the second face 812 of the housing 81.

Referring to FIG. 9, the pattern adjustment portion may correspond to the first left edge region 911-21 and/or the first right edge region 911-22 of the first face 911 of the housing 91. Alternatively, in the metal mesh pattern, the pattern adjustment portion may correspond to a portion of the second left edge region 912-21 and/or a portion of the second right edge region 912-22 of the second face 912 of the housing 91. Alternatively, in the metal mesh pattern, the pattern adjustment portion may correspond to the third face 913 of the housing 91.

Referring to FIG. 10, the pattern adjustment portion may correspond to the first left edge region 1011-21 and/or the first right edge region 1011-22 of the first face 1011 of the housing. Alternatively, the pattern adjustment portion may correspond to a portion of the second left edge region 1012-21 and/or the second right edge region 1012-22 of the second face 1012 of the housing. Alternatively, the pattern adjustment portion may correspond to the second region 1013-2 of the third face 1013 of the housing.

Referring to FIG. 11, the pattern adjustment portion may correspond to the first left edge region 1111-21 and/or a portion of the first right edge region 1111-22 of the first face 1111 of the housing 111. Alternatively, the pattern adjustment portion may correspond to the second left edge region 1112-21 and/or a portion of the second right edge region 1112-22 of the second face 1112 of the housing 111. Alternatively, the pattern adjustment portion may correspond to the first region 1113-1 of the third face 1113 of the housing 111.

Referring to FIG. 12, the pattern adjustment portion may correspond to the third region 1213-3 of the third face 1213 of the housing 1210.

According to an embodiment, in the metal mesh pattern, the pattern adjustment portion may correspond to a portion in which an electronic component is adjacent to a display. For example, referring to FIGS. 6 to 12, the pattern adjustment portion may correspond to a portion located adjacent to the button 6021, 7021, 8021, 9021, 10021, 11021 or 12021. For example, referring to FIGS. 6 to 12, the pattern adjustment portion may correspond to a portion located adjacent to the camera 6031, 7031, 8031, 9031, 10031, 11031 or 12031. For example, referring to FIGS. 6 to 12, the pattern adjustment portion may correspond to a portion located adjacent to the flash 6041, 7041, 8041, 9041, 10041, 11041 or 12041.

As described above, the second conductive pattern and/or the third conductive pattern may be used as an antenna radiator that supports various types of communication. For example, the second conductive pattern and/or the third conductive pattern may be used for cellular communication. The cellular communication may include at least one of, for example, LTE, LTE-A, CDMA, WCDMA, UMTS, WiBro, and GSM.

According to an embodiment, the second conductive pattern and/or the third conductive pattern may be an antenna radiator that supports short range communication. The short range communication may include at least one of, for example, WiFi, Bluetooth, NFC, and GNSS.

According to an embodiment, the second conductive pattern and/or the third conductive pattern may be an antenna radiator that supports transmission/reception of magnetic signals.

According to various embodiments, the second conductive pattern and/or the third conductive pattern may be an antenna radiator that supports wireless charging. For example, the second conductive pattern and/or the third conductive pattern may be used for transmitting wireless power to an external device, or for wirelessly receiving power from the external device.

Figure 13:
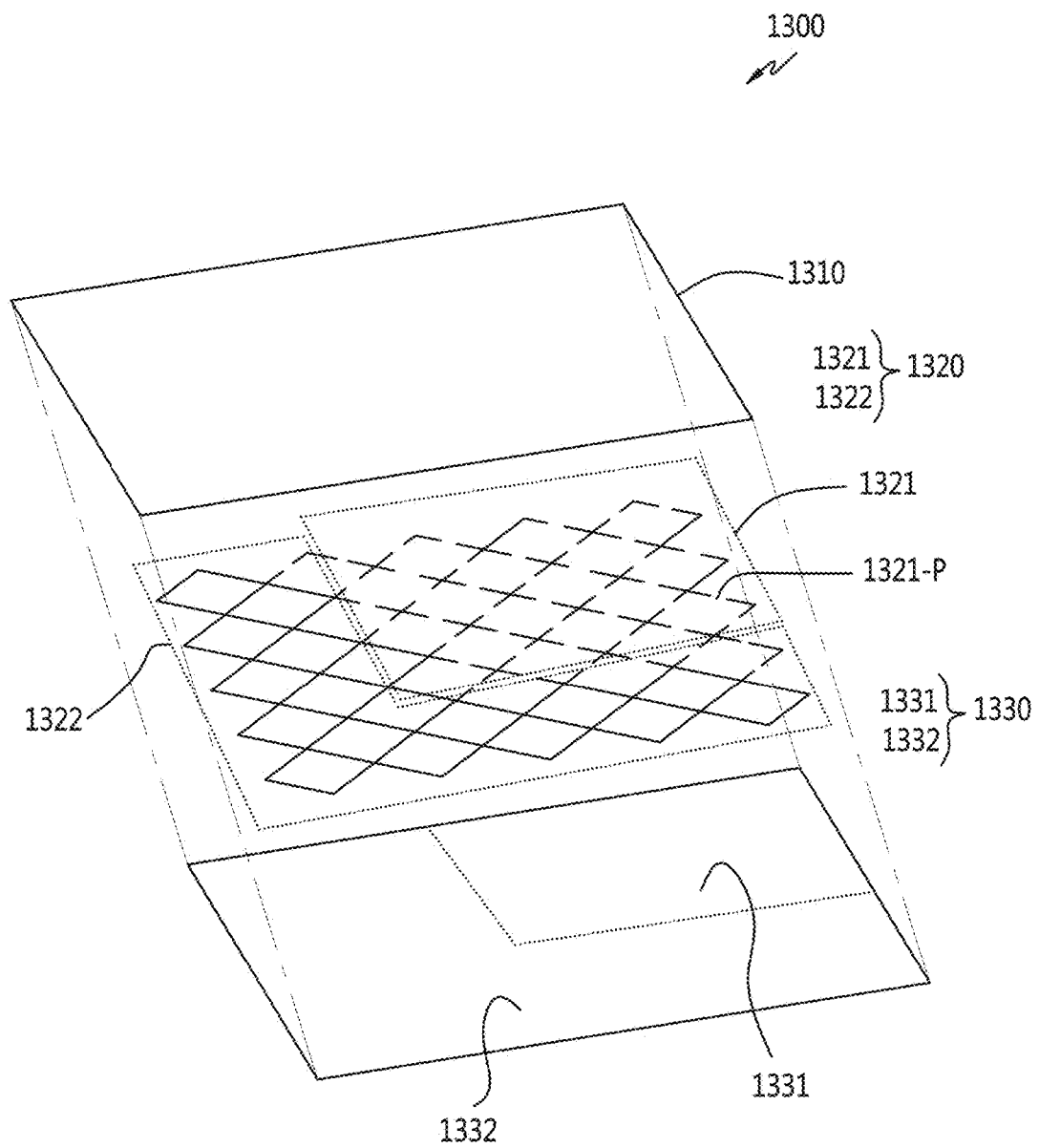
FIG. 13 is a view illustrating a display according to an embodiment of the present disclosure.

FIG. 13 is a view illustrating a display according to an embodiment of the present disclosure.

Referring to 13, the display 1300 may include a window 1310, a metal mesh pattern 1320, and a display panel 1330. According to various embodiments, at least one of the above-described displays 590, 690, 790, 890, 990, 1090, 1190, and 1290 may have a configuration that is at least partially the same as or similar to the display 1300 of FIG. 13.

The window 1310 is transparent, and may include, for example, the transparent substrate illustrated in FIGS. 4A-4B.

According to an embodiment, the metal mesh pattern 1320 may be disposed between the window 1310 and the display panel 1330.

According to an embodiment, the metal mesh pattern 1320 may overlap with the substantially entire region of the display panel 1330. For example, the metal mesh pattern 1320 may include a first metal mesh pattern 1321 and a second metal mesh pattern 1322. The first metal mesh pattern 1321 may include a plurality of segments 1321-P unlike the second metal mesh pattern 1322, and may include a plurality of patterns that are not electrically connected to each other.

According to various embodiments, the second metal mesh pattern 1322 may be used as an antenna radiator for various types of communication. Or, the first metal mesh pattern 1321 may be used as a radiator for wireless charging.

According to various embodiments, the display panel 1330 may include a first display region 1331 corresponding to the first metal mesh pattern 1321 and a second display region 1332 corresponding to the second metal mesh pattern 1322. For example, assuming that only the second metal mesh pattern 1322 is formed, the light generated from the second display region 1332 is transmitted to the window 1310 through the second metal mesh pattern 1322 and the light generated from the first display region 1331 can be transmitted to the window 1310. Thus, a difference in luminance may be generated for respective regions of the display 1300, which are visible to the user. When the first metal mesh pattern 1321 is formed, the second metal mesh pattern 1322 can be used for a function (e.g., wireless communication or wireless charging), and the above-described difference in luminance can be improved.

Figure 14:
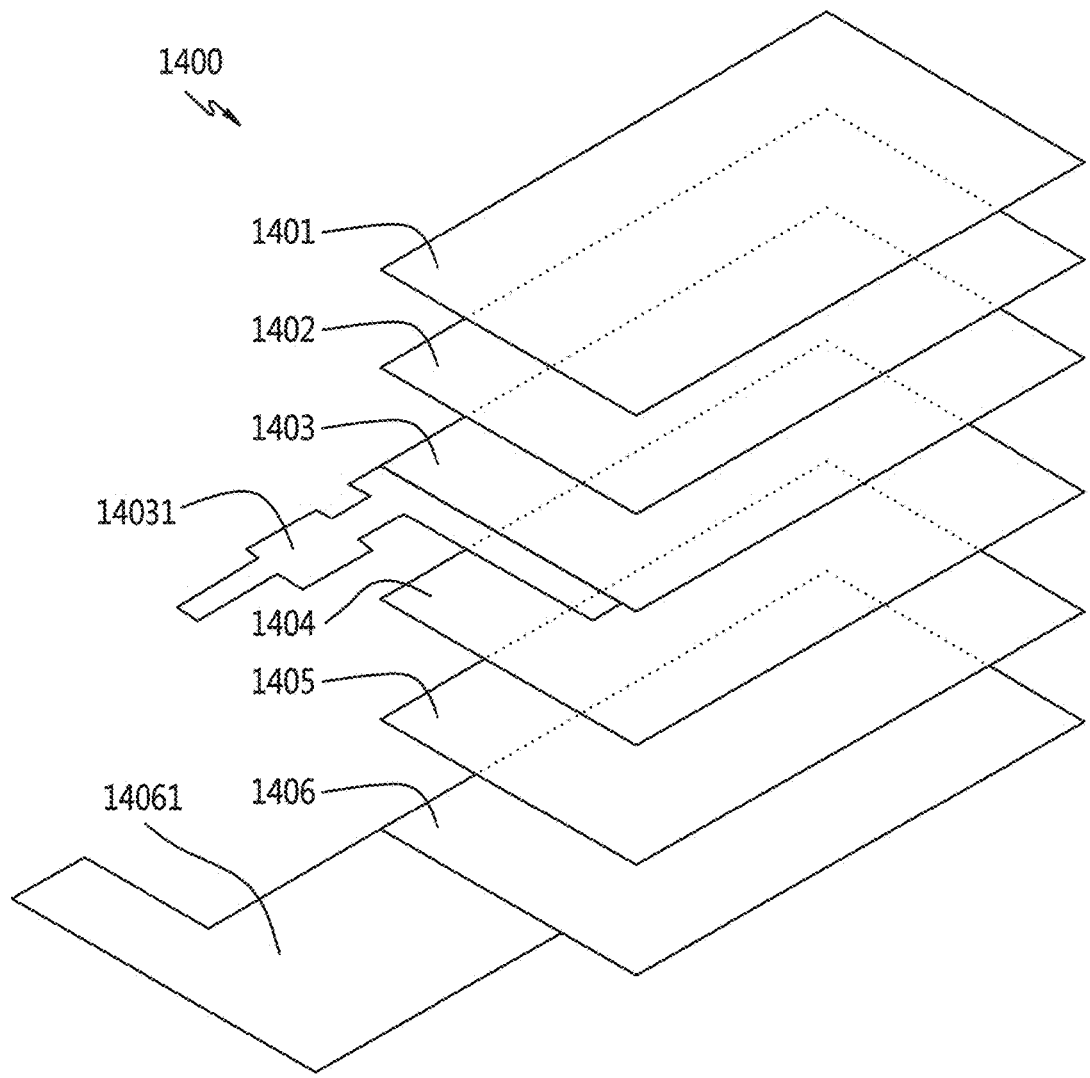
FIG. 14 is a view illustrating a display according to an embodiment of the present disclosure.

FIG. 14 is a view illustrating a display according to an embodiment of the present disclosure.

Referring to 14, the display 1400 may include a window 1401, a touch panel 1403, and a display panel 1406. According to various embodiments, at least one of the above-described displays 590, 690, 790, 890, 990, 1090, 1190, and 1290 may have a configuration that is at least partially the same as or similar to the display 1400 of FIG. 14.

According to an embodiment, the window 1401 may form a face of the electronic device (e.g., the first face 411, the second face 412, or the third face 413 of FIG. 4). The image-related light generated from the display panel 1406 can be emitted to the outside through the transparent region of the window 1401. Alternatively, the window 1401 can protect the display 1400 from an external impact.

According to various embodiments, the window 1401 may include a transparent layer (not illustrated). The transparent layer may be formed of a plastic material (e.g., acryl) or a glass material that has impact resistance. For example, the transparent layer may be formed of tempered glass.

According to various embodiments, a partial region of the window 1401 may have a color. For example, the above-mentioned transparent layer may be colored to express various colors. Alternatively, the window 1401 may further include a color layer including a dye, a pigment, a coloring matter, a fluorescent material, or a phosphor that develops a certain color.

According to various embodiments, the window 1401 may further include a plastic film. The plastic film may be formed of a material having high thermal stability and high mechanical strength. For example, the plastic film may be a polyester (PET) film, a polycarbonate (PC) film, a polyethylene (PE) film, a polypropylene (PP) film, or the like.

According to various embodiments, a partial region of the window 1401 may further include a pattern layer. The pattern layer may additionally include various patterns (e.g., a planar pattern or an input pattern) formed in a manner of being attached or printed. For example, the pattern layer may be formed through an UV molding. The pattern layer may be formed to express a metallic texture when external light is casted thereon.

According to various embodiments, a partial region of the window 1401 may further include a metal layer. The metal layer may be formed in a manner of depositing (e.g., physical vapor deposition (PVD) or chemical vapor deposition (CVD) or coating a metal (e.g., Sn, Al, Si, Ti, TiC, TiN, TiCB or $Al_2O_3$). The metal layer may express a metallic texture when external light is casted thereon.

According to various embodiments, a partial region of the window 1401 may further include an additional light shield layer. The light shield layer may include a black component that does not reflect light but absorbs light. The light shield layer may be a layer printed in black. Alternatively, the light shield layer may be an adhesive containing a black component.

According to an embodiment, the touch panel 1403 (e.g., a touch screen panel (TSP)) may be disposed between the window 1401 and the display panel 1406. The touch panel 1403 may support a touch input or hovering input. For example, when the user's finger or the electronic pen touches the window 1401, a touch input may be generated through the touch panel 1403. Alternatively, when the user's finger or electronic pen is spaced apart from the window 1401 but within a critical distance, a hovering input may be triggered through the touch panel 1403.

The touch panel 1403 may have a light transmittance and the image-related light generated from the display panel 1406 may be transmitted to the window 1401 through the touch panel 1403. According to various embodiments, the touch panel 1403 may have a configuration that is at least partially the same as or similar to the first conductive pattern that has been described above with reference to FIGS. 4A and 4B, and FIGS. 5 to 12.

The display panel 1406 may output an image corresponding to a signal provided from a control circuit (not shown) equipped in an electronic device (e.g., the electronic device 101 in FIG. 1).

According to various embodiments, the display 1400 may further include an adhesive layer 1402 disposed between the window 1401 and the touch panel 1403. The adhesive layer 1402 may have a light transmittance, and may bond the window 1401 and the touch panel 1403 to each other. For example, the adhesive layer 1402 may include an optical clear adhesive (OCA).

According to various embodiments, the display 1400 may further include at least one optical layer 1405 disposed between the touch panel 1403 and the display panel 1406. For example, the optical layer 1405 may include a polarization layer. The polarizing layer may be helpful in improving visibility by adjusting the amount of light reflection or light transmission. Alternatively, the optical layer 1405 may include a phase difference layer. A phase difference film is capable of preventing the occurrence of visual dependence, such as optical distortion caused by birefringence or coloration of display caused by modulation in a visual direction.

According to various embodiments, the display 1400 may include at least one optical layer (e.g., a polarizing layer and/or an optical layer) disposed between the window 1401 and the touch panel 1403.

According to various embodiments, the display 1400 may further include an adhesive layer 1404 disposed between the touch panel 1403 and the optical layer 1405. The adhesive layer 1404 may have a light transmittance, and may bond the touch panel 1403 and the optical layer 1405 to each other.

According to various embodiments, the display panel 1406 may include an AMOLED integrated touch screen (OCTA). For example, a conductive pattern, which replaces a touch panel, may be formed on an etched glass of the display panel 1406, and the touch panel 1403 and the adhesive layer 1404 may be omitted.

The display 1400 may include a first conductive layer (not illustrated) disposed between the window 1401 and the touch panel 1403.

According to an embodiment, the first conductive layer may have a light transmittance. For example, the first conductive layer may include a conductive pattern including openings. The image-related light generated from the display panel 1406 may be transmitted through the openings of the conductive pattern to be transferred to the window 1401.

According to an embodiment, the first conductive layer may include a metal mesh pattern.

According to an embodiment, the first conductive layer may be electrically connected to a communication circuit that is mounted in an electronic device (e.g., the electronic device 101 of FIG. 1) that is mounted with the display 1400. The first conductive pattern may be used as an antenna radiator configured to support various types of communication. According to various embodiments, the first conductive layer may have a configuration that is at least partially the same as or similar to the second conductive pattern that has been described above with reference to FIGS. 4A and 4B, and FIGS. 5 to 12.

According to various embodiments, the display 1400 may include a second conductive layer (not illustrated) disposed on the display panel 1406, or disposed inside the display panel 1406.

According to an embodiment, the second conductive layer may have a light transmittance. For example, the second conductive layer may include a conductive pattern including openings. The conductive pattern may be disposed in a non-pixel region outside a plurality of pixel regions of the display panel 1406. At least a portion of the conductive pattern of the second conductive layer does not overlap with the plurality of pixel regions of the display panel 1406, and each pixel region of the display panel 1406 may be disposed within an opening of the second conductive layer. The light generated from the pixel regions of the display panel 1406 may travel to the window 1401 without being disturbed by the conductive pattern of the second conductive layer.

According to an embodiment, the second conductive layer may include a metal mesh pattern.

According to an embodiment, the second conductive layer may be electrically connected to a communication circuit that is mounted in an electronic device (e.g., the electronic device 101 of FIG. 1) that is mounted with the display 1400. The second conductive pattern may be used as an antenna radiator configured to support various types of communication. According to various embodiments, the second conductive layer may have a configuration that is at least partially the same as or similar to the third conductive pattern that has been described above with reference to FIGS. 4A and 4B, and FIGS. 5 to 12.

According to various embodiments, the display 1400 may include a third conductive layer (not illustrated) disposed between the touch panel 1403 and the display panel 1406. For example, the third conductive layer may be disposed between the touch panel 1403 and the adhesive layer 1404. Alternatively, the third conductive layer may be disposed between the adhesive layer 1404 and at least one optical layer 1405. Alternatively, the third conductive layer may be disposed between the optical layer 1405 and the display panel 1406.

According to an embodiment, the third conductive layer may have a light transmittance. For example, the third conductive layer may include a conductive pattern including openings. The light generated from the pixel regions of the display panel 1406 may travel to the window 1401 without being disturbed by the conductive pattern of the third conductive layer.

According to an embodiment, the third conductive layer may include a metal mesh pattern.

According to an embodiment, the third conductive layer may be electrically connected to a communication circuit that is mounted in an electronic device (e.g., the electronic device 101 of FIG. 1) that is mounted with the display 1400. The third conductive pattern may be used as an antenna radiator configured to support various types of communication. According to various embodiments, the third conductive layer may have a configuration that is at least partially the same as or similar to the third conductive pattern that has been described above with reference to FIGS. 4A and 4B, and FIGS. 5 to 12.

According to various embodiments, the display 1400 may further include an electric connection means 14061 (e.g., a flexible printed circuit board (FPCB)) for electrically interconnecting the display panel 1406 and a printed circuit board (PCB) (not illustrated) mounted in the electronic device (e.g., the electronic device 101 of FIG. 1).

According to various embodiments, the display 1400 may further include an electrical connection means (e.g., FPCB) 14031 for electrically interconnecting the touch panel 1403 and the PCB.

Figure 15:
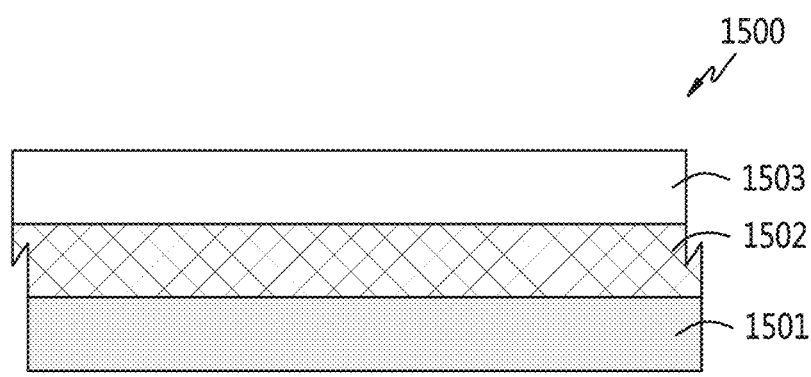
FIG. 15 is a view illustrating a display panel according to an embodiment of the present disclosure.

FIG. 15 is a view illustrating a display panel according to an embodiment of the present disclosure. The display panel 1500 may have a configuration that is at least partially the same as or similar to the display panel 1406 of FIG. 14.

Referring to FIG. 15, the display panel 1500 may include a substrate portion 1501 and a color reproducing portion 1502.

The substrate portion 1501 may be driven under the control of a display driver IC (DDI) (not illustrated) mounted in an electronic device (for example, the electronic device 101 of FIG. 1) that is mounted with the display panel

1500. For example, the DDI may electrically provide a driving signal and data to the substrate portion 1501 so that an image is displayed.

According to an embodiment, the substrate portion 1501 may have a thin film transistor substrate. The thin film transistor substrate may include gate lines, data lines, pixel electrodes, and thin film transistors (TFTs). The gate lines (or scanning signal lines) are disposed between the pixel regions and may transfer a scanning signal or a gate signal. The data lines are orthogonal to the gate lines and are disposed between the pixel regions so that the data lines can transfer a data signal. The TFTs may be disposed at the intersections of the gate lines and the data lines, respectively. The pixel electrodes may be disposed in the pixel regions. Each thin film transistor may include a gate electrode electrically connected to the gate line, a source electrode electrically connected to the data line, and a drain electrode electrically connected to the pixel electrode.

According to various embodiments, the substrate portion 1501 may include a low-temperature polycrystalline silicon (LTPS) substrate.

The color reproducing portion 1502 may implement colors according to the driving of the substrate portion 1501.

According to an embodiment, the color reproducing portion 1502 may be a configuration for a LCD. For example, the color reproducing portion 1502 may include a filter, a liquid crystal, and a backlight.

The filter may include a color pattern, a black matrix pattern, and a common electrode. Color patterns (e.g., a red color filter pattern, a green color filter pattern, and a blue color filter pattern) may be disposed in the pixel regions. The black matrix pattern (e.g., a black color pattern) may be separate from the color filter patterns. The common electrode may be disposed between a color pattern and a liquid crystal.

The liquid crystal may be disposed between the substrate portion 1501 and the filter. The electric field between the pixel electrode of the substrate portion 1501 and the common electrode of the filter may change the arrangement of molecules of the liquid crystal. Light from the backlight is transmitted through the liquid crystal and color filter patterns, so that the pixel region can emit a color.

According to an embodiment, the color reproducing portion 1502 may implement colors using organic light emitting diodes (OLEDs).

An OLED may be formed in a structure in which an organic light emitting material is deposited between a cathode electrode and an anode electrode. A current flows through the organic light emitting material between the two electrodes, and the organic light emitting material can emit light using an electroluminescent phenomenon. For example, when a forward voltage is applied to the thin film transistor, a current flows to the organic light emitting material at a voltage equal to or higher than a certain threshold voltage, and the organic light emitting material can emit light. As the current flowing to the organic luminescent material is increased, the organic light emitting material can emit brighter light. Alternatively, when a reverse voltage is applied to the thin film transistor, the current hardly flows to the organic light emitting material, and the organic light emitting material cannot emit light.

According to various embodiments, the color reproducing portion 1502 may include passive matrix organic light emitting diodes (PMOLEDs) or active matrix organic light emitting diodes (AMOLEDs).

According to various embodiments, the color reproducing portion 1502 using the OLEDs can display a color in an independent pixel method. For example, the independent pixel method can express red, green, and blue, which are the three primary colors of light, one by one in each pixel region (or pixel).

According to various embodiments, the color reproducing portion 1502 using the OLEDs can display a color in a color filter method. For example, the color filter method allows white light to pass through a color filter so as to display a color.

According to various embodiments, the color reproducing portion 1502 using the OLEDs can display a color using a color conversion method (CCM). For example, the CCM can display a color by allowing blue light to pass through the color conversion film.

According to various embodiments, the color reproducing portion 1502 using the OLEDs may include a passive matrix (PM) or an active matrix (AM).

According to various embodiments, the display panel 1500 may further include a protective portion 1503. The color reproducing portion 1502 may be disposed between the substrate portion 1501 and the protective portion 1503. The protective portion 1503 can protect the color reproducing portion 1502. For example, the protective portion 1503 may be formed of a material having a light transmittance, such as glass.

Figure 16:
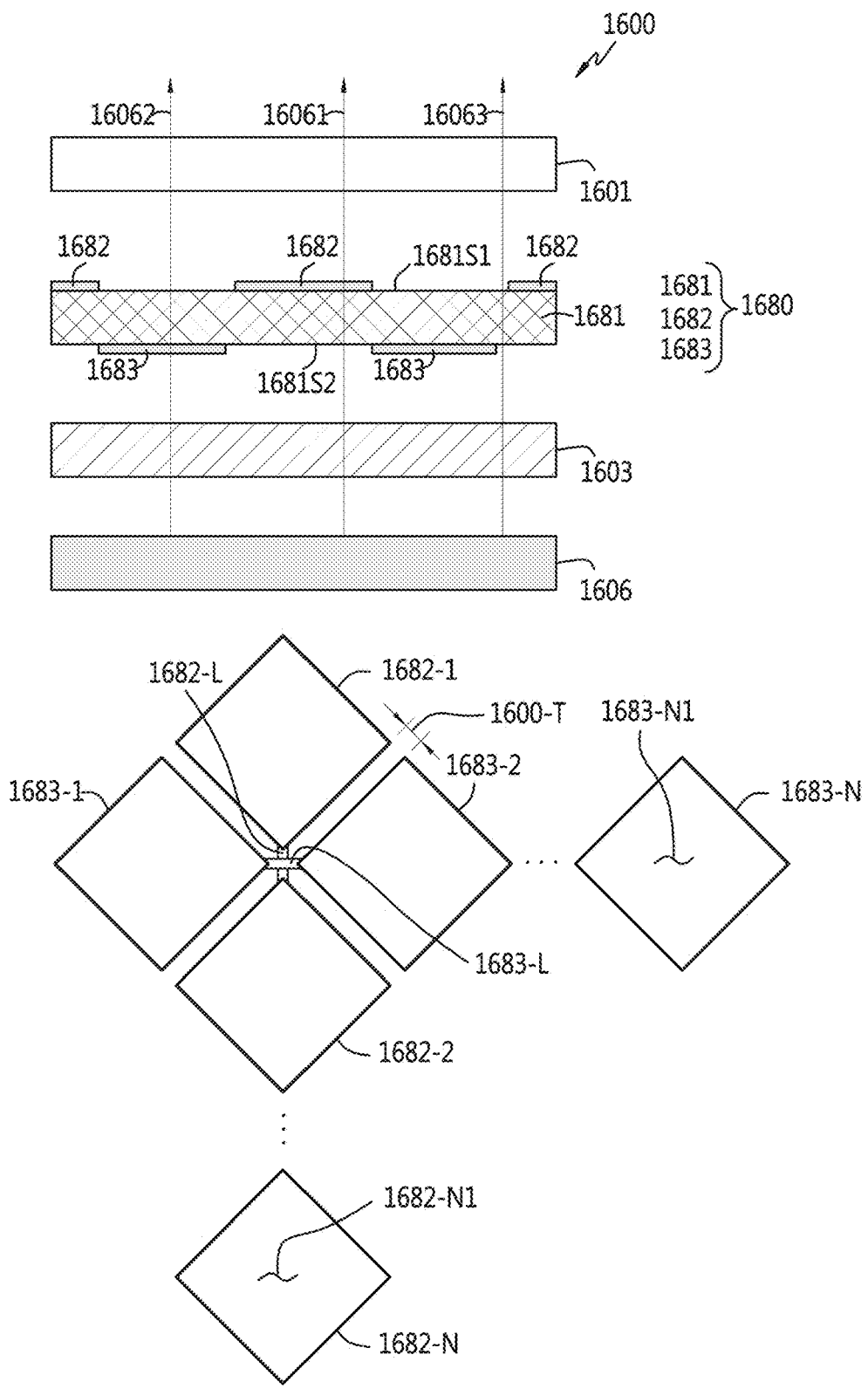
FIG. 16 is a view illustrating a display according to an embodiment of the present disclosure.

FIG. 16 is a view illustrating a display according to an embodiment of the present disclosure.

Referring to FIG. 16, a display 1600 may include a window 1601, a conductive layer 1680, a touch panel 1603, and a display panel 1606. According to various embodiments, at least one of the above-described displays 590, 690, 790, 890, 990, 1090, 1190, and 1290 may have a configuration that is at least partially the same as or similar to the display 1600 of FIG. 16.

The conductive layer 1680 may be disposed between the window 1601 and the touch panel 1603. The touch panel 1603 may be disposed between the conductive layer 1680 and the display panel 1606. According to various embodiments, the window 1601, the touch panel 1603, and the display panel 1606 may have configurations that are at least partially the same as or similar to those of the window 1401, the touch panel 1403, and the display panel 1406 of FIG. 14, respectively, and the descriptions thereof will be omitted.

According to an embodiment, the conductive layer 1680 may include a base layer 1681, a first metal mesh pattern 1682, and a second metal mesh pattern 1683.

The base layer 1681 may have a light transmittance, and may include a first face 1681S1 that faces the window 1601 and a second face 1681S2 that faces the display panel 1606.

According to an embodiment, the first metal mesh pattern 1682 may include a plurality of annular patterns 1682-N. Each of the plurality of annular patterns 1682-N may include an opening 1682-N1. For example, the plurality of annular patterns 1682-N may be arranged in a y-axis direction.

According to an embodiment, the first metal mesh pattern 1682 may be disposed on the first face 1681S1 of the base layer 1681, and may be disposed between the window 1601 and the base layer 1681.

According to an embodiment, many of the plurality of annular patterns 1682-N may be electrically connected to each other. For example, the first metal mesh pattern 1682 may include a connection line 1682-L that interconnects the annular patterns 1682-N.

According to an embodiment, the plurality of annular patterns 1682-N may be substantially uniform in shape. For example, the plurality of annular patterns 1682-N may have a rectangular annular shape.

According to another embodiment, some of the plurality of annular patterns 1682-N may have a shape that is different from that of some other annular patterns. For example, one annular pattern may have a rectangular shape, and another annular pattern may not have a rectangular shape (e.g., a hexagonal shape). For example, one annular pattern and another annular pattern have substantially the same shapes, but may have different sizes. For example, one annular pattern and another annular pattern may have substantially the same shapes, but may partially have different thicknesses.

According to an embodiment, the second metal mesh pattern 1683 may include a plurality of annular patterns 1683-N. Each of the plurality of annular patterns 1683-N may include an opening 1683-N1. For example, the plurality of annular patterns 1683-N may be arranged in an x-axis direction.

According to an embodiment, the second metal mesh pattern 1683 may be disposed on the second face 1681S2 of the base layer 1681, and may be disposed between the base layer 1681 and the touch panel 1603.

According to an embodiment, many of the plurality of annular patterns 1683-N may be electrically connected to each other. For example, the second metal mesh pattern 1683 may include a connection line 1683-L that interconnects the annular patterns 1683-N.

According to an embodiment, the plurality of annular patterns 1683-N may be substantially uniform in shape. For example, the plurality of annular patterns 1683-N may have a rectangular annular shape.

According to another embodiment, some of the plurality of annular patterns 1683-N may be different shapes from some other annular patterns. For example, one annular pattern may have a rectangular shape, and another annular pattern may not have a rectangular shape (e.g., a hexagonal shape). For example, one annular pattern and another annular pattern may have substantially the same shapes, but may have different sizes. For example, one annular pattern and another annular pattern may have substantially the same shapes, but may partially have different thicknesses.

According to an embodiment, when viewed in the direction from the window 1601 to the display panel 1606, a plurality of annular patterns 1682-N of the first metal mesh pattern 1682 and a plurality of annular patterns 1683-N of the second metal mesh pattern 1683 may not overlap with each other. Alternatively, when viewed in the direction from the window 1601 to the display panel 1606, the connection line 1682-L of the first metal mesh pattern 1682 and the connection line 1683-L of the second metal mesh pattern 1683 may at least partially overlap with each other.

According to an embodiment, the light generated from the display panel 1606 may be transferred to the window 1601 through the conductive layer 1680 after passing through the touch panel 1603. For example, a portion 16061 of the light generated from the display panel 1606 may pass through the opening 1682-N1 of the first metal mesh pattern 1682. Alternatively, another portion 16062 of the light generated from the display panel 1606 may pass through the opening 1682-N1 of the second metal mesh pattern 1683. Alternatively, when viewed from above the window 1601, a gap 1600-T may exist between the first metal mesh pattern 1682 and the second metal mesh pattern 1683, and the other portion 16063 of the light generated from the display panel 1606 may pass through the gap 1600-T.

According to an embodiment, at least a part of the first metal mesh pattern 1682 and the second metal mesh pattern 1683 of the conductive layer 1680 may be electrically connected to a communication circuit that is mounted in an electronic device (e.g., the electronic device 101 of FIG. 1) that is mounted with the display 1600. For example, at least a portion of the conductive layer 1680 may be used as an antenna radiator to support various types of communication.

As described above, some of the plurality of annular patterns 1682-N of the first metal mesh pattern 1682 of the conductive layer 1680 may have a shape that is different from that of the other annular patterns. Alternatively, some of the plurality of annular patterns 1683-N of the second metal mesh pattern 1683 of the conductive layer 1680 may have a shape that is different from that of the other annular patterns. This may be helpful in reducing an antenna performance degradation.

Figure 17:
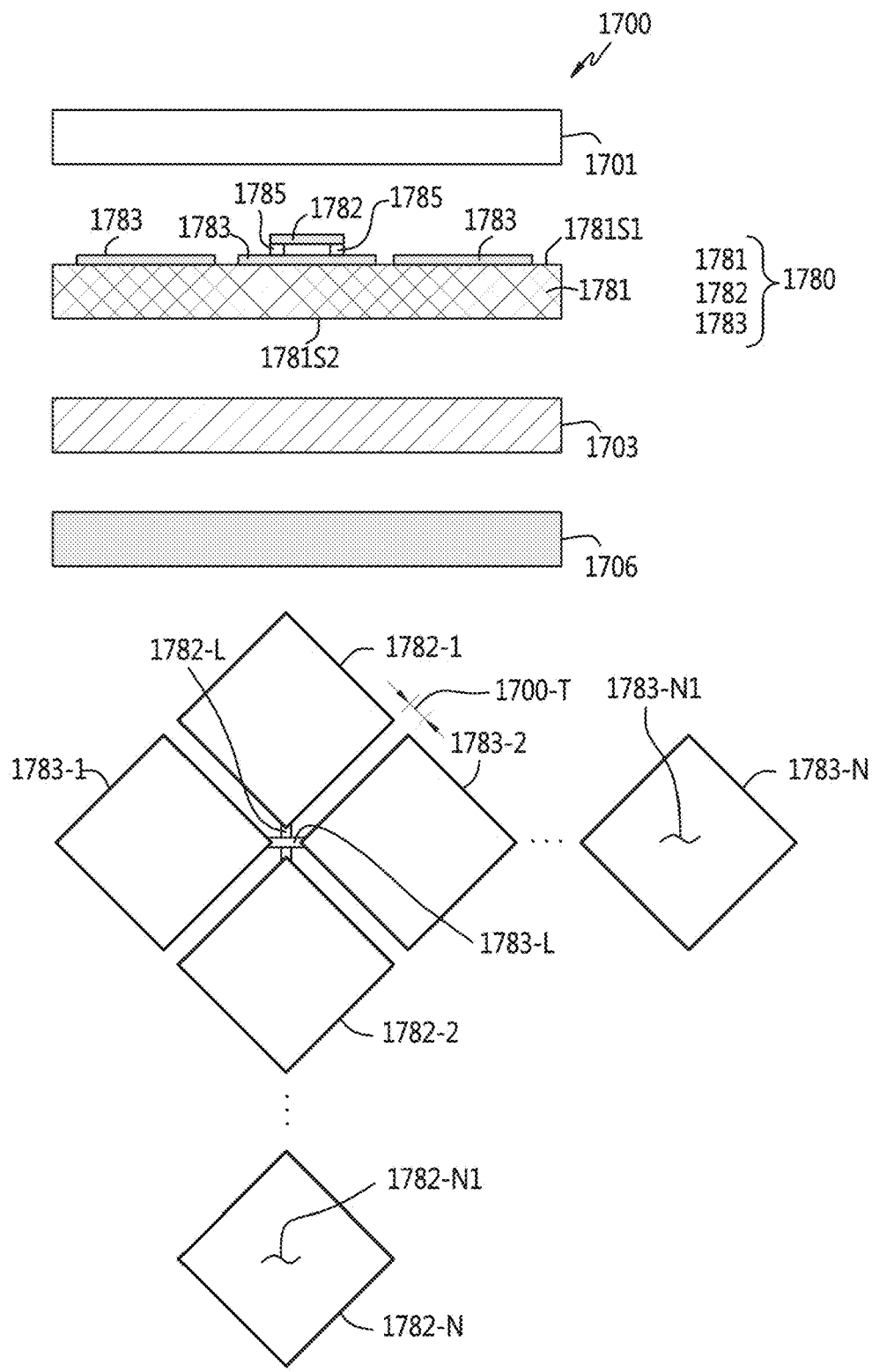
FIG. 17 is a view illustrating a display according to an embodiment of the present disclosure.

FIG. 17 is a view illustrating a display according to an embodiment of the present disclosure.

Referring to FIG. 17, a display 1700 may include a window 1701, a conductive layer 1780, a touch panel 1703, and a display panel 1706. According to various embodiments, at least one of the above-described displays 590, 690, 790, 890, 990, 1090, 1190, and 1290 may have a configuration that is at least partially the same as or similar to the display 1700 of FIG. 17.

The conductive layer 1780 may be disposed between the window 1701 and the touch panel 1703. The touch panel 1703 may be disposed between the conductive layer 1780 and the display panel 1706. According to various embodiments, the window 1701, the touch panel 1703, and the display panel 1706 may have configurations that are at least partially the same as or similar to those of the window 1401, the touch panel 1403, and the display panel 1406 of FIG. 14, respectively.

According to an embodiment, the conductive layer 1780 may include a base layer 1781, a first metal mesh pattern 1782, and a second metal mesh pattern 1783.

The base layer 1781 may have a light transmittance, and may include a first face 1781S1 that faces the window 1701 and a second face 1781S2 that faces the display panel 1706.

According to an embodiment, the first metal mesh pattern 1782 may include a plurality of annular patterns 1782-N. Each of the plurality of annular patterns 1782-N may include an opening 1782-N1. For example, the plurality of annular patterns 1782-N may be arranged in a y-axis direction.

According to an embodiment, the first metal mesh pattern 1782 may be disposed on the first face 1781S1 of the base layer 1781, and may be disposed between the base layer 1781 and the window 1701.

According to an embodiment, many of the plurality of annular patterns 1782-N may be electrically connected to each other. For example, the first metal mesh pattern 1782 may include a connection line 1782-L that interconnects the annular patterns 1782-N.

According to an embodiment, the plurality of annular patterns 1782-N may be substantially uniform in shape. For example, the plurality of annular patterns 1782-N may have a rectangular annular shape.

According to another embodiment, some of the plurality of annular patterns 1782-N may be different shapes from some other annular patterns. For example, one annular pattern may have a rectangular shape, and another annular pattern may not have a rectangular shape (e.g., a hexagonal shape). For example, one annular pattern and another annular pattern may have substantially the same shapes, but may have different sizes. For example, one annular pattern and another annular pattern may have substantially the same shapes, but may partially have different thicknesses.

According to an embodiment, the second metal mesh pattern 1783 may include a plurality of annular patterns 1783-N. Each of the plurality of annular patterns 1783-N may include an opening 1783-N1. For example, the plurality of annular patterns 1783-N may be arranged in an x-axis direction.

According to an embodiment, the second metal mesh pattern 1783 may be disposed on the first face 1781S1 of the base layer 1781, and may be disposed between the base layer 1781 and the window 1701.

According to an embodiment, many of the plurality of annular patterns 1783-N may be electrically connected to each other. For example, the second metal mesh pattern 1783 may include a connection line 1783-L that interconnects the annular patterns 1783-N.

According to an embodiment, the plurality of annular patterns 1783-N may be substantially uniform in shape. For example, the plurality of annular patterns 1783-N may have a rectangular annular shape.

According to another embodiment, some of the plurality of annular patterns 1783-N may have a shape that is different from that of some other annular patterns. For example, one annular pattern may have a rectangular shape, and another annular pattern may not have a rectangular shape (e.g., a hexagonal shape). For example, one annular pattern and another annular pattern may have substantially the same shapes, but may have different sizes. For example, one annular pattern and another annular pattern may have substantially the same shapes, but may partially have different thicknesses.

According to an embodiment, when viewed in the direction from the window 1701 to the display panel 1706, a plurality of annular patterns 1782-N of the first metal mesh pattern 1782 and a plurality of annular patterns 1783-N of the second metal mesh pattern 1783 may not overlap with each other. Alternatively, when viewed in the direction from the window 1701 to the display panel 1706, the connection line 1782-L of the first metal mesh pattern 1782 and the connection line 1783-L of the second metal mesh pattern 1783 may at least partially overlap with each other.

According to an embodiment, the display 1700 may include a layer 1785 disposed between the connection line 1782-L of the first metal mesh pattern 1782 and the connection line 1783-L of the second metal mesh pattern 1783. The layer 1785 may insulate the connection line 1782-L of the first metal mesh pattern 1782 and the connection line 1783-L of the second metal mesh pattern 1783 from each other.

According to an embodiment, the image-related light generated from the display panel 1706 may be transferred to the window 1701 through the conductive layer 1780 after passing through the touch panel 1703. For example, a portion of the light generated from the display panel 1706 may pass through the opening 1782-N1 of the first metal mesh pattern 1782. Alternatively, another portion 1702 of the light generated from the display panel 1706 may pass through the opening 1783-N1 of the second metal mesh pattern 1783. Alternatively, when viewed from above the window 1701, a gap 1700-T may exist between the first metal mesh pattern 1782 and the second metal mesh pattern 1783, and the other portion of the light generated from the display panel 1706 may pass through the gap 1700-T.

According to an embodiment, at least a part of the first metal mesh pattern 1782 and the second metal mesh pattern 1783 of the conductive layer 1780 may be electrically connected to a communication circuit that is mounted in an electronic device (e.g., the electronic device 101 of FIG. 1) that is mounted with the display 1700. For example, at least a portion of the conductive layer 1780 may be used as an antenna radiator to support various types of communication.

According to various embodiments, the first metal mesh pattern 1782 is disposed on the second face 1781S2 of the base layer 1781, and the second metal mesh pattern 1783 is disposed on the first face 1781S1 of the base layer 1781

As described above, some of the plurality of annular patterns 1782-N of the first metal mesh pattern 1782 of the conductive layer 1780 may have a shape that is different from that of the other annular patterns. Alternatively, some of the plurality of annular patterns 1783-N of the second metal mesh pattern 1783 of the conductive layer 1780 may have a shape that is different from that of the other annular patterns. This may be helpful in reducing an antenna performance degradation.

Figure 18:
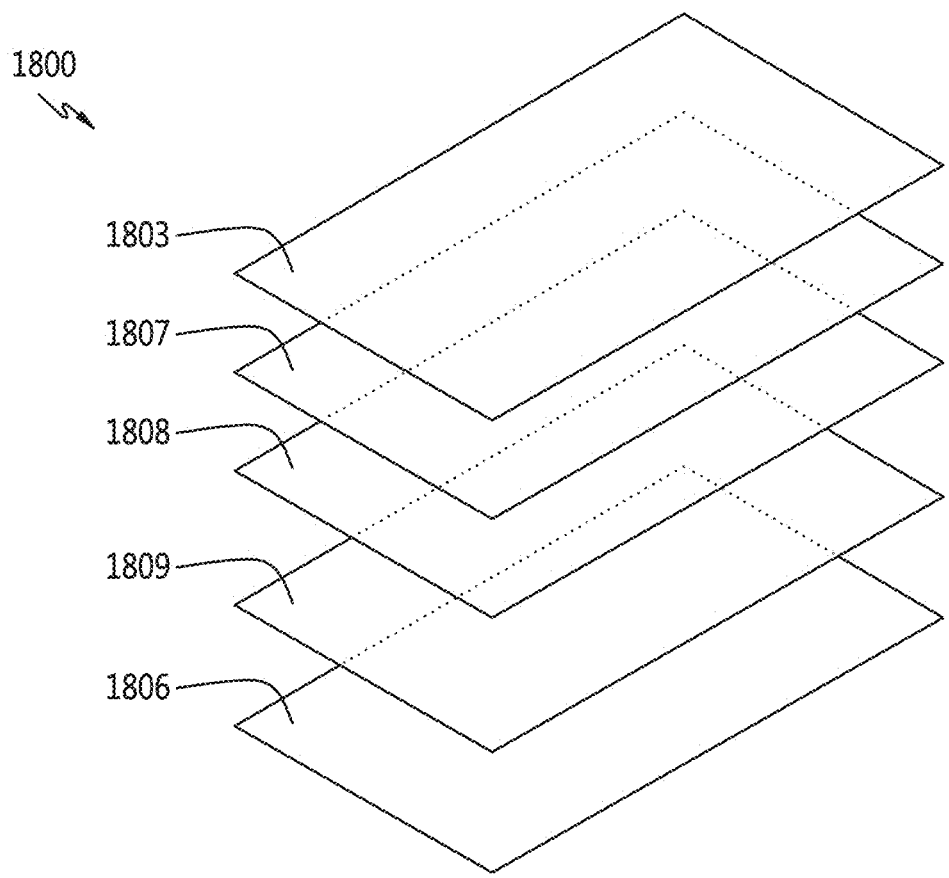
FIG. 18 is a view illustrating a display according to an embodiment of the present disclosure.

FIG. 18 is a view illustrating a display according to an embodiment of the present disclosure.

Referring to FIG. 18, a display 1800 may include a touch panel 1803, a conductive layer 1808, and a display panel 1806. According to various embodiments, at least one of the above-described displays 590, 690, 790, 890, 990, 1090, 1190, and 1290 may have a configuration that is at least partially the same as or similar to the display 1800 of FIG. 18.

According to an embodiment, the conductive layer 1808 may be disposed between the touch panel 1803 and the display panel 1806. The conductive layer 1808 may have a light transmittance. For example, the conductive layer 1808 may include a conductive pattern including openings or transparent regions. Light generated from the display panel 1806 may be transferred to the touch panel 1803 through the openings or the transparent regions of the conductive layer 1808.

According to an embodiment, the conductive layer 1808 may include a metal mesh pattern.

According to an embodiment, the conductive layer 1808 may be electrically connected to a communication circuit that is mounted in an electronic device (e.g., the electronic device 101 of FIG. 1) that is mounted with the display 1800. The conductive layer 1808 may be used as an antenna radiator that supports various types of communication.

According to an embodiment, the touch panel 1803 has a light transmittance, and may support a touch input or a hovering input. The touch panel 1803 may have a configuration that is at least partially the same as or similar to the third conductive pattern that has been described above with reference to FIGS. 4A and 4B, and FIGS. 5 to 12.

The display panel 1806 may output an image corresponding to a signal provided from a control circuit (not shown) equipped in an electronic device (e.g., the electronic device 101 in FIG. 1).

According to various embodiments, the display 1800 may further include a shielding layer 1807 disposed between the touch panel 1803 and the conductive layer 1808. The shielding layer 1807 has a light transmittance and may provide an electromagnetic improvement (e.g., noise blocking). Alternatively, the shielding layer 1807 may be electrically connected to an antenna device (e.g., a wireless communication circuit) and may be used as an antenna ground for improving antenna performance.

According to various embodiments, the display 1800 may further include a ground (GND) layer 1809 disposed between the conductive layer 1808 and the display panel 1806. For example, the ground layer 1809 may provide an electromagnetic improvement (e.g., noise blocking). Alternatively, the ground layer (or shielding layer) 1809 may be electrically connected to a communication circuit, and may be used as an antenna ground for improving antenna performance.

Figure 19A:
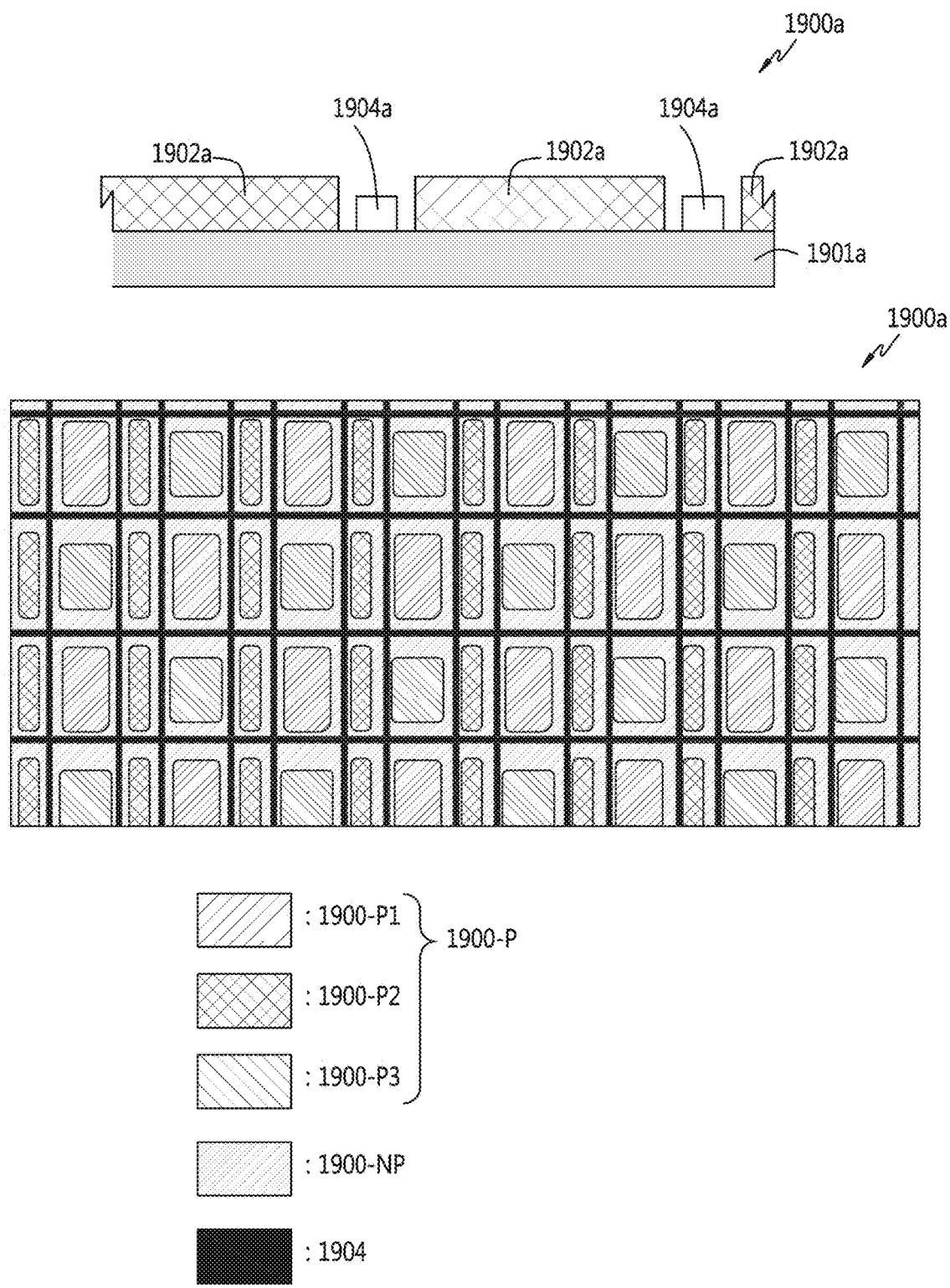
FIG. 19A is a view illustrating a display according to an embodiment of the present disclosure.

FIG. 19A is a view illustrating a display according to an embodiment of the present disclosure.

Referring to FIG. 19A, the display 1900*a* may include a substrate portion 1901*a*, a plurality of color reproducing portions 1902*a*, and a conductive pattern 1904*a*. According to various embodiments, at least one of the above-described displays 590, 690, 790, 890, 990, 1090, 1190, and 1290 may have a configuration that is at least partially the same as or similar to the display 1900*a* of FIG. 19A.

The substrate portion 1901*a* may be driven under the control of a DDI that is mounted in an electronic device (for example, the electronic device 101 of FIG. 1) that is mounted with the display 1900*a*. According to various embodiments, the substrate portion 1901*a* may have a configuration that is at least partially identical or similar to the substrate portion 1501 of FIG. 15.

The plurality of color reproducing portions 1902*a* can implement colors according to the driving of the substrate portion 1901*a*. According to various embodiments, the plurality of color reproducing portions 1902*a* may include the color reproducing portions 1502 of FIG. 5.

According to an embodiment, the display 1900*a* may include pixel regions P and non-pixel regions NP. For example, the pixel regions P may be regularly arranged side by side in a row direction (e.g., an x-axis direction) and/or a column direction (e.g., a y-axis direction).

According to an embodiment, the pixel regions 1900-P may correspond to a plurality of color reproducing portions 1902*a*. For example, one color reproducing portion may provide a pixel region 1900-P1 that emits red light. For example, another color reproducing portion may provide a pixel region 1900-P2 that emits green light. Still another color reproducing portion may provide a pixel region 1900-P3 that emits blue light.

According to an embodiment, a dot, which is a unit representing one color, may form a pixel group that includes three pixel regions (e.g., 1900-P1, 1900-P2, and 1900-P3)

According to various embodiments, the pixel group is not limited to three pixel regions, and may include a greater number of pixel regions.

According to an embodiment, a non-pixel region 1900-NP may be a portion excluding the pixel regions 1900-P. The non-pixel region 1900-NP may include a black color.

According to an embodiment, the conductive pattern 1904*a* may be disposed in the non-pixel region 1900-NP. For example, the conductive pattern 1904*a* may be disposed between the pixel regions 1900-P.

According to an embodiment, the non-pixel region 1900-NP may be substantially in the shape of a lattice pattern. For example, the non-pixel region 1900-NP may be a black matrix. The conductive pattern 1904*a* may be in the shape of a lattice pattern (or a metal mesh pattern) corresponding to the non-pixel region 1900-NP. The conductive pattern 1904*a* may include openings. Each of the pixel regions 1900-P of the display 1900*a* may be disposed within an opening of the conductive pattern 1904*a*. The light generated from the pixel regions 1900-P may be diffused without being disturbed by the conductive pattern 1904*a*.

According to an embodiment, the conductive pattern 1904*a* may be electrically connected to a communication circuit that is mounted in an electronic device (e.g., the electronic device 101 of FIG. 1) that is mounted with the display 1900*a*. The conductive pattern 1904*a* may be used as an antenna radiator to support various types of communication. According to various embodiments, the conductive pattern 1904*a* may have a configuration that is at least partially the same as or similar to the third conductive pattern that has been described above with reference to FIGS. 4A and 4B, and FIGS. 5 to 12.

Figure 19B:
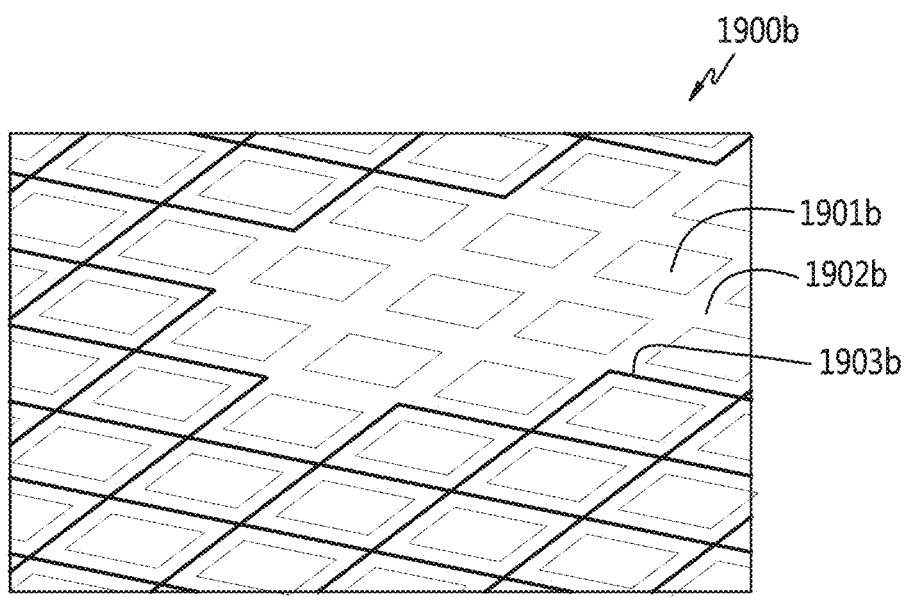
FIG. 19B is a view illustrating a display according to an embodiment of the present disclosure.

FIG. 19B is a view illustrating a display according to an embodiment of the present disclosure. According to various embodiments, at least one of the above-described displays 590, 690, 790, 890, 990, 1090, 1190, and 1290 may have a configuration that is at least partially the same as or similar to the display 1900*b* of FIG. 19B.

Referring to FIG. 19B, the display 1900*b* may include a plurality of pixel regions 1901*b*. According to an embodiment, the display 1900*b* may include a metal mesh pattern 1903*b*. The metal mesh pattern 1903*b* may be disposed in the non-pixel region 1902*b* outside the plurality of pixel regions 1901*b*. The metal mesh pattern 1903*b* may not overlap with the plurality of pixel regions 1901*b*, and each pixel region 1901*b* may be disposed in an opening of the metal mesh pattern 1903*b*.

According to an embodiment, even if the metal mesh pattern 1903*b* is not configured to overlap with the entire region of the display 1900*b*, the brightness difference of each region of the display 1300, which has been described above with reference to FIG. 13, may not be generated because the metal mesh pattern 1903*b* is disposed in the non-pixel region 1902*b*.

Figure 20A:
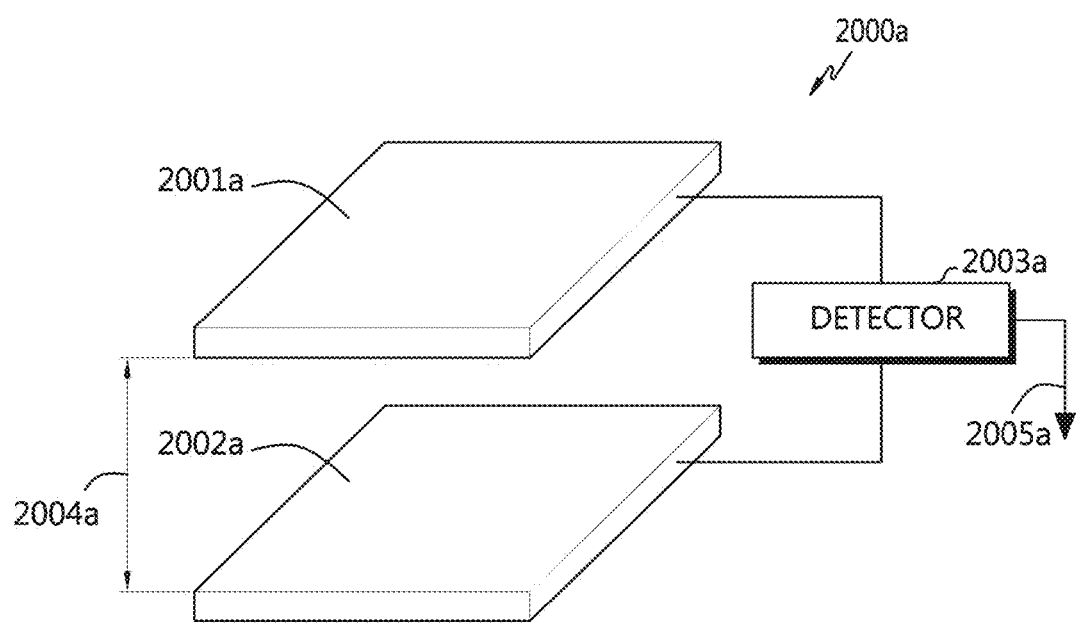
FIG. 20A is a view illustrating a pressure sensing sensor according to an embodiment of the present disclosure.

FIG. 20A is a view illustrating a pressure sensing sensor according to an embodiment of the present disclosure.

Referring to FIG. 20A, the pressure sensing sensor 2000*a* may include a first electrode 2001*a* and a second electrode 2002*a*, which are separated from each other. Alternatively, the pressure sensing sensor 2000*a* may include a detector 2003*a* that is electrically connected to the first electrode 2001*a* and the second electrode 2002*a*.

According to an embodiment, the pressure sensing sensor 2000*a* may be disposed along at least a portion of an outer face of an electronic device (e.g., electronic device 102 of FIG. 1). For example, the pressure sensing sensor 2000*a* may be disposed along at least a portion of a display (display 160 of FIG. 1).

The first electrode 2001*a* may be disposed to face the outer face of the electronic device and the second electrode 2002*a* may be disposed inside the electronic device to at least partially overlap with the first electrode 2001*a*. For example, when viewed from above the first electrode 2001*a*, the second electrode 2002*a* may have substantially the same area or size as the first electrode 2001*a*.

According to various embodiments, the first electrode 2001*a* and the second electrode 2002*a* may be unit electrodes that generate a signal 2005*a* in response to a pressure applied to a local site.

The detector 2003*a* applies a voltage to the first electrode 2001*a* and the second electrode 2002*a* so that a capacitance may be generated between the first electrode 2001*a* and the second electrode 2002*a*. When a pressure is applied to the outer face of the electronic device, the distance 2004*a* between the first electrode 2001*a* and the second electrode 2002*a* is reduced and the capacitance may be changed (e.g., an increase in capacitance). The detector 2003*a* may output a signal 2005*a* corresponding to such a change in capacitance to a processor (e.g., the processor 120 in FIG. 1) of the electronic device. In this way, the processor 120 of the electronic device may determine a pressure-applied position of the outer face of the electronic device.

According to various embodiments, the second electrode 2002*a* may be arranged in various forms within the electronic device. For example, the second electrode 2002a may include a ground mounted on the electronic device.

According to various embodiments, the first electrode 2001a and the second electrode 2002a may be in the form of a thin plate having an area. The first electrode 2001a in the form of a thin plate may be flexible. When a pressure is applied to at least one local area of the outer face of the electronic device, at least one local area of the first electrode 2001a may approach the second electrode 2002a by the deformation of the first electrode 2001a. The detector 2003a may output a signal 2005a related to the position of at least one local area where a pressure is applied based on the change in capacitance.

According to various embodiments, the first electrode 2001a and the second electrode 2002a may include the same material, or may include different materials.

Figure 20B:
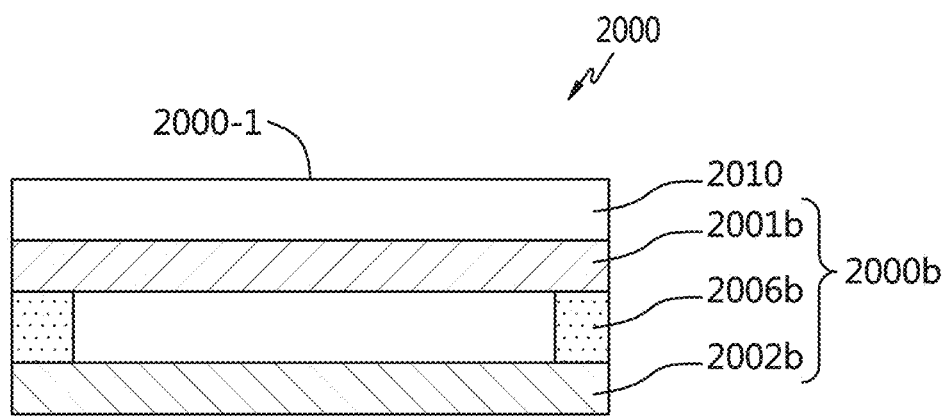
FIG. 20B is a view illustrating an electronic device according to an embodiment of the present disclosure.

FIG. 20B is a view illustrating an electronic device according to an embodiment of the present disclosure. An electronic device 2000 may have a configuration that is the same or similar to that of at least one of the electronic devices mentioned in this specification.

Referring to FIG. 20B, when viewed in a cross section, the electronic device 2000 may include a housing 2010 forming an outer face 2000-1 of the electronic device 2000, and a pressure sensing sensor 2000b. According to an embodiment, at least a portion of the housing 2010 may be in the form of a plate having a substantially constant thickness. The pressure sensing sensor 2000b may be disposed along at least a portion of the housing 2010.

According to an embodiment, the housing 2010 may include a transparent substrate (e.g., window) (not illustrated).

According to various embodiments, the housing 2010 may include a display (not illustrated). For example, the display may be disposed along at least a portion of the transparent substrate.

According to various embodiments, the housing 2010 may include a first conductive pattern (not illustrated) electrically connected to a touch sensing circuit mounted on the electronic device 2000. For example, the first conductive pattern may be disposed between the transparent substrate and the display. Alternatively, the first conductive pattern may be disposed inside the display.

According to various embodiments, the housing 2010 may include a second conductive pattern (not illustrated) electrically connected to a wireless communication circuit mounted on the electronic device 200. For example, the second conductive pattern may be disposed between the transparent substrate and the first conductive pattern.

The pressure sensing sensor 2000b may include a first electrode 2001a and a second electrode 2002a, which are separated from each other. The pressure sensing sensor 2000b may include a spacer 2006b disposed at one or more positions between the first electrode 2001b and the second electrode 2002b. The spacer 2006b serves to maintain a distance between the first electrode 2001b and the second electrode 2002b and may be formed of various non-conductive materials. Alternatively, the spacer 2006b may be a flexible material. According to an embodiment, the spacer 2006b may be formed of silicon.

At least a part of the housing 2010 has flexibility, and the pressure applied to the outer face 2000-1 of the housing 2010 from the outside may be transferred to the pressure sensing sensor 2000b. The pressure sensing sensor 2000b may output a signal related to the pressure-applied position in the manner described above with reference to FIG. 20A.

Figure 21:
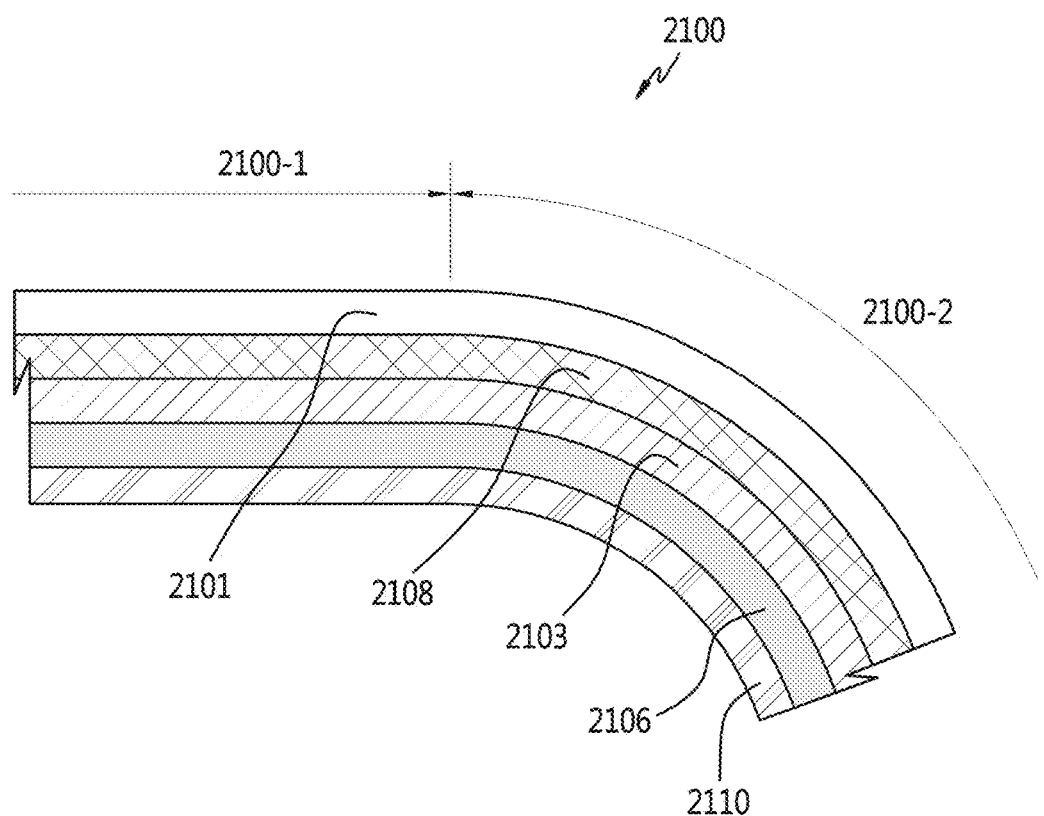
FIGS. 21, 22, 23, 24, 25, 26, 27, 28, 29, and 30 are views each illustrating a display according to various embodiments of the present disclosure.

FIG. 21 is a view illustrating a display according to an embodiment of the present disclosure.

Referring to FIG. 21, when viewed in a cross section, a display 2100 may include a window 2101, a conductive pattern 2108, a touch panel 2103, a display panel 2106, or a pressure sensing sensor 2110. According to various embodiments, at least one of the above-described displays 590, 690, 790, 890, 990, 1090, 1190, and 1290 may have a configuration that is at least partially the same as or similar to the display 2100 of FIG. 21.

When viewed in a cross section, the display 2100 may include a substantially flat first portion 2100-1 and a second portion 2100-2 that extends from the first portion 2100-1 to be curved.

The conductive pattern 2108 may be disposed between the window 2101 and the touch panel 2103. The touch panel 2103 may be disposed between the conductive pattern 2108 and the display panel 2106.

According to various embodiments, the window 2101, the conductive pattern 2108, the touch panel 2103, and the display panel 2106 may have configurations that are at least partially the same as or similar to those of the window 1601, the conductive layer 1680, the touch panel 1603, and the display panel 1606 of FIG. 16, respectively. Alternatively, the window 2101, the conductive pattern 2108, the touch panel 2103, and the display panel 2106 may have configurations that are at least partially the same as or similar to those of the window 1701, the conductive layer 1780, the touch panel 1703, and the display panel 1706 of FIG. 17, respectively.

According to an embodiment, the window 2101, the conductive pattern 2108, the touch panel 2103, and the display panel 2106 may be disposed in the first portion 2100-1 and the second portion 2100-2.

According to an embodiment, the touch panel 2103 may be electrically connected to a touch sensing circuit that is mounted in an electronic device (e.g., the electronic device 101 of FIG. 1) that is mounted with the display 2100, and may support a touch input or a hovering input.

According to an embodiment, the conductive pattern 2108 may be electrically connected to a communication circuit that is mounted in an electronic device (e.g., the electronic device 101 of FIG. 1) that is mounted with the display 2100, and may be used as an antenna radiator that supports various types of communication.

According to an embodiment, the pressure sensing sensor 2110 may be installed adjacent to the display panel 2106, which may be disposed between the touch panel 2103 and the pressure sensing sensor 2110. According to various embodiments, the pressure sensing sensor 2110 may be the pressure sensing sensor 2000a of FIG. 20A or the pressure sensing sensor 2000b of FIG. 20B.

According to an embodiment, the pressure sensing sensor 2110 may be disposed along at least a portion of the first portion 2100-1 and/or the second portion 2100-2 of the display 2100. The pressure applied to at least one local area of the window 2101 from the outside may be transferred to the pressure sensing sensor 2110. The pressure sensing sensor 2110 may induce a signal related to at least one position where the pressure is applied in the manner described above with reference to FIG. 20A. The pressure sensing sensor 2110 may be electrically connected to a pressure sensing circuit (e.g., a detector 2003a of FIG. 20A) or a control circuit (e.g., the processor 120 of FIG. 1) that is mounted in an electronic device (e.g., the electronic device 101 of FIG. 1) that is mounted with the display 2100.

Figure 22:
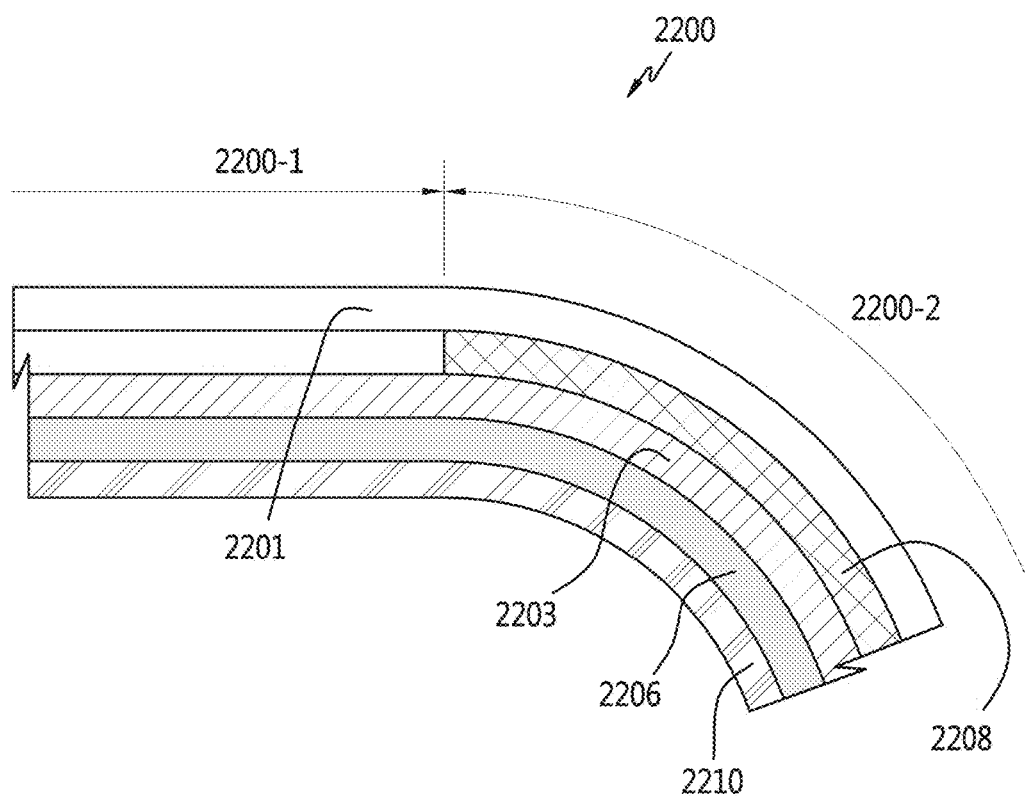

FIG. 22 is a view illustrating a display according to an embodiment of the present disclosure.

Referring to FIG. 22, when viewed in a cross section, a display 2200 may include a window 2201, a conductive pattern 2208, a touch panel 2203, a display panel 2206, or a pressure sensing sensor 2210. According to various embodiments, at least one of the above-described displays 590, 690, 790, 890, 990, 1090, 1190, and 1290 may have a configuration that is at least partially the same as or similar to the display 2200 of FIG. 22.

When viewed in a cross section, the display 2200 may include a substantially flat first portion 2200-1 and a second portion 2200-2 that extends from the first portion 2200-1 to be curved.

The conductive layer 2208 may be disposed between the window 2201 and the touch panel 2203. The touch panel 2203 may be disposed between the conductive pattern 2208 and the display panel 2206. According to various embodiments, the window 2201, the conductive pattern 2208, the touch panel 2203, and the display panel 2206 may have configurations that are at least partially the same as or similar to those of the window 1601, the conductive layer 1680, the touch panel 1603, and the display panel 1606 of FIG. 16, respectively. Alternatively, the window 2201, the conductive pattern 2208, the touch panel 2203, and the display panel 2206 may have configurations that are at least partially the same as or similar to those of the window 1701, the conductive layer 1780, the touch panel 1703, and the display panel 1706 of FIG. 17, respectively.

According to an embodiment, the window 2201, the touch panel 2203, or the display panel 2206 may be disposed in the first portion 2200-1 and the second portion 2200-2.

According to an embodiment, the touch panel 2203 may be electrically connected to a touch sensing circuit that is mounted in an electronic device (e.g., the electronic device 101 of FIG. 1) that is mounted with the display 2200, and may support a touch input or a hovering input.

According to an embodiment, the conductive pattern 2208 may be at least partially disposed in the second portion 2200-2. Alternatively, the conductive pattern 2208 may not be disposed in the first portion 2200-1.

According to an embodiment, the conductive pattern 2208 may be electrically connected to a communication circuit that is mounted in an electronic device (e.g., the electronic device 101 of FIG. 1) that is mounted with the display 2200, and may be used as an antenna radiator that supports various types of communication.

According to an embodiment, the pressure sensing sensor 2210 may be installed adjacent to the display panel 2206, which may be disposed between the touch panel 2203 and the pressure sensing sensor 2210. According to various embodiments, the pressure sensing sensor 2210 may be the pressure sensing sensor 2000a of FIG. 20A or the pressure sensing sensor 2000b of FIG. 20B.

According to an embodiment, the pressure sensing sensor 2210 may be disposed along at least a portion of the first portion 2200-1 and/or the second portion 2200-2 of the display 2200. The pressure applied to at least one local area of the window 2201 from the outside may be transferred to the pressure sensing sensor 2210. The pressure sensing sensor 2210 may induce a signal related to at least one position where the pressure is applied in the manner described above with reference to FIG. 20A. The pressure sensing sensor 2210 may be electrically connected to a pressure sensing circuit (e.g., a detector 2003a of FIG. 20A) or a control circuit (e.g., the processor 120 of FIG. 1) that is mounted in an electronic device (e.g., the electronic device 101 of FIG. 1) that is mounted with the display 2200.

Figure 23:
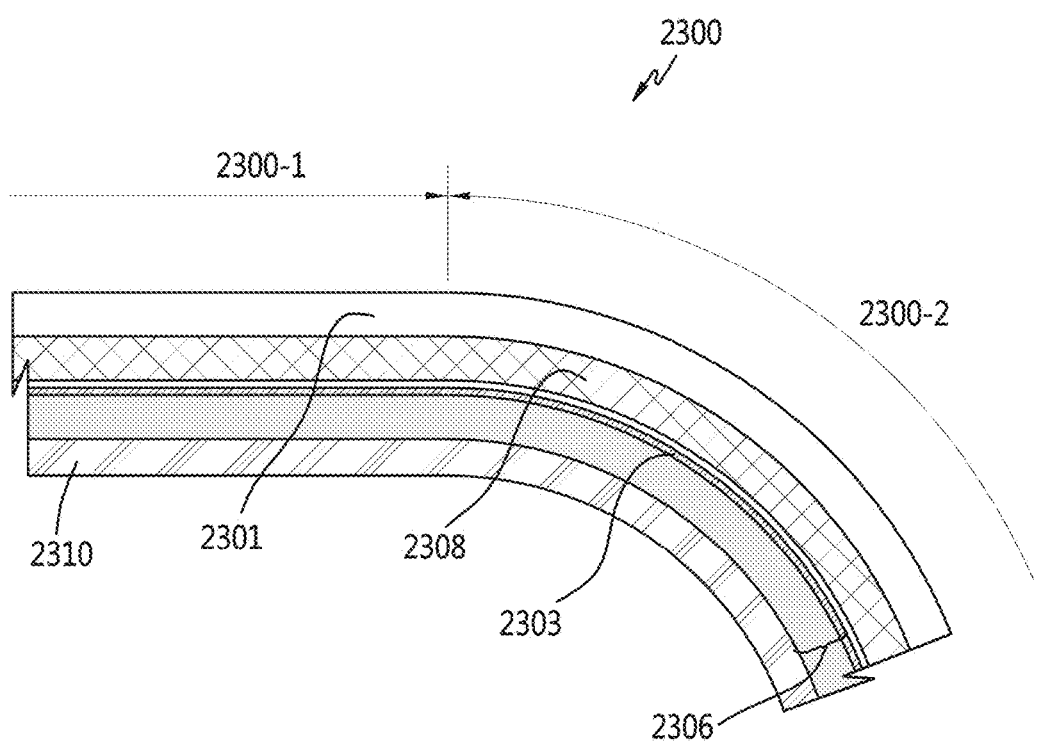

FIG. 23 is a view illustrating a display according to an embodiment of the present disclosure.

Referring to FIG. 23, when viewed in a cross section, a display 2300 may include a window 2301, a second conductive pattern 2308, a display panel 2306, or a pressure sensing sensor 2310. According to various embodiments, at least one of the above-described displays 590, 690, 790, 890, 990, 1090, 1190, and 1290 may have a configuration that is at least partially the same as or similar to the display 2300 of FIG. 23.

When viewed in a cross section, the display 2300 may include a substantially flat first portion 2300-1 and a second portion 2300-2 that extends from the first portion 2300-1 to be curved.

The second conductive pattern 2308 may be disposed between the window 2301 and the display panel 2206.

According to an embodiment, the window 2301, the second conductive pattern 2308, and the display panel 2306 may be disposed in the first portion 2300-1 and the second portion 2300-2.

According to an embodiment, the second conductive pattern 2308 may be electrically connected to a communication circuit that is mounted in an electronic device (e.g., the electronic device 101 of FIG. 1) that is mounted with the display 2300, and may be used as an antenna radiator that supports various types of communication.

According to an embodiment, the display panel 2306 may include a first conductive pattern 2303 to support a touch input and/or a hovering input as well as elements that implement a color according to an image related signal. For example, the first conductive pattern 2303 may form one face of the display panel 2306. The first conductive pattern 2303 may be disposed in an on-cell region of the display panel 2306.

According to an embodiment, the first conductive pattern 2303 may be electrically connected to a touch sensing circuit that is mounted in an electronic device (e.g., the electronic device 101 of FIG. 1) that is mounted with the display 2300, and may support a touch input or a hovering input.

According to an embodiment, the pressure sensing sensor 2310 may be installed adjacent to the display panel 2306, which may be disposed between the conductive pattern 2308 and the pressure sensing sensor 2310. According to various embodiments, the pressure sensing sensor 2310 may be the pressure sensing sensor 2000a of FIG. 20A or the pressure sensing sensor 2000b of FIG. 20B.

According to an embodiment, the pressure sensing sensor 2310 may be disposed along at least a portion of the first portion 2300-1 and/or the second portion 2300-2 of the display 2300. The pressure applied to at least one local area of the window 2301 from the outside may be transferred to the pressure sensing sensor 2310. The pressure sensing sensor 2310 may induce a signal related to at least one position where the pressure is applied in the manner described above with reference to FIG. 20A. The pressure sensing sensor 2310 may be electrically connected to a pressure sensing circuit (e.g., a detector 2003a of FIG. 20A) or a control circuit (e.g., the processor 120 of FIG. 1) that is mounted in an electronic device (e.g., the electronic device 101 of FIG. 1) that is mounted with the display 2300.

Figure 24:
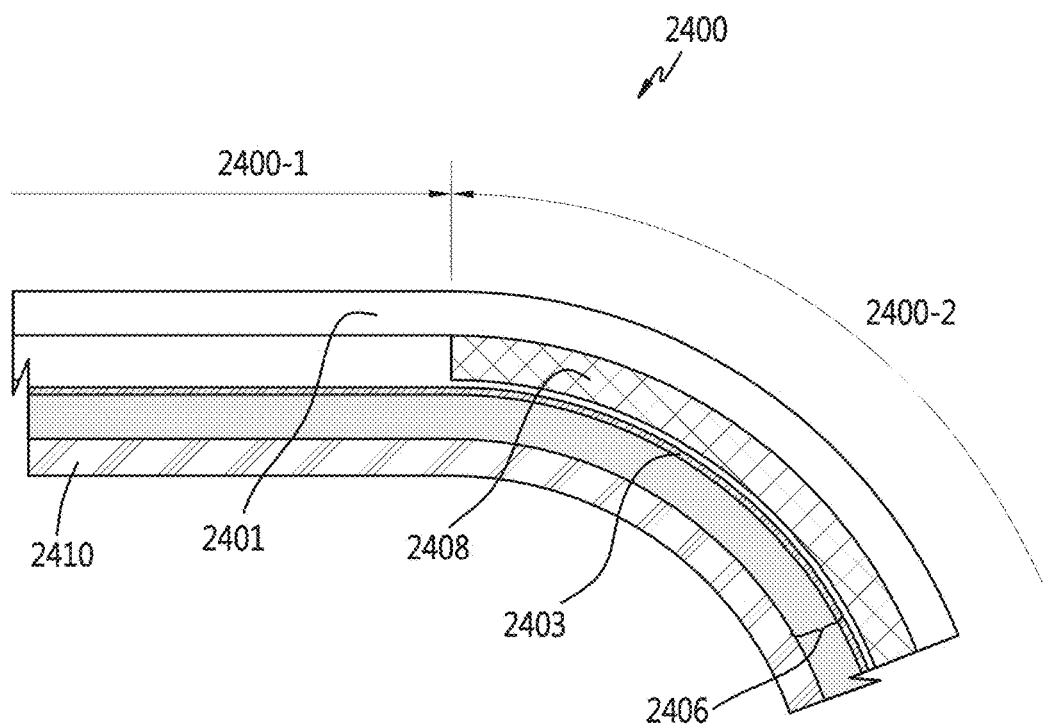

FIG. 24 is a view illustrating a display according to an embodiment of the present disclosure.

Referring to FIG. 24, when viewed in a cross section, a display 2400 may include a window 2401, a second conductive pattern 2408, a display panel 2406, or a pressure sensing sensor 2410. According to various embodiments, at least one of the above-described displays 590, 690, 790, 890, 990, 1090, 1190, and 1290 may have a configuration that is at least partially the same as or similar to the display 2400 of FIG. 24.

When viewed in a cross section, the display 2400 may include a substantially flat first portion 2400-1 and a second portion 2400-2 that extends from the first portion 2400-1 to be curved.

The second conductive pattern 2408 may be disposed between the window 2401 and the display panel 2406. According to an embodiment, the second conductive pattern 2408 may be disposed in the second portion 2400-2 without being disposed in the first portion 2400-1.

According to an embodiment, the window 2401 and the display panel 2406 may be disposed in the first portion 2400-1 and the second portion 2400-2.

According to an embodiment, the second conductive pattern 2408 may be electrically connected to a communication circuit that is mounted in an electronic device (e.g., the electronic device 101 of FIG. 1) that is mounted with the display 2400, and may be used as an antenna radiator that supports various types of communication.

According to an embodiment, the display panel 2406 may include a first conductive pattern 2403 to support a touch input and/or a hovering input as well as elements that implement a color according to an image related signal. For example, the first conductive pattern 2403 may form one face of the display panel 2406. The first conductive pattern 2403 may be disposed in an on-cell region of the display panel 2406.

According to an embodiment, the first conductive pattern 2403 may be electrically connected to a touch sensing circuit that is mounted in an electronic device (e.g., the electronic device 101 of FIG. 1) that is mounted with the display 2400, and may support a touch input or a hovering input.

According to an embodiment, the pressure sensing sensor 2410 may be installed adjacent to the display panel 2406, which may be disposed between the second conductive pattern 2408 and the pressure sensing sensor 2410. According to various embodiments, the pressure sensing sensor 2410 may be the pressure sensing sensor 2000a of FIG. 20A or the pressure sensing sensor 2000b of FIG. 20B.

According to an embodiment, the pressure sensing sensor 2410 may be disposed along at least a portion of the first portion 2400-1 and/or the second portion 2400-2 of the display 2400. The pressure applied to at least one local area of the window 2401 from the outside may be transferred to the pressure sensing sensor 2410. The pressure sensing sensor 2410 may induce a signal related to at least one position where the pressure is applied in the manner described above with reference to FIG. 20A. The pressure sensing sensor 2410 may be electrically connected to a pressure sensing circuit (e.g., a detector 2003a of FIG. 20A) or a control circuit (e.g., the processor 120 of FIG. 1) that is mounted in an electronic device (e.g., the electronic device 101 of FIG. 1) that is mounted with the display 2400.

Figure 25:
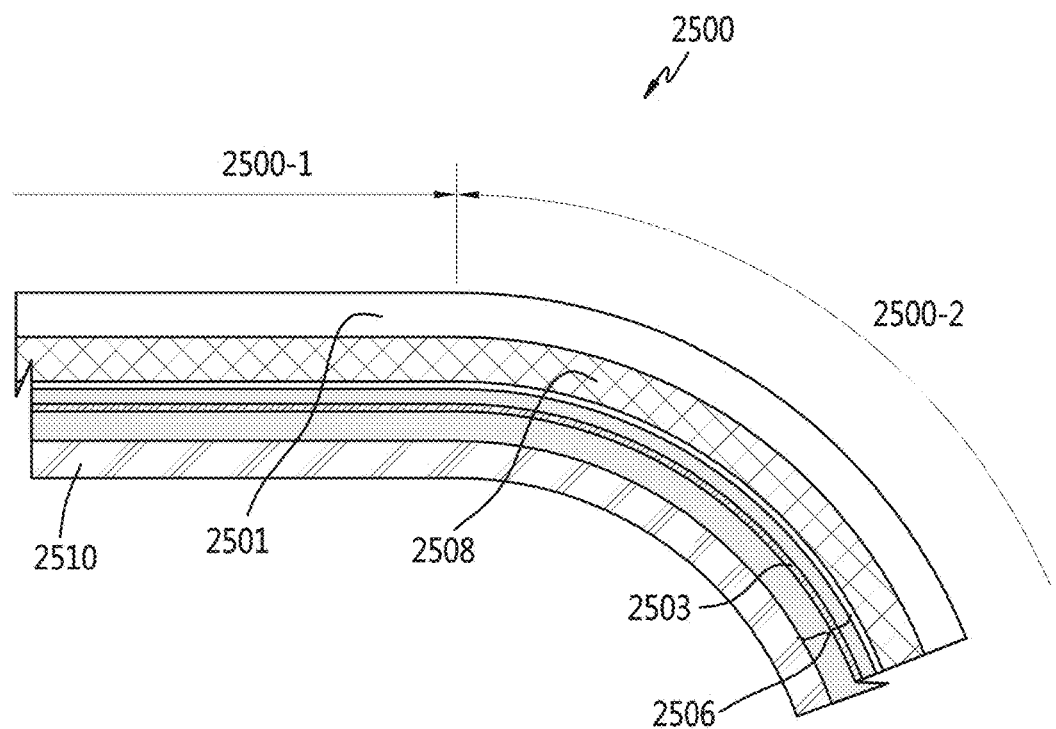

FIG. 25 is a view illustrating a display according to an embodiment of the present disclosure.

Referring to FIG. 25, when viewed in a cross section, a display 2500 may include a window 2501, a second conductive pattern 2508, a display panel 2506, or a pressure sensing sensor 2510. According to various embodiments, at least one of the above-described displays 590, 690, 790, 890, 990, 1090, 1190, and 1290 may have a configuration that is at least partially the same as or similar to the display 2500 of FIG. 25.

When viewed in a cross section, the display 2500 may include a substantially flat first portion 2500-1 and a second portion 2500-2 that extends from the first portion 2500-1 to be curved.

The second conductive pattern 2508 may be disposed between the window 2501 and the touch display 2506.

According to an embodiment, the window 2501, the second conductive pattern 2508, and the display panel 2506 may be disposed in the first portion 2500-1 and/or the second portion 2500-2.

According to an embodiment, the second conductive pattern 2508 may be electrically connected to a communication circuit that is mounted in an electronic device (e.g., the electronic device 101 of FIG. 1) that is mounted with the display 2500, and may be used as an antenna radiator that supports various types of communication.

According to an embodiment, the display panel 2506 may include a first conductive pattern 2503 to support a touch input and/or a hovering input as well as elements that implement a color according to an image related signal. For example, the first conductive pattern 2503 may be disposed inside the display panel 2506. The first conductive pattern 2503 may be disposed in an in-cell region of the display panel 2506.

According to an embodiment, the first conductive pattern 2503 may be electrically connected to a touch sensing circuit that is mounted in an electronic device (e.g., the electronic device 101 of FIG. 1) that is mounted with the display 2500, and may support a touch input or a hovering input.

According to an embodiment, the pressure sensing sensor 2610 may be installed adjacent to the display panel 2606, which may be disposed between the second conductive pattern 2608 and the pressure sensing sensor 2610. According to various embodiments, the pressure sensing sensor 2610 may be the pressure sensing sensor 2000a of FIG. 20A or the pressure sensing sensor 2000b of FIG. 20B.

According to an embodiment, the pressure sensing sensor 2610 may be disposed along at least a portion of the first portion 2600-1 and/or the second portion 2600-2 of the display 2600. The pressure applied to at least one local area of the window 2601 from the outside may be transferred to the pressure sensing sensor 2610. The pressure sensing sensor 2610 may induce a signal related to at least one position where the pressure is applied in the manner described above with reference to FIG. 20A. The pressure sensing sensor 2610 may be electrically connected to a pressure sensing circuit (e.g., a detector 2003a of FIG. 20A) or a control circuit (e.g., the processor 120 of FIG. 1) that is mounted in an electronic device (e.g., the electronic device 101 of FIG. 1) that is mounted with the display 2600.

Figure 26:
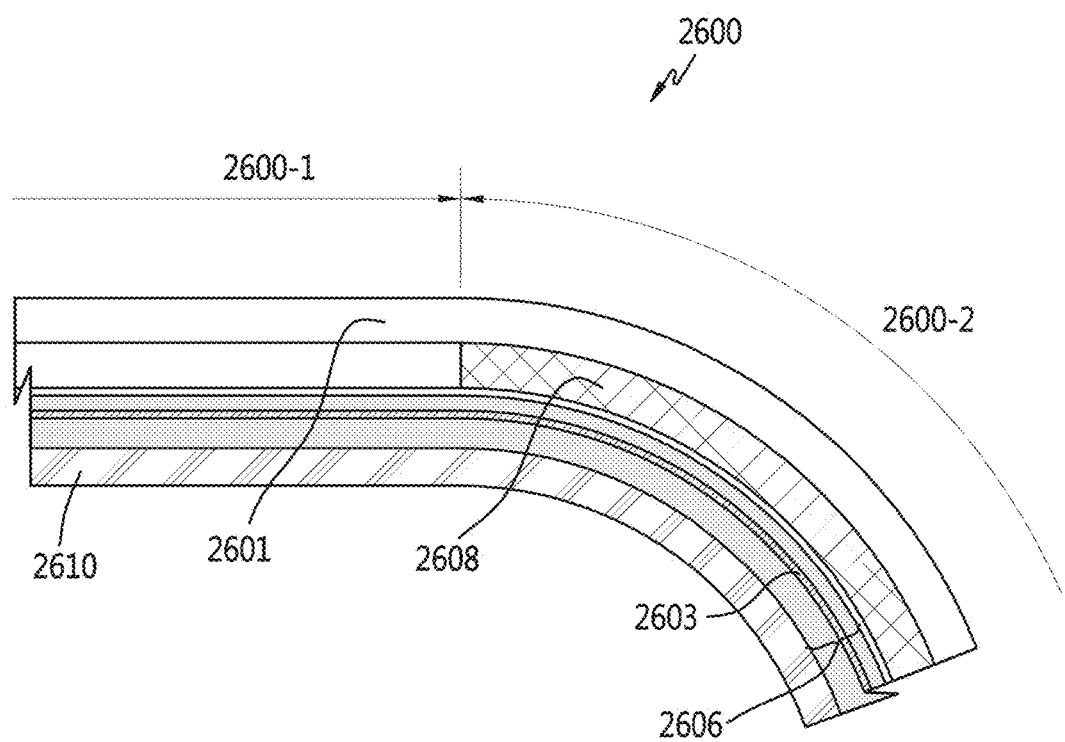

FIG. 26 is a view illustrating a display according to an embodiment of the present disclosure.

Referring to FIG. 26, when viewed in a cross section, a display 2600 may include a window 2601, a second conductive pattern 2608, a display panel 2606, or a pressure sensing sensor 2610. According to various embodiments, at least one of the above-described displays 590, 690, 790, 890, 990, 1090, 1190, and 1290 may have a configuration that is at least partially the same as or similar to the display 2600 of FIG. 26.

When viewed in a cross section, the display 2600 may include a substantially flat first portion 2600-1 and a second portion 2600-2 that extends from the first portion 2600-1 to be curved.

The second conductive pattern 2608 may be disposed between the window 2601 and the display panel 2606. According to an embodiment, the second conductive pattern 2608 may be disposed in the second portion 2600-2 without being disposed in the first portion 2600-1.

According to an embodiment, the window 2601 and the display panel 2606 may be disposed in the first portion 2600-1 and/or the second portion 2600-2.

According to an embodiment, the second conductive pattern 2608 may be electrically connected to a communication circuit that is mounted in an electronic device (e.g., the electronic device 101 of FIG. 1) that is mounted with the display 2600, and may be used as an antenna radiator that supports various types of communication.

According to an embodiment, the display panel 2606 may include a first conductive pattern 2603 to support a touch input and/or a hovering input as well as elements that implement a color according to an image related signal. For example, the first conductive pattern 2603 may be disposed inside the display panel 2606. The first conductive pattern 2603 may be disposed in an in-cell region of the display panel 2606.

According to an embodiment, the first conductive pattern 2603 may be electrically connected to a touch sensing circuit that is mounted in an electronic device (e.g., the electronic device 101 of FIG. 1) that is mounted with the display 2600, and may support a touch input or a hovering input.

According to an embodiment, the pressure sensing sensor 2610 may be installed adjacent to the display panel 2606, which may be disposed between the second conductive pattern 2608 and the pressure sensing sensor 2610. According to various embodiments, the pressure sensing sensor 2610 may be the pressure sensing sensor 2000a of FIG. 20A or the pressure sensing sensor 2000b of FIG. 20B.

According to an embodiment, the pressure sensing sensor 2610 may be disposed along at least a portion of the first portion 2600-1 and/or the second portion 2600-2 of the display 2600. The pressure applied to at least one local area of the window 2601 from the outside may be transferred to the pressure sensing sensor 2610. The pressure sensing sensor 2610 may induce a signal related to at least one position where the pressure is applied in the manner described above with reference to FIG. 20A. The pressure sensing sensor 2610 may be electrically connected to a pressure sensing circuit (e.g., a detector 2003a of FIG. 20A) or a control circuit (e.g., the processor 120 of FIG. 1) that is mounted in an electronic device (e.g., the electronic device 101 of FIG. 1) that is mounted with the display 2600.

Figure 27:
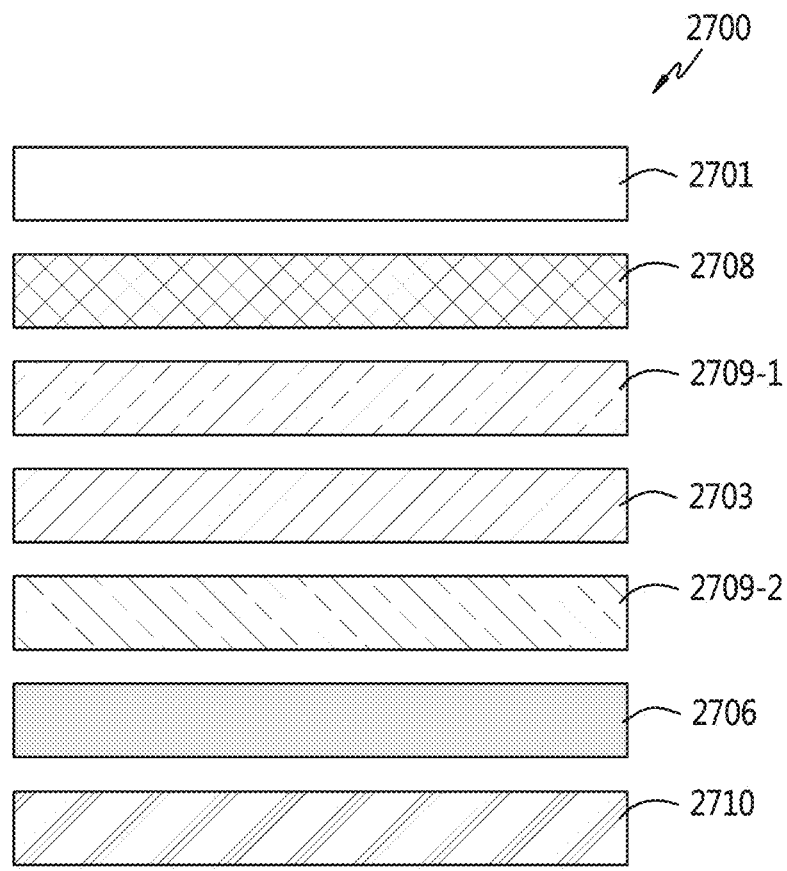

FIG. 27 is a view illustrating a display according to an embodiment of the present disclosure.

Referring to FIG. 27, when viewed in a cross section, a display 2700 may include a window 2701, a conductive pattern 2708, a touch panel 2703, a display panel 2706, or a pressure sensing sensor 2710. According to various embodiments, at least one of the above-described displays 590, 690, 790, 890, 990, 1090, 1190, and 1290 may have a configuration that is at least partially the same as or similar to the display 2700 of FIG. 27.

The conductive pattern 2708 may be disposed between the window 2701 and the touch panel 2703. The touch panel 2703 may be disposed between the conductive pattern 2708 and the display panel 2706. According to various embodiments, the window 2701, the conductive pattern 2708, the touch panel 2703, and the display panel 2706 may have configurations that are at least partially the same as or similar to those of the window 1601, the conductive layer 1680, the touch panel 1603, and the display panel 1606 of FIG. 16, respectively. Alternatively, the window 2701, the conductive pattern 2708, the touch panel 2703, and the display panel 2706 may have configurations that are at least partially the same as or similar to those of the window 1701, the conductive layer 1780, the touch panel 1703, and the display panel 1706 of FIG. 17, respectively.

According to an embodiment, the display 2700 may include a first non-conductive layer 2709-1 disposed between the conductive pattern 2708 and the touch panel 2703.

According to an embodiment, the display 2700 may include a second non-conductive layer 2709-2 disposed between the touch panel 2703 and the display panel 2706.

According to an embodiment, the conductive pattern 2708 may be electrically connected to a communication circuit that is mounted in an electronic device (e.g., the electronic device 101 of FIG. 1) that is mounted with the display 2700, and may be used as an antenna radiator that supports various types of communication.

According to an embodiment, the pressure sensing sensor 2710 may be installed adjacent to the display panel 2706, which may be disposed between the second non-conductive layer 2709-2 and the pressure sensing sensor 2710. According to various embodiments, the pressure sensing sensor 2710 may be the pressure sensing sensor 2000a of FIG. 20A or the pressure sensing sensor 2000b of FIG. 20B.

According to an embodiment, the pressure sensing sensor 2710 may be disposed along at least a portion of the display 2700. The pressure applied to at least one local area of the window 2701 from the outside may be transferred to the pressure sensing sensor 2710. The pressure sensing sensor 2710 may induce a signal related to at least one position where the pressure is applied in the manner described above with reference to FIG. 20A. The pressure sensing sensor 2710 may be electrically connected to a pressure sensing circuit (e.g., a detector 2003a of FIG. 20A) or a control circuit (e.g., the processor 120 of FIG. 1) that is mounted in an electronic device (e.g., the electronic device 101 of FIG. 1) that is mounted with the display 2700.

Figure 28:
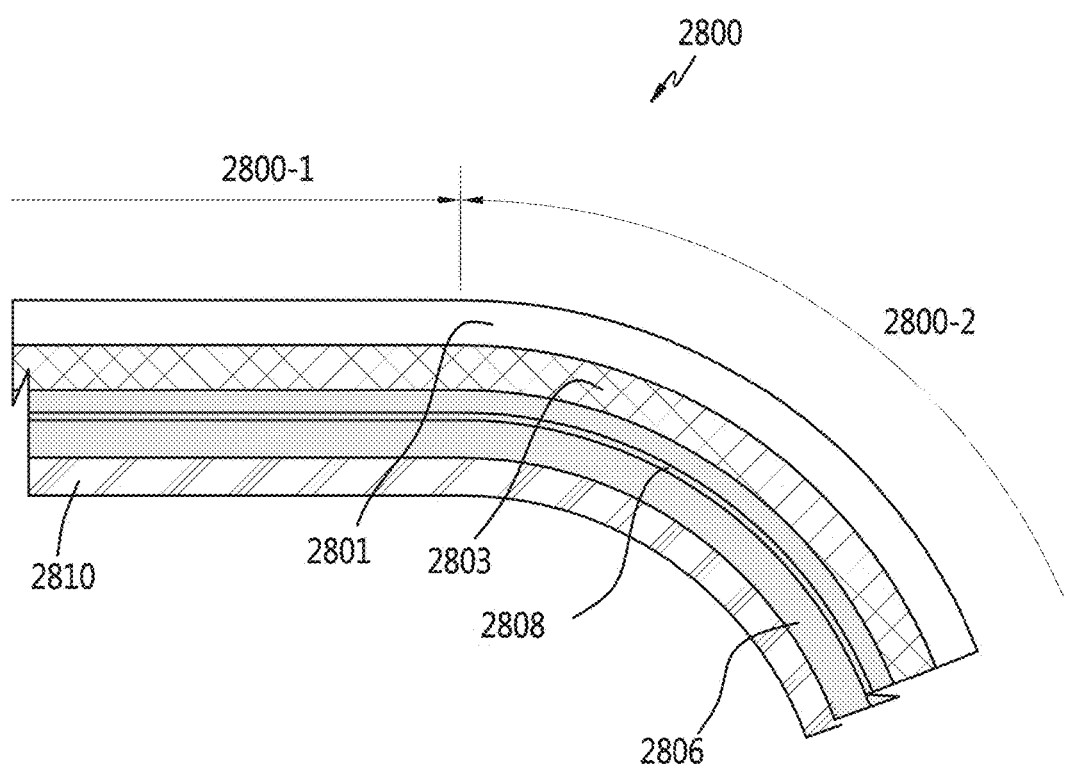

FIG. 28 is a view illustrating a display according to an embodiment of the present disclosure.

Referring to FIG. 28, when viewed in a cross section, a display 2800 may include a window 2801, a touch panel 2803, a display panel 2806, or a pressure sensing sensor 2810. According to various embodiments, at least one of the above-described displays 590, 690, 790, 890, 990, 1090, 1190, and 1290 may have a configuration that is at least partially the same as or similar to the display 2800 of FIG. 28.

When viewed in a cross section, the display 2800 may include a substantially flat first portion 2800-1 and a second portion 2800-2 that extends from the first portion 2800-1 to be curved.

The touch panel 2803 may be disposed between the window 2801 and the display panel 2806. According to various embodiments, the window 2801, the touch panel 2803, and the display panel 2806 may have configurations that are at least partially the same as or similar to those of the window 1401, the touch panel 1403, and the display panel 1406 of FIG. 14, respectively.

According to an embodiment, the touch panel 2803 may be electrically connected to a touch sensing circuit that is mounted in an electronic device (e.g., the electronic device 101 of FIG. 1) that is mounted with the display 2800, and may support a touch input or a hovering input.

According to an embodiment, the display panel 2806 may include a conductive pattern 2808 that may be used as an antenna radiator to support various types of communication as well as elements that implement a color according to an image related signal. The conductive pattern 2808 may be electrically connected to a communication circuit that is mounted in an electronic device (e.g., the electronic device 101 of FIG. 1) that is mounted with the display 2800.

According to an embodiment, the conductive pattern 2808 may be disposed inside the display panel 2806. For example, the conductive pattern 2808 may be disposed in an in-cell region of the display panel 2806. According to another embodiment, the conductive pattern 2808 may form one face of the display panel 2806. For example, the conductive pattern 2808 may be disposed in an on-cell region of the display panel 2806.

According to an embodiment, the display panel 2806 may have a configuration that is at least partially the same as or similar to the display 1900 of FIG. 19. For example, the conductive pattern 2808 may have a configuration that is at least partially the same as or similar to the conductive pattern 1904 of FIG. 19.

According to an embodiment, the conductive pattern 2808 may be disposed in the first portion 2800-1 and the second portion 2800-2.

According to an embodiment, the pressure sensing sensor 2810 may be installed adjacent to the display panel 2806, which may be disposed between the touch panel 2803 and the pressure sensing sensor 2810. According to various embodiments, the pressure sensing sensor 2810 may be the pressure sensing sensor 2000*a* of FIG. 20A or the pressure sensing sensor 2000*b* of FIG. 20B.

According to an embodiment, the pressure sensing sensor 2810 may be disposed along at least a portion of the first portion 2800-1 and/or the second portion 2800-2 of the display 2800. The pressure applied to at least one local area of the window 2801 from the outside may be transferred to the pressure sensing sensor 2810. The pressure sensing sensor 2810 may induce a signal related to at least one position where the pressure is applied in the manner described above with reference to FIG. 20A. The pressure sensing sensor 2810 may be electrically connected to a pressure sensing circuit (e.g., a detector 2003*a* of FIG. 20A) or a control circuit (e.g., the processor 120 of FIG. 1) that is mounted in an electronic device (e.g., the electronic device 101 of FIG. 1) that is mounted with the display 2800.

Figure 29:
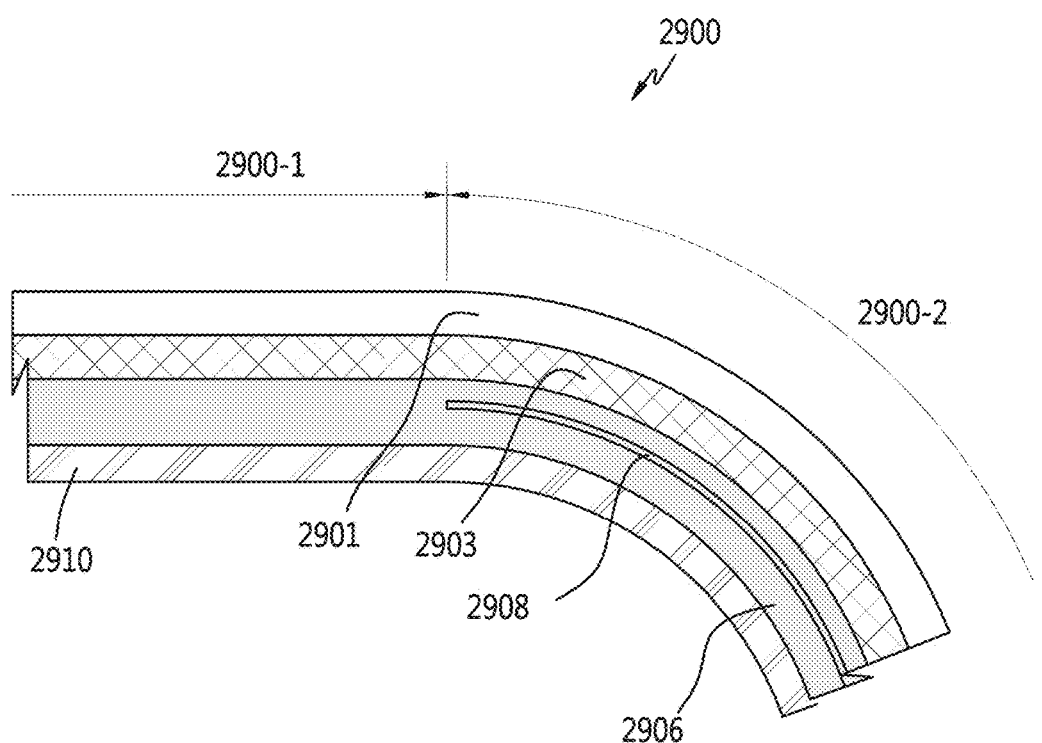

FIG. 29 is a view illustrating a display according to an embodiment of the present disclosure.

Referring to FIG. 29, when viewed in a cross section, a display 2900 may include a window 2901, a touch panel 2903, a display panel 2906, or a pressure sensing sensor 2910. According to various embodiments, at least one of the above-described displays 590, 690, 790, 890, 990, 1090, 1190, and 1290 may have a configuration that is at least partially the same as or similar to the display 2900 of FIG. 29.

When viewed in a cross section, the display 2900 may include a substantially flat first portion 2900-1 and a second portion 2900-2 that extends from the first portion 2900-1 to be curved.

The touch panel 2903 may be disposed between the window 2901 and the display panel 2906. According to various embodiments, the window 2901, the touch panel 2903, and the display panel 2906 may have configurations that are at least partially the same as or similar to those of the window 1401, the touch panel 1403, and the display panel 1406 of FIG. 14, respectively.

According to an embodiment, the touch panel 2903 may be electrically connected to a touch sensing circuit that is mounted in an electronic device (e.g., the electronic device 101 of FIG. 1) that is mounted with the display 2900, and may support a touch input or a hovering input.

According to an embodiment, the display panel 2906 may include a conductive pattern 2908 that may be used as an antenna radiator to support various types of communication as well as elements that implement a color according to an image related signal. The conductive pattern 2908 may be electrically connected to a communication circuit that is mounted in an electronic device (e.g., the electronic device 101 of FIG. 1) that is mounted with the display 2900.

According to an embodiment, the conductive pattern 2908 may be disposed inside the display panel 2906. For example, the conductive pattern 2908 may be disposed in an in-cell region of the display panel 2806. According to another embodiment, the conductive pattern 2908 may form one face of the display panel 2906. For example, the conductive pattern 2908 may be disposed in an on-cell region of the display panel 2906.

According to an embodiment, the display panel 2906 may be similar to the display 1900 of FIG. 19. For example, the conductive pattern 2908 may have a configuration that is at least partially the same as or similar to the conductive pattern 1904 of FIG. 19.

According to an embodiment, the conductive pattern 2908 may be at least partially disposed in the second portion 2900-2. Alternatively, the conductive pattern 2908 may not be disposed in the first portion 2900-1.

According to an embodiment, the pressure sensing sensor 2910 may be installed adjacent to the display panel 2906, which may be disposed between the touch panel 2903 and the pressure sensing sensor 2910. According to various embodiments, the pressure sensing sensor 2910 may be the pressure sensing sensor 2000*a* of FIG. 20A or the pressure sensing sensor 2000*b* of FIG. 20B.

According to an embodiment, the pressure sensing sensor 2910 may be disposed along at least a portion of the first portion 2900-1 and/or the second portion 2900-2 of the display 2900. The pressure applied to at least one local area of the window 2901 from the outside may be transferred to the pressure sensing sensor 2910. The pressure sensing sensor 2910 may induce a signal related to at least one position where the pressure is applied in the manner described above with reference to FIG. 20A. The pressure sensing sensor 2910 may be electrically connected to a pressure sensing circuit (e.g., a detector 2003*a* of FIG. 20A) or a control circuit (e.g., the processor 120 of FIG. 1) that is mounted in an electronic device (e.g., the electronic device 101 of FIG. 1) that is mounted with the display 2900.

Figure 30:
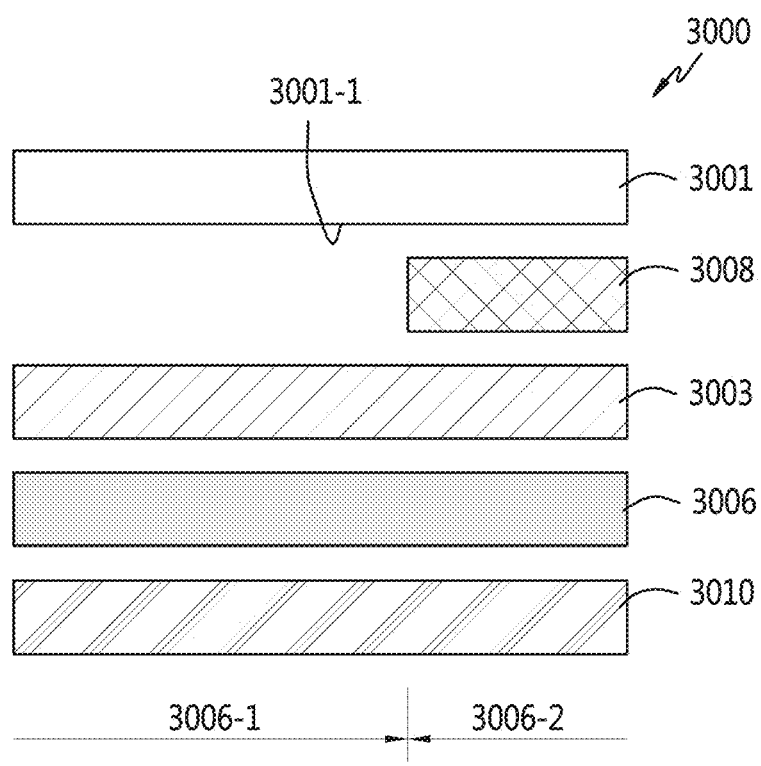

FIG. 30 is a view illustrating a display according to an embodiment of the present disclosure.

Referring to FIG. 30, when viewed in a cross section, a display 3000 may include a window 3001, a touch panel 3003, a conductive pattern 3008, or a pressure sensing sensor 3010. According to various embodiments, at least one of the above-described displays 590, 690, 790, 890, 990, 1090, 1190, and 1290 may have a configuration that is at least partially the same as or similar to the display 3000 of FIG. 30.

When viewed in a cross section, the touch panel 3003 may be disposed between the window 3001 and the display panel 3006. The conductive pattern 3008 may be disposed between the window 3001 and the display panel 3006.

According to an embodiment, the display panel 3006 may include a first portion 3006-1 on which a screen is displayed and a second portion 3006-2 in which no screen is displayed.

According to an embodiment, a portion of the touch panel 3003 may be disposed between the first portion 3006-1 of the display panel 3006 and the window 3001, and another portion of the touch panel 3003 may be disposed between the second portion 3006-2 of the display panel 3006 and the window 3001.

According to another embodiment, although not illustrated, the touch panel 3003 may not be disposed between the second portion 3006-2 of the display panel 3006 and the window 3001.

According to an embodiment, the conductive pattern 3008 may be disposed between the second portion 3006-2 of the display panel 3006 and the window 3001, and may not be disposed between the second portion 3006-2 of the display panel 3006 and the window 3001.

According to various embodiments, the conductive pattern 3008 may be coupled to the window 3001. For example, the conductive pattern 3008 may be coupled to a face 3001-1 of the window 3001, which faces the display panel 3006.

According to various embodiments, the conductive pattern 3008 may be disposed inside the second portion 3006-2 of the display panel 3006.

The conductive pattern 3008 may be electrically connected to a wireless communication circuit that is mounted in an electronic device (e.g., the electronic device 101 of FIG. 1) that is mounted with the display 3000, and may be used as an antenna radiator that supports various types of communication.

According to an embodiment, the pressure sensing sensor 3010 may be installed adjacent to the display panel 3006, which may be disposed between the touch panel 3003 and the pressure sensing sensor 3010. According to various embodiments, the pressure sensing sensor 3010 may be the pressure sensing sensor 2000*a* of FIG. 20A or the pressure sensing sensor 2000*b* of FIG. 20B.

According to an embodiment, the pressure sensing sensor 3010 may be disposed along at least a portion of the display 3000. The pressure applied to at least one local area of the window 3001 from the outside may be transferred to the pressure sensing sensor 3010. The pressure sensing sensor 3010 may induce a signal related to at least one position where the pressure is applied in the manner described above with reference to FIG. 20A. The pressure sensing sensor 3010 may be electrically connected to a pressure sensing circuit (e.g., a detector 2003*a* of FIG. 20A) or a control circuit (e.g., the processor 120 of FIG. 1) that is mounted in an electronic device (e.g., the electronic device 101 of FIG. 1) that is mounted with the display 3000.

Figure 31:
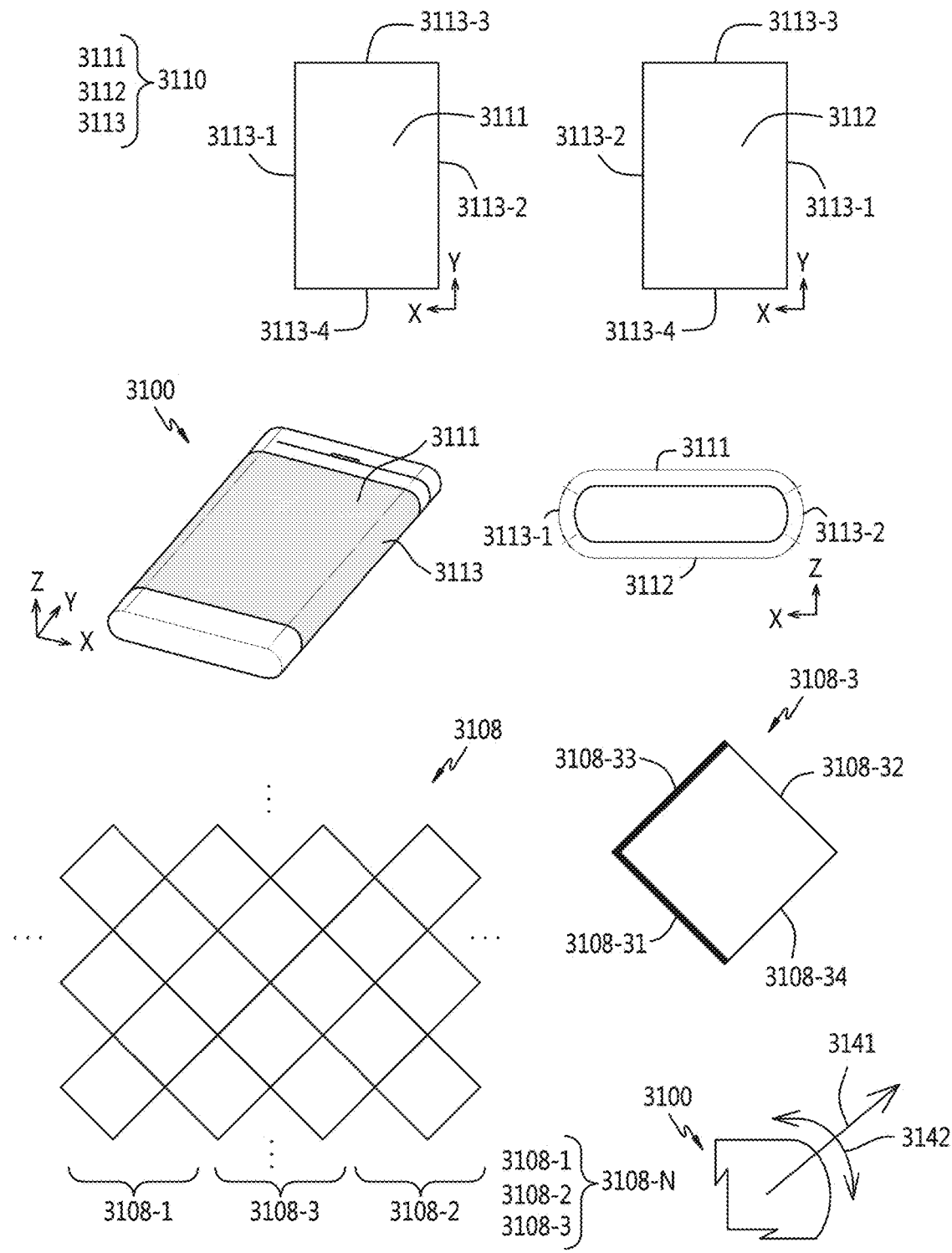
FIGS. 31 and 32 are views each illustrating an electronic device according to various embodiments of the present disclosure.
Figure 32:
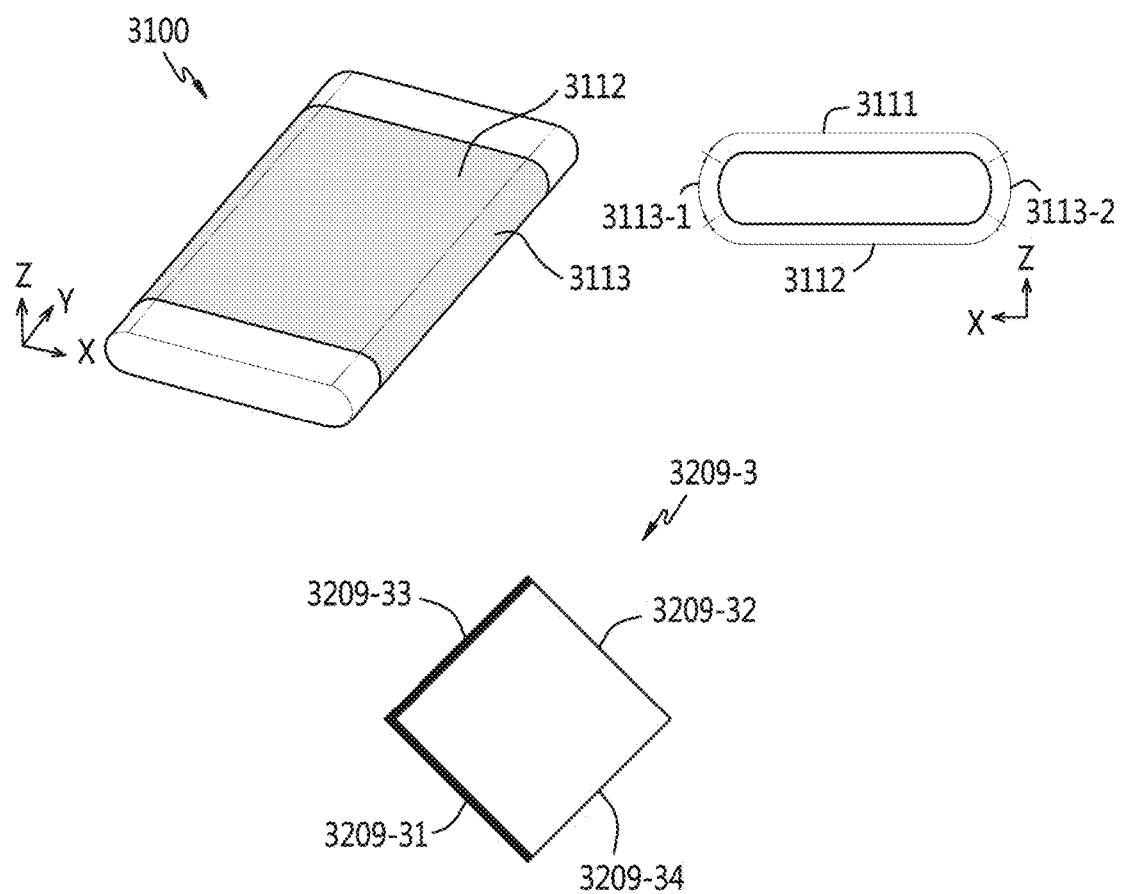

FIGS. 31 and 32 are views each illustrating an electronic device according to various embodiments of the present disclosure. The electronic device may have a configuration that is the same as or similar to that of at least one of the electronic devices mentioned in this specification.

Referring to FIG. 31, when viewed in a cross section, a housing 3110 of the electronic device 3100 may include a first face 3111, a second face 3112, and a third face 3113. The first face 3111 and the second face 3112 may face opposite directions. The third face 3113 may surround a space between the first face 3111 and the second face 3112.

According to an embodiment, the third face 3113 may have a substantially curved face.

According to an embodiment, the first face 3111 and the second face 3112 may be relatively flat as compared with the third face 3113.

According to an embodiment, a portion of the display may be disposed to correspond to the first face 3111 and/or the second face 3112. Alternatively, another portion of the display may be disposed to correspond at least a portion of the third face 3113. According to various embodiments, the display may have a configuration that is at least partially the same as or similar to at least one of the displays 2100, 2200, 2300, 2400, 2500, 2600, 2700, 2800, 2900, and 3000 of FIGS. 21 to 30.

As described above, the conductive pattern 3108 of the display may be used as an antenna radiator to support various types of communication. A portion of the conductive pattern 3108, which is installed to correspond to the third face 3113, may have a curved shape, and the curved shape may have a resistance value that disturbs a current flow (e.g., impedance mismatching), which may cause the loss of antenna performance. For example, a portion of the conductive pattern 3108, which is installed to correspond to the third face 3113, may include an inner curved portion and an outer curved portion. The radius of curvature of the inner curved portion and the radius of the outer curved portion may be different from each other. For example, when a curved portion is formed using a conductive pattern of a certain thickness, the thickness of a part of the conductive pattern of the curved portion may become thinner than the initial thickness depending on a relationship between stress and strain. A part of the conductive pattern of the curved portion may cause a deterioration of antenna performance that was not expected in the initial design.

According to an embodiment, a part of the conductive pattern 3108 disposed to correspond to at least one face (e.g., the third face 3113) in order to reduce the above-described antenna performance deterioration may have a shape that is different from that of another part. For example, the conductive pattern 3108 may be a metal mesh pattern. A part of the conductive pattern 3108 (hereinafter, referred to as a "metal mesh pattern") disposed to correspond to the third face 3113 has a rectangular mesh shape, and another of the metal mesh pattern 3108 disposed to correspond to the first face 3111 and/or the second face 3112 may have a shape that is different from the rectangular mesh shape.

According to an embodiment, a part of the metal mesh pattern 3108 disposed to correspond to at least one face (e.g., the third face 3113) in order to reduce the above-described antenna performance deterioration may have a size that is different from that of another part.

According to an embodiment, a part of the metal mesh pattern 3108 disposed to correspond to at least one face (e.g., the third face 3113) in order to reduce the above-described antenna performance deterioration may have a pattern thickness that is different from that of another part.

According to various embodiments, the metal mesh pattern 3108 may include a plurality of rectangular annular patterns 3108-N. At least a portion 3108-1 of the plurality of rectangular annular patterns 3108-N may be disposed to correspond to the first face 3111. At least a portion 3108-2 of the plurality of rectangular annular patterns 3108-N may be disposed to correspond to the second face 3112. At least a portion 3108-3 of the plurality of rectangular annular patterns 3108-N may be disposed to correspond to the third face 3113.

According to an embodiment, at least one rectangular annular pattern 3108-3 disposed to correspond to the third face 3113 may include a first line 3108-31, a second line 3103-32, a third lines 3108-33, and a fourth line 3108-34. The first line 3108-31 and the second line 3108-32 may be disposed opposite to each other, and the third line 3108-33 and the fourth line 3108-34 may be disposed opposite to each other. The third line 3108-33 may connect one end of the first line 3108-31 and one end of the second line 3108-32 to each other. The fourth line 3108-34 may connect the other end of the first line 3108-31 and the other end of the second line 3108-32 to each other. The first line 3108-31 and the third line 3108-33 may be disposed closer to the first face 3111 as compared to the second line 3108-32 and the fourth line 3108-34. In order to reduce the above-mentioned antenna performance deterioration, the first line 3108-31 and/or the third line 3108-33 may be thicker than the second line 3108-32 and/or the fourth line 3108-34. For example, the first line 3108-31 and/or the third line 3108-33 may be thicker than the second line 3108-32 and/or the fourth line 3108-34 in a direction 3141 following the outer region of the electronic device 3100. Alternatively, the first line 3108-31 and/or the third line 3108-33 may be thicker than the second line 3108-32 and/or the fourth line 3108-34 in a direction 3142 from the inside toward the outside of the electronic device 3100. Since the first line 3108-31 and/or the third line 3108-33 have a greater thickness than the second line 3108-32 and/or the fourth line 3108-34, a relatively large current flows therein, and the radiation direction of the radio waves may be induced in a direction toward the first line 3108-31 and/or the third line 3108-33 from the second line 3108-32 and/or the fourth line 3108-34. For example, this may be helpful for expanding the radiation coverage.

Referring to FIG. 32, at least one rectangular annular pattern 3209-3 disposed to correspond to the third face 3113 may include a first line 3209-31, a second line 3209-32, a third lines 3209-33, and a fourth line 3209-34. The first line 3209-31 and the second line 3209-32 may be disposed opposite to each other, and the third line 3209-33 and the fourth line 3209-34 may be disposed opposite to each other. The third line 3209-33 may connect one end of the first line 3209-31 and one end of the second line 3209-32 to each other. The fourth line 3209-34 may connect the other end of the first line 3209-31 and the other end of the second line 3209-32 to each other. The first line 3209-31 and the third line 3209-33 may be disposed closer to the second face 3212 as compared to the second line 3209-32 and the fourth line 3209-34. In order to reduce the above-mentioned antenna performance deterioration, the first line 3209-31 and/or the third line 3209-33 may be thicker than the second line 3209-32 and/or the fourth line 3209-34

According to various embodiments, the metal mesh pattern 3108 may be formed in various shapes, such as a circular shape, an oval shape, various polygonal shapes, and the combinations thereof without being limited to the rectangular annular patterns 3108-N. According to an embodiment, the metal mesh pattern may include a circular annular pattern, and in order to prevent the deterioration of antenna performance, some of the lines forming the circular annular pattern may have a thickness, a width, etc. that are different from those other portions.

Figure 33A:
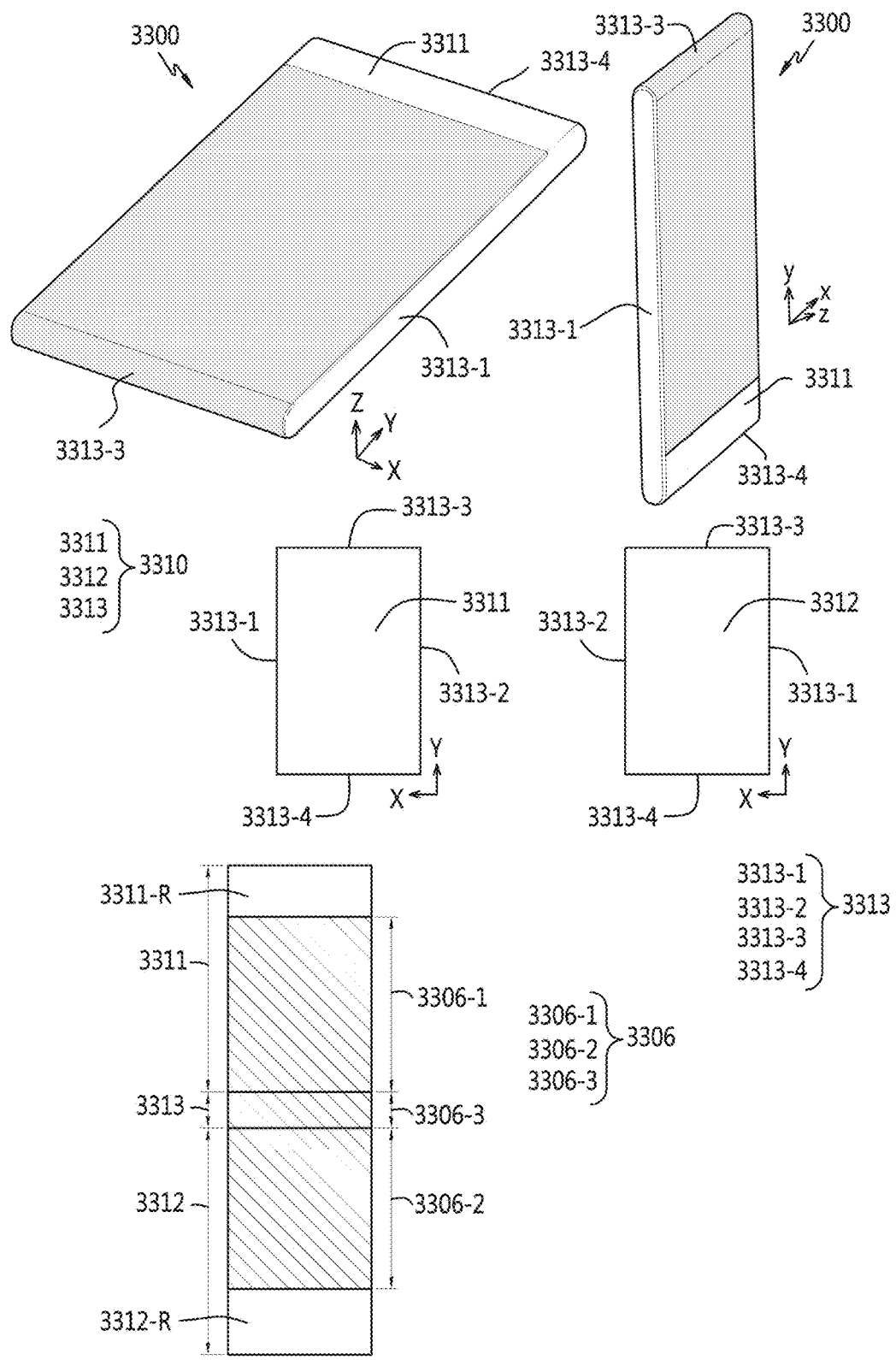
FIGS. 33A and 33B are views each illustrating an electronic device according to various embodiments of the present disclosure.
Figure 33B:
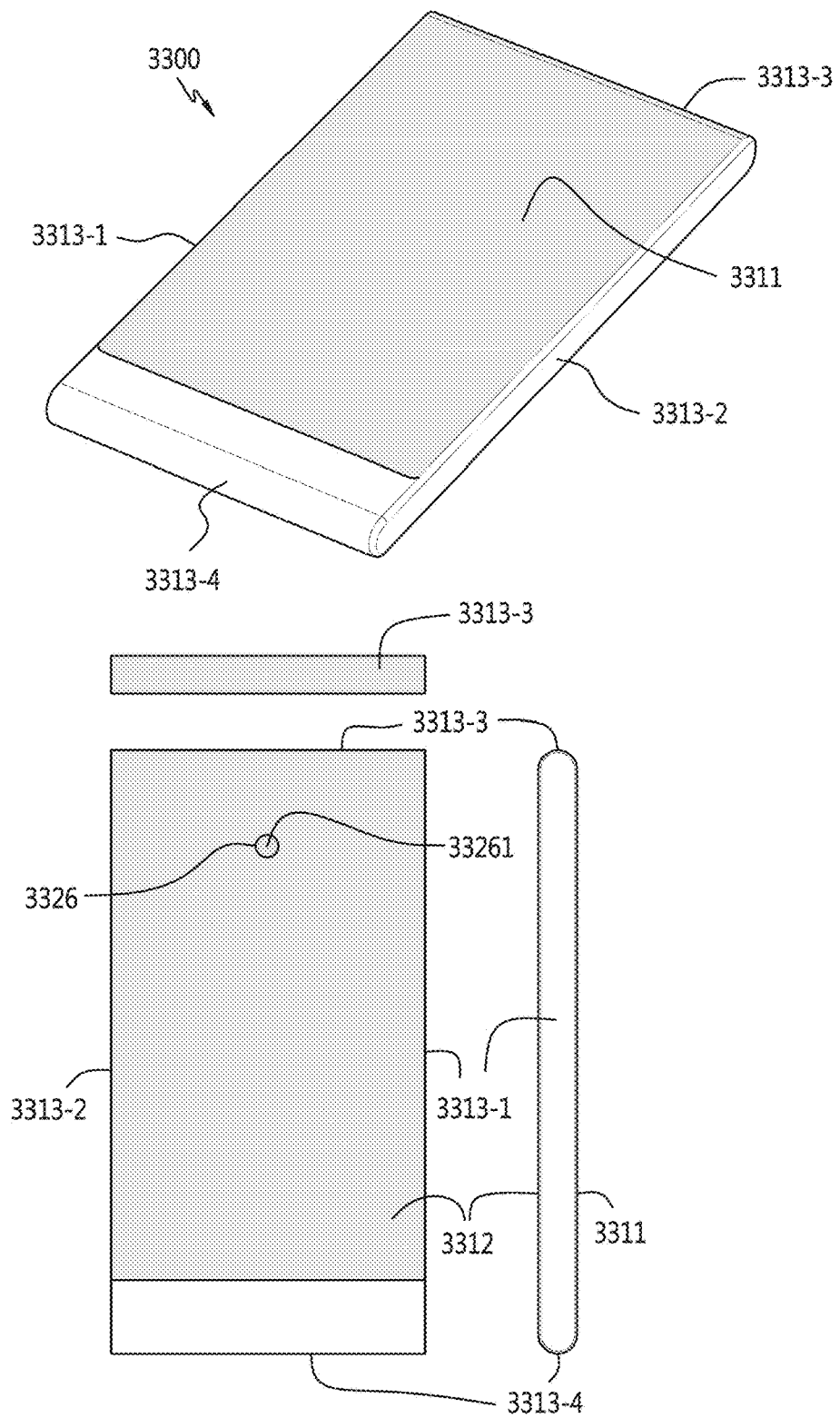

FIGS. 33A and 33B are views each illustrating an electronic device according to various embodiments of the present disclosure. The electronic device 3300 may include a configuration that is the same as or similar to at least some of the components described above.

Referring to FIGS. 33A and 33B, the electronic device 3300 may include a housing 3310 that forms an outer region (exterior appearance or an external face) of the electronic device 3300. According to an embodiment, when viewed in a cross section, the housing 3310 may include a first face 3311 and a second face 3312 that faces in a direction opposite to the first face 3311. Alternatively, the housing 3310 may include a third face 3313 that surrounds a space between the first face 3311 and the second face 3312.

According to an embodiment, the first face 3311 and/or the second face 3112 may be relatively flat as compared with the third face 3313.

According to an embodiment, the third face 3313 may include a first region 3313-1, a second region 3313-2, a third region 3313-3, and a fourth region 3313-4. The first region 3313-1 and the second region 3313-2 may be disposed opposite to each other. The third region 3313-3 and the fourth region 3313-4 may be disposed opposite to each other.

According to an embodiment, the housing 3310 may have a substantially rectangular shape. For example, the distance between the first region 3313-1 and the second region 3313-2 of the third face 3313 may be smaller than the distance between the third region 3313-3 and the regions 3313-4 of the third face 3313.

According to an embodiment, at least one of the first region 3313-1, the second region 3313-2, the third region 3313-3, and the fourth region 3313-4 of the third face 3313 may include a flat face or a curved face. For example, the first region 3313-1 and/or the second region 3313-2 may be a flat face. Alternatively, the third region 3313-3 and/or the fourth region 3313-4 may be a curved face.

According to an embodiment, the first region 3313-1 and the second region 3313-2 of the third face 3313 may be symmetrical to each other. Alternatively, the third region 3313-3 and the fourth region 3313-4 of the third face 3313 may be substantially symmetrical to each other.

According to various embodiments, the display 3306 may be disposed along at least a portion of at least one of the first face 3311, the second face 3312, and third face 3313 of the housing 3310, and may be exposed. According to various embodiments, the display 3306 may have a configuration that is at least partially the same as or similar to at least one of the displays 2100, 2200, 2300, 2400, 2500, 2600, 2700, 2800, 2900, and 3000 of FIGS. 21 to 30.

According to an embodiment, when unfolded and viewed in a plan view, the display 3306 may have a substantially rectangular shape, and may include a first display region 3306-1, a second display region 3306-2, and a third display region 3306-3. When unfolded and viewed in a plan view, each of the first display region 3306-1, the second display region 3306-2, and the third display region 3306-3 may have a rectangular shape. Alternatively, the third display region 3306-3 may connect the first display region 3306-1 and the second display region 3306-2 to each other.

According to an embodiment, the first display region 3306-1 may be disposed along at least a portion of the first face 3311 of the housing 3310. The second display region 3306-2 may be disposed along at least a portion of the second face 3312 of the housing 3310. Alternatively, the third display region 3306-3 may be disposed along at least a portion of the third face 3313 of the housing 3310. For example, the third display region 3306-3 may be disposed along the third region 3313-3 of the third face 3313.

According to various embodiments, the first face 3311 of the housing 3310 may include a first remaining region 3311-R where the display 3306 is not disposed.

According to various embodiments, the second face 3312 of the housing 3310 may include a second remaining region 3312-R where the display 3306 is not disposed.

According to various embodiments, the first remaining region 3311-R of the first face 3311 and the second remaining region 3312-R of the second face 3312 may or may not be symmetrical to each other.

According to various embodiments, when unfolded and viewed in a plan view, the first remaining region 3311-R of the first face 3311 and/or the second remaining region 3312-R of the second face 3312 may have a rectangular shape.

According to various embodiments, the display 3306 may not be disposed along at least one of the first region 3313-1, the second region 3313-2, and the fourth region 3313-4 of the third face 3313 of the housing 3310.

According to various embodiments, the first remaining region 3311-R of the first face 3311 and the second remaining region 3312-R of the second face 3312 may be disposed close to the fourth region 3313-4 of the third face 3313.

According to various embodiments, the electronic device 3300 may provide various components (e.g., a button, a speaker, a microphone, a camera, an earphone jack, a connector, a pull-out antenna, and a sensor) in a region where the display 3306 is not disposed in the housing 3310 (e.g., the first remaining region 3311-R of the first face 3311, the second remaining region 3312-R of the second face 3312, and the first region 3313-1, the second region 3313-2, or the fourth region 3313-4 of the third face 3313). For example, at least one button may be disposed on the first remaining region 3311-R of the first face 3311, and the first region 3313-1, the second region 3313-2, and the fourth region 3313-4 of the third face 3313.

The housing 3310 may include a through-hole or transparent region (not illustrated) for supporting an optical device (e.g., a camera). According to an embodiment, the display 3306 may include a through-hole or transparent region 3326. For example, the optical device (e.g., a camera, a flash, or a sensor) 33261 disposed within the housing 3310 may receive light from the outside or may transmit light to the outside through the through hole or transparent region 3326 of the display 3306.

Figure 34:
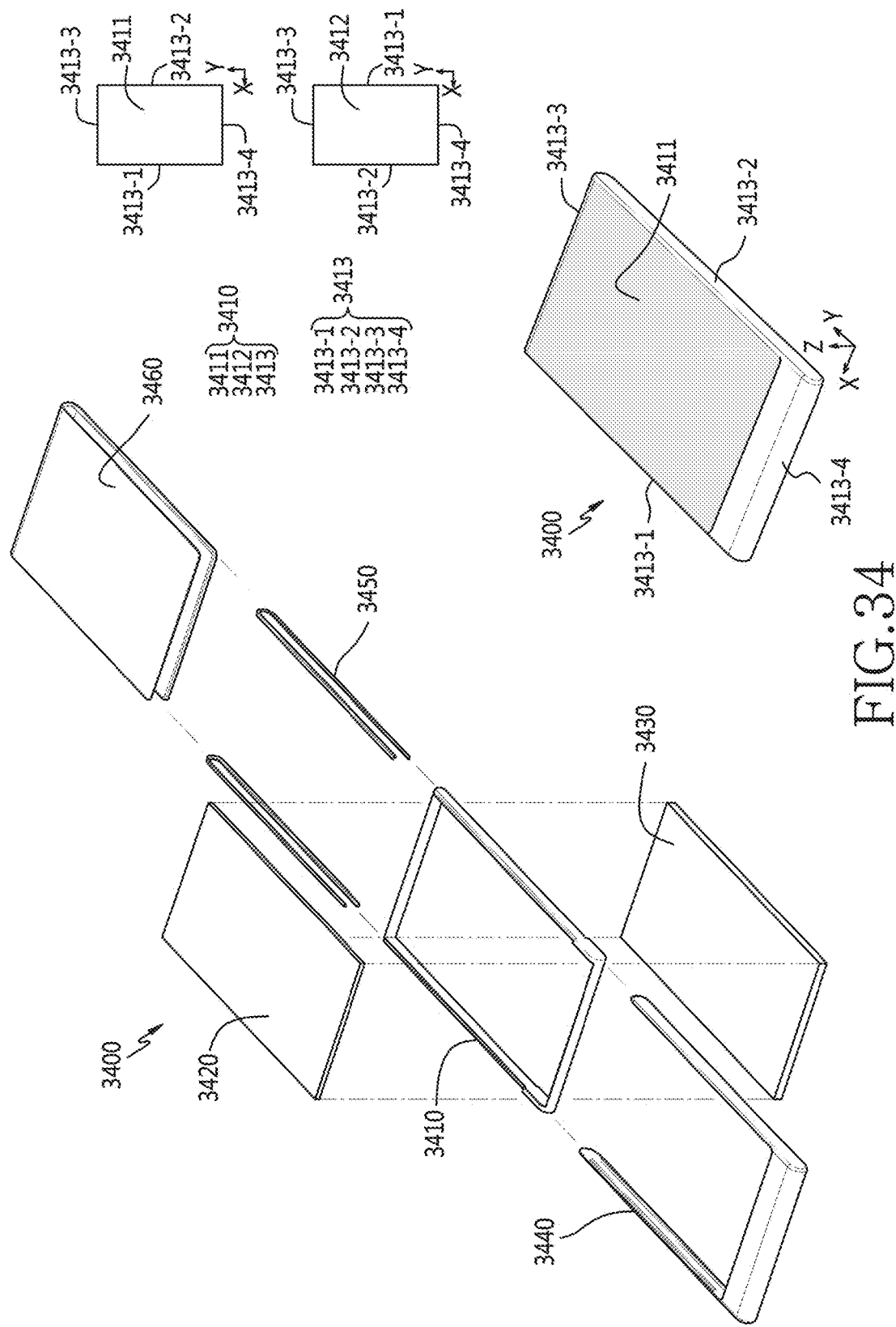
FIG. 34 illustrates an electronic device according to an embodiment of the present disclosure.

FIG. 34 illustrates an electronic device according to an embodiment of the present disclosure. FIGS. 35A, 35B, 35C, 35D, 35E, 36A, 36B, 37A, 37B, 38A, 38B to 38C are views representing assembly operations of an electronic device. According to various embodiments, the electronic device 3400 may include a configuration that is the same as or similar to at least some of the components described above.

Referring to FIG. 34, the outer region of the electronic device 3400 may include a first face 3411 and a second face 3412 that faces a direction opposite to the first face 3411. Alternatively, the outer region of the electronic device 3400 may include a third face 3413 that surrounds a space between the first face 3411 and the second face 3412.

According to an embodiment, the first face 3411 and/or the second face 3412 may be relatively flat as compared with the third face 3413.

According to an embodiment, the third face 3413 may include a first region 3413-1, a second region 3413-2, a third region 3413-3, and a fourth region 3413-4. The first region 3413-1 and the second region 3413-2 may be disposed opposite to each other. The third region 3413-3 and the fourth region 3413-4 may be disposed opposite to each other.

According to an embodiment, at least one of the first region 3413-1, the second region 3413-2, the third region 3413-3, and the fourth region 3413-4 of the third face 3413 may include a flat face or a curved face. For example, the first region 3413-1 and/or the second region 3413-2 may be a flat face. Alternatively, the third region 3413-3 and/or the fourth region 3413-4 may be a curved face.

Electronic device 3400 may include a bracket 3410, a circuit board 3420, a battery pack 3430, a case 3440, a rail 3450, or a display 3460.

Figure 35A:
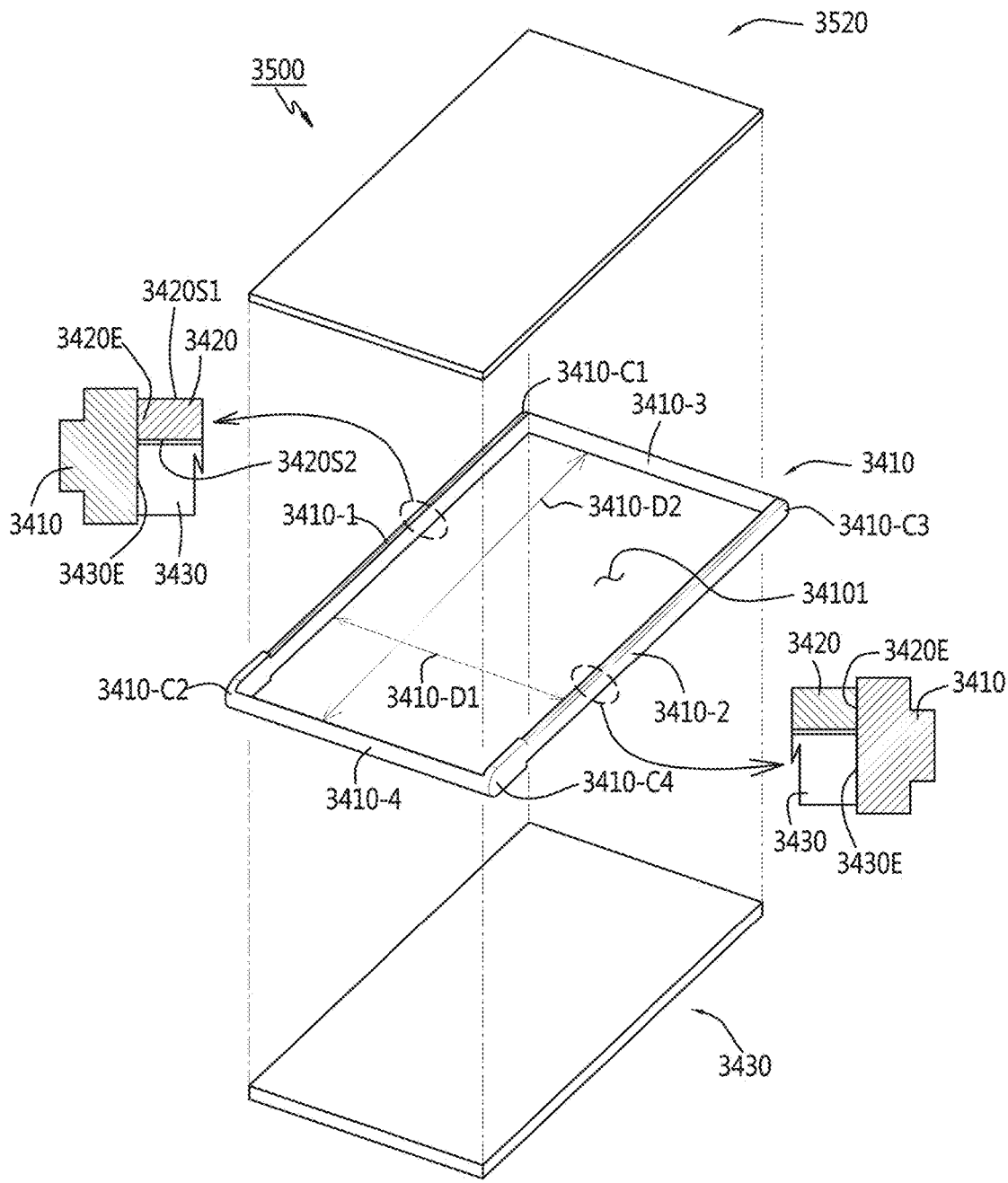
FIGS. 35A, 35B, 35C, 35D, 35E, 36A, 36B, 37A, 37B, 38A, 38B, and 38C are views representing assembly operations of an electronic device according to various embodiments of the present disclosure.
Figure 35B:
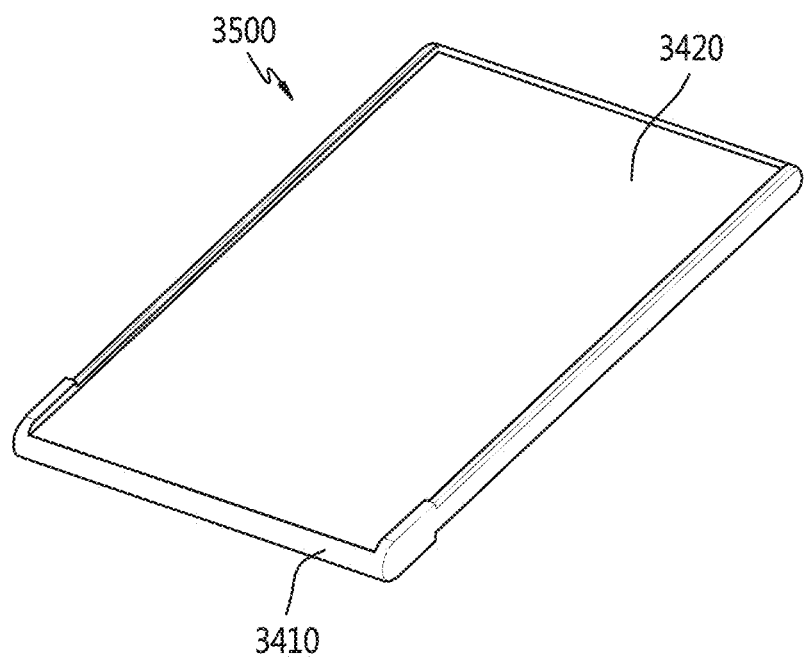

FIGS. 35A and 35B illustrate the assembly of the bracket 3410, the circuit board 3420, and the battery pack 3430 according to various embodiments of the present disclosure.

Hereinafter, a configuration obtained by assembling the bracket 3410, the circuit board 3420, and the battery pack 3430 to each other will be referred to as a first device 3500.

Referring to FIGS. 35A and 35B, the bracket 3410 is a portion where various electronic components may be installed, and is able to impart rigidity to the electronic device 3400. According to an embodiment, the bracket 3410 may have an annular shape. For example, the bracket 3410 may have a substantially rectangular annular shape, including a rectangular hollow portion 34101. The bracket 3410 may include a first frame 3410-1, a second frame 3410-2, a third frame 3410-3, and a fourth frame 3410-4. The frames 3410-1, 3410-2, 3410-3, and 3410-4 may have a substantially linear shape. The first frame 3410-1 and the second frame 3410-2 may be disposed opposite to each other. The third frame 3410-3 and the fourth frame 3410-4 may be disposed opposite to each other. The third frame 3410-3 may connect one end of the first frame 3410-1 and one end of the second frame 3410-2 to each other. The fourth frame 3410-4 may connect the other end of the first frame 3410-1 and the other end of the second frame 3410-2 to each other. The first frame 3410-1 and the second frame 3410-2 may have the substantially same lengths. The third frame 3410-3 and the fourth frame 3410-4 may have the substantially same lengths.

According to an embodiment, the bracket 3410 may have a substantially rectangular shape. For example, a gap 3410-D1 between the first frame 3410-1 and the second frame 3410-2 is larger than a gap 3410-D2 between the third frame 3410-3 and the fourth frame 3410-4.

According to various embodiments, the bracket 3410 may be formed of a metal, such as magnesium (Mg) or Al, or may be formed of a non-metal material, such as plastic.

According to an embodiment, the circuit board 3420 and the battery pack 3430 may be coupled to the bracket 3410.

According to an embodiment, the circuit board 3420 (or a main board, a mother board, a PCB, or a printed board assembly (PBA)) may be a part that constitutes a plurality of electronic components mounted on one side 3420S1 and/or the other side 3420S2, and an electric circuit for interconnecting the electronic components. The circuit board 3420 may set an execution environment of the electronic device 3400, may maintain the information of the electronic device 3400, and may support the data input/out and exchange of the electronic components within the electronic device 400.

According to an embodiment, the circuit board 3420 may be disposed in the rectangular hollow portion 34101 of the bracket 3410. For example, at least a portion of the edge 3420E of the circuit board 3420 may be coupled to the rectangular hollow portion 34101 of the bracket 3410.

According to an embodiment, the circuit board 3420 may have a substantially rectangular plate shape, and may be fitted to the rectangular hollow portion 34101 of the bracket 3410.

The battery pack 3430 can supply power for driving the electronic device 3400. According to an embodiment, the battery pack 3430 may have a substantially rectangular plate shape, and may be fitted to the rectangular hollow portion 34101 of the bracket 3410. For example, at least a portion of the edge 3430E of the battery pack 3430 may be coupled to the rectangular hollow portion 34101 of the bracket 3410.

According to an embodiment, the circuit board 3420 and the battery pack 3430 may be disposed on, and may overlap with, the rectangular hollow portion 34101 or the bracket 3410.

According to various embodiments, the circuit board 3420 may protrude less from the battery pack 3430 relative to the bracket 3410 in a direction toward the circuit board 3420.

According to various embodiments, the circuit board 3420 may protrude less from the circuit board 3420 relative to the bracket 3410 in a direction toward the battery pack 3430.

Figure 35C:
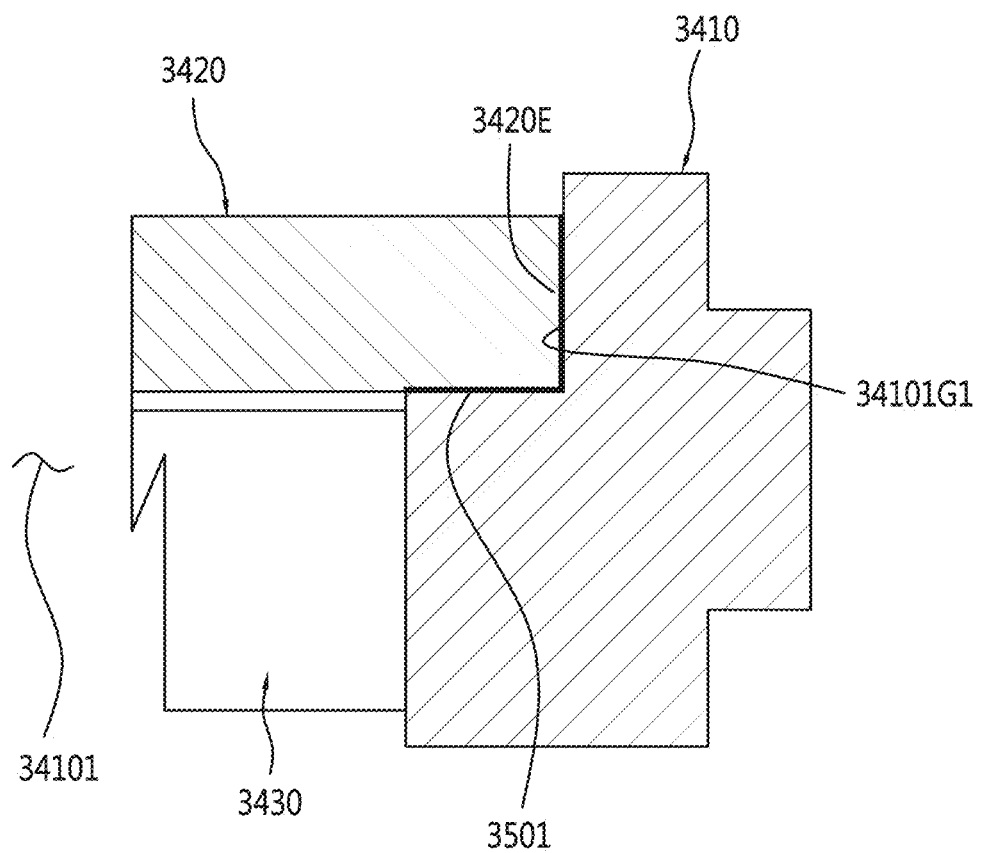
Figure 35D:
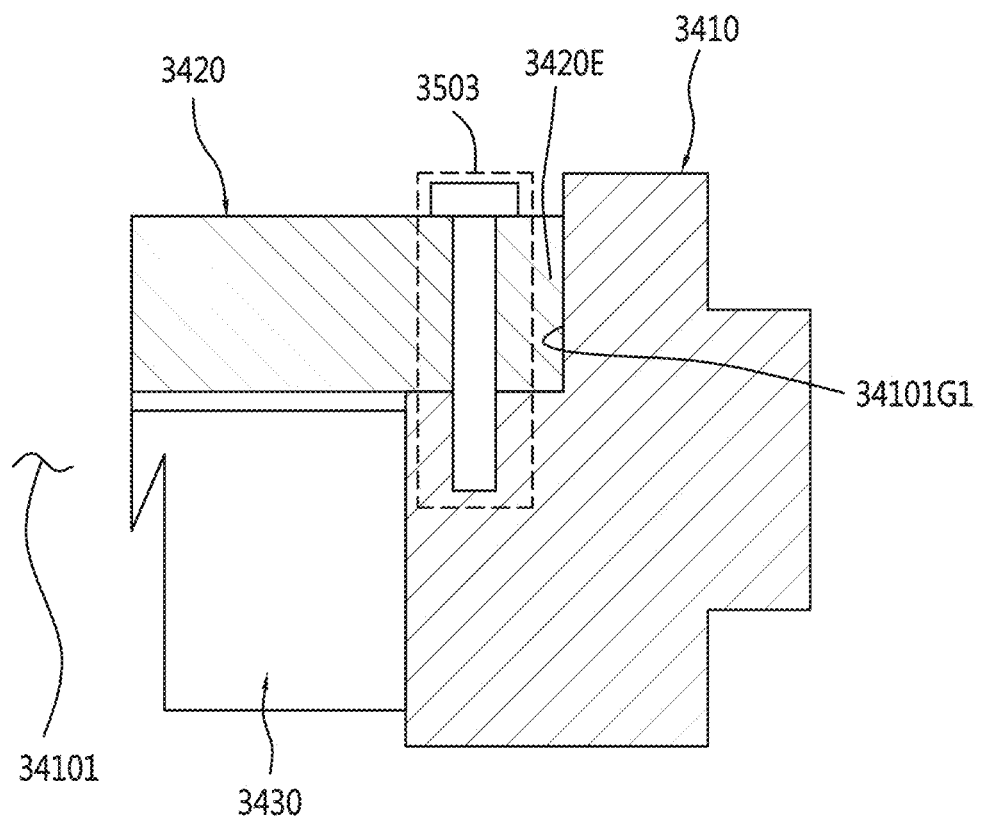
Figure 35E:
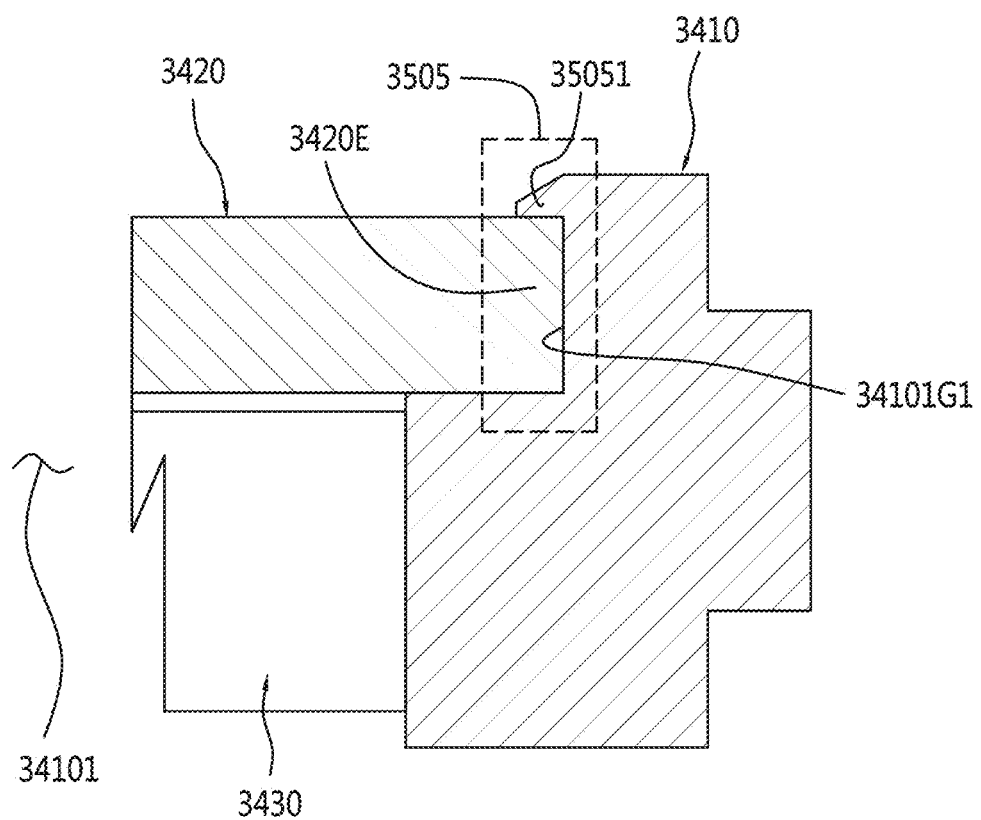

FIGS. 35C to 35E illustrate the assembly structure of the bracket 3410, the circuit board 3420, and the battery pack 3430 according to various embodiments of the present disclosure.

Referring to FIG. 35C, the rectangular hollow portion 34101 of the bracket 3410 may include a circuit board mounting recess 34101G1 on which the circuit board 3420 can be mounted.

According to various embodiments, the circuit board mounting recess 34101G1 may be a recess that is formed in at least a portion of the first frame 3410-1, and is recessed in the direction from the second frame 3410-2 toward the first frame 3410-1. Alternatively, the circuit board mounting recess 34101G1 may be a recess that is formed in at least a portion of the second frame 3410-2, and is recessed in the direction from the first frame 3410-1 toward the second frame 3410-2. Alternatively, the circuit board mounting recess 34101G1 may be a recess that is formed in at least a portion of the third frame 3410-3, and is recessed in the direction from the fourth frame 3410-4 toward the third frame 3410-3. Alternatively, the circuit board mounting recess 34101G1 may be a recess that is formed in at least a portion of the fourth frame 3410-4, and is recessed in the direction from the third frame 3410-3 toward the fourth frame 3410-4.

According to various embodiments, the circuit board mounting recess 34101G1 may be formed in a connecting portion 3410-C1 (see FIG. 35A) between the first frame 3410-1 and the third frame 3410-3. Alternatively, the circuit board mounting recess 34101G1 may be formed in a connecting portion 3410-C2 (see FIG. 35A) between the first frame 3410-1 and the fourth frame 3410-4. Alternatively, the circuit board mounting recess 34101G1 may be formed in a connecting portion 3410-C3 (see FIG. 35A) between the second frame 3410-2 and the third frame 3410-3. Alternatively, the circuit board mounting recess 34101G1 may be formed in a connecting portion 3410-C4 (see FIG. 35A) between the second frame 3410-2 and the fourth frame 3410-4.

According to an embodiment, the edge 3420E of the circuit board 3420 may be fitted to the circuit board mounting recess 34101G1.

According to various embodiments, the edge 3420E of the circuit board 3420 may be coupled to the circuit board mounting recess 34101G1 using various types of coupling means. For example, an adhesive layer 3501 may be disposed between the edge 3420E of the circuit board 3420 and the circuit board mounting recess 34101G1.

Referring to FIG. 35D, the rectangular hollow portion 34101 of the bracket 3410 may include a circuit board mounting recess 34101G2 on which the circuit board 3420 may be mounted. The circuit board mounting recess 34101G2 may be at least partially the same as or similar to the circuit board mounting recess 34101G1 described above with reference to FIG. 35C.

According to an embodiment, the edge 3420E of the circuit board 3420 may be fastened by a bolt 3503 to the circuit board mounting recess 34101G2.

Referring to FIG. 35E, the rectangular hollow portion 34101 of the bracket 3410 may include a circuit board mounting recess 34101G3 on which the circuit board 3420 may be mounted. The circuit board mounting recess 34101G3 may be at least partially the same as or similar to the circuit board mounting recess 34101G1 described above with reference to FIG. 35C.

According to an embodiment, the edge 3420E of the circuit board 3420 may be fastened by a snap-fit 3505 to the circuit board mounting recess 34101G3. For example, the circuit board mounting recess 34101G3 may include a hook 35051. In the operation in which the circuit board 3420 is coupled to the bracket 3410, the hook 35051 is returned to its original position after the elastic bending deformation thereof, and it is possible to prevent the edge 3420E of the circuit board 3420 from being separated from the circuit board mounting recess 34101G3.

According to various other embodiments that are not illustrated, the circuit board 3420 may be coupled to the bracket 3410.

Figure 36A:
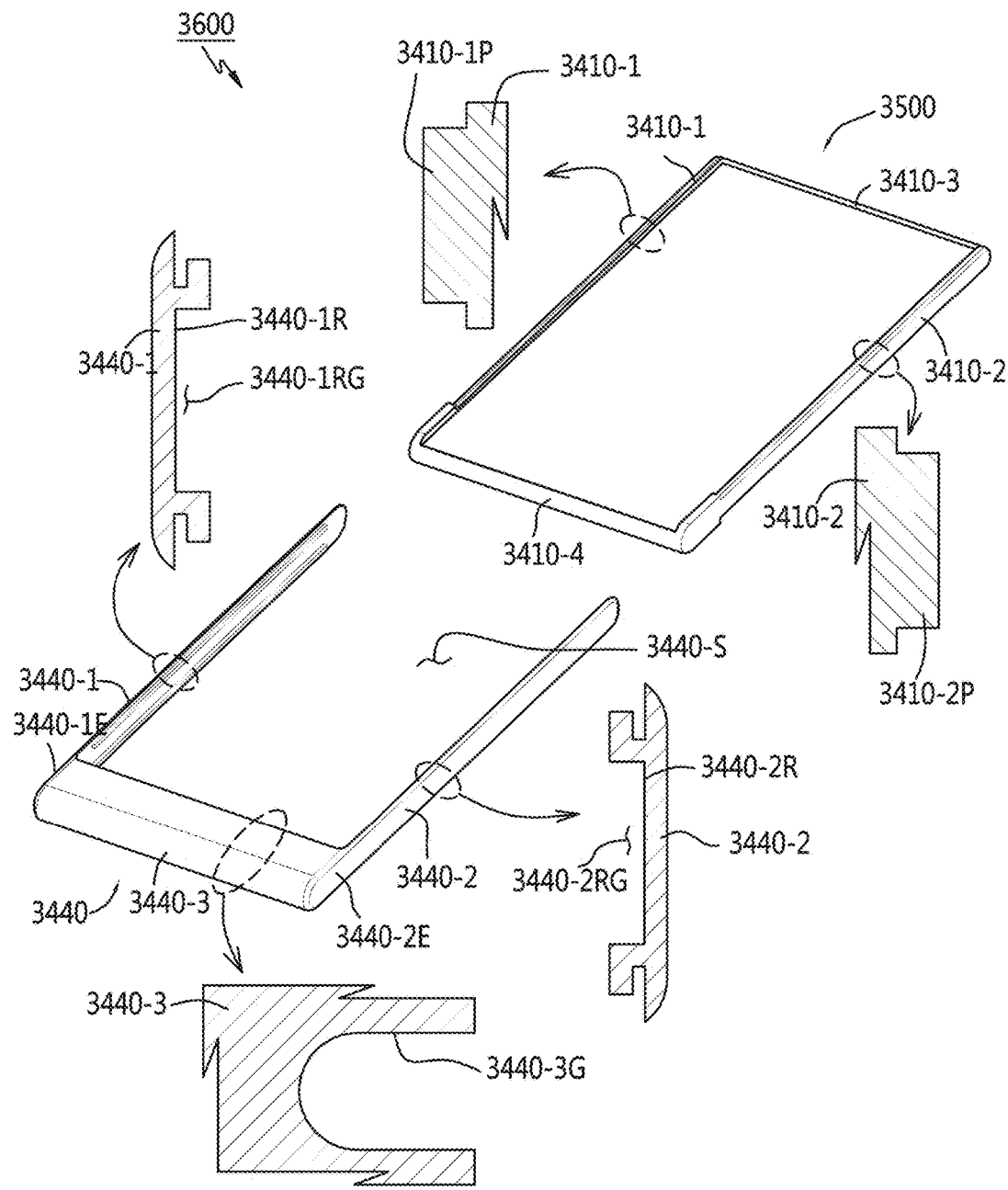
Figure 36B:
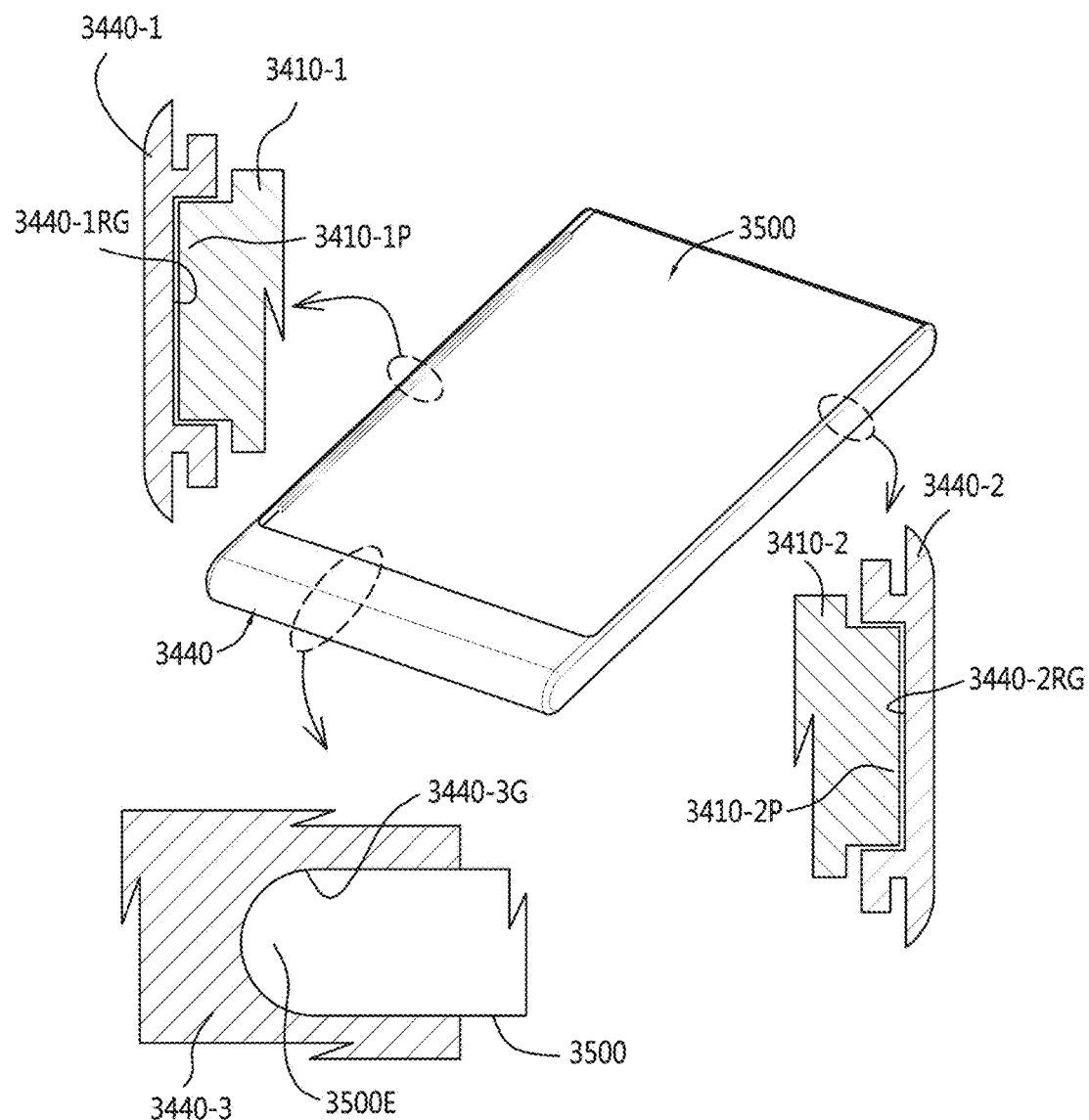

FIGS. 36A and 36B illustrate the assembly of a first device 3500 and a case 3440 according to various embodiments of the present disclosure.

Referring to FIGS. 36A and 36B, the case 3440 may form a part of the outer region of the electronic device 3400. The case 3440 may be coupled to the first device 3500 using various types of coupling means.

According to an embodiment, the case 3440 may include a first case 3440-1 and a second case 3440-2 disposed opposite to each other. The first case 3440-1 and the second case 3440-2 may have a substantially linear shape, and may be symmetrical to each other. The first case 3440-1 may form a first region 3413-1 of the third face 3413 of the electronic device 3400. Alternatively, the second case 3440-2 may form a second region 3413-2 of the third face 3413 of the electronic device 3400.

According to an embodiment, the case 3440 may include a third case 3440-3 that connects one end 3440-1E of the first case 3440-1 and one end 3440-2E of the second case 3440-2 to each other. The third case 3440-3 may form a fourth region 3413-4 of the third face 3413 of the electronic device 3400. Alternatively, the third case 3440-3 may form a portion of the first face 3411 of the electronic device 3400.

According to an embodiment, when viewed in a direction from the first face 3411 toward the second face 3412 of the electronic device 3400, the case 3440 may be have a substantially "U" shape.

According to an embodiment, the first case 3440-1 may include a first rail portion 3440-1R formed on a face facing the second case 3440-2. When viewed in a cross section, the first rail portion 3440-1R may include a recess 3440-1RG in the form of being recessed in the direction from the second case 3440-2 toward the first case 3440-1. The recess 3440-1RG may be in the form of extending in the direction from the third region 3413-3 toward the fourth region 3413-4 of the third face 3413 of the electronic device 3400.

According to an embodiment, the second case 3440-2 may include a second rail portion 3440-2R formed on a face that faces the first case 3440-1. When viewed in a cross section, the second rail portion 3440-2R may include a recess 3440-2RG in the form of being recessed in the direction from the first case 3440-1 toward the second case 3440-2. The recess 3440-2RG may be in the form of extending in the direction from the third region 3413-3 toward the fourth region 3413-4 of the third face 3413 of the electronic device 3400.

According to an embodiment, the first device 3500 may be fitted to a space 3440-S defined by the first case 3440-1, the second case 3440-2, and the third case 3440-3 of the case 3440. For example, the first device 3500 may be slid into the space 3440-S by being guided by the first rail portion 3440-1R of the first case 3440-1 and the second rail portion 3440-2R of the second case 3440-2 of the case 3440.

According to an embodiment, the first frame 3410-1 of the bracket 3410 of the first device 3500 may include a first slider 3410-1P, which may be coupled to the recess 3440-1RG of the first rail portion 3440-1R. When viewed in a cross section, the first slider 3410-1P may have a shape that protrudes more than the peripheral region in the direction from the second frame 3410-2 toward the first frame 3410-1. Alternatively, the first slider 3410-1P may be formed to extend in the direction from the third frame 3410-3 to the fourth frame 3410-4.

According to an embodiment, the second frame 3410-2 of the bracket 3410 of the first device 3500 may include a second slider 3410-2P, which may be coupled to the recess 3440-2RG of the second rail portion 3440-2R. When viewed in a cross section, the second slider 3410-2P may have a shape that protrudes more than the peripheral region in the direction from the first frame 3410-1 toward the second frame 3410-2. Alternatively, the second slider 3410-2P may be formed to extend in the direction from the third frame 3410-3 to the fourth frame 3410-4.

According to an embodiment, the first slider 3410-1P of the first device 3500 may be fitted to the first rail portion 3440-1R of the case 3440 so as to make the first device 3500 slidable in the case 3440 in the direction from the third frame 3410-3 toward the fourth frame 3410-4 or in the direction from the fourth frame 3410-4 toward the third frame 3410-3. According to an embodiment, the second slider 3410-2P of the first device 3500 may be fitted to the second rail portion 3440-2R of the case 3440 so as to make the first device 3500 slidable in the case 3440 in the direction from the third frame 3410-3 toward the fourth frame 3410-4 or in the direction from the fourth frame 3410-4 toward the third frame 3410-3.

According to various embodiments, the third case 3440-3 of the case 3440 may include a recess 3440-3G that is recessed in a direction in which the first device 3500 is slid to be coupled to the case 3440. For example, when the first device 3500 is coupled to the case 3440, the edge portion 3500E of the first device 3500 may be fitted into the recess 3440-3G of the case 3440.

Hereinafter, a configuration in which the first device 3500 and the case 3440 are assembled to each other will be referred to as a second device 3600.

Figure 37A:
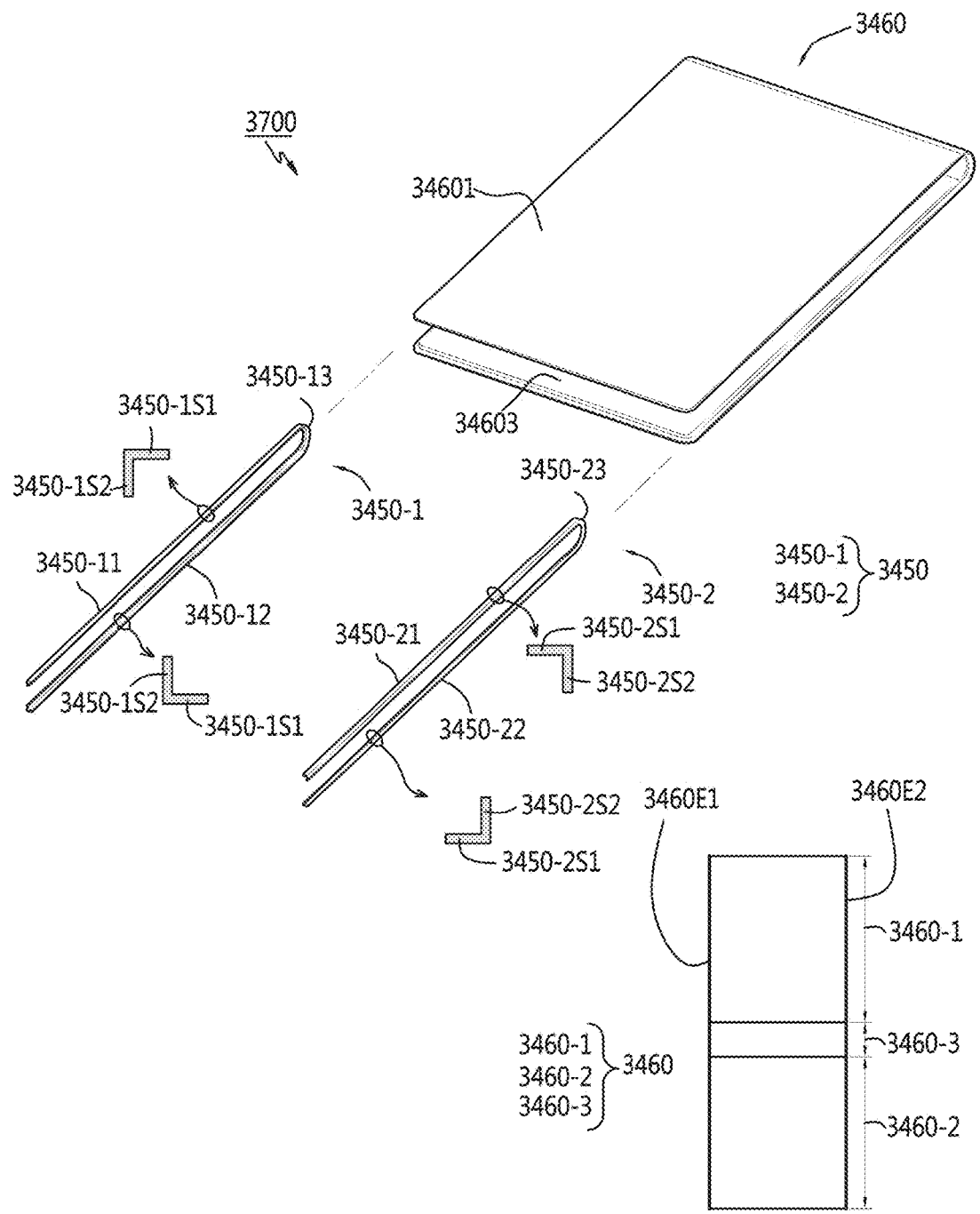
Figure 37B:
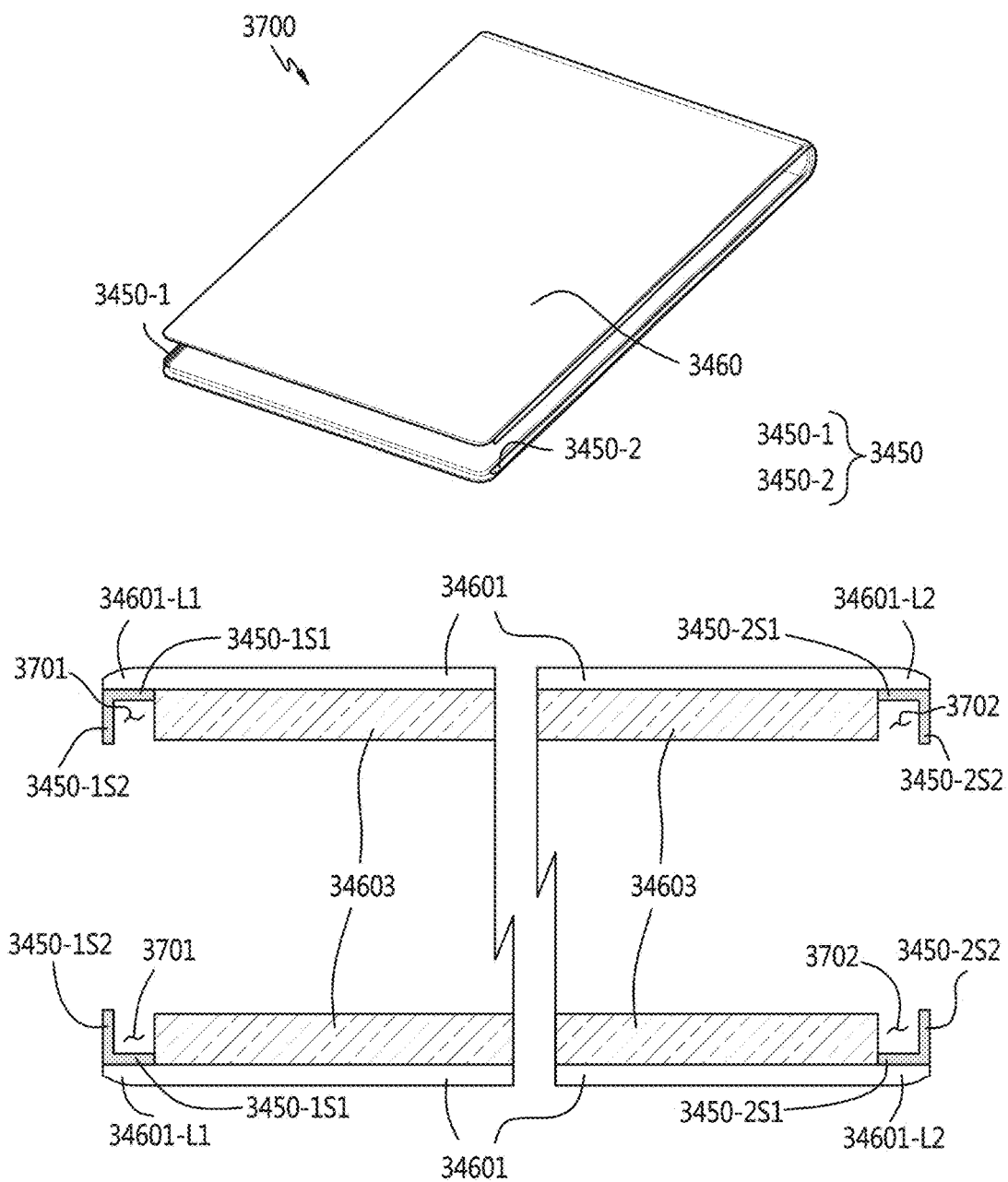

FIGS. 37A and 37B illustrate the assembly of the rail 3450 and display 3460 according to an embodiment of the present disclosure.

Referring to FIGS. 37A and 37B, the rail 3450 may include a first rail 3450-1 and a second rail 3450-2. When viewed in the direction from the first region 3413-1 toward the second region 3413-2 of the third face 3413 of the electronic device 3400, the first rail 3450-1 may be substantially "U" shaped. For example, the first rail 3450-1 may include a first linear portion 3450-11, a second linear portion 3450-12, and a connecting portion 3450-13. The first linear portion 3450-11 and the second linear portion 3450-12 may be disposed opposite to each other. The connecting portion 3450-13 may connect one end of the first linear portion 3450-11 and one end of the second linear portion 3450-12 to each other. Alternatively, the connecting portion 3450-13 may have a curved shape.

According to an embodiment, the second rail 3450-2 may be separated from the first rail 3450-1, and may be disposed opposite to the first rail 3450-1. The second rail 3450-2 may have a shape symmetrical to that of the first rail 3450-1. For example, the second rail 3450-2 may include a first linear portion 3450-21, a second linear portion 3450-22, and a connecting portion 3450-23, which correspond to the first linear portion 3450-11, the second linear portion 3450-12, and the connecting portion 3450-13 of the first rail 3450-1, respectively.

According to an embodiment, when viewed in a cross section, the first rail 3450-1 may be substantially "L" shaped. For example, the first rail 3450-1 may include a coupling portion 3450-1S1 and an extension portion 3450-1S2. The coupling portion 3450-1S1 may be a portion that is coupled to the display 3460. The extension portion 3450-1S2 may be a portion that extends from one end of the coupling portion 3450-1S1 and forms an angle (e.g., 90 degrees) with the coupling portion 3450-1S1. The second rail 3450-2 may include a coupling portion 3450-2S1 and an extension portion 3450-2S2 that are similar to the coupling portion 3450-1S1 and the extension portion 3450-1S2 of the first rail 3450-1, respectively.

The display 3460 may include a window 34601 and a panel 34603.

The window 34601 may cover the panel 34603, and may form an outer region of the electronic device 3400. Light generated in the panel 34603 may be discharged to the outside through the window 34601. Alternatively, the window 34601 may protect the panel 34603 from an external impact.

According to an embodiment, an adhesive layer (not illustrated) having a light transmittance may be disposed between the window 34601 and the panel 34603.

The panel 34603 may include a display panel for outputting an image in response to a signal provided from a control circuit (not illustrated) mounted on the circuit board 3420.

According to various embodiments, the panel 34603 may include a touch panel for supporting a touch input or a hovering input. For example, the touch panel may be disposed between the window 34601 and the display panel. Alternatively, the display panel may be disposed between the window 34601 and the touch panel. When a user's finger or an electronic pen touches the window 34601, the touch input may be triggered by the display 3460. Alternatively, when the user's finger or the electronic pen is spaced apart from the window 34601 but within a critical distance, a hovering input may be triggered by the display 3460. The touch panel has a light transmittance, and light generated from the display panel may be transmitted to the window 34601 through the touch panel. According to various embodiments, the touch panel may include a first conductive pattern that has been described above with reference to FIGS. 4A and 4B, and FIGS. 5 to 12.

According to an embodiment, the window 34601 may have a width that is larger than that of the panel 34603. For example, the window 34601 may include a first lip 34601-L1 that protrudes more than the panel 34603 in a direction from the second region 3413-2 toward the first region 3413-1 of the third face 3413 of the electronic device 3400. The window 34601 may include a second lip 34601-L2 that protrudes more than the panel 34603 in a direction from the first region 3413-1 toward the second region 3413-2 of the third face 3413 of the electronic device 3400. The first lip 34601-L1 and the second lip 34601-L2 may be disposed to be opposite to each other, and may be symmetrical to each other.

According to an embodiment, the coupling portion 3450-1S1 of the first rail 3450-1 may be coupled to the first lip 34601-L1 of the window 34601. The coupling portion 3450-2S1 of the second rail 3450-2 may be coupled to the second lip 34601-L2 of the window 34601. For example, the first rail 3450-1 and the second rail 3450-2 may be coupled to the window 34601 using various coupling means (e.g., adhesive).

According to an embodiment, when the coupling portion 3450-1S1 of the first rail 3450-1 is coupled to the first lip 34601-L1 of the window 34601, a first space 3701 may be formed between the extension portion 3450-1S2 of the first rail 3450-1 and the panel 34603. For example, when viewed in the direction from the first region 3413-1 toward the second region 3413-2 of the third face 3413 of the electronic device 3400, the first space 3701 may have a substantially "U" shape following the shape of the first rail 3450-1.

According to an embodiment, when the coupling portion 3450-2S1 of the second rail 3450-2 is coupled to the second lip 34601-L2 of the window 34601, a second space 3702 may be formed between the extension portion 3450-2S2 of the second rail 3450-2 and the panel 34603. For example, when viewed in the direction from the second region 3413-2 toward the first region 3413-1 of the third face 3413 of the electronic device 3400, the second space 3702 may have a substantially "U" shape following the shape of the second rail 3450-2.

According to an embodiment, when unfolded and viewed in a plan view, the display 3460 may have a substantially rectangular shape. The display 3460 may include a first end 3460E1 and a second end 3460E2 that are disposed opposite each other. The first end 3460E1 may be coupled to the coupling portion 3450-1S1 of the first rail 3450-1 along the first rail 3450-1. The second end 3460E2 may be coupled to the coupling portion 3450-2S1 of the second rail 3450-2 along the second rail 3450-2.

According to an embodiment, the display 3460 may be flexible, and may be deformed in an operation of being coupled to the rails 3450-1 and 3450-2.

According to another embodiment, the display 3460 may be performed and provided in a form that is capable of being coupled to the rails 3450-1 and 3450-2.

According to an embodiment, the display 3460 may include a first display region 3460-1, a second display region 3460-2, and a third display region 3460-3. The third display region 3460-3 may connect the first display region 3460-1 and the second display region 3460-2 to each other. When unfolded and viewed in a plan view, the first display region 3460-1, the second display region 3460-2, or the third display region 3460-3 may have a rectangular shape.

According to an embodiment, the first display region 3460-1 may be coupled to the first linear portion 3450-11 of the first rail 3450-1 and the first linear portion 3450-21 of the second rail 3450-2. The first display region 3460-1 may form at least a portion of the first face 3411 of the electronic device 3400.

According to an embodiment, the second display region 3460-2 may be coupled to the first linear portion 3450-11 of the first rail 3450-1 and the second linear portion 3450-22 of the second rail 3450-2. The second display region 3460-2 may form at least a portion of the second face 3412 of the electronic device 3400.

According to an embodiment, the third display region 3460-3 may be coupled to the connecting portion 3450-13 of the first rail 3450-1 and the connecting portion 3450-23 of the second rail 3450-2. The third display region 3460-3 may form a portion (e.g., the third region 3413-3) of the third face 3413 of the electronic device 3400.

According to various embodiments, the display 3460 may include at least one optical layer (not illustrated). For example, the optical layer may include a polarizing layer. Alternatively, the optical layer may comprise a phase difference layer.

According to various embodiments, a conductive pattern that supports a touch input or a hovering input may form one face of the display 3460. For example, the conductive pattern may have a configuration disposed in an on-cell region of the display 3460. According to an embodiment, the display 3460 may include an AMOLED integrated touch screen (OCTA).

According to various embodiments, the conductive pattern that supports a touch input or a hovering input may be disposed inside the display 3460. For example, the conductive pattern may be disposed in an in-cell region of the display 3460.

According to an embodiment, the display 3460 may include a first conductive layer (not illustrated) disposed between the window 34601 and the panel 34603.

According to an embodiment, the first conductive layer may have a light transmittance. For example, the first conductive layer may include a conductive pattern including openings. The light generated from the panel 34603 may be transmitted through the openings of the conductive pattern to be transferred to the window 34601.

According to an embodiment, the first conductive layer may include a metal mesh pattern.

According to an embodiment, the first conductive layer may be electrically connected to a communication circuit mounted on the circuit board 3420. The first conductive pattern may be used as an antenna radiator that supports various types of communication. According to various embodiments, the first conductive layer may include a second conductive pattern that has been described above with reference to FIGS. 4A and 4B, and FIGS. 5 to 12.

According to various embodiments, the display 3460 may include a second conductive layer (not illustrated) disposed on the panel 34603, or disposed inside the panel 34603.

According to an embodiment, the second conductive layer may have a light transmittance. For example, the second conductive layer may include a conductive pattern including openings. The conductive pattern may be disposed in a non-pixel region outside a plurality of pixel regions of the panel 34603. The conductive pattern of the second conductive layer does not overlap with the plurality of pixel regions of the panel 34603, and each pixel region of the panel 34603 may be disposed within an opening of the second conductive layer. The light generated from the pixel regions of the panel 34603 may travel to the window 34601 without being disturbed by the conductive pattern of the second conductive layer.

According to an embodiment, the second conductive layer may include a metal mesh pattern.

According to an embodiment, the second conductive layer may be electrically connected to a communication circuit mounted on the circuit board 3420. The second conductive layer may be used as an antenna radiator that supports various types of communication. According to various embodiments, the second conductive layer may include a third conductive pattern that has been described above with reference to FIGS. 4A and 4B, and FIGS. 5 to 12.

According to an embodiment, in order to reduce antenna performance degradation, a portion of the first conductive layer and/or the second conductive layer may have a shape different from that of another portion. As described above, the first conductive layer and/or the second conductive layer may include a metal mesh pattern. For example, a part of the metal mesh pattern disposed to correspond to the third face 3413 may have a rectangular mesh shape, and another of the metal mesh pattern disposed to correspond to the first face 3411 and/or the second face 3412 may have a shape that is different from the rectangular mesh shape.

According to an embodiment, in order to reduce antenna performance degradation, a portion of the first conductive layer and/or the second conductive layer (e.g., a portion disposed to correspond to the third face 3413) may have a mesh size that is different from that of another portion.

According to an embodiment, in order to reduce antenna performance degradation, a portion of the first conductive layer and/or the second conductive layer (e.g., a portion disposed to correspond to the third face 3413) may have a pattern thickness that is different from that of another portion.

Hereinafter, a configuration in which the rail 3450 and the display 3460 are assembled to each other will be referred to as a third device 3700.

Figure 38A:
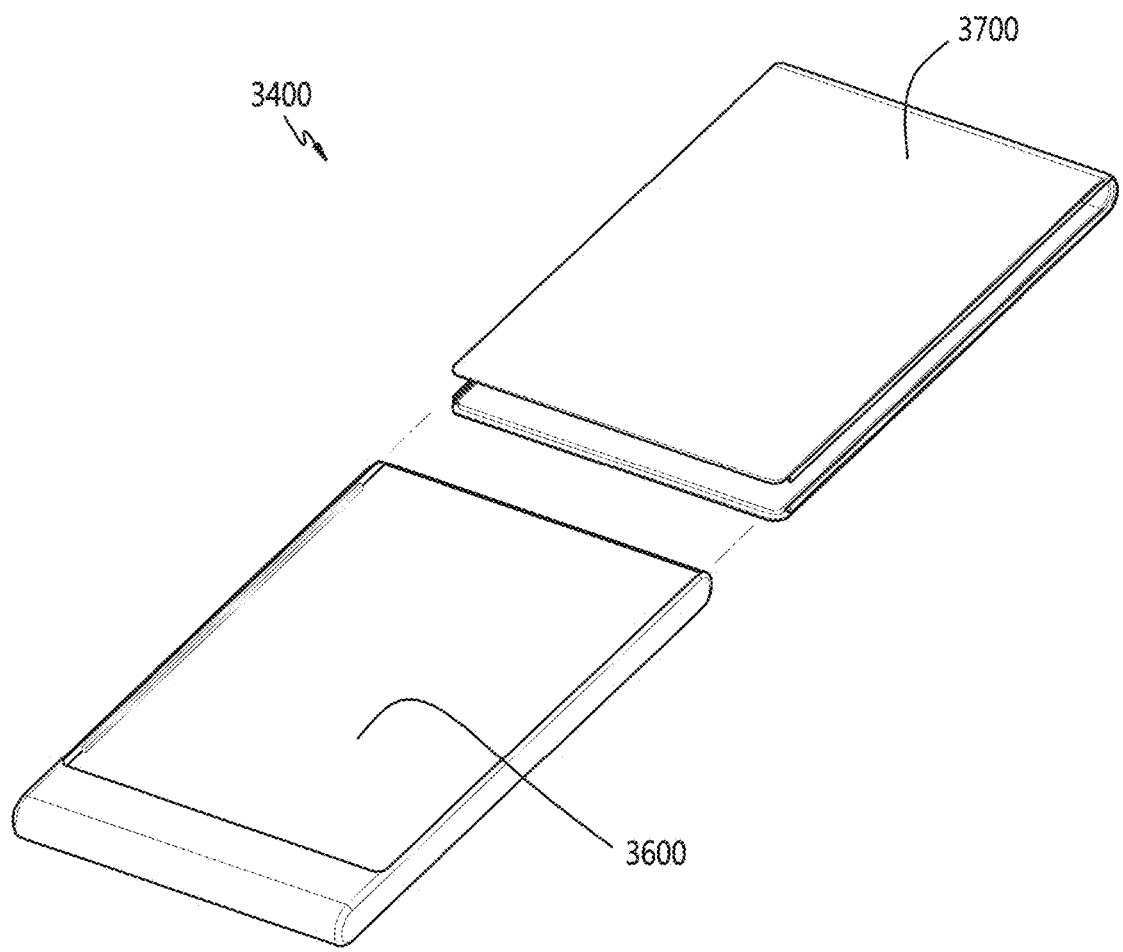
Figure 38B:
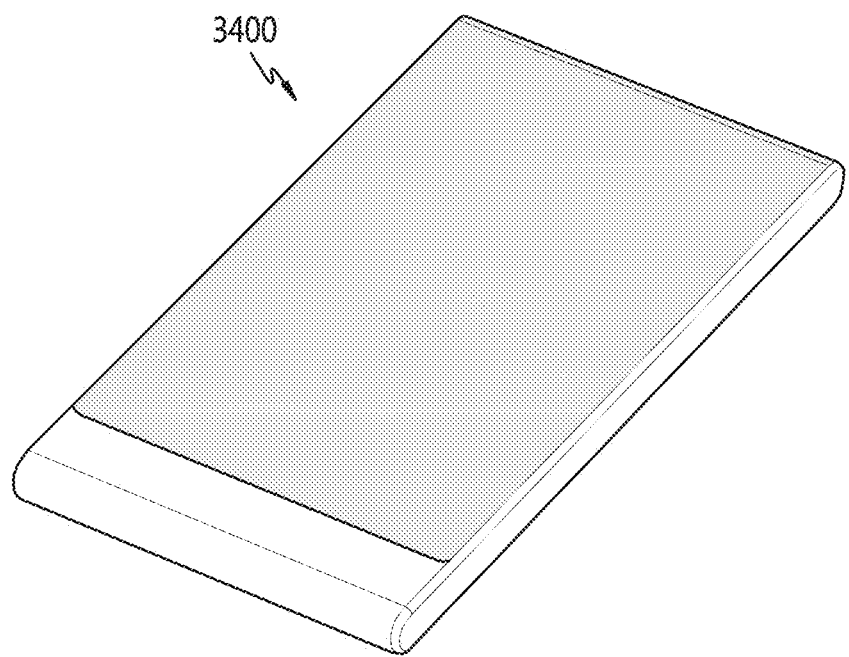

FIGS. 38A and 38B illustrate the assembly of the second device 3600 and the third device 3700 according to various embodiments of the present disclosure.

Figure 38C:
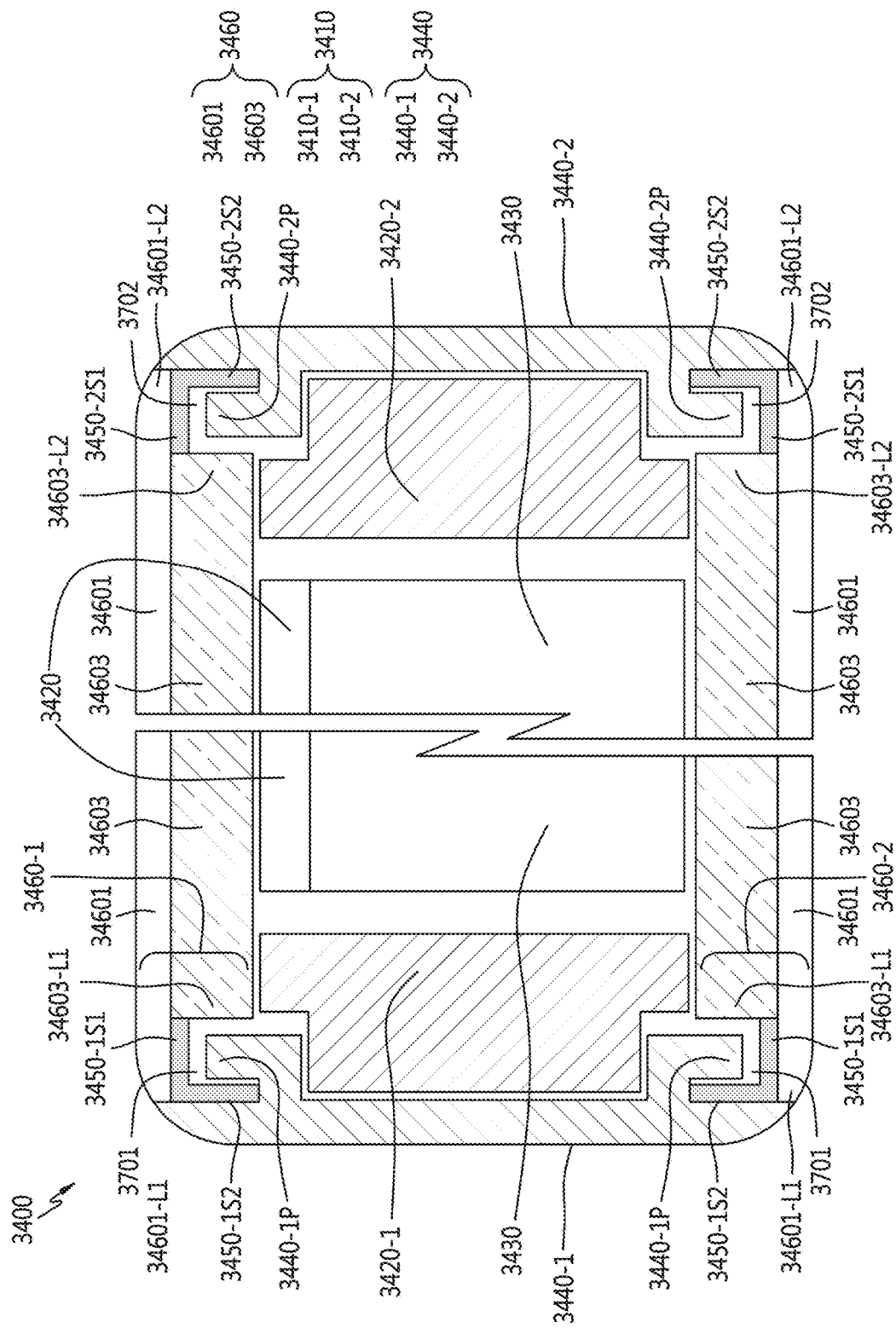

FIG. 38C is a cross-sectional view illustrating an electronic device 3400 according to an embodiment of the present disclosure. When the second device 3600 and the third device 3700 are assembled to each other, the electronic device 3400 may be provided.

Referring to FIGS. 38A and 38B, the third device 3700 may be slid to be coupled to the second device 3600.

As described above, due to the coupling of the coupling portion 3450-1S1 of the first rail 3450-1 and the first lip 34601-L1 of the window 34601, the third device 3700 may include a substantially U-shaped first space 3701 disposed between the extension portion 3450-1S2 of the first rail 3450-1 and the panel 34603. Due to the coupling of the coupling portion 3450-2S1 of the second rail 3450-2 and the second lip 34601-L2 of the window 34601, the third device 3700 may include the substantially U-shaped second space 3702 disposed between the extension portion 3450-2S2 of the second rail 3450-2 and the panel 34603.

According to an embodiment, when viewed in a cross section, the first case 3440-1 of the case 3440 of the second device 3600 may include a first extension portion 3440-1P that is fitted to the first space 3701 of the third device 3700. When viewed in the direction from the first region 3413-1 toward the second region 3413-2 of the third face 3413 of the electronic device 3400, the first extension portion 3440-1P may have a substantially "U" shape following the shape of the first rail 3450-1.

According to an embodiment, when viewed in a cross section, the second case 3440-2 of the case 3440 of the second device 3600 may include a second extension portion 3440-2P that is fitted to the second space 3702 of the third device 3700. When viewed in the direction from the second region 3413-2 toward the first region 3413-1 of the third face 3413 of the electronic device 3400, the second extension portion 3440-2P may have a substantially "U" shape following the shape of the second rail 3450-2 of the second device 3600.

According to an embodiment, when the second device 3600 and the third device 3700 are coupled to each other, the circuit board 3420 and the battery pack 3430 may be disposed in a space defined by the first display region 3460-1, the second display region 3460-2, and the third display region 3460-3 of the display 3460.

According to an embodiment, when the second device 3600 and the third device 3700 are coupled, the window 34601 may be smoothly connected to the first case 3440-1 and the second case 3440-2 of the case 3440

Referring to FIG. 38C, the panel 34603 may have a larger width than that of the circuit board 3420. For example, the panel 34603 may include a first lip 34603-L1 that protrudes more than the circuit board 3420 in a direction from the second region 3413-2 toward the first region 3413-1 of the third face 3413 of the electronic device 3400. The panel 34603 may include a second lip 34603-L2 that protrudes more than the circuit board 3420 in a direction from the first region 3413-1 toward the second region 3413-2 of the third face 3413 of the electronic device 3400. The first lip 34603-L1 and the second lip 34603-L2 may be disposed opposite to each other, and may be symmetrical to each other.

According to an embodiment, the first lip 34603-L1 of the panel 34603 may extend to cover a portion of the first frame 3410-1 of the bracket 3410. The second lip 34603-L2 of the panel 34603 may extend to cover a portion of the second frame 3410-2 of the bracket 3410.

According to various embodiments, the third device 3700 may be detached from the electronic device 3400, and the battery pack 3430 may be replaced from the second device 3600.

FIGS. 39 to 42 are views each illustrating an electronic device according to various embodiments of the present disclosure. The electronic device may include a configuration that is the same as or similar to at least some of the components described above.

Referring to FIG. 39, a housing 3910 of the electronic device 3900 may include a first face 3911 and a second face 3912 that faces a direction opposite to the first face 3911. Alternatively, the outer region of the electronic device 3900 may include a third face 3913 that surrounds a space between the first face 3911 and the second face 3912. The third face 3913 may include a first region 3913-1, a second region 3913-2, a third region 3913-3, and a fourth region 3913-4. The first region 3913-1 and the second region 3913-2 may be disposed opposite to each other. The third region 3913-3 and the fourth region 3913-4 may be disposed opposite to each other.

According to an embodiment, the electronic device 3900 may include optical devices (e.g., a camera, a flash, and a sensor) 39321 mounted therein. The optical devices 39321 may be exposed through the second face 3912.

According to an embodiment, the electronic device 3900 may include one display 3960 that is not physically separated. One display 3960 may be disposed along at least a portion of one or more of the first face 3911, the second face 3912, and the third face 3913 of the electronic device 3900. For example, when unfolded and viewed in a plan view, the one display 3960 may have a substantially rectangular shape, and may include a first display region 3960-1, a second display region 3960-2, and a third display region 3960-3. The third display region 3960-3 may connect the first display region 3960-1 and the second display region 3960-2 to each other. The first display region 3960-1 may be exposed through at least a portion of the first face 3911 of the electronic device 3900. The second display region 3960-2 may be exposed through at least a portion of the second face 3912. The third display region 3960-3 may be exposed through the third region 3913-3 of the third face 3913.

According to an embodiment, the one display 3960 may include a through-hole or transparent region 3932 provided through the second face 3912. The optical devices 39321 may be disposed to correspond to the through hole or transparent region 3932, and is able to receive light from the outside or to transmit the light to the outside through the through hole or the transparent region 3932.

According to an embodiment, the electronic device 3900 may include one DDI (not illustrated) for supporting the driving of the one display 3960.

According to another embodiment, the electronic device 3900 may include two or more DDIs (not illustrated) for supporting the driving of the one display 3960. For example, the one display 3960 may include a plurality of display regions. Each of the plurality of DDIs may individually support the driving of each of the plurality of display regions. The plurality of display regions may include the first display region 3960-1, the second display region 3960-2, and the third display region 3960-3 as described above. Alternatively, without being limited to this, one of the plurality of display regions may be disposed on a plurality of different surfaces. For example, one of the plurality of display regions may be disposed on at least two of the first face 3911, the second face 3912, and the third face 3913.

Figure 40:
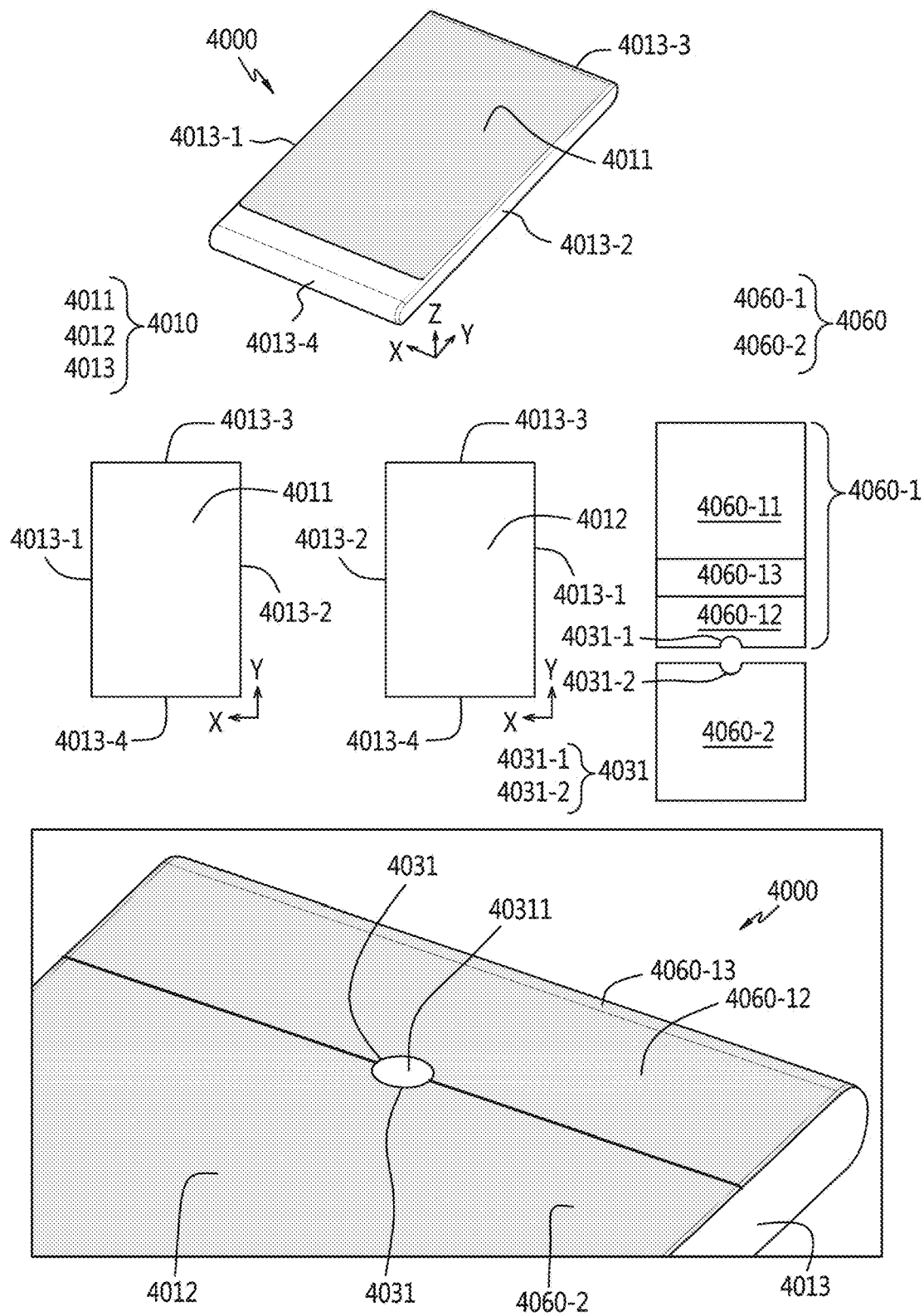

Referring to FIG. 40, a housing 4010 of the electronic device 4000 may include a first face 4011 and a second face 4012 that faces a direction opposite to the first face 4011. Alternatively, the outer region of the electronic device 4000 may include a third face 4013 that surrounds a space between the first face 4011 and the second face 4012. The third face 4013 may include a first region 4013-1, a second region 4013-2, a third region 4013-3, and a fourth region 4013-4. The first region 4013-1 and the second region 4013-2 may be disposed opposite to each other. The third region 4013-3 and the fourth region 4013-4 may be disposed opposite to each other.

According to an embodiment, the electronic device 4000 may include a plurality of displays 4060 that are physically separated from each other. For example, the plurality of displays may include a first display 4060-1 and a second display 4060-2.

According to an embodiment, when unfolded and viewed in a plan view, the first display 4060-1 may have a substantially rectangular shape. The first display 4060-1 may include a first display region 4060-11, a second display region 4060-12, and a third display region 4060-13. The third display region 4060-13 may connect the first display region 4060-11 and the second display region 4060-12 to each other. The first display region 4060-11 may be exposed through the first face 4011. The second display region 4060-12 may be exposed through the second face 4012. The third display region 4060-13 may be exposed through the third region 4013-3 of the third face 4013.

According to an embodiment, when unfolded and viewed in a plan view, the second display 4060-2 may have a substantially rectangular shape. The second display 4060-2 may be exposed through the second face 4012 together with the second display region 4060-12 of the first display 4060-1.

According to an embodiment, the second display region 4060-12 of the first display 4060-1 may be disposed adjacent to the second display 4060-2. For example, the edge 4060-12E of the second display region 4060-12 of the first display 4060-1 and the edge 4060-2E of the second display 4060-2 may be disposed close to each other, and the first display 4060-1 and the second display 4060-2 may be seen as one display.

According to an embodiment, the electronic device 4000 may include optical devices (e.g., a camera, a flash, and a sensor) 40311 mounted therein. The optical devices 40311 may be exposed through the second face 4012.

According to an embodiment, due to the coupling of a portion 4031-1 of the edge 4060-12E of the second display region 4060-12 of the first display 4060-1 and a portion 4031-2 of the edge 4060-2E of the second display 4060-2, a through hole or a transparent region 4031 surrounded by the display region may be formed. The optical devices 40311 may be disposed to correspond to the through hole or transparent region 4031, and is able to receive light from the outside or to transmit the light to the outside through the through hole or the transparent region 4031.

According to an embodiment, the electronic device 4000 may include a first DDI (not illustrated) for supporting the driving of the first display 4060-1 and a second DDI (not illustrated) for supporting the driving of the second display 4060-2.

Figure 41:
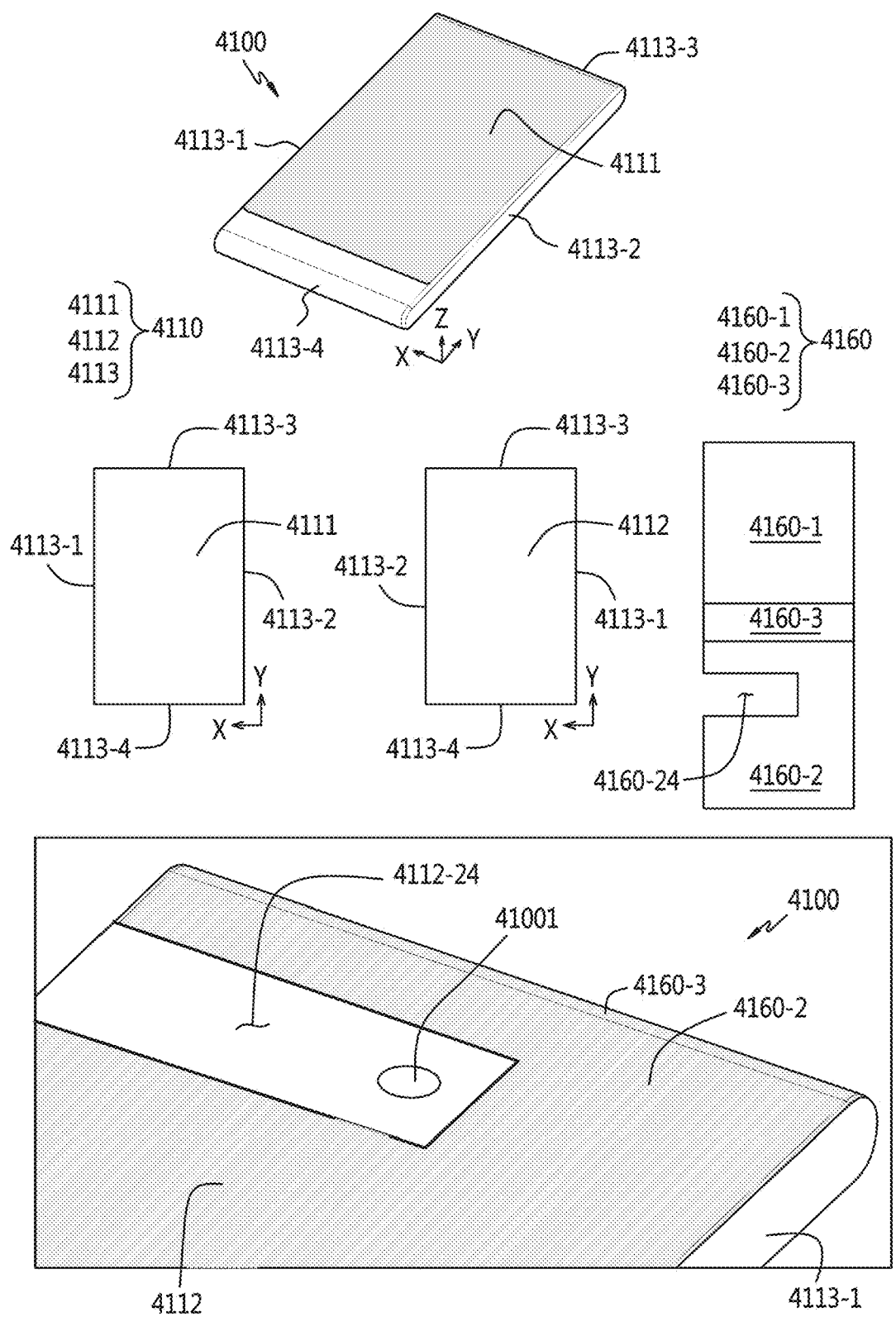

Referring to FIG. 41, a housing 4110 of the electronic device 4100 may include a first face 4111 and a second face 4112 that faces a direction opposite to the first face 4111. Alternatively, the outer region of the electronic device 4100 may include a third face 4113 that surrounds a space between the first face 4111 and the second face 4112. The third face 4113 may include a first region 4113-1, a second region 4113-2, a third region 4113-3, and a fourth region 4113-4. The first region 4113-1 and the second region 4113-2 may be disposed opposite to each other. The third region 4113-3 and the fourth region 4113-4 may be disposed opposite to each other.

According to an embodiment, the electronic device 4100 may include one display 4160 that is not physically separated. One display 4160 may be disposed along at least a portion of one or more of the first face 4111, the second face 4112, and the third face 4113 of the electronic device 4100. For example, when viewed in a plan view, the one display 4160 may include a first display region 4160-1, a second display region 4160-2, and a third display region 4160-3. The third display region 4160-3 may connect the first display region 4160-1 and the second display region 4160-2 to each other. The first display region 4160-1 may be exposed through at least a portion of the first face 4111 of the electronic device 4100. The second display region 4160-2 may be exposed through at least a portion of the second face 4112. The third display region 4160-3 may be exposed through the third region 4113-3 of the third face 4113.

According to an embodiment, the second display region 4160-2 of the display 4160 may include an opening 4160-24. For example, the second display region 4160-2 may have a substantially "U" shape, and the opening 4160-24 may be an empty space surrounded by the display region of the "U" shape. For example, the opening 4160-24 may have a substantially rectangular shape. The second face 4112 of the electronic device 4100 may include a cover region 4112-24 exposed through the opening 4160-24 of the display 4160.

According to an embodiment, the electronic device 4100 may include optical devices (e.g., a camera, a flash, and a sensor) 41001 mounted therein. The optical devices 41001 may be exposed through the second face 4112. For example, the optical devices 41001 may be coupled to the cover region 4112-24.

According to an embodiment, the electronic device 4100 may include one DDI (not illustrated) for supporting the driving of the one display 4160.

Figure 42:
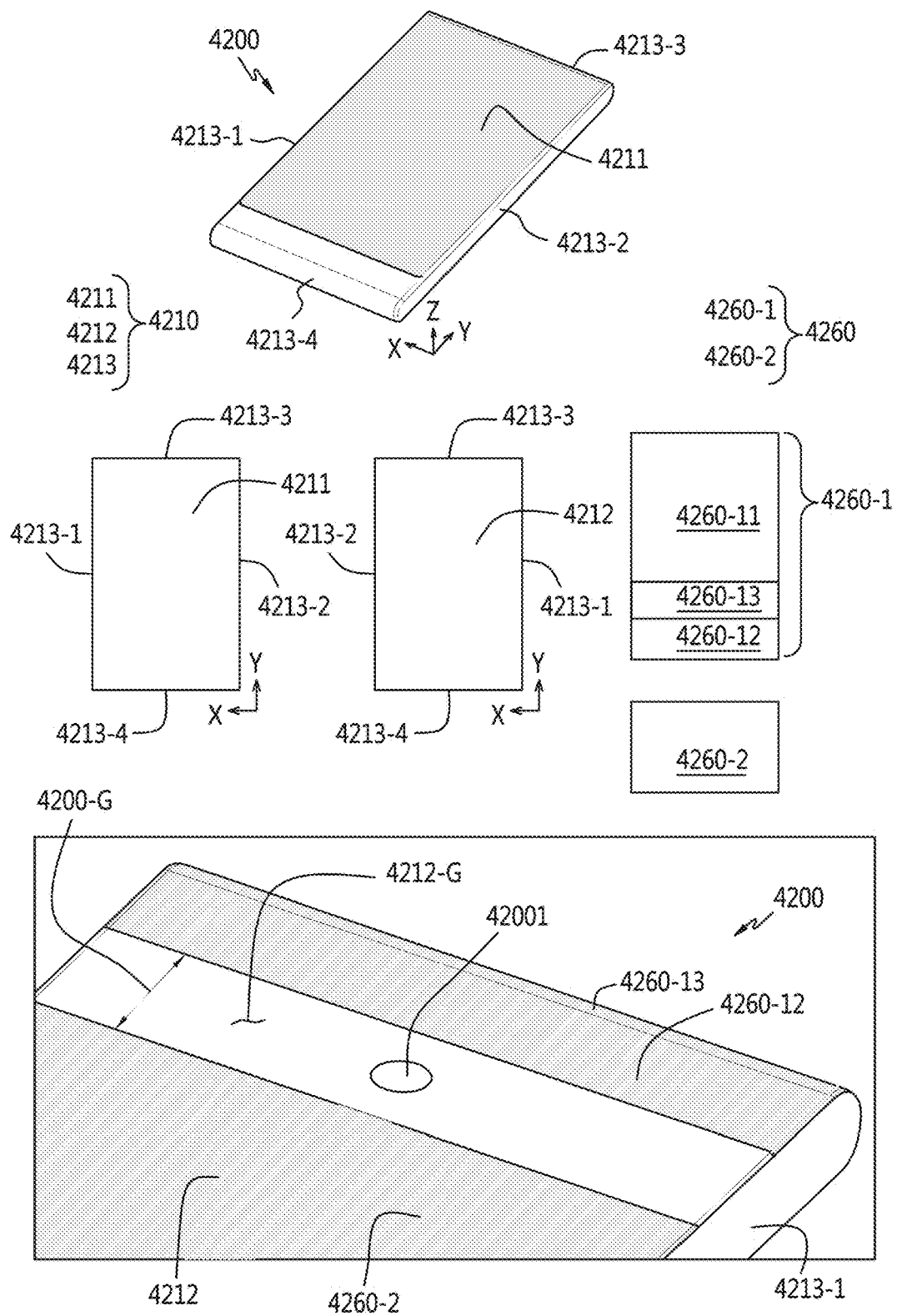

Referring to FIG. 42, a housing 4210 of the electronic device 4200 may include a first face 4211 and a second face

4212 that faces a direction opposite to the first face 4211. Alternatively, the outer region of the electronic device 4200 may include a third face 4213 that surrounds a space between the first face 4211 and the second face 4212. The third face 4213 may include a first region 4213-1, a second region 4213-2, a third region 4213-3, and a fourth region 4213-4. The first region 4213-1 and the second region 4213-2 may be disposed opposite to each other. The third region 4213-3 and the fourth region 4213-4 may be disposed opposite to each other.

According to an embodiment, the electronic device 4200 may include a plurality of displays 4260 that are physically separated from each other. For example, the plurality of displays may include a first display 4260-1 and a second display 4260-2.

According to an embodiment, when unfolded and viewed in a plan view, the first display 4260-1 may have a substantially rectangular shape. The first display 4260-1 may include a first display region 4260-11, a second display region 4260-12, and a third display region 4260-13. The third display region 4260-13 may connect the first display region 4260-11 and the second display region 4260-12 to each other. The first display region 4260-11 may be exposed through the first face 4211. The second display region 4260-12 may be exposed through the second face 4212. The third display region 4260-13 may be exposed through the third region 4213-3 of the third face 4213.

According to an embodiment, when unfolded and viewed in a plan view, the second display 4260-2 may have a substantially rectangular shape. The second display 4260-2 may be exposed through the second face 4212 together with the second display region 4260-12 of the first display 4260-1.

According to an embodiment, a gap 4200-G may exist between the second display region 4260-12 of the first display 4260-1 and the second display 4260-2. The second face 4212 of the electronic device 4200 may include a cover region 4212-G exposed through the gap 4200-G.

According to an embodiment, the electronic device 4200 may include optical devices (e.g., a camera, a flash, and a sensor) 42001 mounted therein. The optical devices 42001 may be exposed through the second face 4212. For example, the optical devices 4200 may be disposed on the cover region 4212-G.

According to an embodiment, the electronic device 4200 may include a first DDI (not illustrated) for supporting the driving of the first display 4260-1 and a second DDI (not illustrated) for supporting the driving of the second display 4260-2.

Figure 43A:
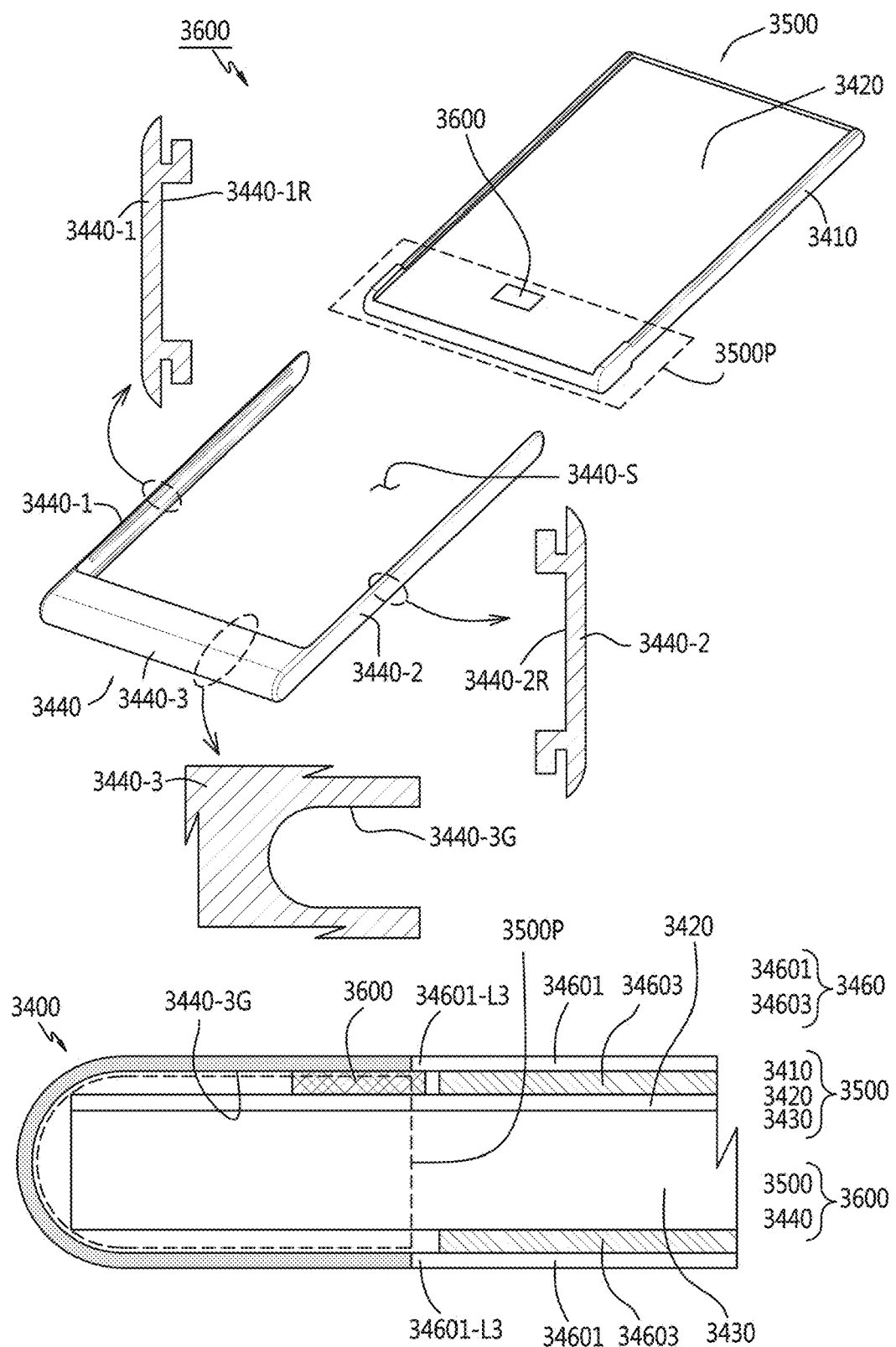
FIGS. 43A and 43B are views each illustrating an electronic device according to various embodiments of the present disclosure.
Figure 43B:
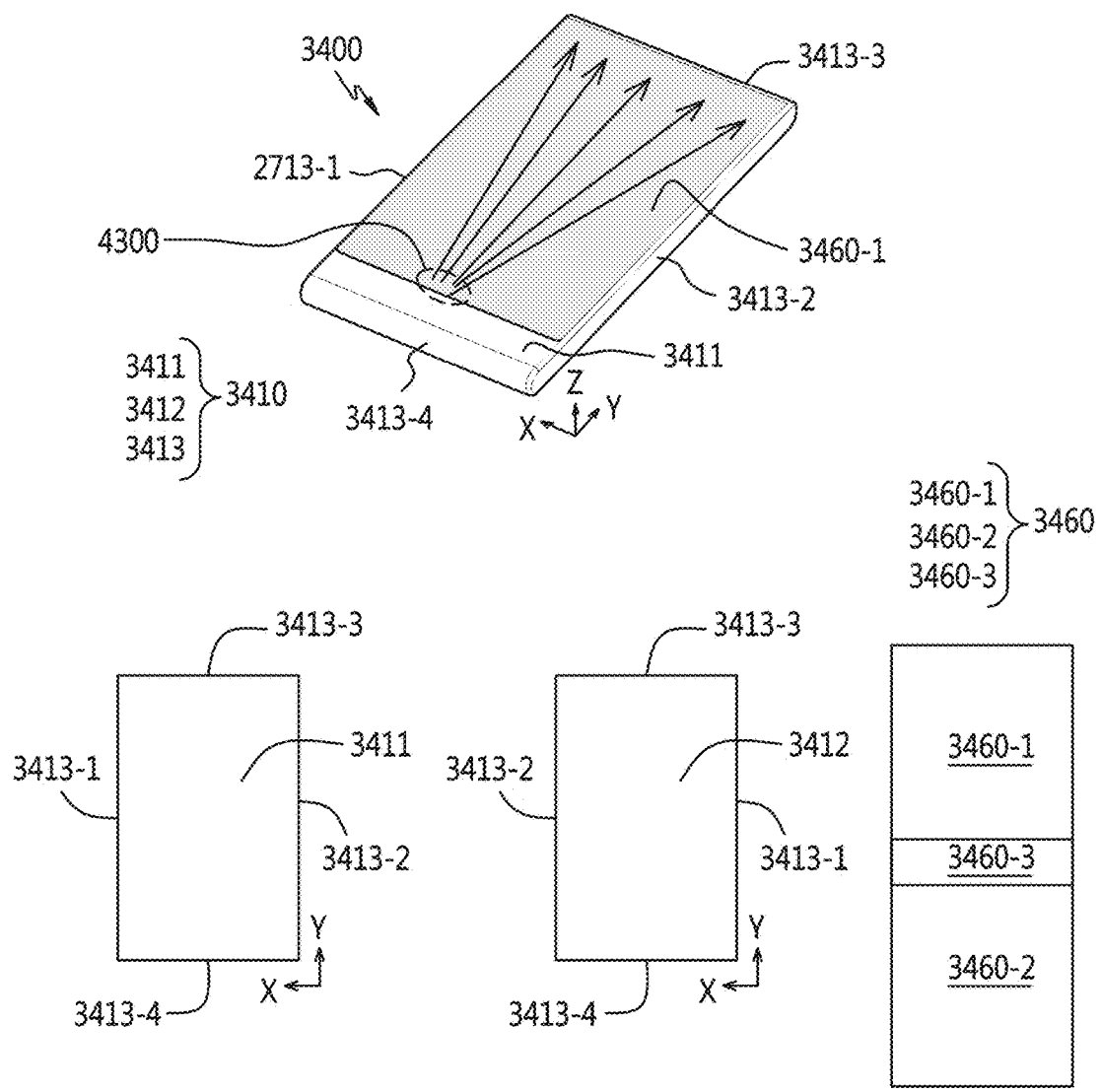

FIGS. 43A and 43B are views each illustrating an electronic device according to various embodiments of the present disclosure.

Referring to FIGS. 36A, 36B, and 43A, the second device 3600 may be formed by coupling the first device 3500 and the case 3440 to each other. As described above, the first device 3500 may be a configuration in which the bracket 3410, the circuit board 3420, and the battery pack 3430 are coupled to each other.

According to an embodiment, the first device 3500 may be fitted to a space 3440-S defined by the first case 3440-1, the second case 3440-2, and the third case 3440-3 of the case 3440. For example, the first device 3500 may be slid into the space 3440-S by being guided by the first rail portion 3440-1R of the first case 3440-1 and the second rail portion 3440-2R of the second case 3440-2 of the case 3440.

According to an embodiment, the third case 3440-3 of the case 3440 may include a recess 3440-3G that is recessed in a direction from the third region 3413-3 toward the fourth region 3413-4 of the third face 3413 of the electronic device 3400, and extends in the direction from the first case 3440-1 to the second case 3440-2.

According to an embodiment, the first device 3500 may include an insertion portion 3500P that may be fitted into the recess 3440-3G of the case 3440.

Referring to FIGS. 38A, 38B, and 43B, the electronic device 3400 may be formed by coupling the second device 3600 and the third device 3700 to each other, as described above. The third device 3700 may be formed by coupling the rail 3450 and the display 3460 to each other. The third device 3700 may be slid to be coupled to the second device 3600. The window 34601 of the display 3460 and the third case 3440-3 of the case 3440 may be smoothly connected to form the outer region of the electronic device 3400.

According to an embodiment, the first device 3500 may include a vibration or sound device 4300. For example, the circuit board 3420 may include a vibration or sound device 4300.

According to various embodiments, the vibration or sound device 4300 may include a vibrator, a speaker, a receiver, or the like. For example, the vibration or sound device 4300 may include a piezo receiver.

As described above, the display 3460 may include a first conductive layer (not illustrated) disposed between the window 34601 and the panel 34603. Alternatively, the display 3460 may include a second conductive layer (not illustrated) disposed on the panel 34603, or disposed inside the panel 34603. The first conductive layer and/or the second conductive layer may be used as an antenna radiator that supports various types of communication.

According to an embodiment, the vibration or sound device 4300 may be disposed at a position for reducing the antenna performance degradation of the antenna device using the first conductive layer and/or the second conductive layer. For example, the antenna performance of the antenna device using the first conductive layer and/or the second conductive layer may be deteriorated by vibration or sound generated from the vibration or sound device 4300.

According to an embodiment, in order to reduce antenna performance degradation, the vibration or sound device 4300 may be located at a position where it is possible to reduce the transmission of vibration or sound generated from the vibration or sound device 4300 to the display 3460.

According to an embodiment, in order to reduce antenna performance degradation, at least a portion of the vibration or sound device 4300 may be disposed at a position separated from the display 3460. For example, at least a portion of the vibration or sound device 4300 may be disposed in the insertion portion 3500P of the first device 3500 and may be inserted into the recess 3440-3G of the third case 3440-3 of the case 3440.

According to an embodiment, the vibration or sound device 4300 may be disposed between the first face 3411 of the electronic device 3400 and the circuit board 3420. For example, the vibration or sound device 4300 may be located at a position separated from the panel 34603 of the first display region 3460-1 of the display 3460 in the direction from the third region 3413-3 toward the fourth region 3413-4 of the third face 3413 of the electronic device 3400.

According to an embodiment, the window 34601 of the first display region 3460-1 of the display 3460 may include a third lip 34603-L3 that protrudes more than the panel 34603 in the direction from the third region 3413-3 toward the fourth region 3413-4 of the third face 3413 of the electronic device 3400. The third lip 34603-L3 abuts against the third case 3440-3 of the case 3440 and is smoothly connected to the third case 3440-3 of the case 3440 so as to form an outer region of the electronic device 3400. The third lip 34601-L3 of the window 34601 may extend to cover a portion of the vibration or sound device 4300.

According to an embodiment, the display 3460 including the first conductive layer and/or the second conductive layer used as an antenna radiator may be disposed along a portion of the first face 3411 of the electronic device 3400, the third region 3413-3 of the third face 3413, and at least a portion of the second face 3412. At least a portion of the vibration or sound device 4300 may be inserted into the third case 3440-3 of the case 3440 and may be separated from the display 3460. Alternatively, the vibration or sound device 4300 may be disposed closer to the fourth region 3413-4 among the first region 3413-1, the second region 3413-2, the third region 3413-3, and the fourth region 3413-4 of the third face 3413. For example, the above-described structure can reduce the transmission of vibration or sound generated from the vibration or sound device 4300 to the display 3460, and can suppress the antenna performance from being deteriorated.

Figure 44:
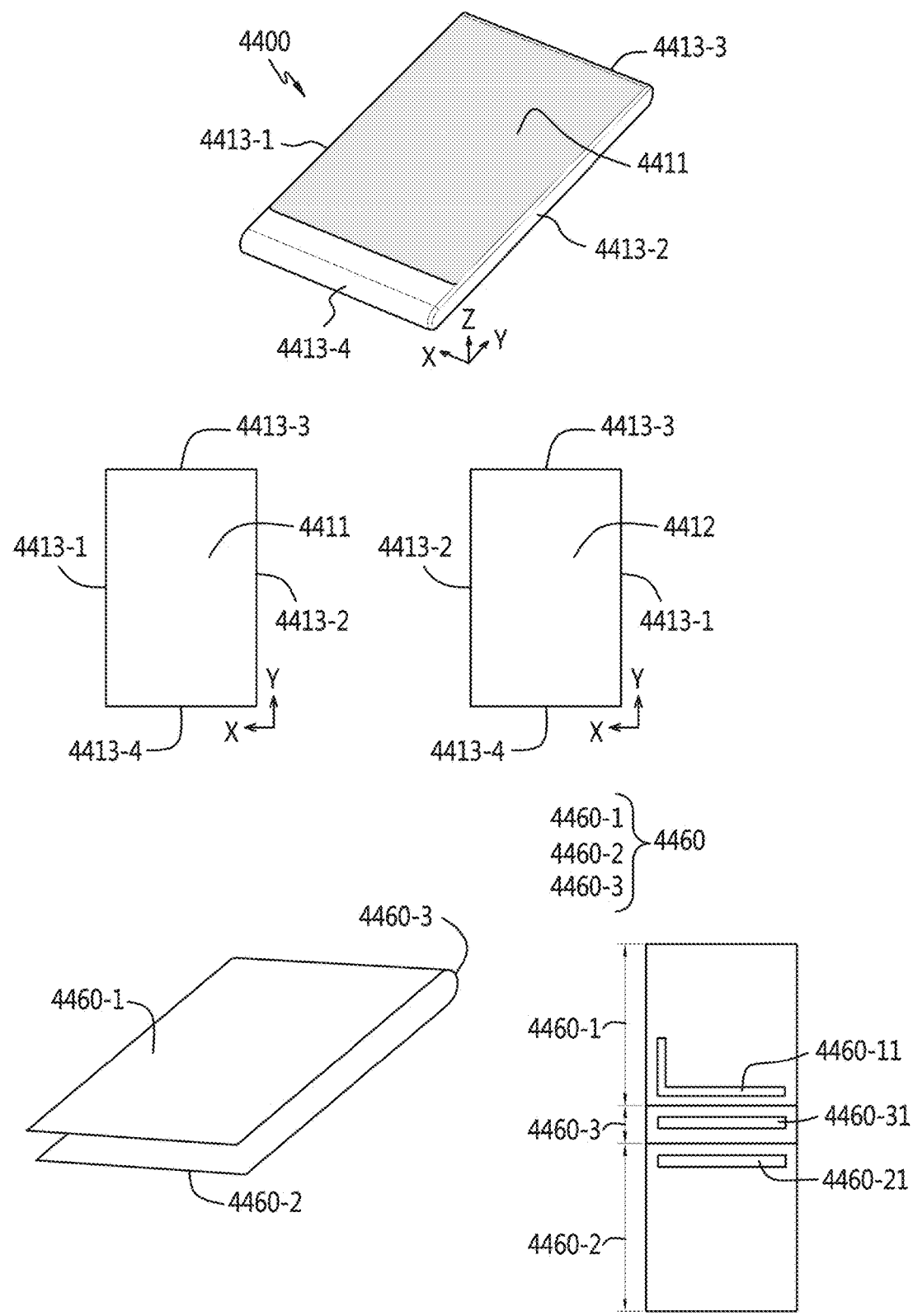
FIG. 44 is a view illustrating an electronic device according to an embodiment of the present disclosure.

FIG. 44 is a view illustrating an electronic device according to an embodiment of the present disclosure. The electronic device may include a configuration that is the same as or similar to at least some of the components described above.

Referring to FIG. 44, the outer region of the electronic device 4400 may include a first face 4411 and a second face 4412 that faces a direction opposite to the first face 4411. Alternatively, the outer region of the electronic device 4400 may include a third face 4413 that surrounds a space between the first face 4411 and the second face 4412. The third face 4413 may include a first region 4413-1, a second region 4413-2, a third region 4413-3, and a fourth region 4413-4. The first region 4413-1 and the second region 4413-2 may be disposed opposite to each other. The third region 4413-3 and the fourth region 4413-4 may be disposed opposite to each other.

When unfolded and viewed in a plan view, the display 4460 may be a substantially rectangular shape, and may include a first display region 4460-1, a second display region 4460-2, and a third display region 4460-3. The third display region 4460-3 may connect the first display region 4460-1 and the second display region 4460-2 to each other.

According to an embodiment, the first display region 4460-1 may be exposed through at least a portion of the first face 4411 of the electronic device 4400. The second display region 4460-2 may be exposed through at least a portion of the second face 4412 of the electronic device 4400. The third display region 4460-3 may be exposed through the third region 4413-3 of the third face 4413 of the electronic device 4400.

According to an embodiment, the first display region 4460-1 may include a first antenna radiator 4460-11. The second display region 4460-2 may include a second antenna radiator 4460-21. The third display region 4460-3 may include a third antenna radiator 4460-31.

According to an embodiment, the first antenna radiator 4460-11, the second antenna radiator 4460-21, and the third antenna radiator 4460-31 may be physically separated from each other.

According to an embodiment, at least one of the first antenna radiator 4460-11, the second antenna radiator 4460-21, and the third antenna radiator 4460-31 may be electrically connected to a communication circuit that is mounted in an electronic device (e.g., the electronic device 101 of FIG. 1) that is mounted with a display 4460. The communication circuit may support various types of communication using at least one of the first antenna radiator 4460-11, the second antenna radiator 4460-21, and the third antenna radiator 4460-31.

The first antenna radiator 4460-11, the second antenna radiator 4460-21, or the third antenna radiator 4460-31 may have various shapes.

According to an embodiment, the first antenna radiator 4460-11 may have a substantially "L" shape. For example, a portion of the first antenna radiator 4460-11 may be in the form of extending in the direction from the first region 4413-1 toward the second region 4413-2 of the third face 4413 of the electronic device 4400. Another portion of the first antenna radiator 4460-11 may be in the form of extending in the direction from the fourth region 4413-4 toward the third region 4413-3 of the third face 4413 of the electronic device 4400.

According to an embodiment, at least one of the second antenna radiator 4460-21 and the third antenna radiator 4460-31 may have a linear shape. For example, the second antenna radiator 4460-21 and/or the third antenna radiator 4460-31 may be in the form of extending in the direction from the first region 4413-1 toward the second region 4413-2 of the third face 4413 of the electronic device 4400.

According to an embodiment, at least one of the first antenna radiator 4460-11, the second antenna radiator 4460-21, and the third antenna radiator 4460-31 may include a metal mesh pattern.

According to an embodiment, in order to reduce the deterioration of the antenna performance, the mesh shape of a metal mesh pattern constituting a part of the first antenna radiator 4460-11 and the mesh shape of a metal mesh pattern constituting another part of the first antenna radiator 4460-11 may be different from each other.

According to an embodiment, in order to reduce the deterioration of the antenna performance, the mesh size of the mesh pattern of a metal mesh pattern constituting a part of the first antenna radiator 4460-11 and the mesh size of the mesh pattern of a metal mesh pattern constituting another part of the first antenna radiator 4460-11 may be different from each other.

According to an embodiment, in order to reduce the deterioration of the antenna performance, the thickness or width of the mesh pattern of a metal mesh pattern constituting a part of the first antenna radiator 4460-11 and the thickness or width of the mesh pattern of a metal mesh pattern constituting another part of the first antenna radiator 4460-11 may be different from each other.

According to an embodiment, in order to reduce the deterioration of the antenna performance, the mesh shape of a metal mesh pattern constituting a part of the second antenna radiator 4460-21 and the mesh shape of a metal mesh pattern constituting another part of the second antenna radiator 4460-21 may be different from each other.

According to an embodiment, in order to reduce the deterioration of the antenna performance, the mesh size of the mesh pattern of a metal mesh pattern constituting a part of the second antenna radiator 4460-21 and the mesh size of the mesh pattern of a metal mesh pattern constituting another part of the second antenna radiator 4460-21 may be different from each other.

According to an embodiment, in order to reduce the deterioration of the antenna performance, the thickness or width of the mesh pattern of a metal mesh pattern constituting a part of the second antenna radiator 4460-21 and the thickness or width of the mesh pattern of a metal mesh pattern constituting another part of the second antenna radiator 4460-21 may be different from each other.

According to an embodiment, in order to reduce the deterioration of the antenna performance, the mesh shape of a metal mesh pattern constituting a part of the third antenna radiator 4460-31 and the mesh shape of a metal mesh pattern constituting another part of the third antenna radiator 4460-31 may be different from each other.

According to an embodiment, in order to reduce the deterioration of the antenna performance, the mesh size of the mesh pattern of a metal mesh pattern constituting a part of the third antenna radiator 4460-31 and the mesh size of the mesh pattern of a metal mesh pattern constituting another part of the third antenna radiator 4460-31 may be different from each other.

According to an embodiment, in order to reduce the deterioration of the antenna performance, the thickness or width of the mesh pattern of a metal mesh pattern constituting a part of the third antenna radiator 4460-31 and the thickness or width of the mesh pattern of a metal mesh pattern constituting another part of the third antenna radiator 4460-31 may be different from each other.

Figure 45:
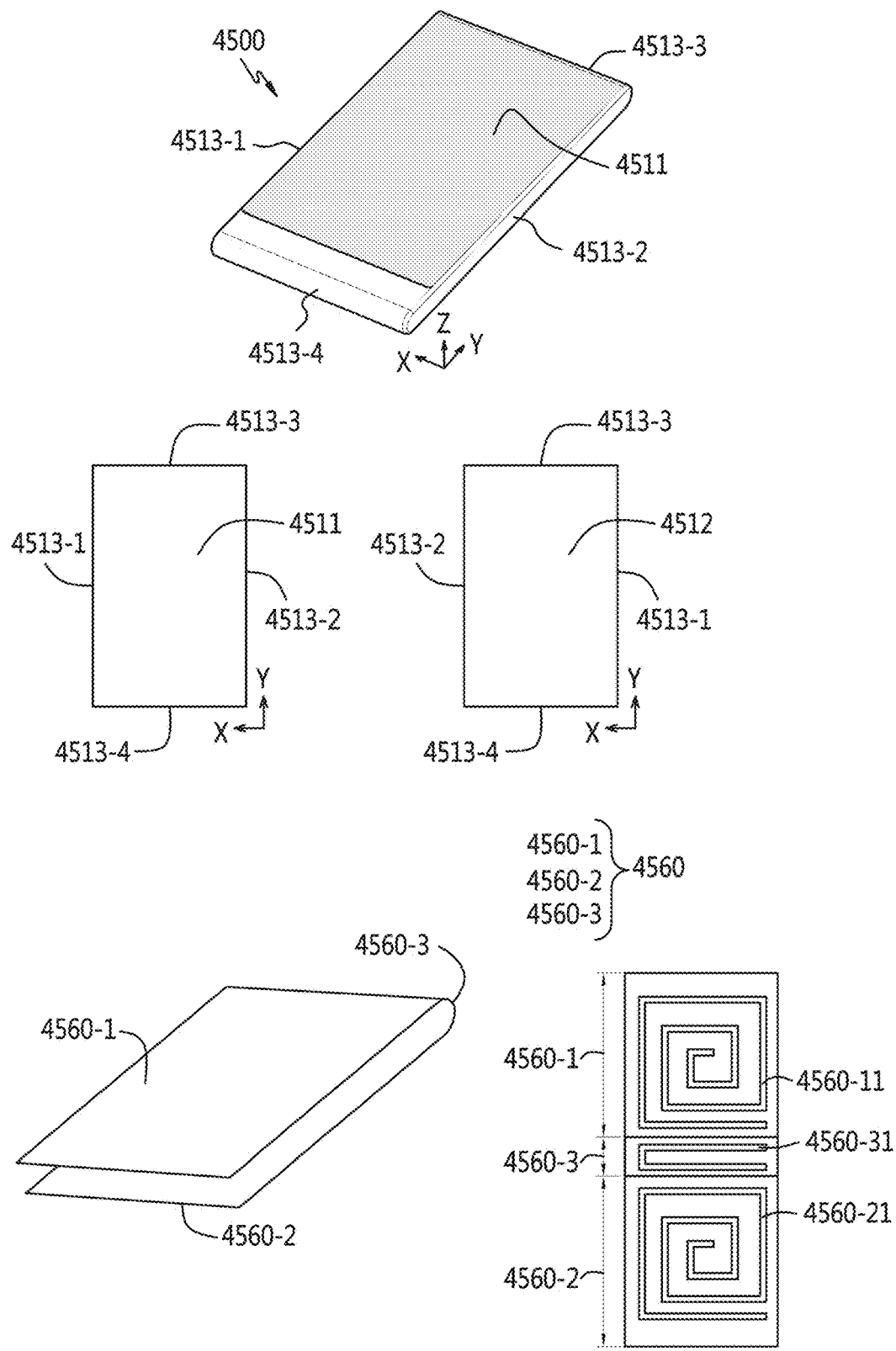
FIG. 45 is a view illustrating an electronic device according to an embodiment of the present disclosure.

FIG. 45 is a view illustrating an electronic device according to an embodiment of the present disclosure. The electronic device may include a configuration that is the same as or similar to at least some of the components described above.

Referring to FIG. 45, the outer region of the electronic device 4500 may include a first face 4511 and a second face 4512 that faces a direction opposite to the first face 4511. Alternatively, the outer region of the electronic device 4500 may include a third face 4513 that surrounds a space between the first face 4511 and the second face 4512.

When unfolded and viewed in a plan view, the display 4560 may be a substantially rectangular shape, and may include a first display region 4560-1, a second display region 4560-2, and a third display region 4560-3. According to an embodiment, the first display region 4560-1 may be exposed through at least a portion of the first face 4511 of the electronic device 4500. The second display region 4560-2 may be exposed through at least a portion of the second face 4512 of the electronic device 4500. The third display region 4560-3 may be exposed through the third region 4513-3 of the third face 4513 of the electronic device 4500.

According to an embodiment, the first display region 4560-1 may include a first antenna radiator 4560-11. The second display region 4560-2 may include a second antenna radiator 4560-21. The third display region 4560-3 may include a third antenna radiator 4560-31.

According to an embodiment, the first antenna radiator 4560-11, the second antenna radiator 4560-21, and the third antenna radiator 4560-31 may be physically separated from each other.

The first antenna radiator 4460-11, the second antenna radiator 4560-21, or the third antenna radiator 4560-31 may have various shapes.

According to an embodiment, the first antenna radiator 4560-11 and/or the second antenna radiator 4560-21 may have a conductive coil shape that generally includes a plurality of turns. For example, the first antenna radiator 4560-11 and/or the second antenna radiator 4560-21 may have a rectangular spiral shape.

According to an embodiment, the third antenna radiator 4560-31 may have a substantially "U" shape.

According to an embodiment, at least one of the first antenna radiator 4560-11, the second antenna radiator 4560-21, and the third antenna radiator 4560-31 may include a metal mesh pattern.

According to an embodiment, in order to reduce the deterioration of the antenna performance, the mesh shape of a metal mesh pattern constituting a part of the first antenna radiator 4560-11 and the mesh shape of a metal mesh pattern constituting another part of the first antenna radiator 4560-11 may be different from each other.

According to an embodiment, in order to reduce the deterioration of the antenna performance, the mesh size of the mesh pattern of a metal mesh pattern constituting a part of the first antenna radiator 4560-11 and the mesh size of the mesh pattern of a metal mesh pattern constituting another part of the first antenna radiator 4560-11 may be different from each other.

According to an embodiment, in order to reduce the deterioration of the antenna performance, the thickness or width of the mesh pattern of a metal mesh pattern constituting a part of the first antenna radiator 4560-11 and the thickness or width of the mesh pattern of a metal mesh pattern constituting another part of the first antenna radiator 4560-11 may be different from each other.

According to an embodiment, in order to reduce the deterioration of the antenna performance, the mesh shape of a metal mesh pattern constituting a part of the second antenna radiator 4560-21 and the mesh shape of a metal mesh pattern constituting another part of the second antenna radiator 4560-21 may be different from each other.

According to an embodiment, in order to reduce the deterioration of the antenna performance, the mesh size of the mesh pattern of a metal mesh pattern constituting a part of the second antenna radiator 4560-21 and the mesh size of the mesh pattern of a metal mesh pattern constituting another part of the second antenna radiator 4560-21 may be different from each other.

According to an embodiment, in order to reduce the deterioration of the antenna performance, the thickness or width of the mesh pattern of a metal mesh pattern constituting a part of the second antenna radiator 4560-21 and the thickness or width of the mesh pattern of a metal mesh pattern constituting another part of the second antenna radiator 4560-21 may be different from each other.

According to an embodiment, in order to reduce the deterioration of the antenna performance, the mesh shape of a metal mesh pattern constituting a part of the third antenna radiator 4560-31 and the mesh shape of a metal mesh pattern constituting another part of the third antenna radiator 4560-31 may be different from each other.

According to an embodiment, in order to reduce the deterioration of the antenna performance, the mesh size of the mesh pattern of a metal mesh pattern constituting a part of the third antenna radiator 4560-31 and the mesh size of the mesh pattern of a metal mesh pattern constituting another part of the third antenna radiator 4560-31 may be different from each other.

According to an embodiment, in order to reduce the deterioration of the antenna performance, the thickness or width of the mesh pattern of a metal mesh pattern constituting a part of the third antenna radiator 4560-31 and the thickness or width of the mesh pattern of a metal mesh pattern constituting another part of the third antenna radiator 4560-31 may be different from each other.

Figure 46:
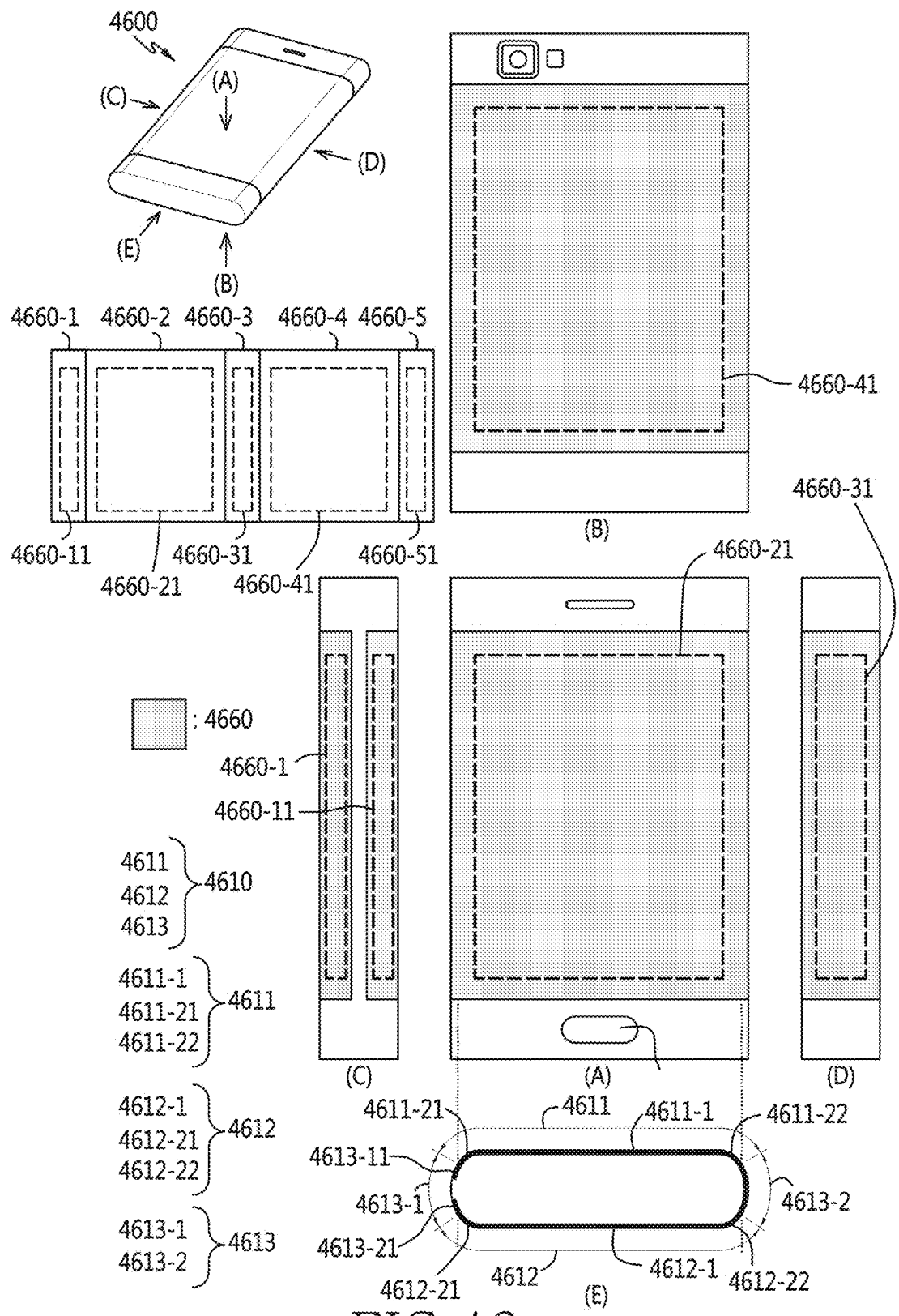
FIG. 46 is a view illustrating an electronic device according to an embodiment of the present disclosure.

FIG. 46 illustrates an electronic device according to an embodiment of the present disclosure. The electronic device may include a configuration that is the same as or similar to at least some of the components described above.

Referring to FIG. 46, when viewed in a cross section, an outer region 4610 of the electronic device 4600 may include a first face 4611, a second face 4612, and a third face 4613. The first face 4611, the second face 4612, and the third face 4613 may be at least partially the same as or similar to the first face 611, the second face 612, and the third face 613 of FIG. 6, respectively.

According to an embodiment, when viewed in a plan view, the display 4660 may include a first display region 4660-1, a second display region 4660-2, a third display region 4660-3, a fourth display area 4660-4, or a fifth display area 4660-5. The second display region 4660-2 may connect the first display region 4660-1 and the third display region 4660-3 to each other. The third display region 4660-3 may connect the second display region 4660-2 and the fourth display region 4660-4 to each other. The fourth display region 4660-4 may connect the third display region 4660-3 and the fifth display region 4660-5 to each other.

According to an embodiment, the first display region 4660-1 of the display 4660 may be exposed through a region 4613-11 adjacent to the first face 4611 in the first region 4613-1 of the third face 4613.

According to an embodiment, the second display region 4660-2 of the display 4660 may be exposed through the first face 4611. For example, the display 4660 may be disposed through the first left edge region 4611-21, the first central region 4611-1, and the first right edge region 4611-22.

According to an embodiment, the third display region 4660-3 of the display 4660 may be exposed through the second region 4613-2 of the third face 4613.

According to an embodiment, the fourth display region 4660-4 of the display 4660 may be exposed through the second face 4612. For example, the display 4660 may be disposed through the second right edge region 4612-22, the second central region 4612-1, and the second left edge region 4612-21.

According to an embodiment, the fifth display region 4660-5 of the display 4660 may be exposed through a region 4613-21 adjacent to the second face 4612 in the second region 4613-2 of the third face 4613.

According to an embodiment, at least one of the first display region 4660-1, the second display region 4660-2, the third display region 4660-3, the fourth display region 4660-4, and the fifth display region 4660-5 may include an antenna radiator (e.g., a metal mesh pattern).

According to various embodiments, the first display region 4660-1 may include a first electric loop 4660-11 that is used as an antenna radiator. The second display region 4660-2 may include a second electric loop 4660-21 that is used as an antenna radiator. Alternatively, the third display region 4660-3 may include a third electric loop 4660-31 that is used as an antenna radiator. The fourth display region 4660-4 may include a fourth antenna radiator 4660-41 that is used as an antenna radiator. Alternatively, the fifth display region 4660-5 may include a fifth electric loop 4660-51 that is used as an antenna radiator.

According to an embodiment, the first electric loop 4660-11, the second electric loop 4660-21, the third electric loop 4660-31, the fourth antenna radiator 4660-41, and the fifth electric loop 4660-51 may be physically separated from each other.

Figure 47:
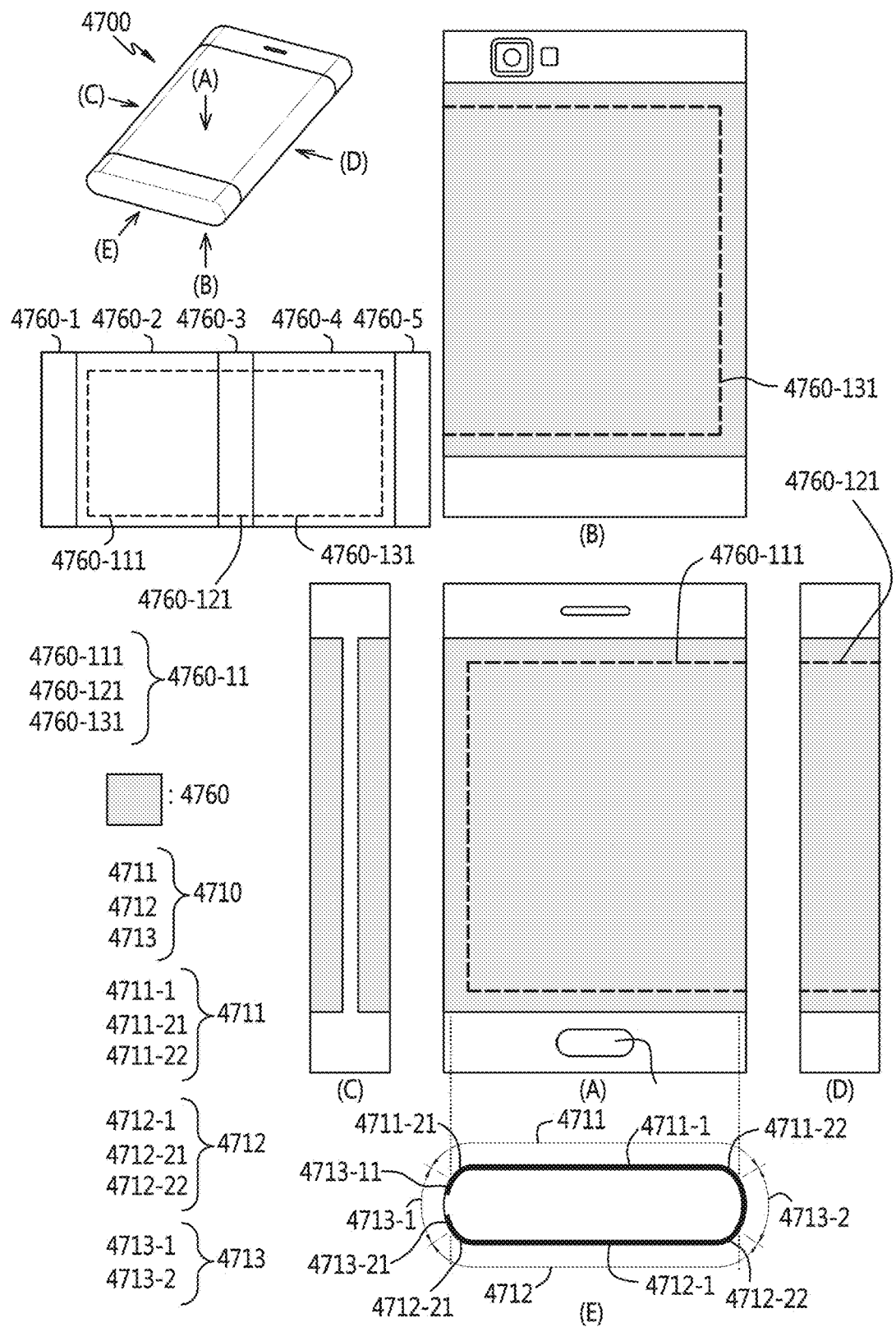
FIG. 47 is a view illustrating an electronic device according to an embodiment of the present disclosure.

FIG. 47 illustrates an electronic device according to an embodiment of the present disclosure. The electronic device may include a configuration that is the same as or similar to at least some of the components described above.

Referring to FIG. 47, when viewed in a cross section, the outer region 4710 of the electronic device 4700 may include a first face 4711, a second face 4712, and a third face 4713. The first face 4711, the second face 4712, and the third face 4713 may be at least partially the same as or similar to the first face 611, the second face 612, and the third face 613 of FIG. 6, respectively.

According to an embodiment, when unfolded and viewed in a plan view, the display 4760 may include includes a first display region 4760-1, a second display region 4760-2, a third display region 4760-3, a fourth display region 4760-4, or a fifth display area 4760-5. The first display region 4760-1 may be exposed through a region 4713-11 adjacent to the first face 4711 in the first region 4713-1 of the third face 4713. The second display region 4760-2 may be exposed through a first left edge region 4711-21, a first central region 4711-1, and a first right edge region 4711-22. The third display region 4760-3 may be exposed through the second region 4713-2 of the third face 4713. The fourth display region 4760-4 may be exposed through a second right edge region 4712-22, a second central region 4712-1, and a second left edge region 4712-21 of the second face 4712. The fifth display region 4660-5 may be exposed through a region 4713-21 adjacent to the second face 4712 in the second region 4713-2 of the third face 4713.

The display 4760 may include an electrical loop 4760-11 that is used as an antenna radiator. According to an embodiment, the plurality of patterns constituting the electrical loop 4760-11 may be disposed in each of the plurality of display areas. For example, the electrical loop 4760-11 may include a first pattern 4760-111, a second pattern 4760-121, and a third pattern 4760-131. The second pattern 4760-121 may connect the first pattern 4760-111 and the third pattern 4760-131 to each other. The first pattern 4760-111 may be disposed in the second display region 4760-2. The second pattern 4760-121 may be disposed in the fourth display region 4760-4. The third pattern 4760-131 may be disposed in the third display region 4760-3.

Figure 48:
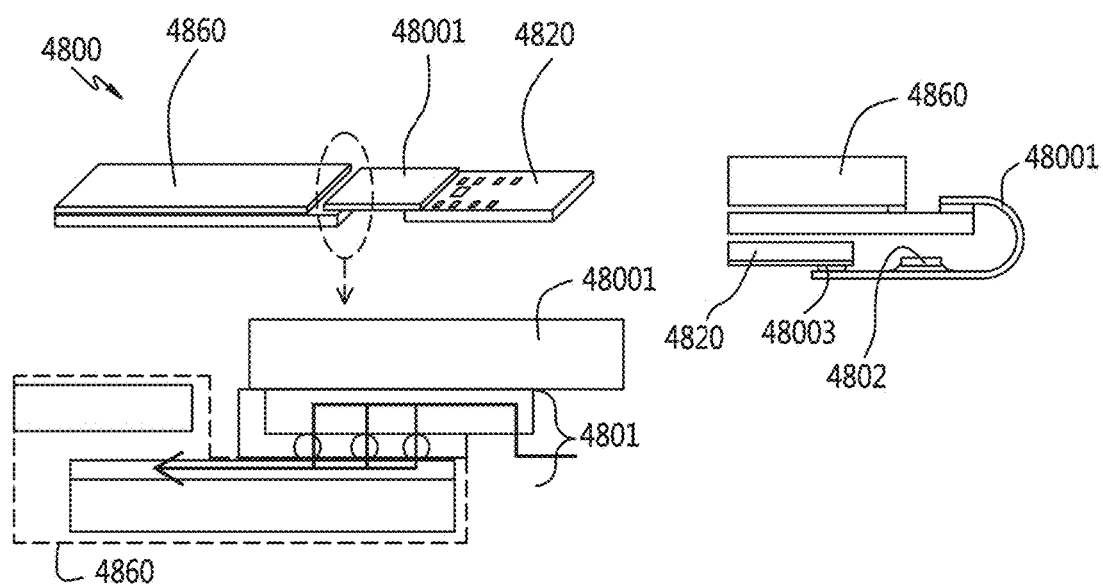
FIG. 48 is a view illustrating an electric connection between a display and a printed circuit board (PCB) according to an embodiment of the present disclosure.

FIG. 48 is a view illustrating an electric connection between a display and a PCB according to an embodiment of the present disclosure.

Referring to FIG. 48, the electronic device 4800 may include a display 4860, a PCB 4820, and a FPCB 48001. According to various embodiments, the electronic device 4800 may include a configuration that is the same as or similar to at least some of the components described above.

The display 4860 may include a conductive pattern that may be used as an antenna radiator. In the display, the conductive pattern may be stacked on a separate layer or may be incorporated in an in-cell or on-cell. According to various embodiments, the display 4860 may have a configuration that is at least partially the same as or similar to that of at least one of the displays described above.

According to various embodiments, the PCB 4820 may be the circuit board 3420 of FIG. 34.

The FPCB 48001 may connect the display 4860 or a conductive pattern stacked on a separate layer in the display and the PCB 4820.

The display 4860 may include a conductive pattern that may be used as an antenna radiator. According to an embodiment, the conductive pattern may be disposed inside the display 4860. For example, the conductive pattern may be disposed in an in-cell region of the display 4860. According to another embodiment, the conductive pattern may form one face of the display 4860. For example, the conductive pattern may be disposed in an on-cell region of the display

4860. For example, the conductive pattern may be disposed as a separate layer on one face of the display.

According to an embodiment, the display 4860 or the conductive pattern stacked on a separate layer in the display may be electrically connected to the FPCB 48001 using an ACF bonding 4801. For example, the conductive pattern of the display 4860 may be electrically connected to a communication circuit (not illustrated) mounted on the PCB 4820 via the FPCB 48001.

According to various embodiments, the display 4860 may include a pressure sensing sensor (not illustrated) (e.g., the pressure sensing sensor 2000a of FIG. 20A or the pressure sensing sensor 2000b of FIG. 20B). For example, the pressure sensing sensor may be stacked on a layer separate from the display 4860.

According to an embodiment, the pressure sensing sensor may be electrically connected to the FPCB 48001 through the ACF bonding 4801 in a manner that is the same as or similar to a conductive pattern stacked on the display 4860. The pressure sensing sensor may be electrically connected to a touch sensing circuit (e.g., a touch IC) or a pressure sensing circuit (e.g., a pressure sensing IC) mounted on the FPCB 48001 or the PCB 4820.

According to an embodiment, the PCB 4820 and the FPCB 48001 may be electrically interconnected through a receptacle 48003. For example, one end of the FPCB 48001 may include a connector (e.g., the receptacle 48003), and the PCB 4820 may include a connector that is electrically connectable with the connector 48003 of the FPCB 48001.

According to an embodiment, the communication circuit of the PCB 4820 may be electrically connected to the conductive pattern of the display 4860 through the FPCB 48001, and may perform various types of communication using the conductive pattern. Alternatively, the ground of the PCB 4820 may be electrically connected to the conductive pattern of the display 4860 through the FPCB 48001. The communication circuit of the PCB 4820 may transmit and receive RF signals through the conductive pattern of the display 4860. The communications circuit of the PCB 4820 may include all the RF components between the conductive pattern of the display 4860 and a control circuit (e.g., a processor).

According to various embodiments, an antenna matching element (e.g., an impedance matching element) 4802 for antenna matching may be additionally configured after ACF bonding 4801 between the conductive pattern of display 4860 and FPCB 48001. The antenna matching element 4802 may be configured before the ACF bonding 4801 to minimize a loss, and may be configured after the ACF bonding 4801 to improve a mounting convenience.

According to various embodiments, the PCB 4820, which includes a communications circuit (e.g., an RF component) mounted thereon, may be located on the rear face of the antenna pattern in order to reduce the mounting area.

Figure 49:
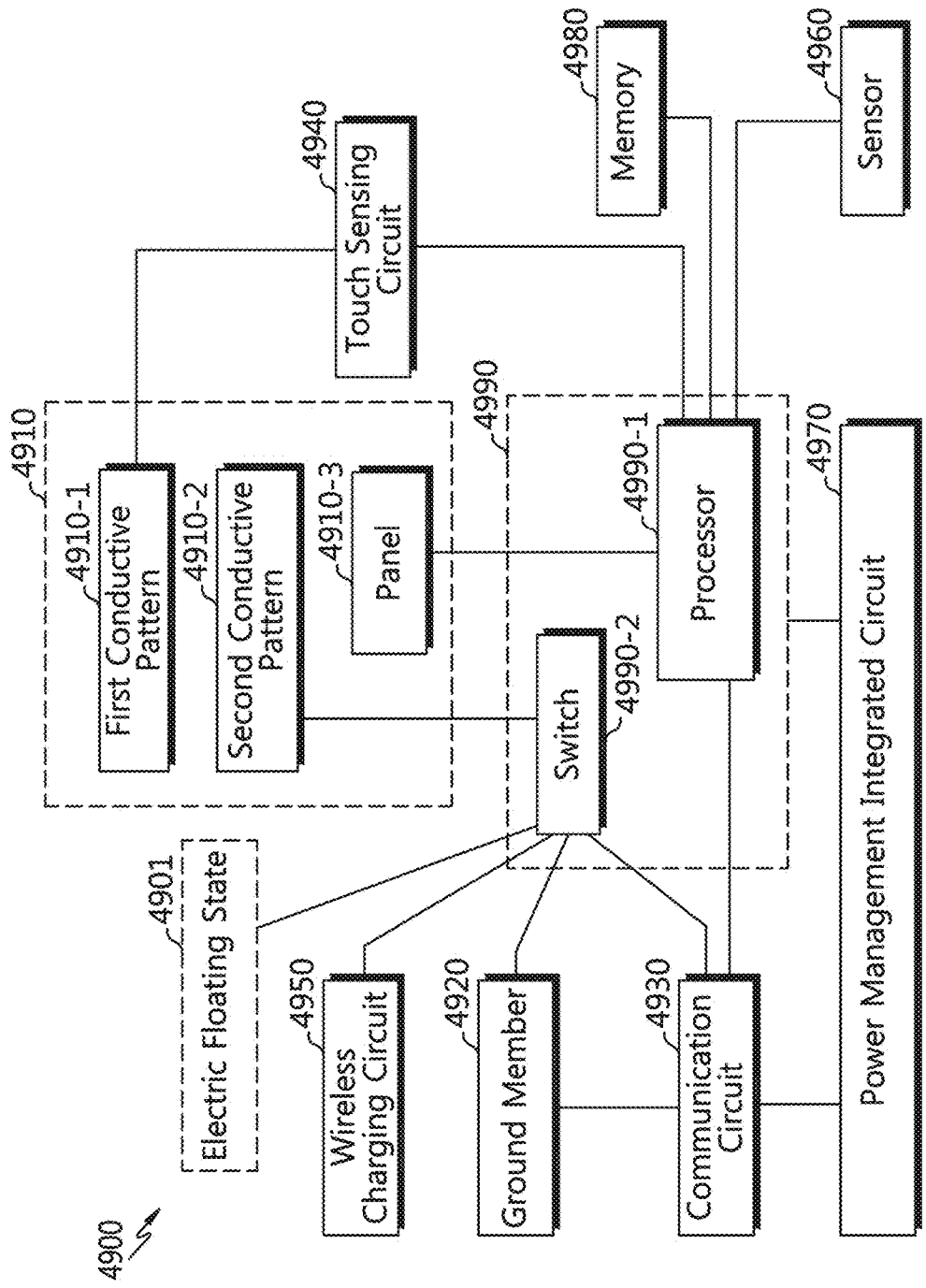
FIG. 49 is a view schematically illustrating a configuration of an electronic device according to an embodiment of the present disclosure.

FIG. 49 is a view schematically illustrating a configuration of an electronic device according to an embodiment of the present disclosure. The electronic device 4900 may include a configuration that is the same as or similar to at least some of the components described above.

Referring to FIG. 49, the electronic device 4900 may include a display 4910, a ground member 4920, a communication circuit 4930, a touch sensing circuit 4940, a wireless charging circuit 4950, at least one sensor 4960, a PMIC 4970, a memory 4980, and a control circuit 4990.

According to an embodiment, the display 4910 may be disposed along at least a portion of the outer region of the electronic device 4900. For example, the outer region of the electronic device 4900 may include a first face and a second face that faces a direction opposite to the first face. The outer region of the electronic device 4900 may include a third face that surrounds a space between the first face and the second face. The display 4910 may be disposed along at least a portion of at least one of the first face, the second face, and the third face.

According to an embodiment, the display 4910 may include a first conductive pattern 4910-1, a second conductive pattern 4910-2, and a panel 4910-3.

According to an embodiment, the first conductive pattern 4910-1 may be configured to support a touch input or a hovering input. The first conductive pattern 4910-1 may be electrically connected to the touch sensing circuit 4940.

According to an embodiment, the touch sensing circuit 4940 may deliver a signal regarding a touch input or a hovering input to the processor 4990-1 using the first conductive pattern 4910-1. For example, the touch sensing circuit 4940 supplies a current to the first conductive pattern 4910-1, and a capacitance may be generated by the first conductive pattern 4910-1. When a user's finger or an electronic pen approaches the outer region of the electronic device 4900, the capacitance may vary. When the variable amount of capacitance exceeds a threshold, the touch sensing circuit 4940 may deliver a signal related to a touch input or a hovering input to the processor 4990-1 of the control circuit 4990.

According to an embodiment, the processor 4990-1 may control various operations of the electronic device 4900 in response to the signal related to a touch input or a hovering input, which is delivered from the touch sensing circuit 4940. For example, the processor 4990-1 may control an image display through the panel 4910-3 of the display 4910 in response to the signal related to a touch input or a hovering input from the touch sensing circuit 4940. For example, the processor 4990-1 may control sound output through a speaker (not illustrated) mounted on the electronic device 4900 in response to the signal related to a touch input or a hovering input from the touch sensing circuit 4940.

According to an embodiment, the first conductive pattern 4910-1 may be disposed along at least a portion of the display region of the display 4910. For example, a region that supports touch input or hovering input (hereinafter, referred to as an "input region") may be formed along the entire display region of the display 4910, or along a portion of the entire display region.

According to an embodiment, the processor 4990-1 may control the touch sensing circuit 4940 to set an effective input region where a touch input or a hovering input is enabled in the input region. The touch sensing circuit 4940 may support the effective input region by forming a first portion of the first conductive pattern 4910-1 in an able state or an active state under the control of the processor 4990-1. Alternatively, the touch sensing circuit 4940 may support the non-effective input region by forming a second portion of the first conductive pattern 4910-1 in an enable state or a disable state under the control of the processor 4990-1. For example, the touch sensing circuit 4940 may not provide a current to the second portion of the first conductive pattern 4910-1.

According to another embodiment, the touch sensing circuit 4940 may detect a signal related to a touch input or a hovering input through a portion of the first conductive pattern 4910-1 corresponding to a non-effective input region, and may deliver a detected signal to the processor 4990-1. However, the processor 4990-1 may invalidate the signal generated through the non-effective input region.

According to an embodiment, the processor 4990-1 may adjust the effective input region based on various inputs generated from the electronic device 4900. For example, the processor 4990-1 may adjust the effective input region based on at least a portion of information obtained from at least one sensor 4960 of the electronic device 4900. Alternatively, the processor 4990-1 may adjust the effective input region based on at least a portion of a user input via various input devices of the electronic device 4900.

According to various embodiments, the processor 4990-1 may be set such that an effective touch input region that supports a touch input and an effective hovering input region that supports a hovering input to be distinguished in the effective input region. For example, the touch sensing circuit 4940 may be set to be capable of sensing a touch input when the variable amount of capacitance generated through the first portion of the first conductive pattern 4910-1 reaches a first threshold value in order to provide an effective touch input region. Alternatively, the touch sensing circuit 4940 may be set to be capable of sensing a hovering input when the variable amount of capacitance generated through the second portion of the first conductive pattern 4940-1 reaches a second threshold value in order to provide an effective touch input region.

According to various embodiments, the electronic device 4900 may include various function-related applications (e.g., a camera application, an e-book application, an audio/video reproducing application, and a web browser). The processor 4990-1 may determine the execution of an application, and may adjust the effective input region according to the executed application.

According to an embodiment, an input region may be defined in advance for each application. Alternatively, the input region may be set by a user input.

According to an embodiment, the touch sensing circuit 4940 may detect a position (hereinafter, referred to as an input generation position) where a touch input or a hovering input is generated in the effective input region, and may deliver the detected input position to the processor 4990-1.

According to an embodiment, the touch sensing circuit 4940 may detect a region (hereinafter, referred to as an input generation region) where a touch input or a hovering input is generated in the effective input region, and may deliver the detected input region to the processor 4990-1. The input generation region may include a plurality of adjacent input generation positions or a plurality of separate input generation positions.

According to an embodiment, the second conductive pattern 4910-2 may be used as an antenna radiator for supporting various types of communication. The second conductive pattern 4910-2 may be electrically connected to the communication circuit 4930. For example, the second conductive pattern 4910-2 may be used for cellular communication. The cellular communication may use at least one of, for example, LTE, LTE-A, CDMA, WCDMA, UMTS, WiBro, and GSM. For example, the second conductive pattern 4910-2 may support short range communication. The short range communication may include at least one of, for example, WiFi, Bluetooth, NFC, and GNSS.

According to various embodiments, the second conductive pattern 4910-2 may support magnetic signal transmission/reception.

According to various embodiments, the second conductive pattern 4910-2 may be configured as at least one type that may be selected from a mono-pole antenna, a dipole antenna, an inverted-F antenna (IFA), a planar inverted-F antenna (PIFA), a loop antenna, and a slot antenna.

According to an embodiment, the communication circuit 4930 may be electrically connected to the second conductive pattern 4910-2. For example, the communication circuit 4930 may be electrically connected to a processor 4990-1 of the control circuit 4990.

According to an embodiment, the communication circuit 4930 may support various types of communication (e.g., cellular communication) that use the second conductive pattern 4910-2 of the display 4910. The communication circuit 4930 may transmit/receive a RF signal through the second conductive pattern 4910-2. The communication circuit 4930 may include all the RF components between the second conductive pattern 4910-2 and the control circuit 4990. For example, the communication circuit 4930 may include a radio frequency integrated circuit (RFIC) and a front end module (FEM). The RFIC (e.g., an RF transceiver) may receive radio waves from a base station, and may modulate a received high frequency waves into a low frequency band (base band) that is processable by the processor 4990-1. For example, the RFIC may modulate the low frequency waves processed by the processor 4990-1 into high frequency waves for the purpose of base station transmission. For example, the FEM may be a transceiver device that is capable of controlling a radio wave signal. For example, the FEM may connect the RFIC with the second conductive pattern 4910-2, and may separate transmitted/received signals. For example, the FEM may perform filtering and amplification, and may include a reception end FEM in which a filter is embedded to filter a received signal and a transmission end FEM in which a PAM is embedded to amplify a transmitted signal.

In the reception of a wireless signal according to various embodiments, the communication circuit 4930 may receive a wireless signal from the second conductive pattern 4910-2, convert the received wireless signal into a baseband signal, and transmit the converted baseband signal to the processor 4990-1. The processor 4990-1 may process the received baseband signal, and may control a human/mechanical interface of the electronic device 4900, which corresponds to the received baseband signal.

According to various embodiments, in the transmission of a wireless signal, the processor 4990-1 may generate a baseband signal and may output the baseband signal to the communication circuit 4930. The communication circuit 4930 may receive the baseband signal from the processor 4990-1, convert the received baseband signal into a wireless signal, and transmit the wireless signal to the air through the second conductive pattern 4910-2.

According to an embodiment, the communication circuit 4930 may support at least one type of communication among single input multiple output (SIMO), multiple input single output (MISO), diversity, and multiple input multiple output (MIMO) using the second conductive pattern 4910-2.

According to an embodiment, the second conductive pattern 4910-2 may be electrically connected to the communication circuit 4930. The second conductive pattern 4910-2 may be electrically connected to a ground of a PCB (not illustrated) (hereinafter, referred to as a "ground"). For example, the second conductive pattern 4910-2 may include a first end and a second end, which are electrically connected to the communication circuit 4930 and the ground of the PCB, respectively. The communication circuit 4930 may provide a current to the second conductive pattern 4910-2, and the current is circulated along the second conductive pattern 4910-2 to flow into the ground of the PCB, thereby forming a transmission line that is capable of transmitting/receiving wireless electromagnetic waves.

According to an embodiment, the ground member 4920 may be disposed between a first face and a second face of the housing forming the outer region of the electronic device 4900.

According to an embodiment, the ground member 4920 may be at least partially disposed within the housing that forms the exterior of the electronic device 4900 and/or on a portion of the housing.

According to an embodiment, the ground member 4920 may be a portion of the PCB of the electronic device 4900. For example, the ground member 4920 may include a PCB ground.

According to an embodiment, the ground member 4920 may be electrically connected to the second conductive pattern 4910-2. The ground member 4920 may serve as an antenna ground for resonance of the second conductive pattern 4910-2.

According to various embodiments, the second conductive pattern 4910-2 may include a radiator for supporting the wireless charging circuit 4950. For example, the second conductive pattern 4910-2 may be used for transmitting wireless power to an external device, or for wirelessly receiving power from the external device. For example, the second conductive pattern 4910-2 may take at least one of a form of a coil type metal pattern, and a form of an annular metal pattern.

According to an embodiment, the second conductive pattern 4910-2 may be electrically connected to the control circuit 4990. At least a portion of the second conductive pattern 4910-2 may be electrically connected to a switch 4990-2 of the control circuit 4990, and may be electrically connected to one of the communication circuit 4930 and the wireless charging circuit 4950 depending on the operation of controlling the switch 4990-2 by the processor 4990-1.

According to various embodiments, in the case where at least a portion of the second conductive pattern 4910-2 is configured as at least one antenna radiator for supporting communication as described above, the communication circuit 4930 may support various types of communication that use the second conductive pattern 4910-2. For example, the communication circuit 4930 may include a cellular communication circuit and may support cellular communication with an external device using at least a portion of the second conductive pattern 4910-2. For example, the communication circuit 4930 may include a short range communication circuit, and may support short range communication (e.g., WiFi, Bluetooth, NFC, or GNSS) with an external device using at least a portion of the second conductive pattern 4910-2. For example, the communication circuit 4930 may include a communication circuit based on a magnetic signal, and may support magnetic signal transmission/reception (e.g., magnetic security transmission (MST) for electronic payment) with an external device using at least a portion of the second conductive pattern 4910-2.

According to various embodiments, at least a portion of the second conductive pattern 4910-2 may be a radiator configured to support wireless charging. The wireless charging circuit 4950 may be configured to wirelessly transmit power to an external device, or to wirelessly receive power from the external device using at least a portion of the second conductive pattern 4910-2. The wireless charging circuit 4950 may be configured as, for example, a magnetic resonance type, a magnetic induction type, or an electromagnetic wave type. The wireless charging circuit 4950 may include an additional circuit for wireless charging (e.g., a resonance circuit or a rectifier).

According to an embodiment, the PMIC 4970 may be electrically connected to the control circuit 4990 and the communication circuit 4930. The PMIC 4970 may efficiently manage and optimize the use of power within a system. For example, the processor 4990-1 may transmit, to the PMIC 4970, a signal according to load to be processed. The PMIC 4970 may adjust a core voltage to be supplied to the processor 4990-1 to be suitable to the processor 4990-1.

According to an embodiment, the PMIC 4970 may optimize a power distribution between a battery charging circuit and a system power supply device when the wireless charging circuit 4950 is electrically connected to the control circuit 4990.

According to an embodiment, the memory 4980 may be electrically connected to the processor 4990-1 of the control circuit 4990. The memory 4980 may store a software-related program (a set of commands) that can be executed by the processor 4990-1. The memory 4980 may include at least one high speed random accessory memory (e.g., a magnetic disc storage device) and/or a non-volatile memory or at least one optical storage device and/or a flash memory (e.g., NAND or NOR).

According to an embodiment of the present disclosure, the memory 4980 may include a program that allows the control circuit 4990 to control the switch 4990-2 (hereinafter, the program will be referred to as a "switch control program").

The term "program" may also be referred to as a group of commands or a command set. By the switch control program, at least a portion of the second conductive pattern 4910-2 may be constituted in an electric floating status 4901 or may be electrically connected to the communication circuit 4930, the wireless charging circuit 4950, or the ground member 4920.

According to an embodiment, the switch control program may be configured to control the switch 4990-2 based on various inputs generated from the electronic device 4900. For example, the switch control program may be configured to control the switch 4990-2 based on at least a part of information acquired from at least one sensor 4960 of the electronic device 4900. For example, the switch control program may be configured to control the switch 4990-2 based on at least a part of a user input generated from an input device of the electronic device 4900.

According to an embodiment, the control circuit 4990 may include the processor 4990-1 and the switch 4990-2. The processor 4990-1 may execute various software programs (command sets) stored in the memory 4980 so as to perform various functions for the electronic device 4900. The processor 4990-1 may execute the switch control program stored in the memory 4980 so as to control the switch 4990-2 and to perform a function that is suitable thereto.

According to various embodiments, the processor 4990-1 may control the switch 4990-2 such that at least a portion of the second conductive pattern 4910-2 is electrically connected to the communication circuit 4930. For example, in a case where at least a portion of the second conductive pattern 4910-2 is used in short range communication and the short range communication is set as an active state, the processor 4990-1 may make an adjustment such that at least a portion of the second conductive pattern 4910-2 is electrically connected to the communication circuit 4930. For example, in a case where at least a portion of the second conductive pattern 4910-2 is used in magnetic signal transmission/reception and the magnetic signal transmission/reception is set as an active state, the processor 4990-1 may make an adjustment such that at least a portion of the second conductive pattern 4910-2 is electrically connected to the communication circuit 4930. The processor 4990-1 may perform the corresponding communication (e.g., short range communication or magnetic signal-based communication) using the second conductive pattern 4910-2 and the communication circuit 4930.

According to various embodiments, the processor 4990-1 may control the switch 4990-2 such that at least a portion of the second conductive pattern 4910-2 is electrically connected to the wireless charging circuit 4950. For example, in a case where at least a portion of the second conductive pattern 4910-2 is used in wireless charging and the wireless charging is set as an active state, the processor 4990-1 may control the switch 4990-2 such that at least a portion of the second conductive pattern 4910-2 is electrically connected to the wireless charging circuit 4950. The processor 4990-1 may be configured to wirelessly transmit power to an external device, or to wirelessly receive power from the external device by using the wireless charging circuit 4950.

According to various embodiments, the second conductive pattern 4910-2 may include a first antenna radiator for wireless charging and a second antenna radiator for wireless communication. Here, the wireless charging and the wireless communication may be set as an active state or an inactive state by a user input. When both the wireless charging and the wireless communication are set as the active state, the processor 4990-1 may control the switch 4990-2 such that the first antenna radiator for wireless charging is electrically connected to the wireless charging circuit 4950 and the second antenna radiator for wireless communication is electrically connected to the communication circuit 4930. For example, when both the wireless charging and the wireless communication are set as the inactive state, the processor 4990-1 may control the switch 4990-2 such that the first antenna radiator for wireless charging is not electrically connected to the wireless charging circuit 4950 and the second antenna radiator for wireless communication is not electrically connected to the communication circuit 4930. For example, when both the wireless charging and the wireless communication are set as the inactive state, the processor 4990-1 may control the switch 4990-2 such that at least one of the first antenna radiator for wireless charging and the second antenna radiator for wireless communication is configured to be in an electric floating status 4901, or is electrically connected to the ground member 4920.

According to various embodiments, the processor 4990-1 may control the switch 4990-2 such that a portion of the second conductive pattern 4910-2 is in the electric floating status 4901. At least a portion of the second conductive pattern 4910-2, which is in the electric floating status 4901, may reduce the effect of electromagnetic waves generated from the electronic device 4900 on the user's body.

According to various embodiments, a portion of the second conductive pattern 4910-2, which is in the electric floating status 4901, may support the maintenance of the antenna performance of the antenna device that uses another portion of the second conductive pattern 4910-2.

According to various embodiments, the processor 4990-1 may control the switch 4990-2 such that at least a portion of the second conductive pattern 4910-2 is electrically connected to the ground member 4920 (e.g., the PCB ground). A portion of the second conductive pattern 4910-2 electrically connected to the ground member 4920 may support the maintenance of the antenna performance of the antenna device that uses another portion of the second conductive pattern 4910-2.

According to various embodiments, a portion of the second conductive pattern 4910-2, which is electrically connected to the ground member 4920 (e.g., the PCB ground), may reduce the effect of electromagnetic waves generated from the electronic device 4900 on the user's body.

According to an embodiment, a switch control program stored in the memory 4980, the processor 4990-1 may control the communication circuit 4930 such that the transmission power (Tx power) of at least a portion of the second conductive pattern 4910-2 is adjusted. For example, the communication circuit 4930 may differently set the Tx power provided to the first portion of the second conductive pattern 4910-2 and the Tx power provided to the second portion of the second conductive pattern 4910-2. For example, the communication circuit 4930 may cut off the Tx power of a portion of the second conductive pattern 4910-2.

According to an embodiment, the processor 4990-1 may adjust the Tx power of at least a portion of the second conductive pattern 4910-2 based on at least a portion of a signal related to a touch input or a hovering input, which is delivered from the touch sensing circuit 4940. For example, the second conductive pattern 4910-2 may include a $(2-1)^{th}$ conductive pattern, a $(2-2)^{th}$ conductive pattern, and a $(2-3)^{th}$ conductive pattern. The $(2-1)^{th}$ conductive pattern may be disposed along at least a portion of the first face of the electronic device 4900. The $(2-2)^{th}$ conductive pattern may be disposed along at least a portion of the second face of the electronic device 4900. The $(2-3)^{th}$ conductive pattern may be disposed along at least a portion of the third face of the electronic device 4900. When the user's body is proximate to one of the first, second, and third faces of the electronic device 4900, the touch sensing circuit 4940 may deliver a signal related to the corresponding touch input or hovering input to the processor 4990-1. The processor 4990-1 may lower the Tx power provided to a portion of the second conductive pattern 4910-2 disposed along one face to which the user's body is proximate, and may lower the Tx power provided to another portion of the second conductive pattern 4910-2 disposed along two other faces to which the user's body is not proximate. Alternatively, when the user's body is proximate to two of the first, second, and third faces of the electronic device 4900, the touch sensing circuit 4940 may deliver a signal related to the corresponding touch input or hovering input to the processor 4990-1. The processor 4990-1 may lower the Tx power provided to a portion of the second conductive pattern 4910-2 disposed along two faces to which the user's body is proximate, and may raise the Tx power provided to another portion of the second conductive pattern 4910-2 disposed along the remaining one face to which the user's body is not proximate.

According to an embodiment, the processor 4990-1 may adjust the Tx power of at least a portion of the second conductive pattern 4910-2 based on at least a portion of a signal delivered from at least one sensor 4960. For example, the second conductive pattern 4910-2 may include a $(2-1)^{th}$ conductive pattern disposed along the first face, a $(2-2)^{th}$ conductive pattern disposed along the second face, and a $(2-3)^{th}$ conductive pattern disposed along the third face. When the user's body is proximate to one of the first, second, and third faces of the electronic device 4900, the at least one sensor 4960 (e.g., a pressure sensing sensor or a proximity sensing sensor) may deliver a corresponding signal to the processor 4990-1. The processor 4990-1 may lower the Tx power provided to a portion of the second conductive pattern 4910-2 disposed along one face to which the user's body is proximate, and may lower the Tx power provided to another portion of the second conductive pattern 4910-2 disposed along two other faces to which the user's body is not proximate. Alternatively, when the user's body is proximate to two of the first, second, and third faces of the electronic device 4900, the at least one sensor 4960 may deliver a corresponding signal to the processor 4990-1. The processor 4990-1 may lower the Tx power provided to a portion of the second conductive pattern 4910-2 disposed along two faces to which the user's body is proximate, and may raise the Tx power provided to another portion of the second conductive pattern 4910-2 disposed along the remaining one face to which the user's body is not proximate.

According to various embodiments, the operation of reducing the Tx power provided to at least a portion of the second conductive pattern 4910-2 of a face where the user's body is proximate may reduce an effect (e.g., Specific Absorption Rate (SAR)) on the user's body by the second conductive pattern 4910-2.

According to various embodiments, the operation of increasing the Tx power provided to the other portion of the second conductive pattern 4910-2 on the other face to which the user's body is not proximate can suppress the antenna performance from being deteriorated by the user's body.

According to various embodiments, the processor 4990-1 may selectively activate at least a portion of the second conductive pattern 4910-2 at least partially based on various types of inputs. For example, the processor 4990-1 may set an antenna active region according to a pressing position determined from the pressure sensing sensor (e.g., the pressure sensing sensor 2000a in FIG. 20A). When the pressure sensing position is changed from the first position to the second position, the processor 4990-1 may change the antenna active region. Alternatively, when a pressure sensing position is added or deleted, the processor 4990-1 may change the antenna active region. Alternatively, the processor 4990-1 may set the antenna active region according to the intensity of the pressure determined at one or more positions. For example, when the intensity of the pressure determined at the one or more positions increases, the processor 4990-1 may extend or move the antenna active region. According to various embodiments, the processor 4990-1 may also set the antenna active region based on at least a portion of the motion information of the electronic device 4900, which is obtained from a motion information acquisition sensor (e.g., an acceleration sensor or a gyro sensor).

According to an embodiment, based on at least a portion of a signal related to a touch input or a hovering input delivered from the touch sensing circuit 4940, the processor 4990-1 may set some display regions of the panel 4910-3 to a disable state, and may set the other display regions of the panel 4910-3 to an able state in which an image can be displayed. For example, when a touch input or a hovering input that is made through at least one display region, which is gripped by the user's hand to be difficult to see, is determined through the touch sensing circuit 4940, the processor 4990-1 may set the display region to the disable state and may set the remaining display region to the able state in which an image can be displayed.

According to an embodiment, based on at least a portion of a signal related to a touch input or a hovering input delivered from the touch sensing circuit 4940, the processor 4990-1 may set some display regions of the panel 4910-3 to the disable state, and may set the other display regions of the panel 4910-3 to the able state in which an image can be displayed. For example, when at least one display region, which is gripped by the user's hand to be difficult to see, is determined by the at least one sensor 4960 (e.g., a pressure sensor or a proximity sensor), the processor 4990-1 may set the display region to a disable state, and may set the remaining display region to an able state in which an image can be displayed. For example, the processor 4990-1 may identify one face of the electronic device 4900, which is oriented in the gravity direction using the at least one sensor 4960 (e.g., an acceleration sensor and/or a gyro sensor), and may set a display region disposed along the identified face to the disable state. Alternatively, the processor 4990-1 may identify another face of the electronic device 4900, which is oriented opposite to the gravity direction using the at least one sensor 4960, and may set a display region disposed along the identified face to the able state in which an image can be displayed.

According to various embodiments of the present disclosure, the electronic device 4900 may further include outer various components. For example, the electronic device 4900 may further include an input device, an audio device, a camera device, and the like, which are not illustrated.

Figure 50:
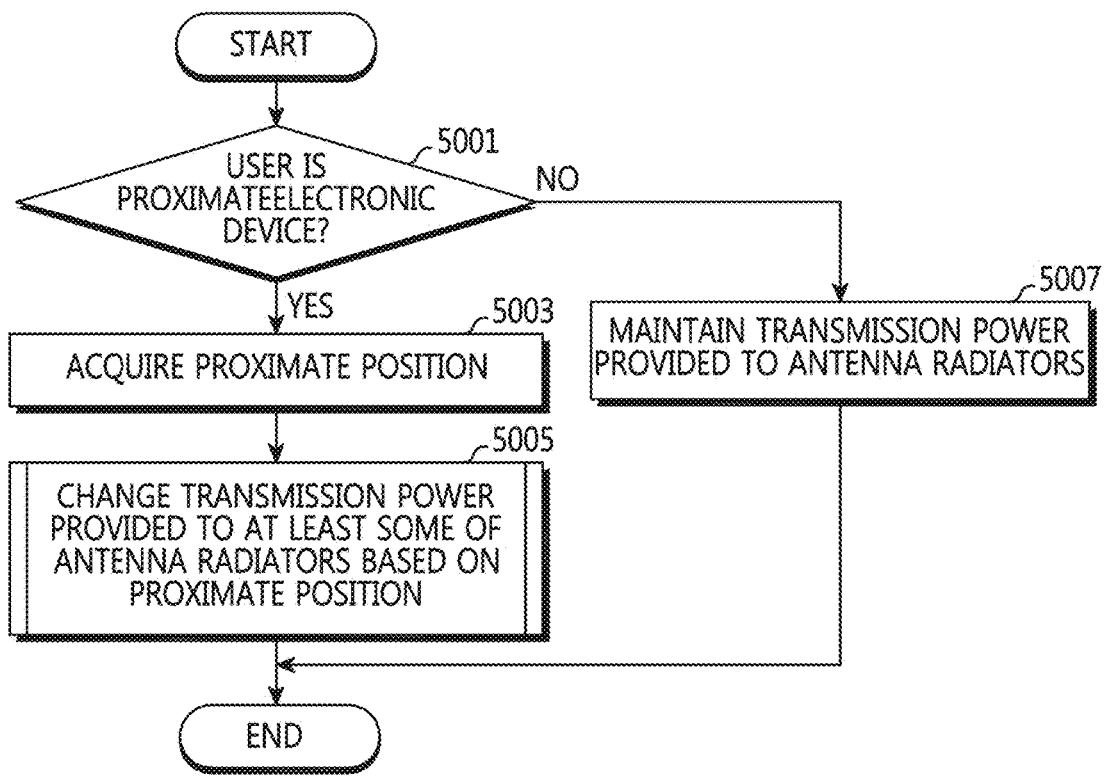
FIG. 50 illustrates a flowchart illustrating operations of an electronic device according to an embodiment of the present disclosure.
Figure 51A:
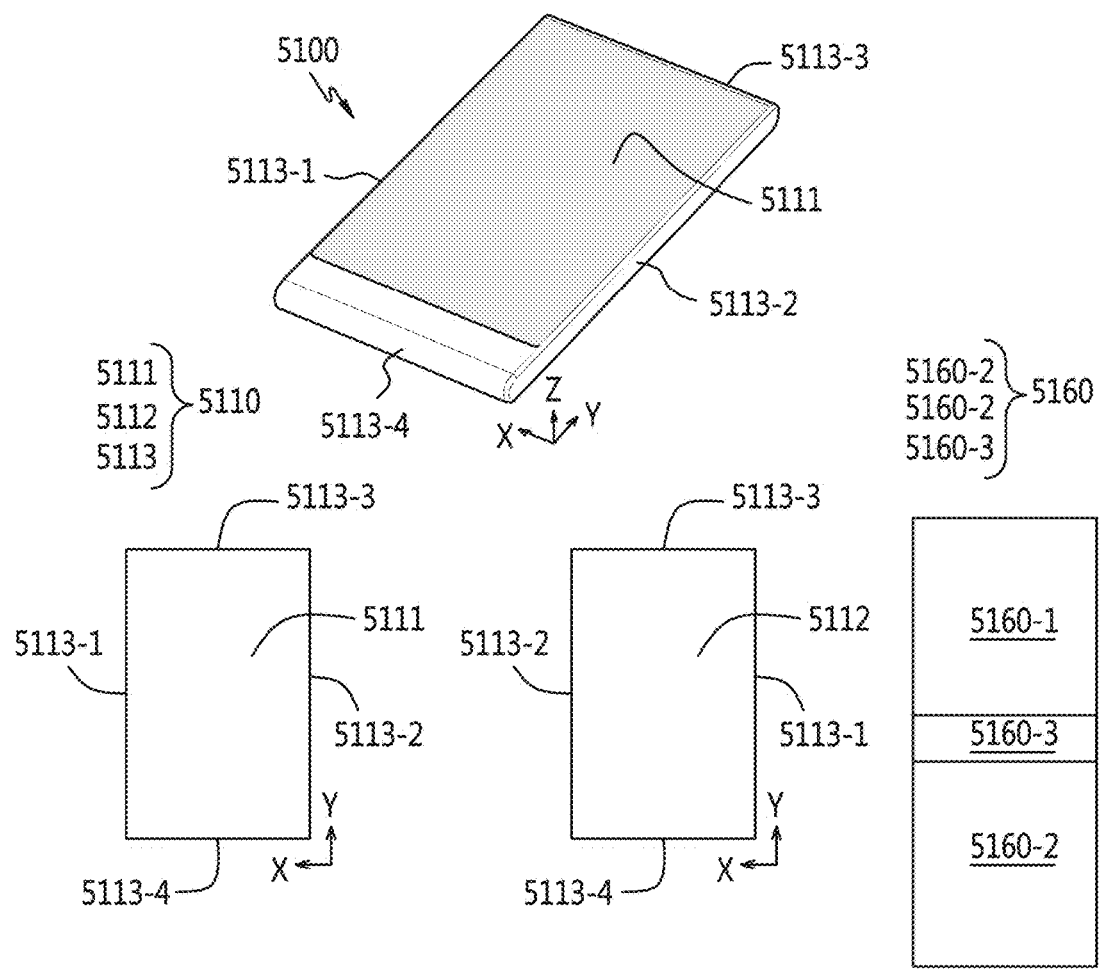
FIG. 51A is a view illustrating an operation flow of an electronic device according to an embodiment of the present disclosure.

FIG. 50 is a view illustrating an operation flow of an electronic device according to an embodiment of the present disclosure. FIG. 51A is a view illustrating an operation flow of an electronic device according to an embodiment of the present disclosure. FIG. 51B is a view illustrating an operation flow of an electronic device according to an embodiment of the present disclosure. The electronic device may include a configuration that is the same as or similar to at least some of the components described above.

Referring to FIG. 51A, the outer region of the electronic device 5100 may include a first face 5111 and a second face 5112 that faces a direction opposite to the first face 5111. Alternatively, the outer region of the electronic device 5100 may include a third face 5113 that surrounds a space between the first face 5111 and the second face 5112. The third face 5113 may include a first region 5113-1, a second region 5113-2, a third region 5113-3, and a fourth region 5113-4. The first region 5113-1 and the second region 5113-2 may be disposed opposite to each other. The third region 5113-3 and the fourth region 5113-4 may be disposed opposite to each other.

Referring to FIGS. 50 and 51A, when the user is proximate to the electronic device 5100, the processor (e.g., the processor 4990-1 of FIG. 49) may determine this in operation 5001.

In operation 5003, the processor 4990-1 is able to detect a position to which the user is proximate (hereinafter referred to as a "proximate position") in the external area of the electronic device 5100.

According to an embodiment, the electronic device 5100 may include a display 5160 that is disposed along at least a portion of one or more of the first face 5111, the second face 5112, and the third face 5113. The display 5160 may include a first display region 5160-1 disposed along the first face 5111, a second display region 5160-2 disposed along the second face 5112, and a third display region 5160-3 disposed along the third region 5113-3 of the third face 5113. The third display region 5160-3 may interconnect the first display region 5160-1 and the second display region 5160-2. The display 5160 may include a first conductive pattern (not illustrated) that supports a touch input or a hovering input. The first conductive pattern may be disposed along at least a portion of at least one of the first display region 5160-1, the second display region 5160-2, and the third display region 5160-3. The first conductive pattern may include a $(1-1)^{th}$ conductive pattern disposed in the first display region 5160-

1, a $(1-2)^{th}$ conductive pattern disposed in the second display region 5160-2, and a $(1-3)^{th}$ conductive pattern disposed in the third display region 5160-3. According to various embodiments, the $(1-1)^{th}$ conductive pattern, the $(1-2)^{th}$ conductive pattern, and the $(1-3)^{th}$ conductive pattern may be physically separated from each other.

According to an embodiment, the processor 4990-1 may acquire a proximate position on the first face 5111 using a touch input or a hovering input determined through the $(1-1)^{th}$ conductive pattern disposed along the first face 5111. The processor 4990-1 may acquire a proximate position on the second face 5112 using a touch input or a hovering input determined through the $(1-2)^{th}$ conductive pattern disposed along the second face 5112. The processor 4990-1 may acquire a proximate position on the third face 5113 using a touch input or a hovering input determined through the $(1-3)^{th}$ conductive pattern disposed along the third face 5113.

According to another embodiment, the electronic device 5100 may include at least one sensor (e.g., a pressure sensing sensor or a proximity sensing sensor) (not illustrated) disposed along the outer region. For example, the at least one sensor may include a first pressure sensing sensor disposed along at least a portion of the first face 5111. The at least one sensor may include a second pressure sensing sensor disposed along at least a portion of the second face 5112. The at least one sensor may include a third pressure sensing sensor disposed along at least a portion of the third face 5113.

According to an embodiment, the processor 4990-1 may acquire a proximate position on the first face 5111 using the first pressure sensing sensor disposed along the first face 5111. The processor 4990-1 may acquire a proximate position on the second face 5112 using the second pressure sensing sensor disposed along the second face 5112. The processor 4990-1 may acquire a proximate position on the third face 5113 using the third pressure sensing sensor disposed along the third face 5113.

In operation 5005, the processor 4990-1 may adjust Tx power provided to at least a portion of an antenna radiator mounted in the electronic device 5100 based on the acquired proximity position. According to an embodiment, the display 5160 may include a second conductive pattern (not illustrated) that is available as an antenna radiator. The second conductive pattern may include a $(2-1)^{th}$ conductive pattern disposed along at least a portion of the first display region 5160-1. The second conductive pattern may include a $(2-2)^{th}$ conductive pattern disposed along at least a portion of the second display region 5160-2. The second conductive pattern may include a $(2-3)^{th}$ conductive pattern disposed along at least a portion of the third display region 5160-3. According to various embodiments, the $(2-1)^{th}$ conductive pattern, the $(2-2)^{th}$ conductive pattern, and the $(2-3)^{th}$ conductive pattern may be physically separated from each other.

According to an embodiment, the processor 4990-1 may identify the face including the acquired proximity position, and may change the Tx power provided to at least a portion of the second conductive pattern.

When the user is not proximate to the electronic device 5100, in operation 5007, the processor 4990-1 adjusts a communication circuit (the communication circuit 4930 of FIG. 49) to maintain the Tx power provided to the antenna radiator mounted on the electronic device 5100. Referring to FIG. 51B according to various embodiments, the display 5160 may include a first antenna radiator 5160-11 disposed in the first display region 5160-1, a second antenna radiator 5160-21 disposed in the second display region 5160-2, and a third antenna radiator 5160-31 disposed in the third display region 5160-3. For example, when the electronic device 5100 is separated from the user, the processor 4990-1 may maintain the first Tx power provided to the first antenna radiator 5160-11. Alternatively, when the electronic device 5100 is separated from the user, the processor 4990-1 may maintain the second Tx power provided to the second antenna radiator 5160-21. Alternatively, when the electronic device 5100 is separated from the user, the processor 4990-1 may maintain the third Tx power provided to the third antenna radiator 5160-31. The first Tx power, the second Tx power, and the third Tx power may be equal to or different from each other.

Figure 52:
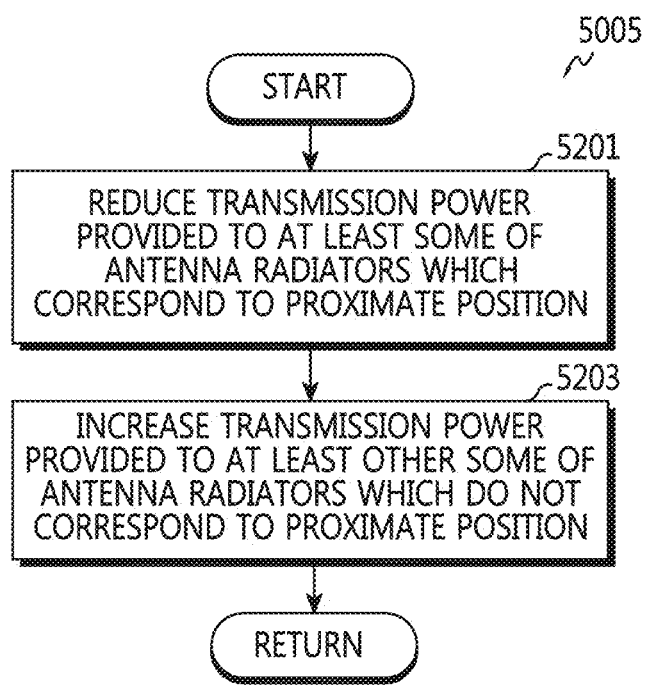
FIG. 52 is a view illustrating transmission power (Tx power) adjustment of at least a portion of an antenna radiator based on a proximity position according to an embodiment of the present disclosure.
Figure 53A:
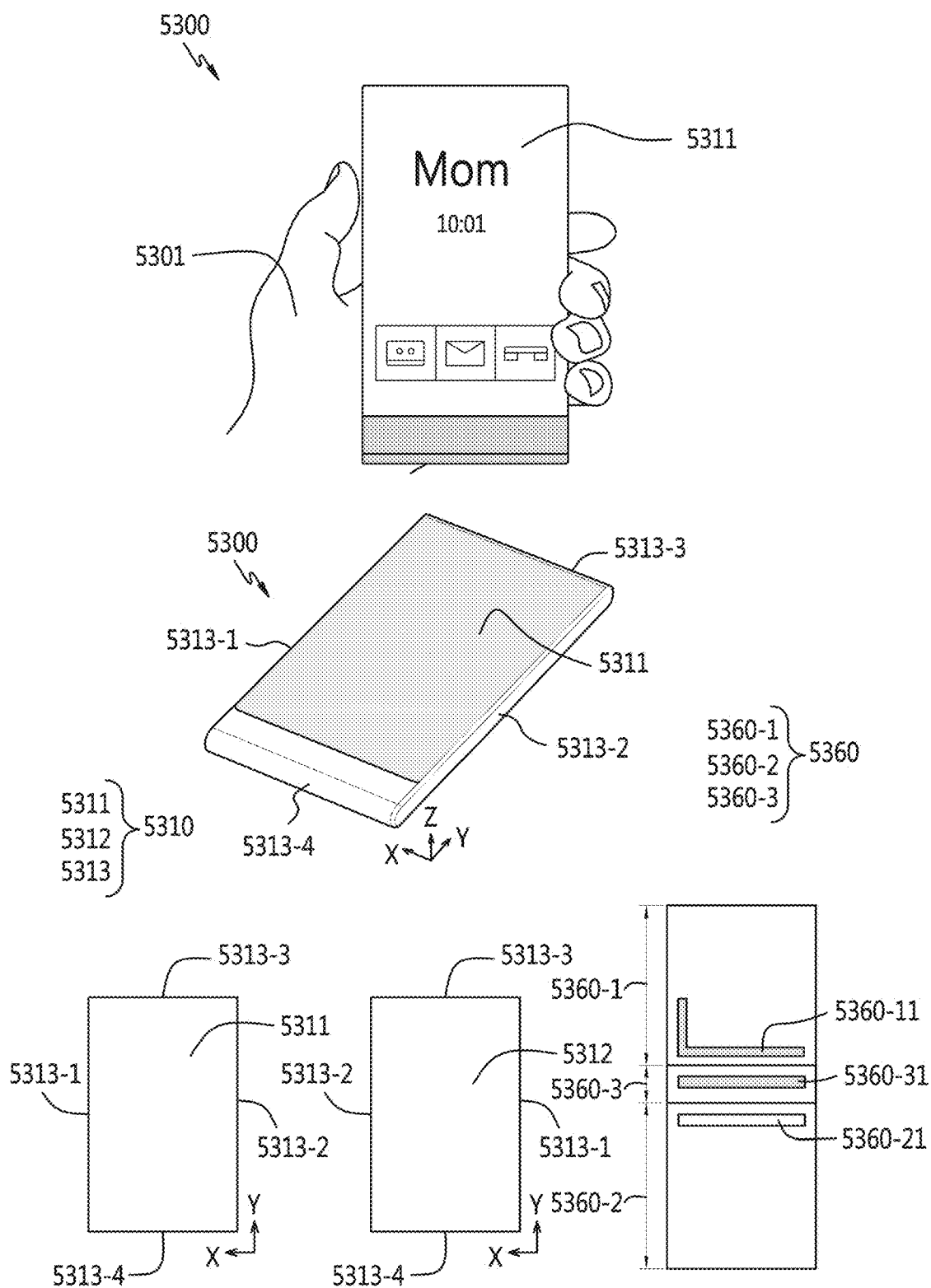
FIGS. 53A and 53B are views for describing an operation flow of an electronic device according to various embodiments of the present disclosure.
Figure 53B:
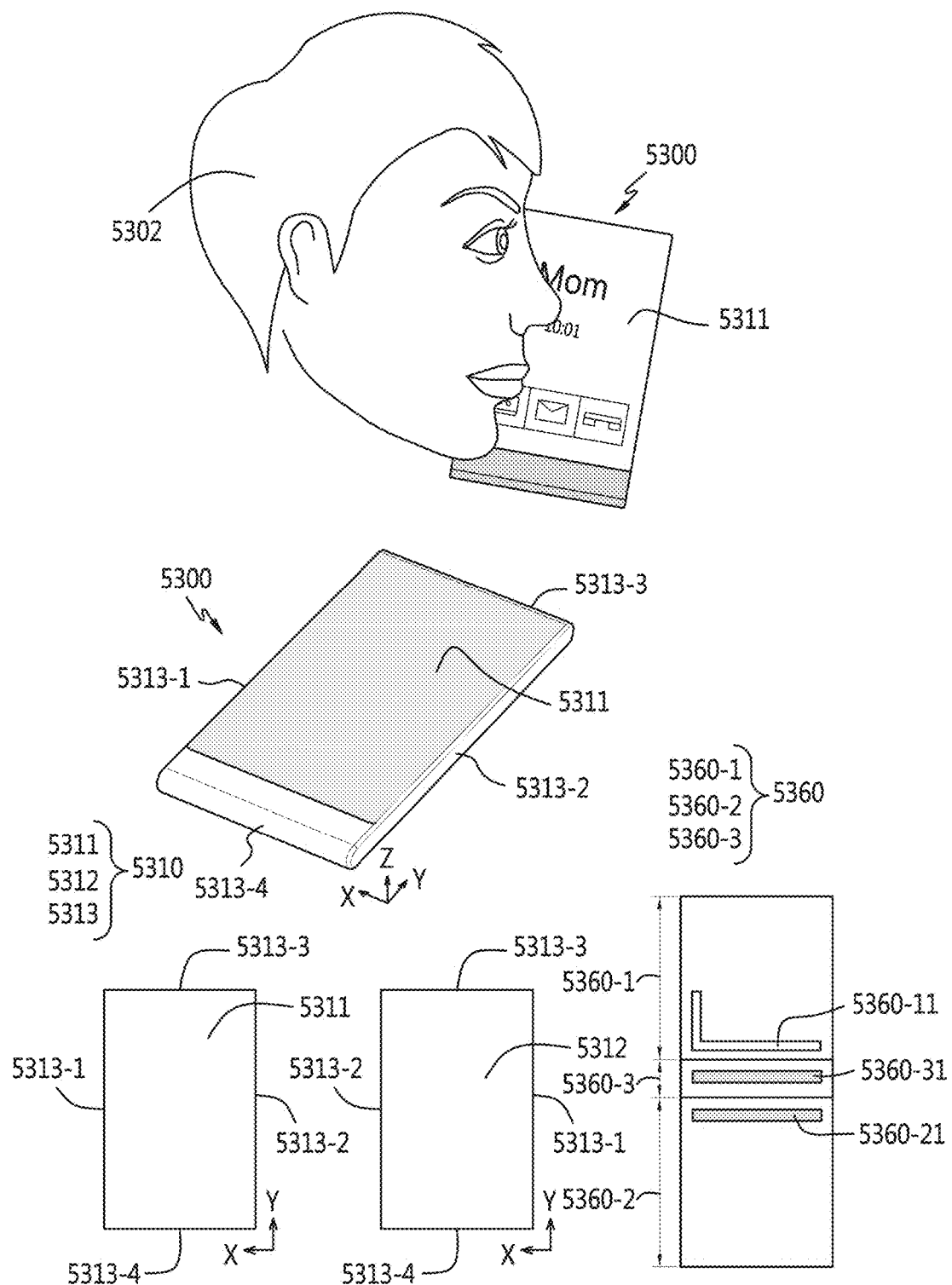

FIG. 52 is a view illustrating Tx power adjustment of at least a portion of an antenna radiator based on a proximity position according to an embodiment of the present disclosure. FIGS. 53A and 53B are views for describing an operation flow of an electronic device according to various embodiments of the present disclosure.

Referring to FIGS. 53A and 53B, the outer region 5310 of an electronic device 5300 may include a first face 5311 and a second face 5312 that faces a direction opposite to the first face 5311. The outer region of the electronic device 5300 may include a third face 5313 that surrounds a space between the first face 5311 and the second face 5312. The third face 5313 may include a first region 5313-1, a second region 5313-2, a third region 5313-3, and a fourth region 5313-4. The first region 5313-1 and the second region 5313-2 may be disposed opposite to each other. The third region 5313-3 and the fourth region 5313-4 may be disposed opposite to each other.

When viewed in a plan view, the display 5360 may include a first display region 5360-1 disposed along the first face 5311, a second display region 5360-2 disposed along the second face 5312, or a third display area 5360-3 disposed along the third region 5313-3 of the third face 5313. The display 5360 may include a first antenna radiator 5360-11 disposed in the first display region 5360-1, a second antenna radiator 5360-21 disposed in the second display region 5360-2, and a third antenna radiator 5360-31 disposed in the third display region 5360-3.

Referring to FIG. 52, in operation 5201, the processor 4990-1 may adjust a communication circuit (e.g., the communication circuit 4930 of FIG. 49) to reduce the Tx power provided to at least some antenna radiators that correspond to a proximate position among the antenna radiators mounted in the electronic device 5300.

In operation 5203, the processor 4990-1 may adjust the communication circuit 4930 to raise the Tx power provided to at least some other antenna radiators that do not correspond to a proximate position among the antenna radiators mounted in the electronic device 5300.

Referring to FIG. 53A, when the electronic device 5300 is held by the user's hand 5301, the user's hand 5301 may be proximate to the second face 5312 among the outer regions of the electronic device 5300. The electronic device 5300 may lower or block the Tx power provided to the second antenna radiator 5360-21 disposed along the second face 5312. Alternatively, the electronic device 5300 may raise the Tx power of the first antenna radiator 5360-11 disposed along the first face 5311 and/or the third antenna radiator 5360-31 disposed along the third face 5313. The operation of reducing the Tx power provided to the second conductive pattern 5360-21 of a face where the user's body is proximate may reduce an effect on the user's body by the second conductive pattern 5360-21. The operation of raising the Tx power provided to the first antenna radiator 5360-11 and/or the third antenna radiator 5360-31 on the other face where the user's body is not proximate may suppress the antenna performance from being deteriorated by the user's body.

Referring to FIG. 53B, when the electronic device 5300 is proximate to the user's face 5302, the user's face 5302 may be proximate to the first face 5311 among the outer regions of the electronic device 5300. The electronic device 5300 may lower or block the Tx power provided to the first antenna radiator 5360-11 disposed along the first face 5311. Alternatively, the electronic device 5300 may raise the Tx power of the second antenna radiator 5360-21 disposed along the second face 5312 and/or the third antenna radiator 5360-31 disposed along the third face 5313. The operation of reducing the Tx power provided to the first antenna radiator 5360-11 of a face to which the user's body is proximate may reduce an effect on the user's body by the first antenna radiator 5360-11. The operation of raising the Tx power provided to the second antenna radiator 5360-21 and/or the third antenna radiator 5360-31 on the other face to which the user's body is not proximate may suppress the antenna performance from being deteriorated by the user's body.

Figure 54:
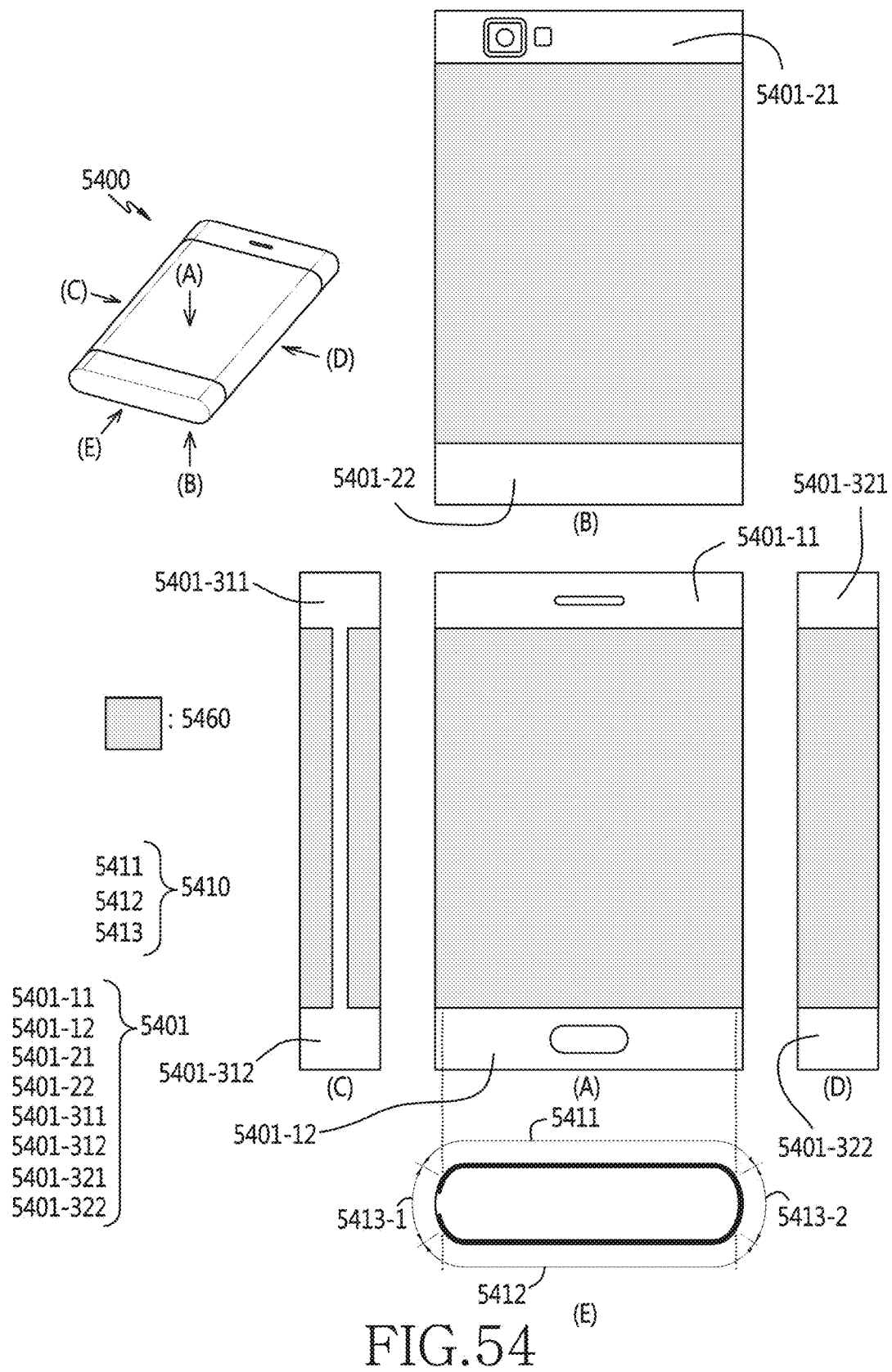
FIG. 54 is a view illustrating a position where at least one sensor is disposed in an electronic device according to an embodiment of the present disclosure.

FIG. 54 is a view illustrating a position where at least one sensor is disposed in an electronic device according to an embodiment of the present disclosure. The electronic device may include a configuration that is the same as or similar to at least some of the components described above.

Referring to FIG. 54, when viewed in a cross section, the outer region 5410 of an electronic device 5400 may include a first face 5411, a second face 5412, and a third face 5413.

According to an embodiment, the electronic device 5400 may include a display 5460 disposed along at least a portion of the outer region thereof.

According to an embodiment, the electronic device 5400 may include at least one sensor (not illustrated) disposed along at least a portion of the outer region thereof. The at least one sensor may determine whether the user is proximate to the electronic device 5400.

According to an embodiment, the at least one sensor may support the performance maintenance of the antenna device using an antenna radiator of the display 5460. Alternatively, the at least one sensor may be used to secure the antenna performance using an antenna radiator of display 5460 by suppressing an effect on a human body. For example, when the electronic device 5400 is in proximity to the user's body, the user's body, which is an electric potential, is brought close to the electronic device 5400, and the antenna device is designed based on the permittivity of the human body, so that the electric length of the antenna radiator becomes long to have a relatively low resonance frequency under a situation where the permittivity of the human body exists, which may cause the performance deterioration of the antenna device. In another example, when the electronic device 5400 is in proximity to the user's body, the user's body, which is an electric potential, is brought away from the electronic device 5400, and the antenna device is designed based on the permittivity of the human body, so that the electric length of the antenna radiator becomes short to have a relatively high resonance frequency under a situation where the permittivity of the human body does not exist, which may cause the performance deterioration of the antenna device. Depending on a detection result from at least one sensor, the electronic device 5400 may control the antenna device to maintain the performance of the antenna device.

According to an embodiment, the above-mentioned at least one sensor may be disposed along at least a portion of one or more of the first face 5411, the second face 5412, and the third face 5413 of the electronic device 5400.

According to various embodiments, the at least one sensor may be disposed along at least a portion of the display 5460.

According to various embodiments, the at least one sensor may be disposed in a dead space 5401 in the vicinity of the antenna radiator of the display 5460.

Figure 55:
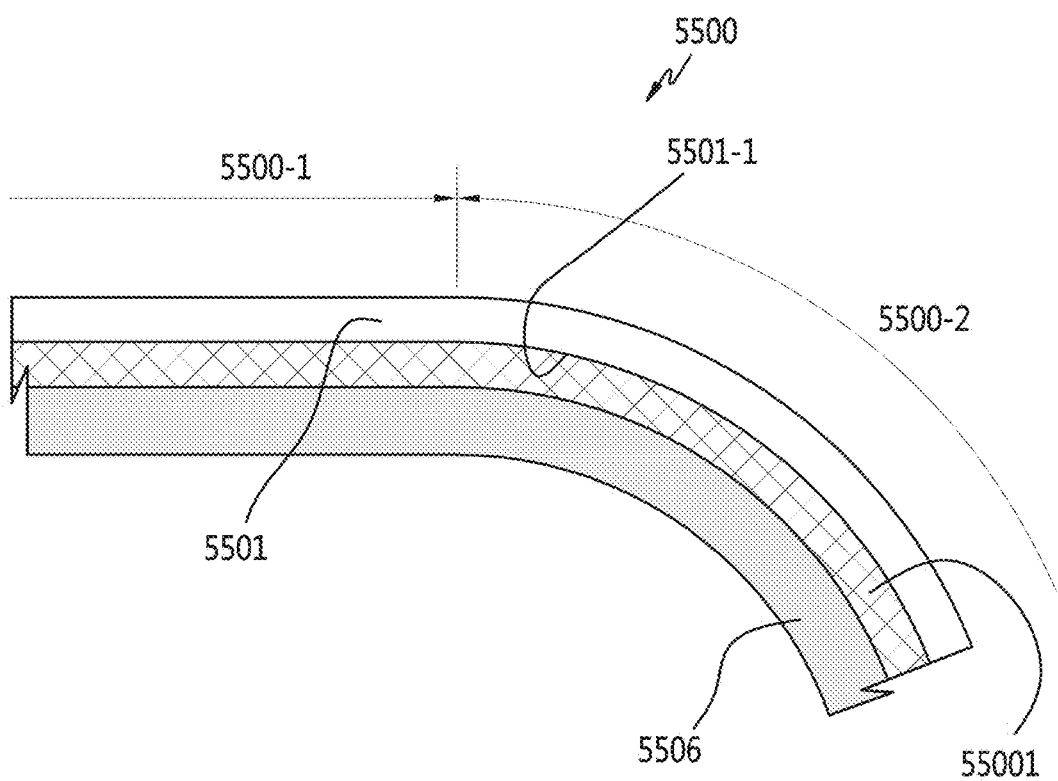
FIG. 55 is a view illustrating a display according to an embodiment of the present disclosure.

FIG. 55 is a view illustrating a display according to an embodiment of the present disclosure.

Referring to FIG. 55, a display 5500 may include a window 5501, a pressure sensing sensor 55001, and a panel 5506.

The pressure sensing sensor 55001 may be disposed between the window 5501 and the panel 5506.

According to an embodiment, the panel 5506 may include a circuit configuration (not illustrated) that implements a color according to an image-related signal. Alternatively, the panel 5506 may include a first conductive pattern (not illustrated) for supporting a touch input and/or a hovering input. The first conductive pattern may be electrically connected to a touch sensing circuit that is mounted in an electronic device (e.g., the electronic device 101 of FIG. 1) that is mounted with the display 5500. Alternatively, the panel 5506 may include a second conductive pattern (not illustrated) that may be used as an antenna radiator that supports various types of communication. The second conductive pattern may be electrically connected to a communication circuit that is mounted in the electronic device 101 that is mounted with the display 5500.

According to various embodiments, the panel 5506 may include the conductive pattern 2108, the touch panel 2103, and the display panel 2106 of FIG. 21. Alternatively, the panel 5506 may include the conductive pattern 2208, the touch panel 2203, and the display panel 2206 of FIG. 22. Alternatively, the panel 5506 may include the conductive pattern 2308 and the display panel 2306 of FIG. 23. Alternatively, the panel 5506 may include the conductive pattern 2408 and the display panel 2406 of FIG. 24. Alternatively, the panel 5506 may include the conductive pattern 2508 and the display panel 2506 of FIG. 25. Alternatively, the panel 5506 may include the conductive pattern 2608 and the display panel 2606 of FIG. 26. Alternatively, the panel 5506 may include the touch panel 2803 and the display panel 2806 of FIG. 28. Alternatively, the panel 5506 may include the touch panel 2903 and the display panel 2906 of FIG. 29.

According to an embodiment, the pressure sensing sensor 55001 may be coupled to the window 5501. For example, the pressure sensing sensor 55001 may be coupled to the face 5501-1 of the window 5501, which faces the panel 5506. For example, an adhesive layer (not illustrated) (e.g., an OCA) may be disposed between the pressure sensing sensor 55001 and the window 5501.

According to an embodiment, when viewed in a cross section, the display 5500 may include a substantially flat first portion 5500-1 and a second portion 5500-2 that extends from the first portion 5500-1 to be curved.

According to an embodiment, the window 5501, the pressure sensing sensor 55001, and the panel 5506 may be disposed in the first portion 5500-1 or the second portion 5500-2.

According to an embodiment, the pressure sensing sensor 55001 may measure a position where a pressure is applied in a direction from the window 5501 toward the panel 5506 of the display 5500 and the intensity of the pressure.

According to an embodiment, when there is a user touch to press a portion of the first portion 5500-1 or the second portion 5500-2 of the window 5501, an electronic device (e.g., the electronic device 101 in FIG. 1) that is mounted with the display 5500 may determine a pressure input (pressing position and intensity) using the pressure sensing sensor 55001 after the touch input is made using the first conductive pattern.

According to an embodiment, the pressure sensing sensor 55001 may be electrically connected to a touch sensing circuit. For example, the touch sensing circuit may determine a pressure input after a touch input is made.

According to an embodiment, the pressure input (pressing position and intensity) determined by the pressure sensing sensor 55001 may be used for an antenna control operation. Antenna performance may be changed according to the distance between a human body and an antenna radiator. When a human body and an antenna radiator are close to each other, the absorbance of the human body may increase and the radiation coverage may decrease. An electronic device (e.g., the electronic device 101 of FIG. 1) that is mounted with the display 5500 may change a signal transferred to at least a portion of an antenna radiator (e.g., a second conductive pattern) of the panel 5506 based on at least a portion of a pressure input acquired from the pressure sensing sensor 55001, or may set a weighted value thereof. For example, the electronic device 101 may change the Tx power provided to at least a portion of the second conductive pattern of the panel 5506 based on at least a portion of the pressure input. For example, when the pressing intensity determined at a first position is greater than the pressing intensity determined at a second position, the distance between the user's body and the second conductive pattern may be relatively shorter at the second position. The electronic device 101 may reduce the Tx power through a portion of the second conductive pattern that corresponds to the second position to be lower than the Tx power through the other portion of the second conductive pattern that corresponds to the first position, which may reduce an effect by the user's body so as to secure antenna performance.

Figure 56:
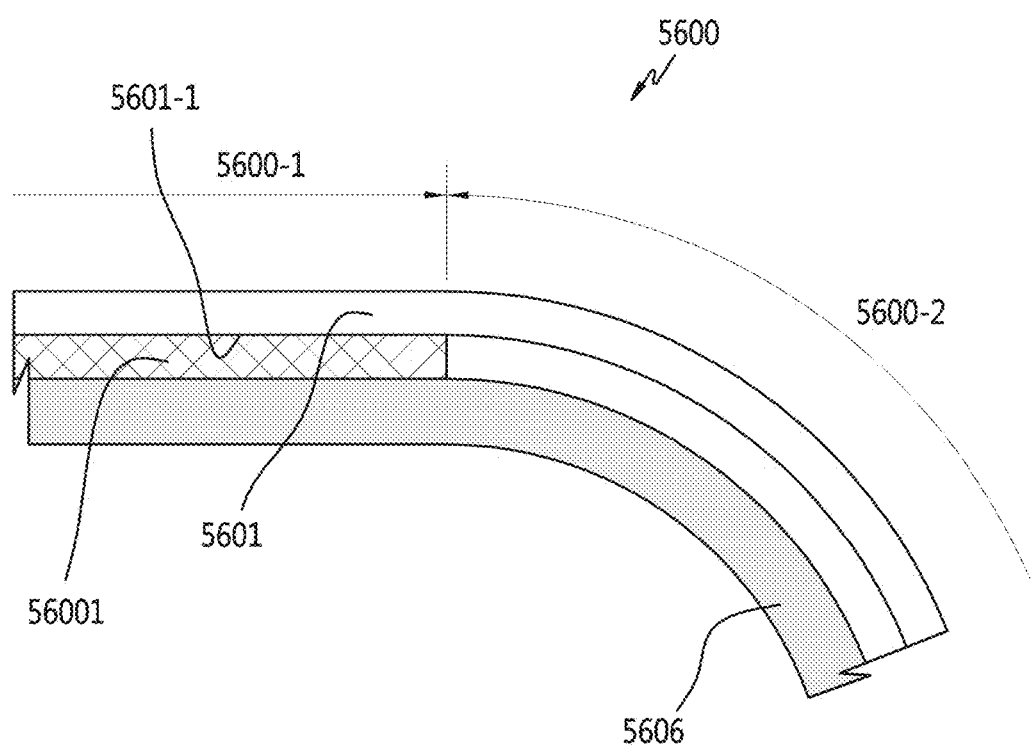
FIG. 56 is a view illustrating a display according to an embodiment of the present disclosure.

FIG. 56 is a view illustrating a display according to an embodiment of the present disclosure.

Referring to FIG. 56, a display 5600 may include a window 5601, a pressure sensing sensor 56001, and a panel 5606.

The pressure sensing sensor 56001 may be disposed between the window 5601 and the panel 5606.

According to an embodiment, the panel 5606 may include a circuit configuration (not illustrated) that implements a color according to an image-related signal. Alternatively, the panel 5606 may include a first conductive pattern (not illustrated) for supporting a touch input and/or a hovering input. The first conductive pattern may be electrically connected to a touch sensing circuit that is mounted in an electronic device (e.g., the electronic device 101 of FIG. 1) that is mounted with the display 5600. Alternatively, the panel 5606 may include a second conductive pattern (not illustrated) that may be used as an antenna radiator that supports various types of communication. The second conductive pattern may be electrically connected to a communication circuit that is mounted in the electronic device 101 that is mounted with the display 5600.

According to various embodiments, the panel 5606 may include the conductive pattern 2108, the touch panel 2103, and the display panel 2106 of FIG. 21. Alternatively, the panel 5606 may include the conductive pattern 2208, the touch panel 2203, and the display panel 2206 of FIG. 22. Alternatively, the panel 5606 may include the conductive pattern 2308 and the display panel 2306 of FIG. 23. Alternatively, the panel 5606 may include the conductive pattern 2408 and the display panel 2406 of FIG. 24. Alternatively, the panel 5606 may include the conductive pattern 2508 and the display panel 2506 of FIG. 25. Alternatively, the panel 5606 may include the conductive pattern 2608 and the display panel 2606 of FIG. 26. Alternatively, the panel 5606 may include the touch panel 2803 and the display panel 2806 of FIG. 28. Alternatively, the panel 5606 may include the touch panel 2903 and the display panel 2906 of FIG. 29.

According to an embodiment, the pressure sensing sensor 56001 may be coupled to the window 5601. For example, the pressure sensing sensor 56001 may be coupled to the face 5601-1 of the window 5601, which faces the panel 5606. For example, an adhesive layer (not illustrated) (e.g., an OCA) may be disposed between the pressure sensing sensor 56001 and the window 5601.

According to an embodiment, when viewed in a cross section, the display 5600 may include a substantially flat first portion 5600-1 and a second portion 5600-2 that extends from the first portion 5600-1 to be curved.

According to an embodiment, the window 5601 and the panel 5606 may be disposed in both the first portion 5600-1 and the second portion 5600-2.

According to an embodiment, the pressure sensing sensor 56001 may be disposed in at least a portion of the first portion 5600-1, but may not be disposed in the second portion 5600-2.

According to an embodiment, the pressure sensing sensor 56001 may measure a position where a pressure is applied in a direction from the window 5601 toward the panel 5606 of the display 5600 and the intensity of the pressure.

According to an embodiment, when there is a user touch to press a portion of the first portion 5600-1 of the window 5601, an electronic device (e.g., the electronic device 101 in FIG. 1) that is mounted with the display 5600 may determine a pressure input (pressing position and intensity) using the pressure sensing sensor 56001 after the touch input is made using the first conductive pattern.

According to an embodiment, the pressure sensing sensor 56001 may be electrically connected to a touch sensing circuit. For example, the touch sensing circuit may determine a pressure input after a touch input is made.

According to an embodiment, the pressure input (pressing position and intensity) determined by the pressure sensing sensor 56001 may be used for an antenna control operation. Antenna performance may be changed according to the distance between a human body and an antenna radiator. When a human body and an antenna radiator are close to each other, an absorbance of the human body may increase and a radiation coverage may decrease. An electronic device (e.g., the electronic device 101 of FIG. 1) that is mounted with the display 5600 change a signal transferred to at least a portion of an antenna radiator (e.g., a second conductive pattern) of the panel 5606 based on at least a portion of a pressure input acquired from the pressure sensing sensor 56001, or may set a weighted value thereof. For example, the electronic device 101 may change the Tx power provided to at least a portion of the second conductive pattern of the panel 5606 based on at least a portion of the pressure input. For example, when the pressing intensity determined at a first position is larger than the pressing intensity determined at a second position, the distance between the user's body and the second conductive pattern may be relatively shorter at the second position. The electronic device 101 may reduce the Tx power through a portion of the second conductive pattern that corresponds to the second position to be lower than the Tx power through the other portion of the second conductive pattern that corresponds to the first position, which may reduce an effect by the user's body so as to secure antenna performance.

Figure 57:
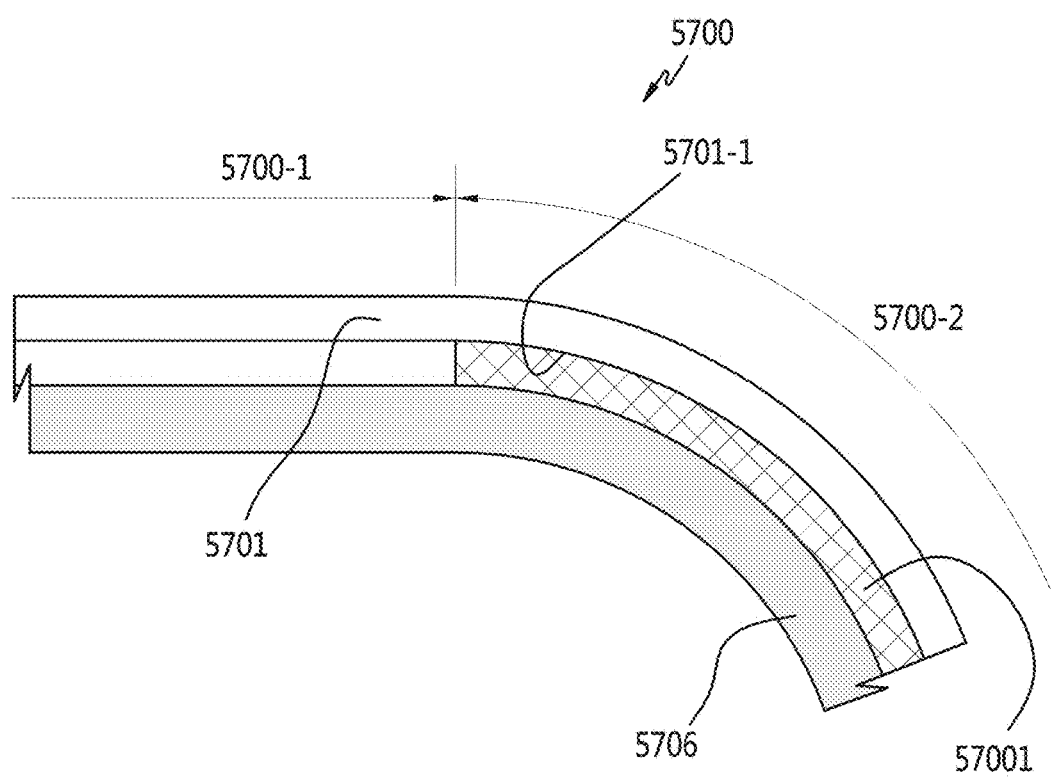
FIG. 57 is a view illustrating a display according to an embodiment of the present disclosure.

FIG. 57 is a view illustrating a display according to an embodiment of the present disclosure.

Referring to FIG. 57, a display 5700 may include a window 5701, a pressure sensing sensor 57001, and a panel 5706.

The pressure sensing sensor 57001 may be disposed between the window 5701 and the panel 5706.

According to an embodiment, the panel 5706 may include a circuit configuration (not illustrated) that implements a color according to an image-related signal. Alternatively, the panel 5706 may include a first conductive pattern (not illustrated) for supporting a touch input and/or a hovering input. The first conductive pattern may be electrically connected to a touch sensing circuit that is mounted in an electronic device (e.g., the electronic device 101 of FIG. 1) that is mounted with the display 5700. Alternatively, the panel 5706 may include a second conductive pattern (not illustrated) that may be used as an antenna radiator that supports various types of communication. The second conductive pattern may be electrically connected to a communication circuit that is mounted in the electronic device 101 that is mounted with the display 5700.

According to various embodiments, the panel 5706 may include the conductive pattern 2108, the touch panel 2103, and the display panel 2106 of FIG. 21. Alternatively, the panel 5706 may include the conductive pattern 2208, the touch panel 2203, and the display panel 2206 of FIG. 22. Alternatively, the panel 5706 may include the conductive pattern 2308 and the display panel 2306 of FIG. 23. Alternatively, the panel 5706 may include the conductive pattern 2408 and the display panel 2406 of FIG. 24. Alternatively, the panel 5706 may include the conductive pattern 2508 and the display panel 2506 of FIG. 25. Alternatively, the panel 5706 may include the conductive pattern 2608 and the display panel 2606 of FIG. 26. Alternatively, the panel 5706 may include the touch panel 2803 and the display panel 2806 of FIG. 28. Alternatively, the panel 5706 may include the touch panel 2903 and the display panel 2906 of FIG. 29.

According to an embodiment, the pressure sensing sensor 57001 may be coupled to the window 5701. For example, the pressure sensing sensor 57001 may be coupled to the face 5701-1 of the window 5701, which faces the panel 5706. For example, an adhesive layer (not illustrated) (e.g., an OCA) may be disposed between the pressure sensing sensor 57001 and the window 5701.

According to an embodiment, when viewed in a cross section, the display 5700 may include a substantially flat first portion 5700-1 and a second portion 5700-2 that extends from the first portion 5700-1 to be curved.

According to an embodiment, the window 5701 and the panel 5706 may be disposed in both the first portion 5700-1 and the second portion 5700-2.

According to an embodiment, the pressure sensing sensor 57001 may be disposed in at least a portion of the second portion 5700-2, but may not be disposed in the first portion 5700-1.

According to an embodiment, the pressure sensing sensor 57001 may output a signal related to a position where a pressure is applied in a direction from the window 5701 toward the panel 5706 of the display 5700 and the intensity of the pressure. For example, when the user's finger presses the window 5701, the pressure sensing sensor 57001 can measure the pressing position and intensity.

According to an embodiment, when there is a user touch to press a portion of the second portion 5700-2 of the window 5701, an electronic device (e.g., the electronic device 101 in FIG. 1) that is mounted with the display 5700 may determine a pressure input (pressing position and intensity) using the pressure sensing sensor 57001 after the touch input is made using the first conductive pattern.

According to an embodiment, the pressure sensing sensor 57001 may be electrically connected to a touch sensing circuit. For example, the touch sensing circuit may determine a pressure input after a touch input is made.

According to an embodiment, the pressure input (pressing position and intensity) determined by the pressure sensing sensor 57001 may be used for an antenna control operation. Antenna performance may be changed according to the distance between a human body and an antenna radiator. When a human body and an antenna radiator are close to each other, the absorbance of the human body may increase and the radiation coverage may decrease. An electronic device (e.g., the electronic device 101 of FIG. 1) that is mounted with the display 5700 may change a signal transferred to at least a portion of an antenna radiator (e.g., a second conductive pattern) of the panel 5706 based on at least a portion of a pressure input acquired from the pressure sensing sensor 57001, or may set a weighted value thereof. For example, the electronic device 101 may change the Tx power provided to at least a portion of the second conductive pattern of the panel 5706 based on at least a portion of the pressure input. For example, when the pressing intensity determined at the first position is larger than the pressing intensity determined at the second position, the distance between the user's body and the second conductive pattern may be relatively shorter at the second position. The electronic device 101 may reduce the Tx power through a portion of the second conductive pattern that corresponds to the second position to be lower than the Tx power through the other portion of the second conductive pattern that corresponds to the first position, which may reduce an effect by the user's body so as to secure antenna performance.

Figure 58:
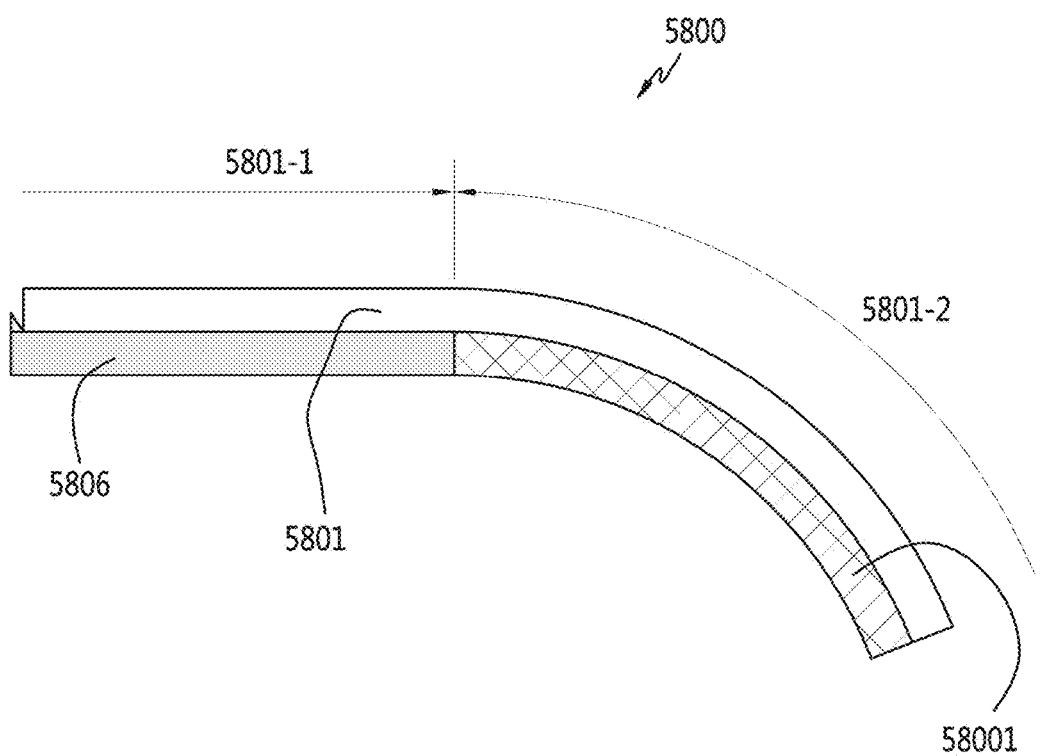
FIG. 58 is a view illustrating a display according to an embodiment of the present disclosure.

FIG. 58 is a view illustrating a display according to an embodiment of the present disclosure.

Referring to FIG. 58, a display 5800 may include a window 5801, a panel 5806, and a pressure sensing sensor 58001.

According to an embodiment, when viewed in a cross section, the window 5801 may include a substantially flat first portion 5801-1 and a second portion 5801-2 that extends from the first portion 5801-1 to be curved.

According to an embodiment, the panel 5806 may be disposed along at least a portion of the first portion 5801-1, but may not be disposed along the second portion 5801-2. The pressure sensing sensor 58001 may be disposed along at least a portion of the second portion 5801-2, but may not be disposed along the first portion 5801-1.

According to an embodiment, the panel 5806 and/or the pressure sensing sensor 58001 may be coupled to the window 5801. For example, an adhesive layer (e.g., an OCA) may be disposed between the window 5801 and the panel 5806. Alternatively, an adhesive layer (e.g., an OCA) may be disposed between the window 5801 and the pressure sensing sensor 58001.

According to an embodiment, the panel 5806 may include a circuit configuration (not illustrated) that implements a color according to an image-related signal. Alternatively, the panel 5806 may include a first conductive pattern (not illustrated) for supporting a touch input and/or a hovering input. The first conductive pattern may be electrically connected to a touch sensing circuit that is mounted in an electronic device (e.g., the electronic device 101 of FIG. 1) that is mounted with the display 5800. Alternatively, the panel 5806 may include a second conductive pattern (not illustrated) that may be used as an antenna radiator that supports various types of communication. The second conductive pattern may be electrically connected to a communication circuit that is mounted in the electronic device 101 that is mounted with the display 5800.

According to various embodiments, the panel 5806 may include the conductive pattern 2108, the touch panel 2103, and the display panel 2106 of FIG. 21. Alternatively, the panel 5806 may include the conductive pattern 2208, the touch panel 2203, and the display panel 2206 of FIG. 22. Alternatively, the panel 5806 may include the conductive pattern 2308 and the display panel 2306 of FIG. 23. Alternatively, the panel 5806 may include the conductive pattern 2408 and the display panel 2406 of FIG. 24. Alternatively, the panel 5806 may include the conductive pattern 2508 and the display panel 2506 of FIG. 25. Alternatively, the panel 5806 may include the conductive pattern 2608 and the display panel 2606 of FIG. 26. Alternatively, the panel 5806 may include the touch panel 2803 and the display panel 2806 of FIG. 28. Alternatively, the panel 5806 may include the touch panel 2903 and the display panel 2906 of FIG. 29.

According to an embodiment, when there is a touch that presses a portion of the second portion 5801-2 of the window 5801, the pressure sensing sensor 58001 may output a signal related to a position where a pressure is applied in a direction from the window 5801 toward the inside of the display 5800 and the intensity of the pressure. For example, when the user's finger presses the window 5801, the pressure sensing sensor 58001 can measure the pressing position and intensity.

Figure 59:
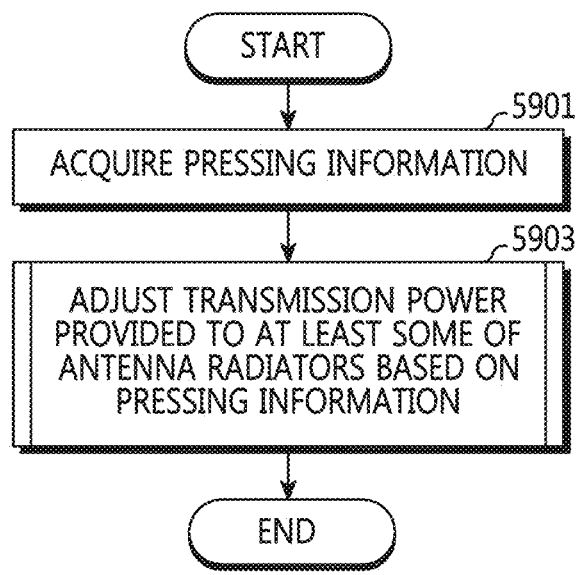
FIG. 59 is a view illustrating an operation flow of an electronic device according to an embodiment of the present disclosure.
Figure 60:
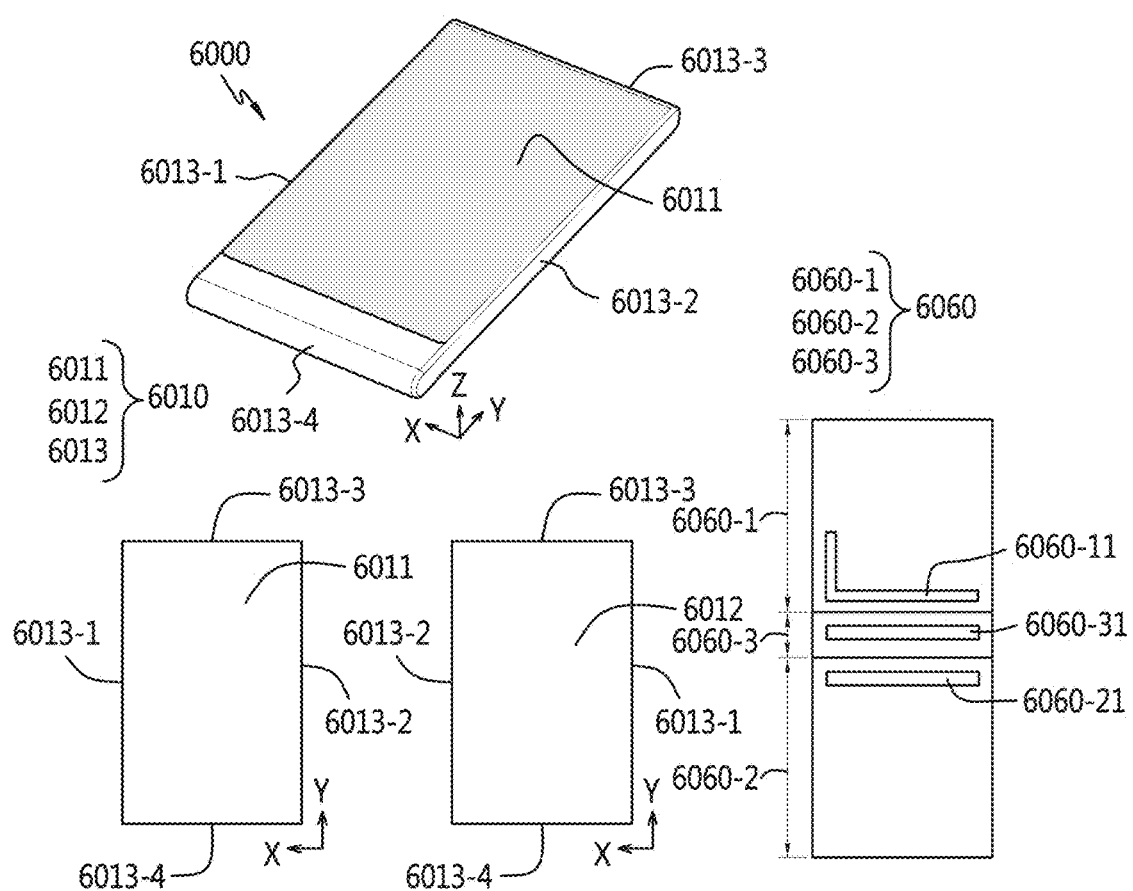
FIG. 60 is a view illustrating an electronic device according to an embodiment of the present disclosure.

FIG. 59 is a view illustrating an operation flow of an electronic device according to an embodiment of the present disclosure. FIG. 60 is a view illustrating an electronic device according to an embodiment of the present disclosure. The electronic device may include a configuration that is the same as or similar to at least some of the components described above.

Referring to FIG. 60, the outer region of the electronic device 6000 may include a first face 6011 and a second face 6012 that faces a direction opposite to the first face 6011. Alternatively, the outer region of the electronic device 6000 may include a third face 6013 that surrounds a space between the first face 6011 and the second face 6012. The third face 6013 may include a first region 6013-1, a second region 6013-2, a third region 6013-3, and a fourth region 6013-4. The first region 6013-1 and the second region 6013-2 may be disposed opposite to each other. The third region 6013-3 and the fourth region 6013-4 may be disposed opposite to each other.

According to an embodiment, the electronic device 6000 may include a display 6060 that is disposed along at least a portion of one or more of the first face 6011, the second face 6012, and the third face 6013. The display 6060 may include a first display region 6060-1 disposed along the first face 6011, a second display region 6060-2 disposed along the second face 6012, and a third display region 6060-3 disposed along the third region 6013-3 of the third face 6013. The third display region 6060-3 may interconnect the first display region 6060-1 and the second display region 6060-2. The display 6060 may include a pressure sensing sensor disposed along at least a portion of at least one of the first display region 6060-1, the second display region 6060-2, and the third display region 6060-3.

Referring to FIGS. 59 and 60, in operation 5901, the processor 4990-1 may obtain pressing information via a pressure sensing sensor. For example, the pressing information may include a pressing position and/or intensity on an outer region of the electronic device 6000. According to an embodiment, the processor 4990-1 may acquire pressing information on the first face 6011 using the first pressure sensing sensor disposed along the first face 6011. The processor 4990-1 may acquire pressing information on the second face 6012 using the second pressure sensing sensor disposed along the second face 6012. The processor 4990-1 may acquire pressing information on the third face 6013 using the third pressure sensing sensor disposed along the third face 6013.

In operation 5903, the processor 4990-1 may adjust Tx power provided to at least a portion of an antenna radiator mounted in the electronic device 6000 based on at least a portion of the acquired pressing information. According to an embodiment, the display 6060 may include a first antenna radiator 6060-11 disposed in the first display region 6060-1, a second antenna radiator 6060-21 disposed in the second display region 6060-2, and a third antenna radiator 6060-31 disposed in the third display region 6060-3. The first antenna radiator 6060-11, the second antenna radiator 6060-21, and the third antenna radiator 6060-31 may be physically separated from each other.

According to an embodiment, the processor 4990-1 may identify a face where a pressing position and intensity are acquired, and may adjust a communication circuit (the communication circuit 4930 of FIG. 49) to change the Tx power provided to at least a portion of the second conductive pattern.

Figure 61:
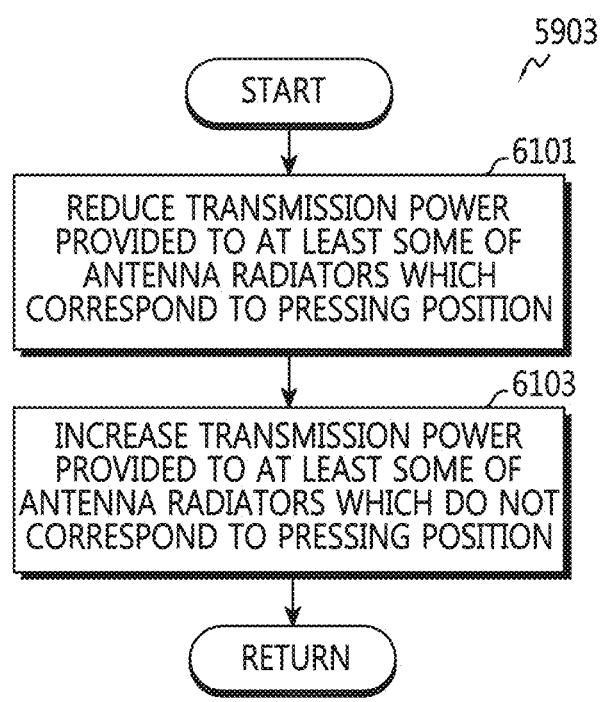
FIG. 61 is a view illustrating Tx power adjustment of at least a portion of an antenna radiator based on a proximity position according to an embodiment of the present disclosure.

FIG. 61 is a view illustrating Tx power adjustment of at least a portion of an antenna radiator based on a proximity position according to various embodiments of the present disclosure.

Referring to FIGS. 60 and 61, in operation 6101, the processor 4990-1 may adjust a communication circuit (e.g., the communication circuit 4930 of FIG. 49) to reduce the Tx power provided to at least some antenna radiators that correspond to a pressing position in the antenna radiators mounted in the electronic device 6000.

In operation 6103, the processor 4990-1 may adjust the communication circuit 4930 to raise the Tx power provided to at least some other antenna radiators that do not correspond to a pressing position among the antenna radiators mounted in the electronic device 6000.

According to an embodiment, when the electronic device 6000 is held by the user's hand, the user's hand may come in contact with the second face 6012 among the outer regions of the electronic device 6000. The electronic device 6000 may lower or block the Tx power provided to the second antenna radiator 6060-21 disposed along the second face 6012. Alternatively, the electronic device 6000 may raise the Tx power of the first antenna radiator 6060-11 disposed along the first face 6011 and/or the third antenna radiator 6060-31 disposed along the third face 6013. The operation of reducing the Tx power provided to the second conductive pattern 6060-21 of a face where the user's body is in contact may reduce an effect on the user's body by the second conductive pattern 6060-21. The operation of raising the Tx power provided to the first antenna radiator 6060-11 and/or the third antenna radiator 6060-31 on the other face where the user's body is not in contact may suppress the antenna performance from being deteriorated by the user's body.

According to an embodiment, when the electronic device 6000 is proximate to the user's body, the user's body may be proximate to the first face 6011 among the outer regions of the electronic device 6000. The electronic device 6000 may lower or block the Tx power provided to the first antenna radiator 6060-11 disposed along the first face 6011. Alternatively, the electronic device 6000 may raise the Tx power of the second antenna radiator 6060-21 disposed along the second face 6012 and/or the third antenna radiator 6060-31 disposed along the third face 6013. The operation of reducing the Tx power provided to the first antenna radiator 6060-11 of a face where the user's body is in contact may reduce an effect on the user's body by the first antenna radiator 6060-11. The operation of raising the Tx power provided to the second antenna radiator 6060-21 and/or the third antenna radiator 6060-31 of another face where the user's body is not in contact may suppress the antenna performance from being deteriorated by the user's body.

According to an embodiment, when the electronic device 6000 is proximate to the user's body, the user's body may be proximate to the third face 6013 among the outer regions of the electronic device 6000. The electronic device 6000 may lower or block the Tx power provided to the third antenna radiator 6060-13 disposed along the third face 6013. Alternatively, the electronic device 6000 may raise the Tx power of the first antenna radiator 6060-11 disposed along the first face 6011 and/or the second antenna radiator 6060-21 disposed along the second face 6012. The operation of reducing the Tx power provided to the third antenna radiator 6060-31 of a face where the user's body is in contact may reduce an effect on the user's body by the third antenna radiator 6060-31. The operation of raising the Tx power provided to the first antenna radiator 6060-11 and/or the second antenna radiator 6060-21 on another face where the user's body is not in contact may suppress the antenna performance from being deteriorated by the user's body.

Figure 62:
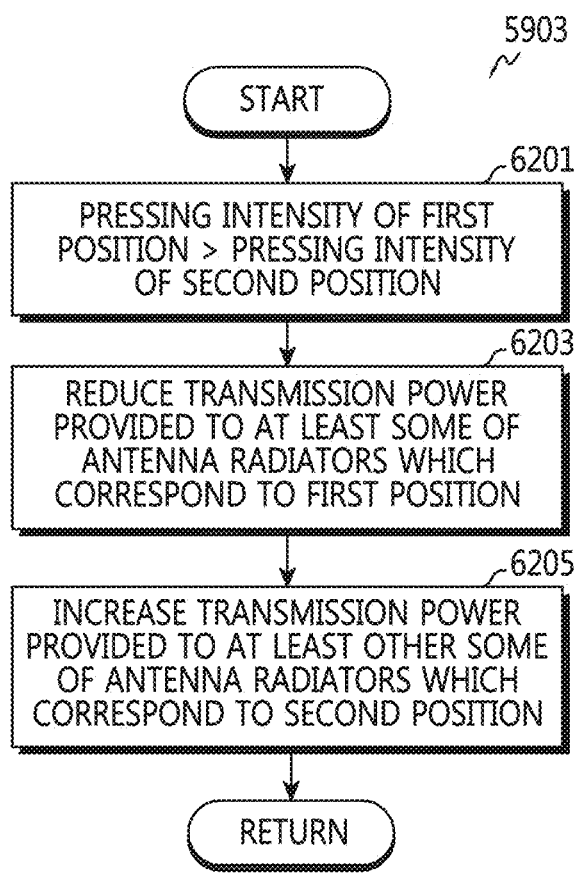
FIG. 62 is a view illustrating Tx power adjustment of at least a portion of an antenna radiator based on a proximity position according to an embodiment of the present disclosure.

FIG. 62 is a view illustrating Tx power adjustment of at least a portion of an antenna radiator based on a proximity position according to an embodiment of the present disclosure.

Referring to FIGS. 60 and 62, in operation 6201, the processor 4990-1 may confirm that the pressing intensity of the first position is larger than the pressing intensity of the second position via a pressure sensing sensor.

In operation 6203, the processor 4990-1 may adjust a communication circuit (the communication circuit 4930 of FIG. 49) to reduce the Tx power provided to at least some antenna radiators that do not correspond to the first position among the antenna radiators mounted in the electronic device 6000.

In operation 6205, the processor 4990-1 may adjust the communication circuit 4930 to raise the Tx power provided to at least some antenna radiators that correspond to the second position among the antenna radiators mounted in the electronic device 6000.

According to an embodiment, when the electronic device 6000 is held by the user's hand, the user's hand may come in contact with the second face 6012 and the third face 6013 among the outer regions of the electronic device 6000. The pressing intensity determined through the pressure sensing sensor disposed on the second face 6012 may be larger than the pressing intensity determined through the pressure sensing sensor disposed on the third face 6013. The processor 4990-1 may lower or block the Tx power provided to the second antenna radiator 6060-21 disposed along the second face 6012. Alternatively, the electronic device 6000 may raise the Tx power of the third antenna radiator 6060-31 disposed along the third face 6013. The operation of reducing the Tx power provided to the second conductive pattern 6060-21 of a face which is touched by the user's body may reduce an effect on the user's body by the second conductive pattern 6060-21. The operation of raising the Tx power provided to the third antenna radiator 6060-13 of another face where the user's body is not in contact may suppress the antenna performance from being deteriorated by the user's body.

Figure 63A:
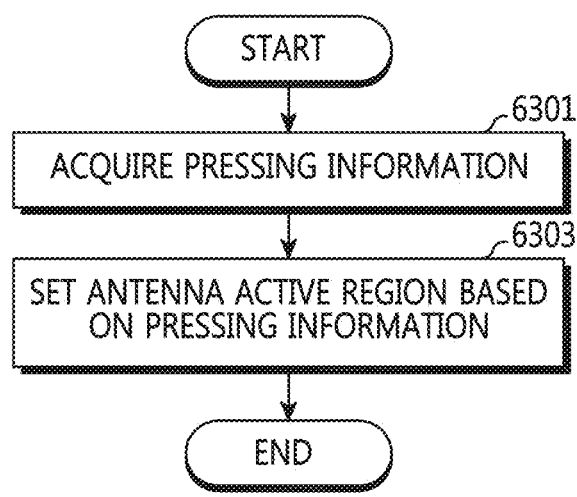
FIG. 63A is a view illustrating a flow of an operation of adjusting an antenna region using a pressure sensing sensor according to an embodiment of the present disclosure.
Figure 63B:
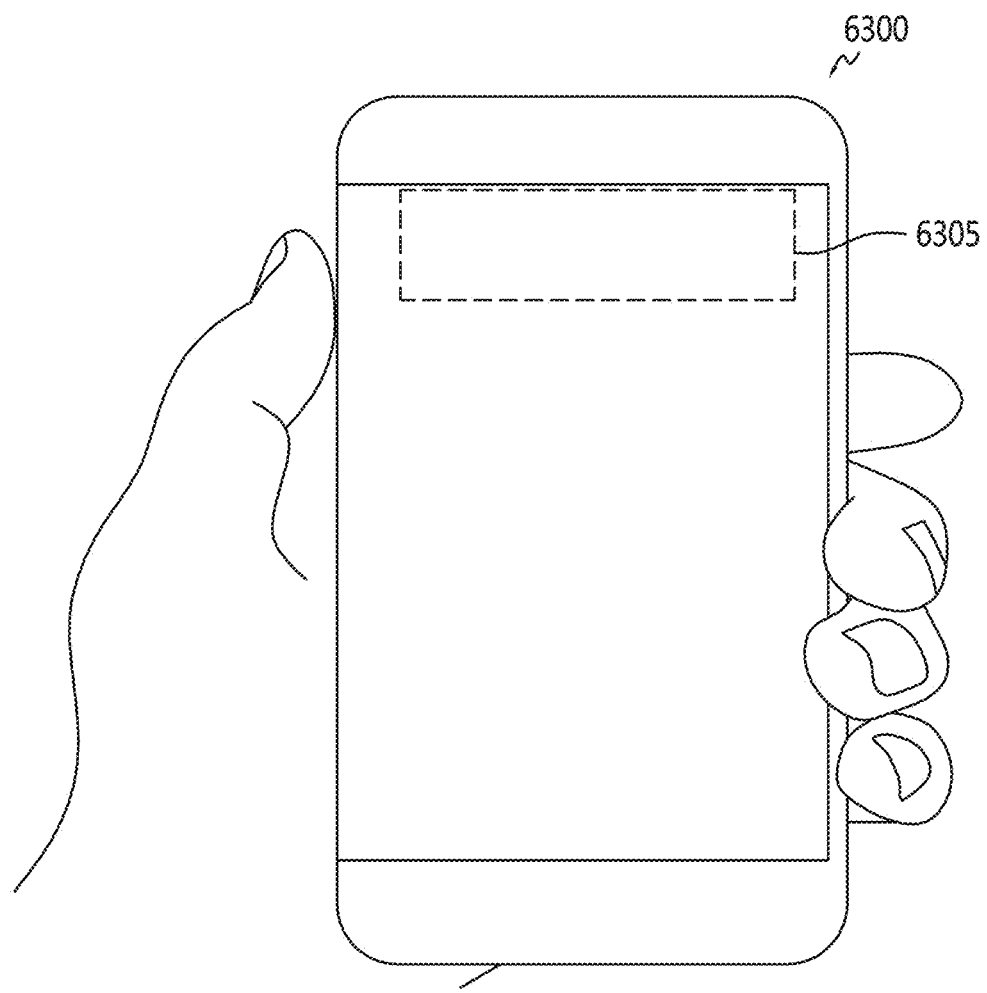
FIGS. 63B, 63C, and 63D are views for describing an operation flow of an electronic device according to various embodiments of the present disclosure.
Figure 63C:
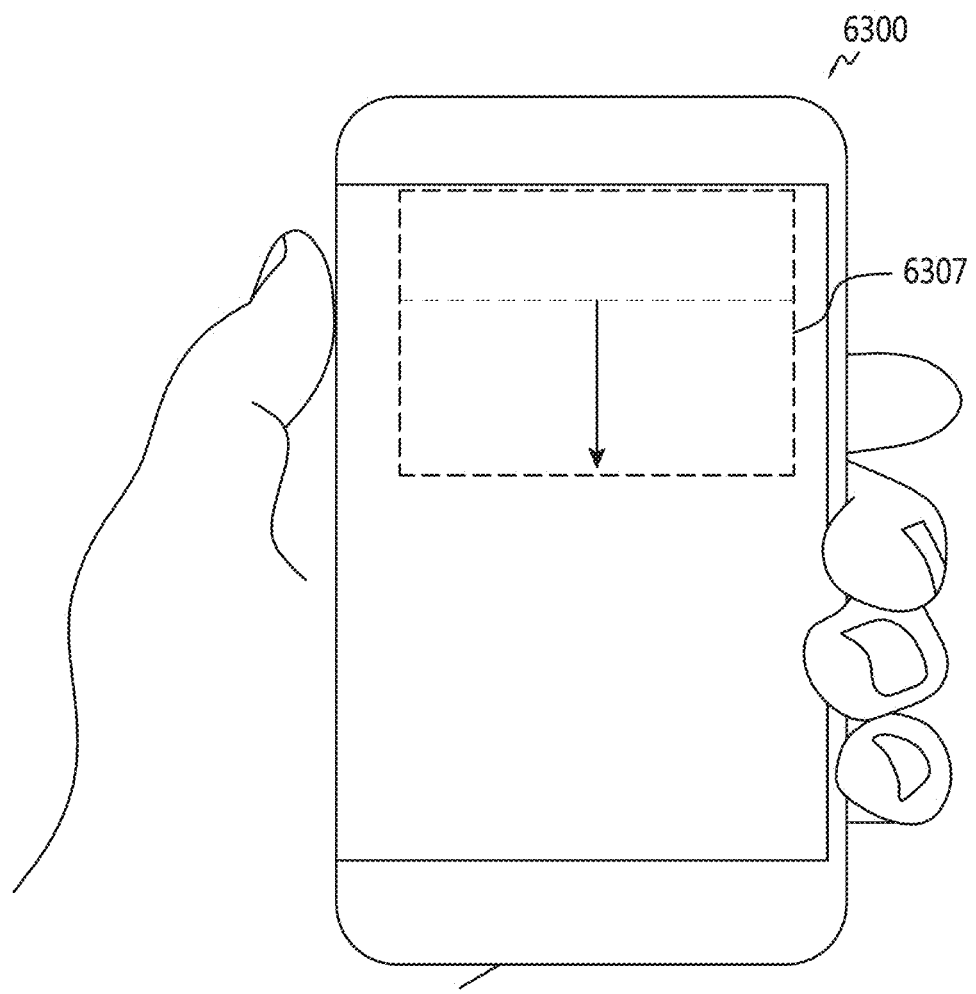
Figure 63D:
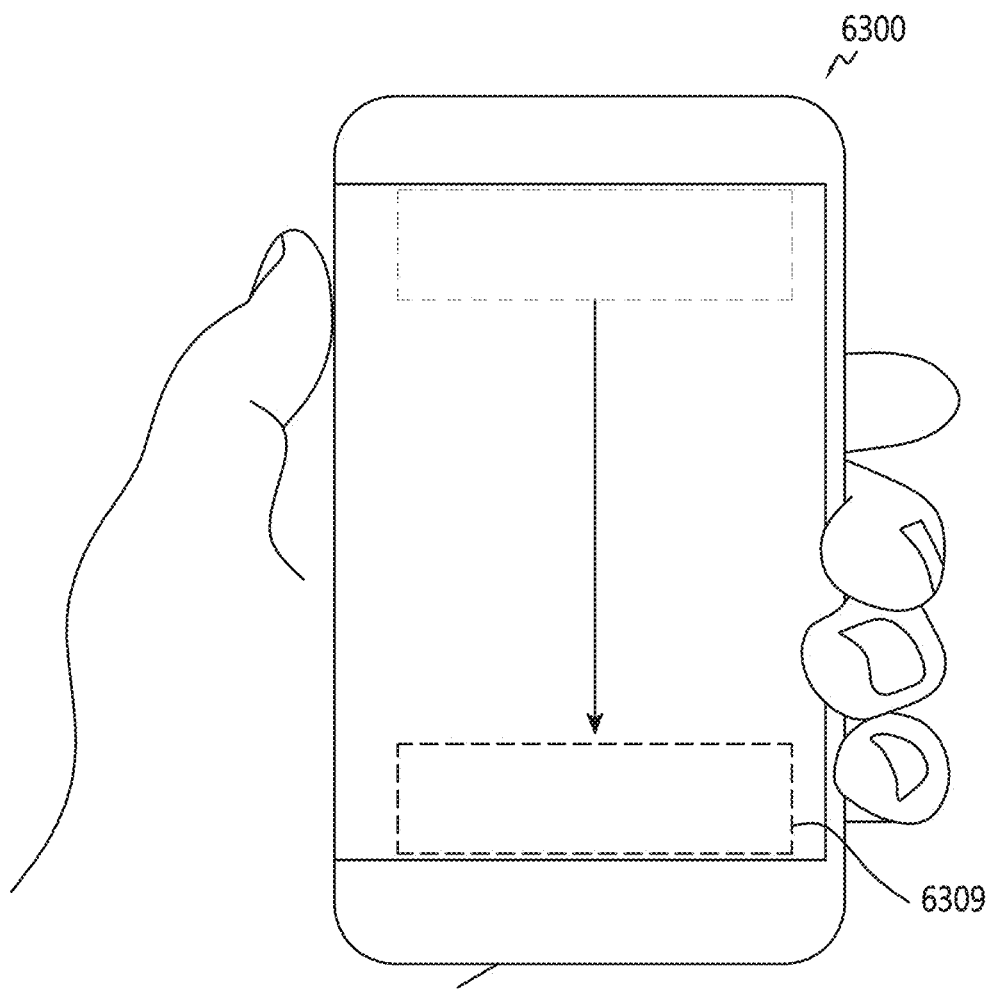

FIG. 63A is a view illustrating a flow of an operation of adjusting an antenna region using a pressure sensing sensor according to an embodiment of the present disclosure. FIGS. 63B, 63C, and 63D are views for describing an operation flow of an electronic device according to various embodiments of the present disclosure.

Referring to FIG. 63A, in operation 6301, the processor 4990-1 may obtain pressing information (e.g., pressing position and/or intensity) on an outer region of an electronic device 6300 via a pressure sensing sensor. According to various embodiments, the pressure sensing sensor may be one of the pressure sensing sensors of FIGS. 21 to 30.

In operation 6303, the processor 4990-1 may set an antenna active region based on at least a portion of the obtained pressing information. The setting of the antenna active region may selectively activate at least a portion of a conductive pattern (e.g., the conductive pattern 2108 of FIG. 21, the pattern 2208 of FIG. 22, the pattern 2308 of FIG. 23, the pattern 2408 of FIG. 24, the pattern 2508 of FIG. 25, the pattern 2608 of FIG. 26, the pattern 2708 of FIG. 27, the pattern 2808 of FIG. 28, the pattern 2908 of FIG. 29, or the pattern 3008 of FIG. 30).

According to various embodiments, the processor 4990-1 may set an antenna active region depending on a pressure sensing position. For example, when the pressure sensing position is changed from the first position to the second position, the processor 4990-1 may change the antenna active region. Alternatively, when a pressure sensing position is added or deleted, the processor 4990-1 may change the antenna active region.

According to various embodiments, the processor 4990-1 may set the antenna active region according to the intensity of the pressure determined at one or more positions. For example, when the intensity of the pressure determined at the one or more positions increases, the processor 4990-1 may extend or move the antenna active region.

According to various embodiments, the processor 4990-1 may adjust the antenna active region according to the number of times of pressing at one or more positions. When the pressure determined at one or more positions increases below and exceeds a reference value, the processor 4990-1 may count the number of times of pressing. When pressing is counted once at one or more position, the processor 4990-1 may drive a timer, and may count the number of times of pressing that additionally occurs before the expiration of the timer.

Referring to FIG. 63B, when the pressing position and/or intensity corresponds to a first reference, the processor 4990-1 may activate the first antenna active region 6305.

Referring to FIG. 63C, when the pressing position and/or intensity corresponds to a second reference, the processor 4990-1 may expend the first antenna active region 6305 to the second antenna active region 6307. Alternatively, although not illustrated, the processor 4990-1 may reduce the first antenna active region 6305 based on at least a portion of the pressing position and/or intensity.

Referring to FIG. 63C, when the pressing position and/or intensity corresponds to a third reference, the processor 4990-1 may expend the first antenna active region 6305 to the third antenna active region 6309.

Figure 64:
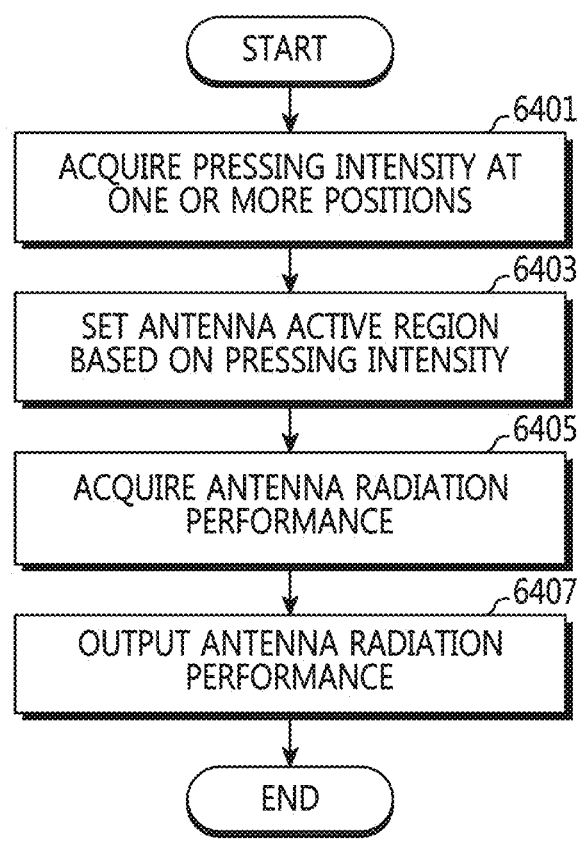
FIG. 64 is a view illustrating a flow of an operation of setting an antenna region using a pressure sensing sensor according to an embodiment of the present disclosure.

FIG. 64 is a view illustrating a flow of an operation of setting an antenna region using a pressure sensing sensor according to an embodiment of the present disclosure.

Referring to FIG. 64, in operation 6401, the processor 4990-1 may acquire pressing intensity at one or more positions on the outer region of an electronic device (e.g., the electronic device 101 of FIG. 1) via a pressure sensing sensor.

In operation 6403, the processor 4990-1 may set an antenna active region according to an acquired pressing intensity. According to various embodiments, the processor 4990-1 may expand the antenna active region as the pressing intensity increases.

In operation 6405, the processor 4990-1 may acquire antenna radiation performance (e.g., the intensity or signal sensitivity of a radio signal).

In operation 6407, the processor 4990-1 may output the acquired antenna radiation performance. For example, when an electronic device (e.g., the electronic device 101 of FIG. 1) is gripped by the user more and more strongly, the pressing intensity at one or more positions may increase. Processor 4990-1 may measure the antenna radiation performance and output it through a screen while varying the setting of the antenna active region according to the increase of the pressing intensity at one or more positions. The electronic device 101 may allow the user to recognize the gripping force for the optimal antenna radiation performance.

Figure 65:
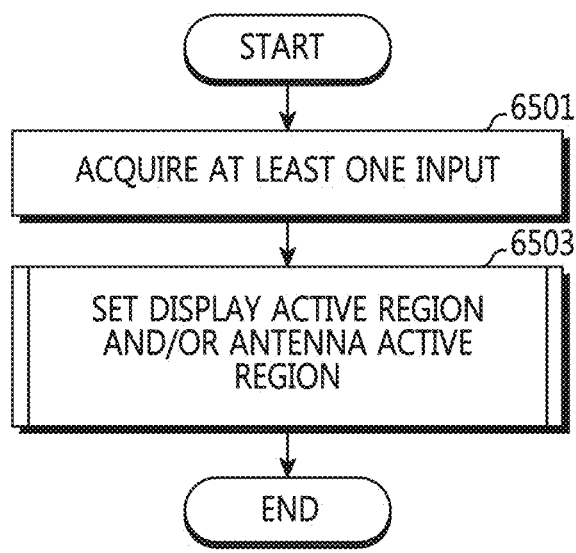
FIG. 65 is a view illustrating an operation flow of an electronic device according to an embodiment of the present disclosure.

FIG. 65 is a view illustrating an operation flow of an electronic device according to an embodiment of the present disclosure.

Referring to FIG. 65, in operation 6501, a processor (e.g., the processor 4990-1 of FIG. 49) may determine at least one input. For example, at least one input may be generated from various types of input devices of an electronic device (e.g., the electronic device 101 of FIG. 1). At least one input may be information acquired from at least one sensor (e.g., a six-axis sensor, an acceleration sensor, or a pressure sensor). At least one input may be a signal received from the outside (e.g., a call reception or a message reception). Alternatively, the at least one input may include starting of a predefined application.

In operation 6503, the processor 4990-1 may set a display active region and/or an antenna active region based on at least a portion of the at least one input.

Figure 66:
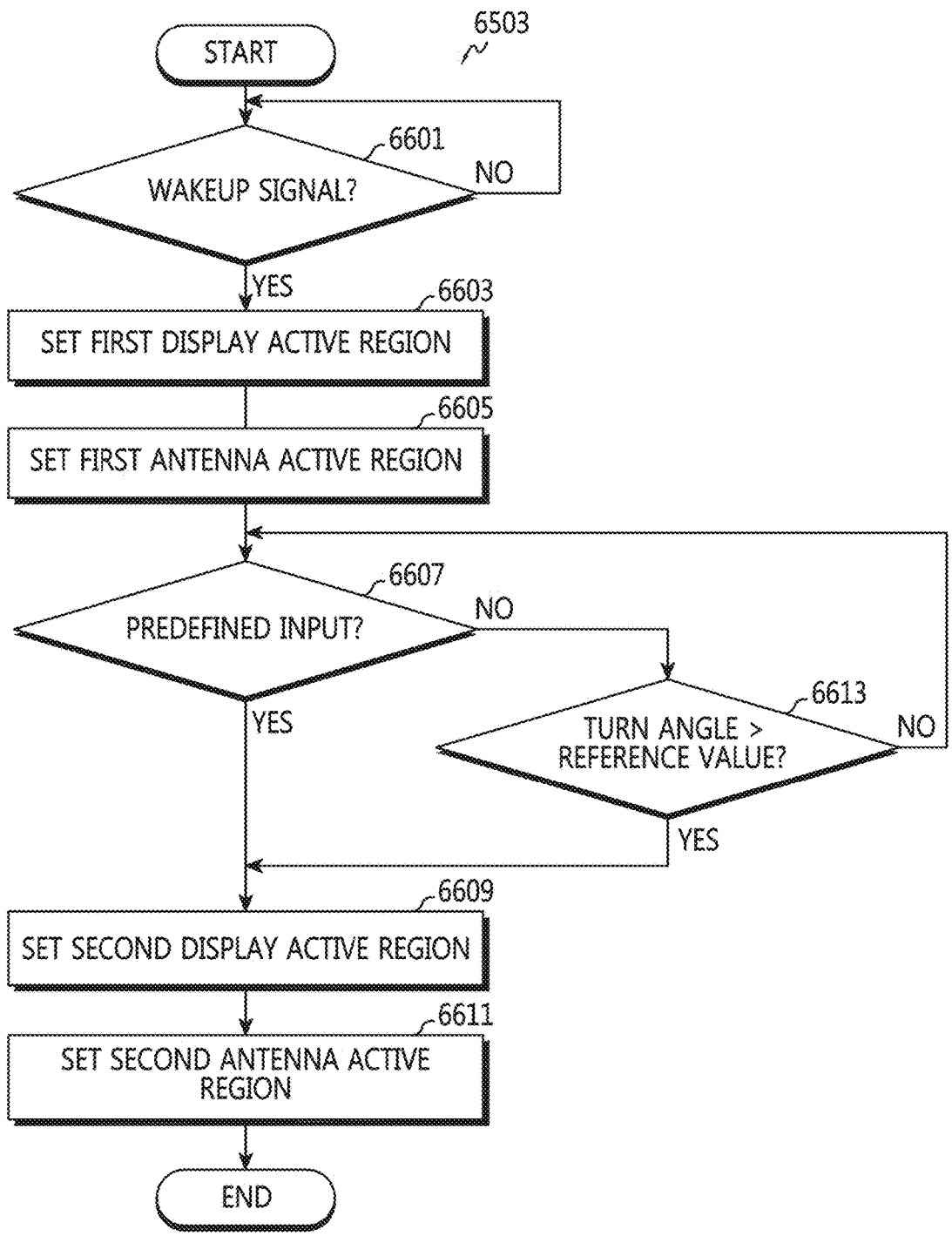
FIG. 66 is a view illustrating a flow of operation of setting a display active region and/or an antenna active region based on at least one input according to an embodiment of the present disclosure.

FIG. 66 is a view illustrating a flow of operation of setting a display active region and/or an antenna active region based on at least one input according to an embodiment of the present disclosure. FIGS. 67AA and 67BC are illustrative views for describing an operation flow of an electronic device according to various embodiments of the present disclosure.

FIGS. 67BA, 67BB, and 67BC are illustrative views for describing an operation flow of an electronic device according to various embodiments of the present disclosure.

Referring to FIGS. 66, 67AA, 67BA, 67BB, and 67BC, the outer region of the electronic device 6700 may include a first face 6711 and a second face 6712 that faces a direction opposite to the first face 6711. Alternatively, the outer region of the electronic device 6700 may include a third face 6713 that surrounds a space between the first face 6711 and the second face 6712. The electronic device 6700 may include a display 6760 that is disposed along at least a portion of one or more of the first face 6711, the second face 6712, and the third face 6713. The display 6760 may include a first display region 6760-1 disposed along the first face 6711, a second display region 6760-2 disposed along the second face 6712, and a third display region 6760-3 disposed along the third face 6713 of the third face 6713. The third display region 6760-3 may interconnect the first display region 6760-1 and the second display region 6760-2.

Referring to FIG. 66, when a wakeup signal is generated in a standby mode, a processor (e.g., the processor 4990-1 of FIG. 49) may determine this in operation 6601. For example, the wakeup signal may be triggered by a push of a button or a predefined type of a touch input and/or a hovering input. Alternatively, the wakeup signal may be a signal determined from at least one sensor. Alternatively, the wakeup signal may be reception of a call, reception of a text message, reception of a SNS message, or the like.

In operation 6603, the processor 4990-1 may set a first display active region. Alternatively, in operation 6605, the processor 4990-1 may set the first antenna active region.

Referring to FIG. 67AA, when the electronic device 6700 is placed on a floor, the first face 6711 may be exposed, and the second face 6712 may be covered. When a touch input or a hovering input, such as a flicking gesture or a double tap, occurs on the first display region 6760-1 of the first face 6711, the first display region 6760-1 is unlocked to display the corresponding content 6740, or the first antenna region 6701 may be activated. The first antenna region 6701 may be disposed along the first face 6711.

When a predefined input occurs, the processor 4990-1 may determine this in operation 6607. Referring to FIG. 67BA, when a user grips the electronic device 6700, a portion of the user's hand 67 may continuously touch or hover over the display 6760, and a predefined input in this regard may be generated. Alternatively, when the user grips the electronic device 6700, a pressure sensor (e.g., the pressure sensing sensor 2000a of FIG. 20A) disposed along at least a portion of the outer region of the electronic device 6700 may continuously react to the user's hand 67, and a predefined input in this regard may be generated.

When a predefined input is not generated, in operation 6613, the processor 4990-1 may measure a turn angle of the electronic device 6700, and may determine whether the measured turn angle exceeds a reference value. When it is detected that the turn angle of the electronic device 6700 exceeds the reference value, the processor 4990-1 may set the second display active region in operation 6609, or may set the second antenna active region in operation 6611.

Referring to FIG. 67AB, when the electronic device 6700 in state FIG. 67AA is inverted such that the second face 6712 is exposed and the first face 6711 is exposed, the processor 4990-1 may determine that the turn angle of the electronic device exceeds the reference value. The processor 4990-1 may switch the first display region 6760-1 from the active state to the inactive state, may switch the second display region 6760-2 from the inactive state to the active state, and may display contents 6740 through the second display region 6760-2. Alternatively, the processor 4990-1 may activate the second antenna region 6702. The second antenna region 6702 may be disposed along the second face 6712.

When the predefined input is generated, the processor 4990-1 may set the second display active region in operation 6609, or may set the second antenna active region in operation 6611. Referring to FIGS. 67BB and 67BC, when the user grips the electronic device 6700, a portion of the user's hand 67 may touch or hover over the first display region 6760-1, and the processor 4990-1 may switch the first display region 6760-1 from the active state to the inactive state, may switch the second display region 6760-2 from the inactive state to the active state, and may display contents 6740 through the second display region 6760-2. Alternatively, the processor 4990-1 may activate the third antenna region 6703. According to various embodiments, the third antenna region 6703 may be adjusted according to the operation flow of FIG. 63A. For example, the user may grip the electronic device 6700 as shown in FIG. 67BC and may manipulate the activated second display region 6760-2 of the second face 6712 while viewing the activated second display region 6760-2 in a lying posture.

Figure 68:
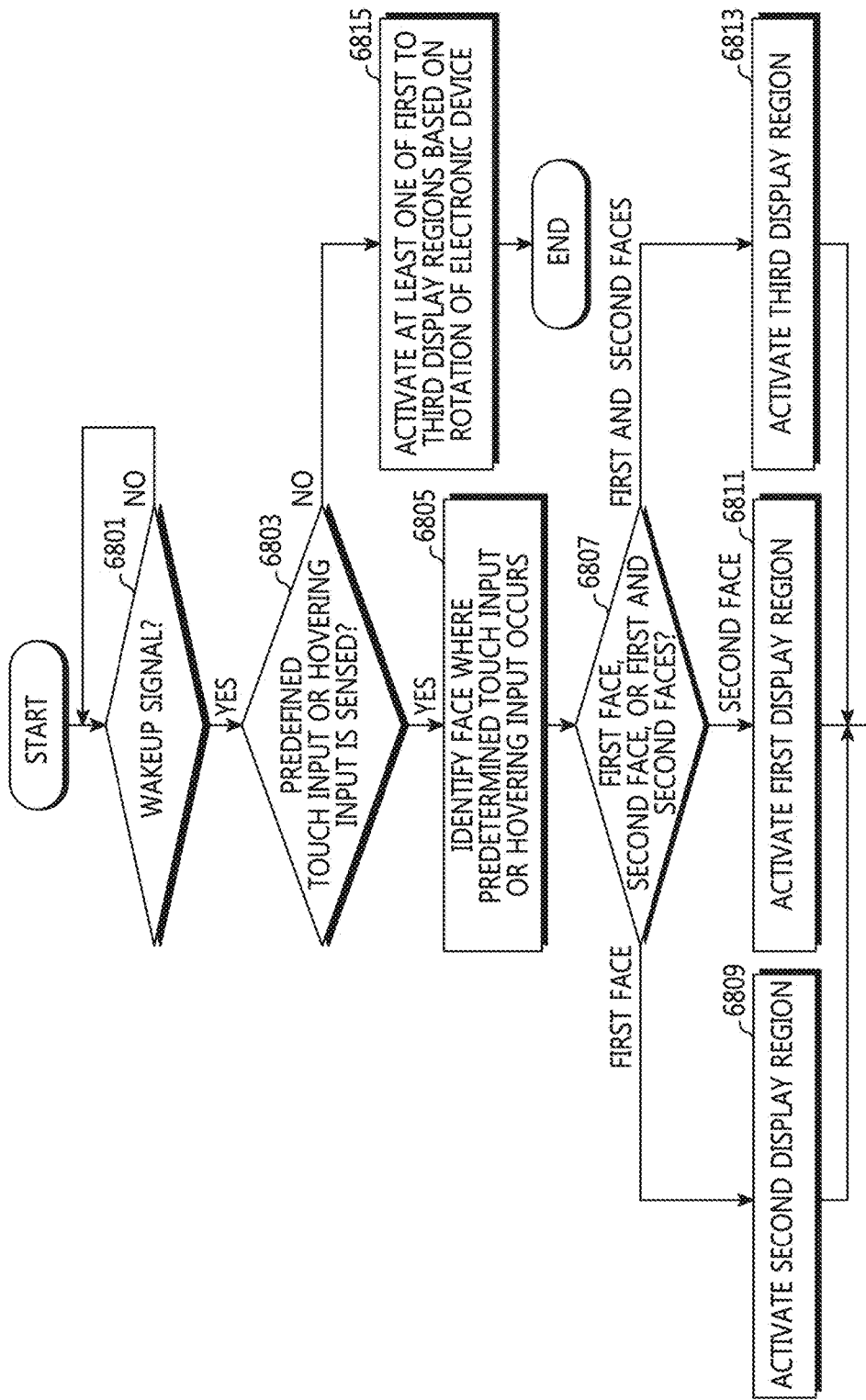
FIG. 68 is a view illustrating an operation flow of an electronic device according to an embodiment of the present disclosure.
Figure 69A:
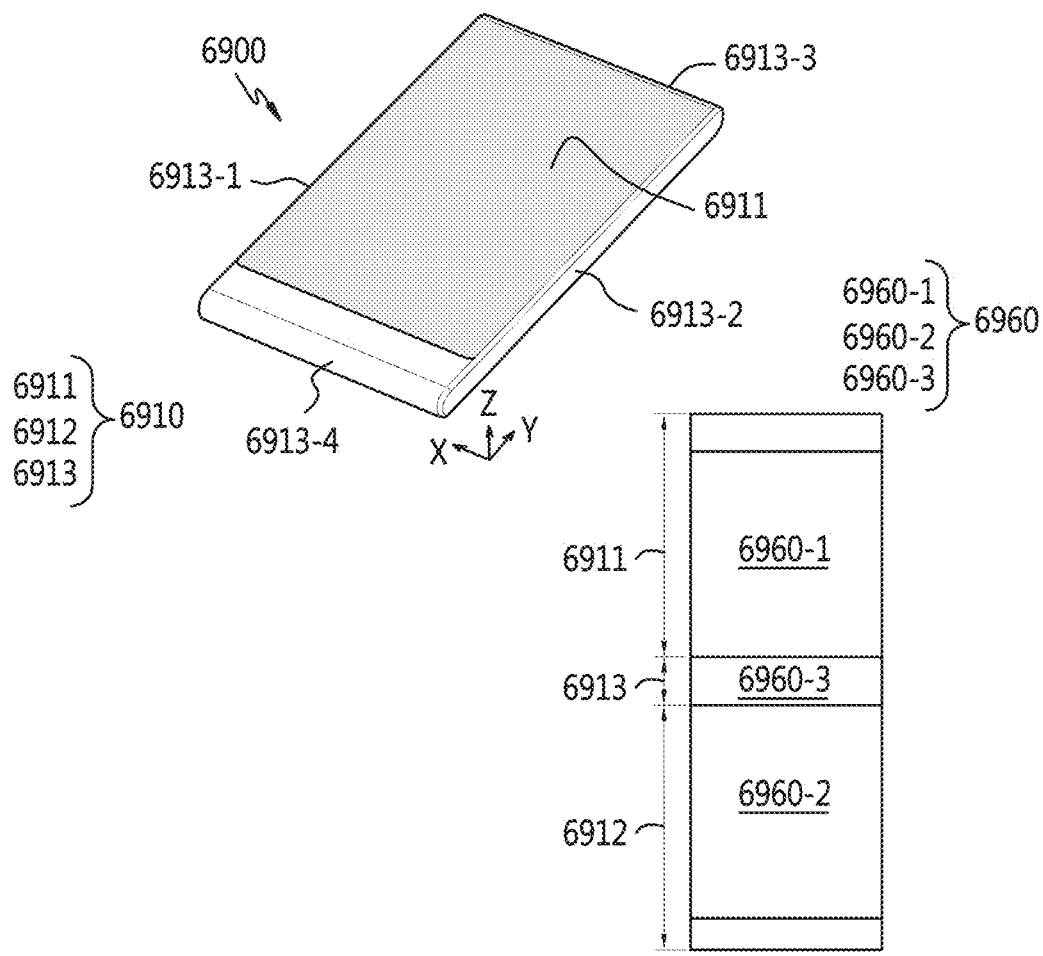

FIG. 68 is a view illustrating an operation flow of an electronic device according to an embodiment of the present disclosure. FIGS. 69A, 69B, and 69C are views illustrating an operation flow of an electronic device according to various embodiments of the present disclosure. The electronic device may include a configuration that is the same as or similar to at least some of the components described above.

Referring to FIG. 69A, the outer region of the electronic device 6900 may include a first face 6911 and a second face 6912 that faces a direction opposite to the first face 6911. Alternatively, the outer region of the electronic device 6900 may include a third face 6913 that surrounds a space between the first face 6911 and the second face 6912.

According to an embodiment, the electronic device 6900 may include a display 6960 that is disposed along at least a portion of one or more of the first face 6911, the second face 6912, and the third face 6913. When viewed in a plan view, the display 6960 may have a substantially rectangular shape, and may include a first display region 6960-1 disposed along the first face 6911, a second display region 6960-2 disposed along the second face 6912, or a third display region 6960-3 disposed along the third face 6913. The third display region 6960-3 may interconnect the first display region 6960-1 and the second display region 6960-2. The first display region 6960-1, the second display region 6960-2, and/or the third display region 6960-3 may support a touch input and/or a hovering input.

Referring to FIGS. 68, 69A, 69B, and 69C, when a wakeup signal is generated in the standby mode, a processor (e.g., processor 4990-1 of FIG. 49) in operation 6801 may determine this. For example, the wakeup signal may be triggered by reception of a call, reception of a text message, reception of a SNS message, pressing of a button, a predefined type of a touch input and/or a hovering input, or the like.

When the wakeup signal is generated in the standby mode, in operation 6803, the processor 4990-1 may determine whether a predefined touch input or hovering input occurs. According to an embodiment, the predefined touch input or hovering input may be caused by a state in which at least a portion of the display region is continuously touched.

When no predefined touch input or hovering input occurs, in operation 6815, the processor 4990-1 may activate at least one of the first to third display regions 6960-1, 6960-2, and 6960-3 based on the rotation of the electronic device 6900. For example, referring to FIG. 69B, when a call is received while the user does not touch the electronic device 6900, the processor 4990-1 may identify a face of the electronic device 6900 that faces a direction opposite to gravity in the electronic device 6900 using an acceleration sensor and/or a gyro sensor (or a six-axis sensor). When the identified face is the first face 6911, the processor 4990-1 may display information about call reception through the first display region 6960-1 of the first face 6911.

When a predefined touch input or hovering input occurs, in operation 6805, the processor 4990-1 may identify a face on which a predefined touch input or hovering input occurs.

In operation 6807, when it is determined that the face on which the predefined touch input or hovering input occurs is the first face 6911, in operation 6809, the processor 4990-1 may activate the second display region 6920-2, which is disposed in the second face 6912 disposed opposite to the first face 6911. For example, when the user places the electronic device 6900 on a palm, the first face 6911 may come in contact with the user's hand to be covered, and the second face 6912 may be exposed. When a text message is received in this state, the processor 4990-1 may display information regarding the text message through the second display region 6960-2 disposed in the second face 6912.

In operation 6807, when it is determined that the face on which the predefined touch input or hovering input occurs is the second face 6912, in operation 6811, the processor 4990-1 may activate the first display region 6960-1, which is disposed in the first face 6911 disposed opposite to the second face 6912. For example, when the user places the electronic device 6900 on a palm, the second face 6912 may come in contact with the user's hand to be covered, and the first face 6911 may be exposed. When a notification event, such as an alarm, is generated, the processor 4990-1 may display information regarding the text message through the first display region 6960-1 disposed in the first face 6911.

In operation 6807, when it is determined that the predefined touch input or hovering input occurs on the first and second faces 6911 and 6912, in operation 6813, the processor 4990-1 may activate the third display region 6960-3, which is disposed in the third face 6913. For example, referring to FIG. 69C, when the user grips the electronic device 6900 with a hand 69, some of the fingers touch the first face 6911 (6900a), and the other fingers (e.g., the thumb) may touch the second face 6912 (6900b). When a text message is received in this state, the processor 4990-1 may display information regarding the text message through the third display region 6960-3 disposed in the third face 6913.

According to various embodiments of the present disclosure, an electronic device may include: a housing including a first face, a second face that faces a direction opposite to the first face, and a side face that encloses at least a portion of a space between the first face and the second face; a touch sensing circuit disposed within the housing; a wireless communication circuit disposed within the housing; a transparent substrate that forms at least a portion of the first face, the second face, and/or the side face of the housing; at least one display disposed within the housing along at least a portion of the transparent substrate; a first conductive pattern disposed between the transparent substrate and the at least one display or inside the at least one display, and electrically connected with the touch sensing circuit; and a second conductive pattern disposed between the transparent substrate and the first conductive pattern, and electrically connected with the wireless communication circuit.

According to various embodiments of the present disclosure, the electronic device may further include a control circuit electrically connected to the touch sensing circuit, the wireless communication circuit, the first conductive pattern, and the second conductive pattern. The control circuit may be configured to determine a position of a user's touch or gesture input based on a signal acquired via the first conductive pattern using the touch sensing circuit, and to transmit and/or receive a signal to/from an external device via the second conductive pattern using the wireless communication circuit.

According to various embodiments of the present disclosure, the at least one display may include a flat first portion and a second portion extending from the first portion to be curved.

According to various embodiments of the present disclosure, the second conductive pattern may be at least partially disposed between the second portion and the transparent substrate.

According to various embodiments of the present disclosure, the electronic device may further include a pressure sensing sensor at least partially disposed between the second portion and the transparent substrate, or on a face of the second portion, which faces opposite to the transparent substrate.

According to various embodiments of the present disclosure, the pressure sensing sensor may be electrically connected to the touch sensing circuit.

According to various embodiments of the present disclosure, the at least one display includes a first portion on which a screen is displayed and a second portion on which no screen is displayed.

According to various embodiments of the present disclosure, the second conductive pattern may be at least partially disposed on the second portion.

According to various embodiments of the present disclosure, the electronic device may further include a pressure sensing sensor at least partially disposed between the second portion and the transparent substrate, or on a face of the second portion, which faces opposite to the transparent substrate.

According to various embodiments of the present disclosure, the at least one display includes one display disposed along at least a portion of the first face, the second face, and the side face of the housing.

According to various embodiments of the present disclosure, the at least one display may include a first display disposed along at least a portion of the first face of the housing and at least a portion of the side face of the housing, and a second display disposed along at least a portion of the second face of the housing and at least a portion of another portion of the side face of the housing.

According to various embodiments of the present disclosure, the at least one display may include a first display disposed along at least a portion of the first face of the housing, a second display disposed along at least a portion of the second face of the housing, and a third display disposed along at least a portion of the side face of the housing.

According to various embodiments of the present disclosure, the second conductive pattern may be disposed in a mesh shape.

According to various embodiments of the present disclosure, the second conductive pattern may be disposed such that at least a portion of the mesh shape is opened.

According to various embodiments of the present disclosure, the second conductive pattern may include a first portion having a first width and a second portion having a second width narrower than the first width.

According to various embodiments of the present disclosure, the second conductive pattern may include a first portion having a first thickness and a second portion having a second thickness thinner than the first width.

According to various embodiments of the present disclosure, the first conductive pattern or the second conductive pattern may at least partially include Al, Cu, Ag, graphene, ITO, or IZO.

According to various embodiments of the present disclosure, the first conductive pattern may at least partially include Ag, the ITO, or the IZO. The second conductive pattern may at least partially include Al or Cu.

According to various embodiments of the present disclosure, the electronic device may further include a first non-conductive layer disposed between the first conductive pattern and the second conductive pattern.

According to various embodiments of the present disclosure, the first conductive pattern may be disposed on the display. The electronic device may further include a second non-conductive layer disposed between the display and the first conductive pattern.

According to various embodiments of the present disclosure, the electronic device may further include a first non-conductive layer disposed between the first conductive pattern and the transparent substrate. The second conductive pattern may be disposed on both sides of the first conductive layer.

According to various embodiments of the present disclosure, the control circuit may be configured to detect a region where a user's body touches via the first conductive pattern, and to reduce the intensity of a signal to be transmitted to an external device via at least a portion of the second conductive pattern disposed in the detected region.

According to various embodiments of the present disclosure, the control circuit may be configured to increase the intensity of a signal to be transmitted to an external device via at least another portion of the second conductive pattern disposed outside the detected region.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. In addition, some of the hardware components according to various embodiments may be combined into one entity, which may perform functions identical to those of the relevant components before the combination.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a housing comprising a front surface, a rear surface facing away the front surface, and a side surface between the front surface and the rear surface, wherein the side surface comprises a first planar portion extended from a first portion of the front surface and a first portion of the rear surface, a second planar portion extended from a second portion of the front surface and a second portion of the rear surface, and a curved portion extended from a remaining portion of the front surface and a remaining portion of the rear surface;
a communication circuit within the housing;

a transparent substrate that forms at least a portion of the front surface and at least a portion of the side surface;

a display comprising a first display area viewed through a partial area of the front surface and a second display area viewed through an entire area of the curved portion, wherein the display is viewable through the transparent substrate; and a first conductive pattern, disposed between the transparent substrate and the display, electrically connected with the communication circuit, wherein the first conductive pattern comprises a plurality of first mesh patterns formed along the first display area and a plurality of second mesh patterns formed along the second display area, wherein each of the plurality of second mesh patterns comprises a first periphery, a second periphery substantially parallel to the first periphery, a third periphery extended from an end of the first periphery to an end of the second periphery, and a fourth periphery extended from the other end of the first periphery to the other end of the second periphery, wherein the second periphery and the third periphery are closer to the curved portion of the housing than the first periphery and the fourth periphery, and wherein a thickness of the second periphery and a thickness of the third periphery are respectively thinner than a thickness of the first periphery and a thickness of the fourth periphery.

2. The electronic device of claim 1, further comprising:
a second conductive pattern disposed inside the display or between the transparent substrate and the display; and
a touch sensing circuit within the housing and electrically connected with the second conductive pattern,
wherein the first conductive pattern is disposed between the second conductive pattern and the transparent substrate.

3. The electronic device of claim 2, further comprising:
a pressure sensor at least partially disposed between the second display area and the transparent substrate, or on a face of the second display area, which faces opposite to the transparent substrate.

4. The electronic device of claim 3, wherein the pressure sensor is electrically connected to the touch sensing circuit.

5. The electronic device of claim 2, wherein the first conductive pattern or the second conductive pattern at least partially includes aluminum, copper, silver, graphene, indium-tin-oxide (ITO), or indium-zinc-oxide (IZO).

6. The electronic device of claim 5,
wherein the first conductive pattern at least partially includes silver, ITO, or IZO, and
wherein the second conductive pattern at least partially includes aluminum or copper.

7. The electronic device of claim 2, further comprising:
a first non-conductive layer disposed between the first conductive pattern and the second conductive pattern.

8. The electronic device of claim 7,
wherein the second conductive pattern is disposed on the display, and
wherein the electronic device further comprises a second non-conductive layer disposed between the display and the second conductive pattern.

9. The electronic device of claim 2, further comprising:
a first non-conductive layer disposed between the second conductive pattern and the transparent substrate,
wherein the first conductive pattern is disposed on both sides of the first non-conductive layer.

10. The electronic device of claim 2, further comprising a control circuit operatively coupled with the first conductive pattern and the second conductive pattern, the control circuit is configured to:
detect a region of a user touch via the second conductive pattern, and
reduce intensity of a signal to be transmitted to an external device via at least a portion of the first conductive pattern that is disposed in the detected region.

11. The electronic device of claim 10, wherein the control circuit is configured to increase intensity of a signal to be transmitted to the external device via at least another portion of the first conductive pattern disposed outside of the detected region.

12. The electronic device of claim 2, further comprising:
a control circuit electrically connected to the touch sensing circuit, the communication circuit, the first conductive pattern, and the second conductive pattern,
wherein the control circuit is configured to
determine a position of a user's touch or gesture input based on a signal acquired via the second conductive pattern using the touch sensing circuit, and
transmit and receive a signal to/from an external device via the first conductive pattern using the communication circuit.

13. The electronic device of claim 1, wherein the first conductive pattern is at least partially disposed between the second display area and the transparent substrate.

14. The electronic device of claim 1, wherein the display comprises a first portion on which a screen is displayed and a second portion on which no screen is displayed.

15. The electronic device of claim 14, wherein the first conductive pattern is at least partially disposed on the second portion.

16. The electronic device of claim 14, further comprising:
a pressure sensor at least partially disposed between the second portion and the transparent substrate, or on a face of the second portion, which faces opposite to the transparent substrate.

17. The electronic device of claim 1, wherein the display comprises a single display disposed along at least a portion of the front surface, at least a portion of the rear surface, and at least a portion of the side surface of the housing.

18. The electronic device of claim 1, wherein the display comprises:
a first display disposed along at least a portion of the front surface of the housing and at least a portion of the side surface of the housing, and
a second display disposed along at least a portion of the rear surface of the housing and another portion of the side surface of the housing.

19. The electronic device of claim 1, wherein the display comprises:
a first display disposed along at least a portion of the front surface of the housing,
a second display disposed along at least a portion of the rear surface of the housing, and
a third display disposed along at least a portion of the side surface of the housing.

20. The electronic device of claim 1, wherein the first conductive pattern is disposed such that at least a part of a plurality of mesh patterns are opened.

* * * * *